Cenozoic Production.
Drainage up-dip.

Paleozoic Production.

Inventors:
Robert A. Clark, Jr.,
James H. Starr,
Kenneth M. Watson &
Thomas A. Banning, Jr.

Feb. 26, 1963  R. A. CLARK, JR., ETAL  3,079,085
APPARATUS FOR ANALYZING THE PRODUCTION AND DRAINAGE OF
PETROLEUM RESERVOIRS, AND THE LIKE
Filed Oct. 21, 1959  32 Sheets-Sheet 2
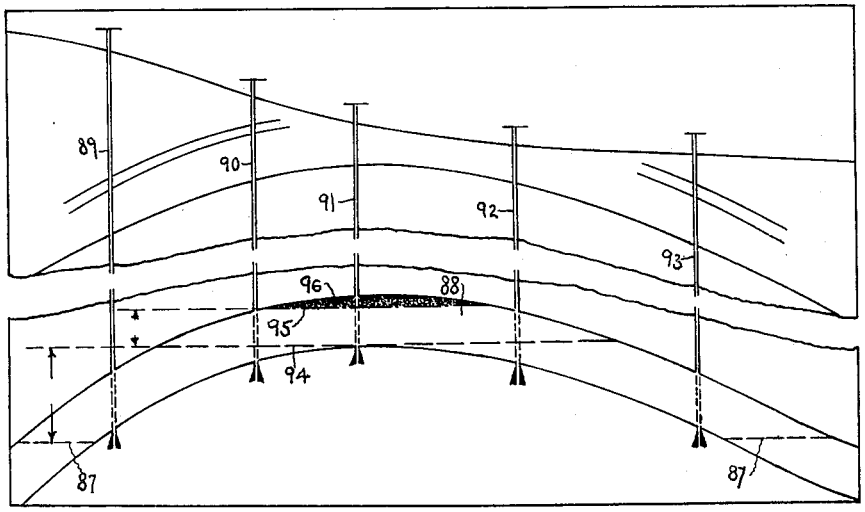
Anticlinal Cenozoic Production.  Fig.3.
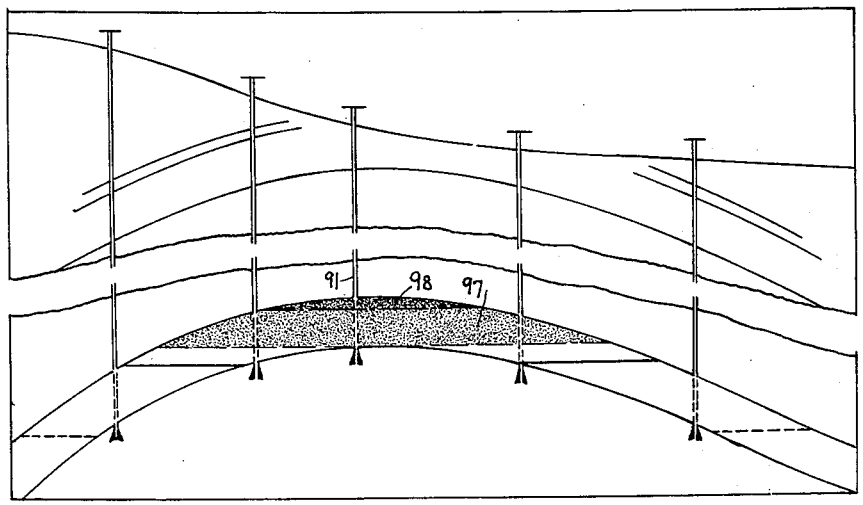
Edge Water Drive.   Fig.4.
Secondary Production shown by
Lighter Stippling.
Inventors:
Robert A. Clark, Jr.,
James H. Starr,
Kenneth M. Watson &
Thomas A. Banning, Jr.

Feb. 26, 1963 R. A. CLARK, JR., ETAL 3,079,085
APPARATUS FOR ANALYZING THE PRODUCTION AND DRAINAGE OF
PETROLEUM RESERVOIRS, AND THE LIKE
Filed Oct. 21, 1959 32 Sheets-Sheet 3
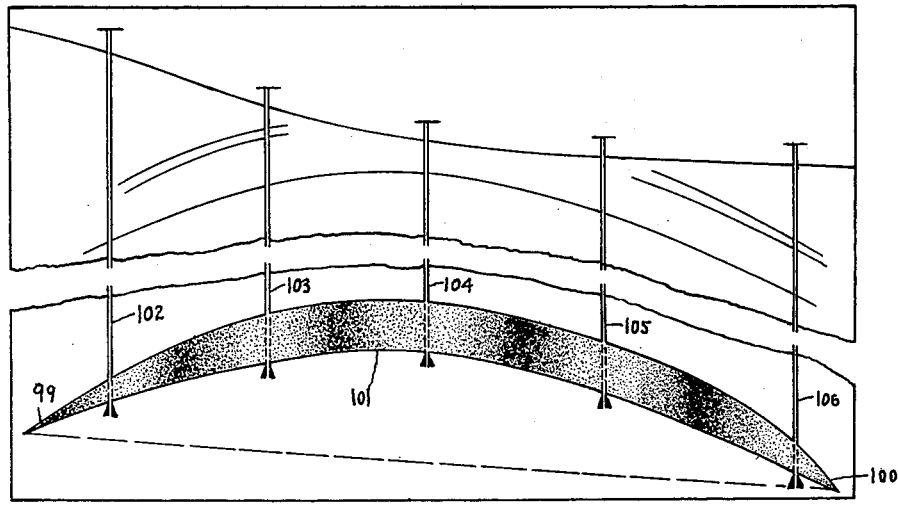
Trap. Paleozoic Production. Fig.5.
Depletion shown by
Intensity of Stippling.
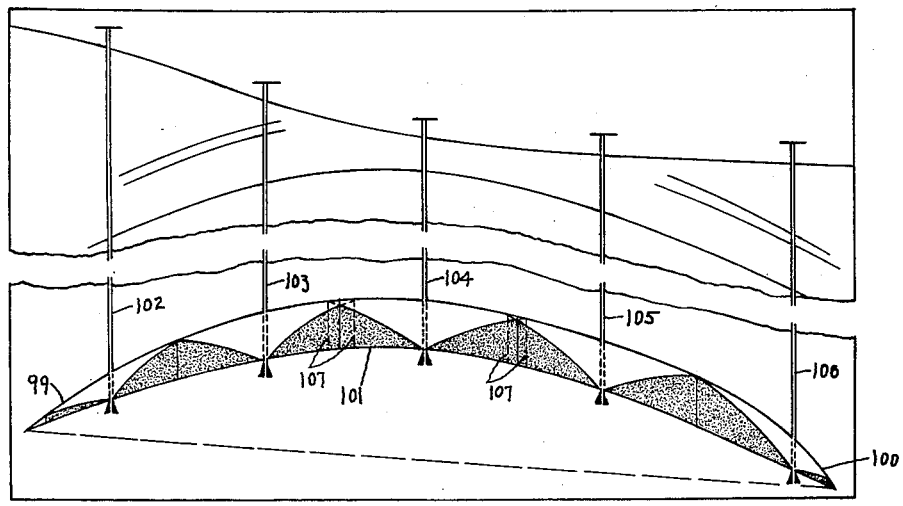
Trap. Paleozoic Production. Fig.6.
Depletion shown Schematically
by Stippling.
Inventors:
Robert A. Clark, Jr.,
James H. Starr,
Kenneth M. Watson &
Thomas A. Banning, Jr.

Feb. 26, 1963 R. A. CLARK, JR., ET AL 3,079,085
APPARATUS FOR ANALYZING THE PRODUCTION AND DRAINAGE OF
PETROLEUM RESERVOIRS, AND THE LIKE
Filed Oct. 21, 1959 32 Sheets-Sheet 4
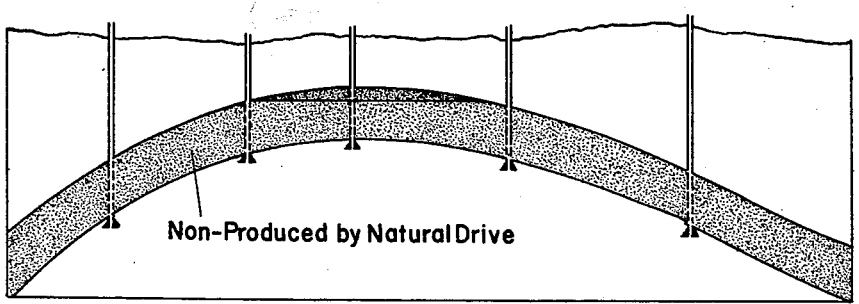
Cenozoic Production. Fig. 7.
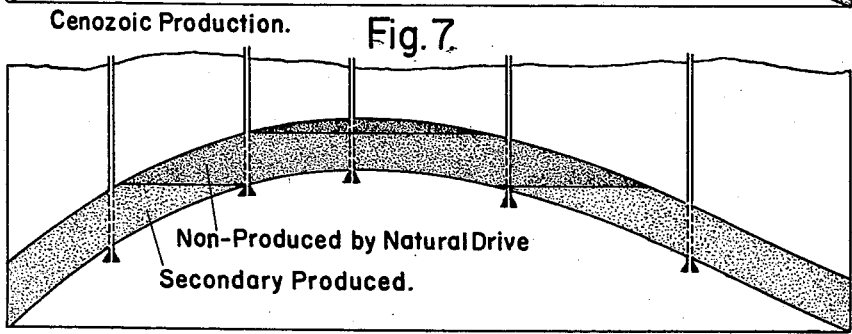
Cenozoic Production. Fig. 8.
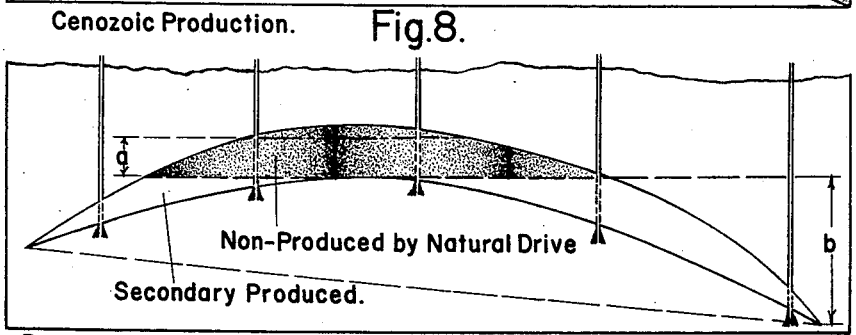
Paleozoic Production. Fig. 10.
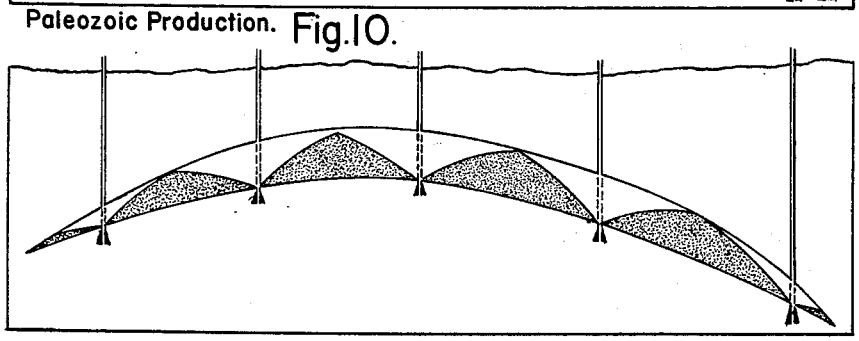
Fig. 9.
Trap. Paleozoic Production.
Non-Produced Contents
Shown schematically
by Stippling.
Inventors:
Robert A. Clark, Jr.,
James H. Starr,
Kenneth M. Watson &
Thomas A. Banning, Jr.

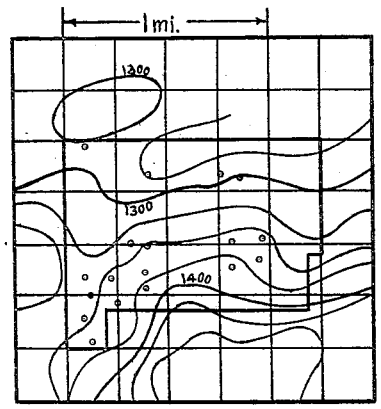
Cenozoic Production. Fig. 11.
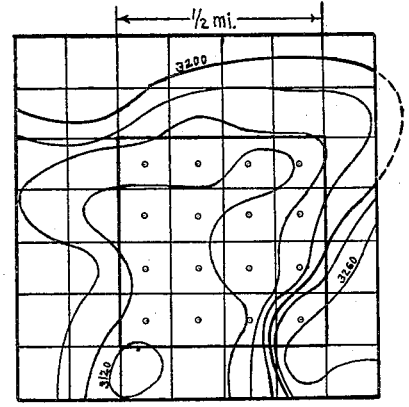
Paleozoic Production. Fig. 12.
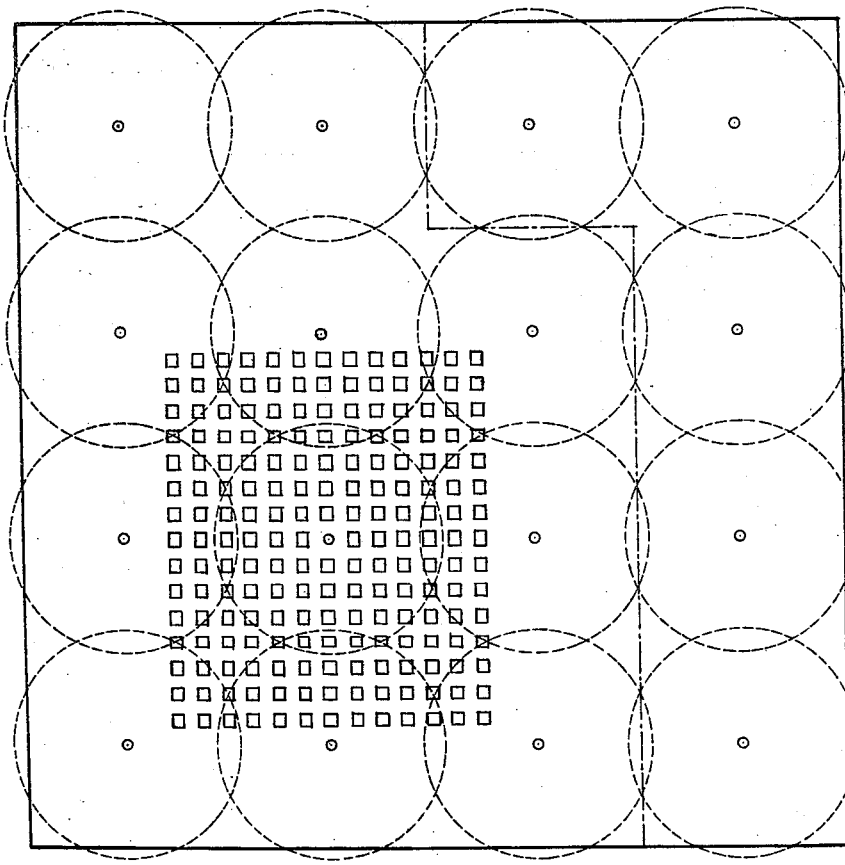
Paleozoic Production. Fig. 13.
Inventors:
Robert A. Clark, Jr., James H. Starr,
Kenneth M. Watson & Thomas A. Banning, Jr.

Feb. 26, 1963  R. A. CLARK, JR., ET AL  3,079,085
APPARATUS FOR ANALYZING THE PRODUCTION AND DRAINAGE OF
PETROLEUM RESERVOIRS, AND THE LIKE
Filed Oct. 21, 1959  32 Sheets-Sheet 6
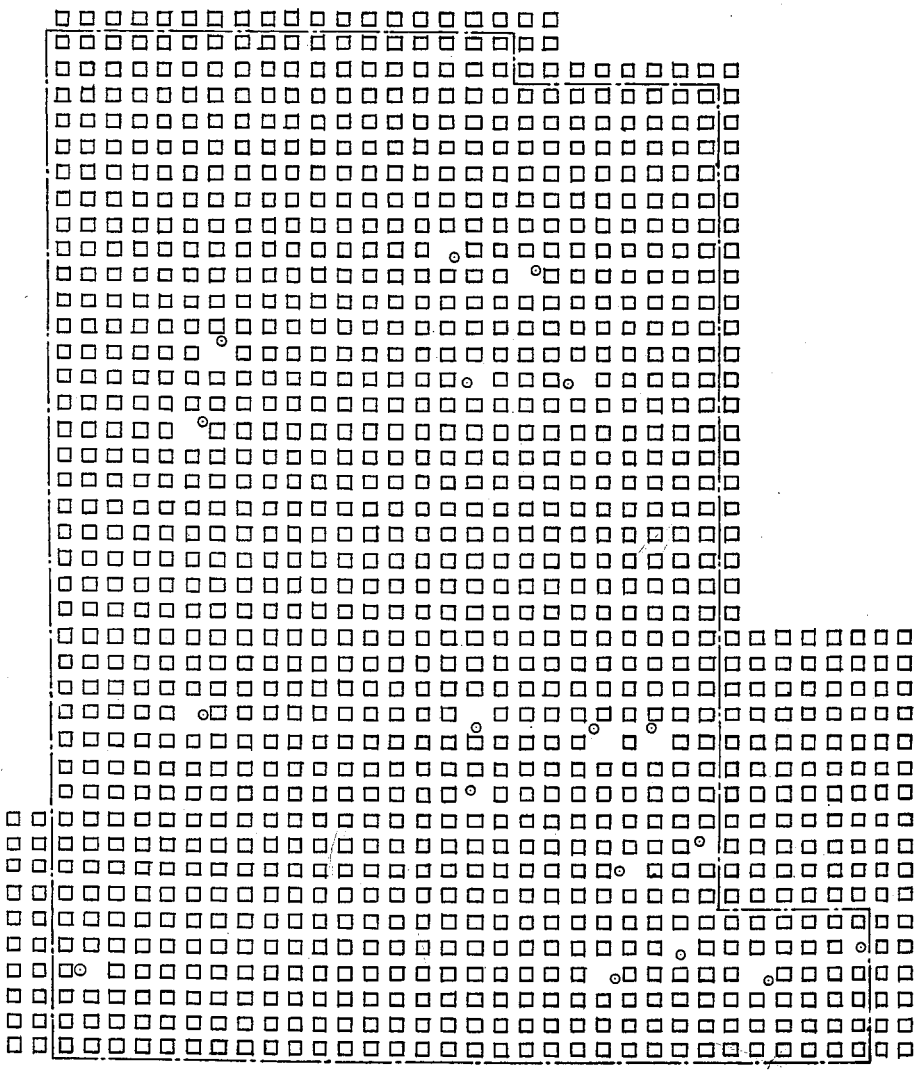
Cenozoic Production.  Fig.14.
Inventors:
Robert A. Clark, Jr.,
James H. Starr,
Kenneth M. Watson &
Thomas A. Banning, Jr.

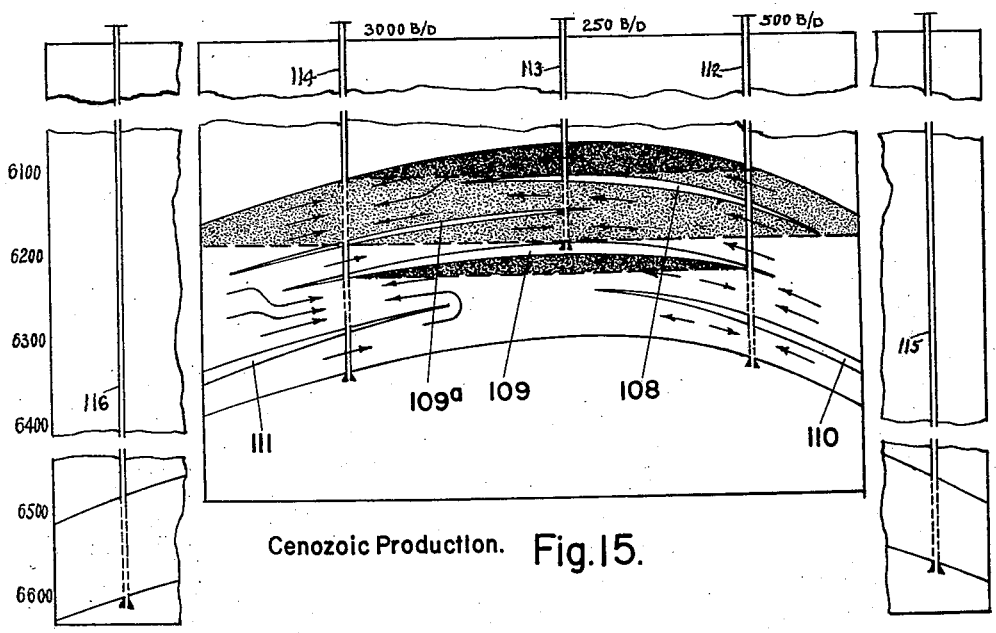
Cenozoic Production. Fig. 15.
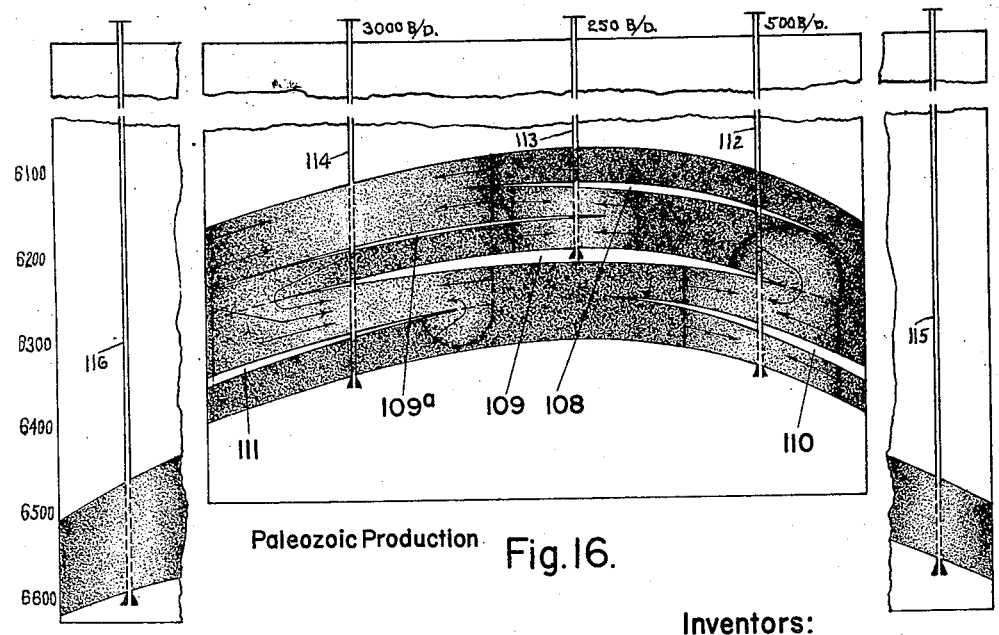
Paleozoic Production Fig. 16.
Inventors:
Robert A. Clark, Jr.,
James H. Starr,
Kenneth M. Watson &
Thomas A. Banning, Jr.

Common Production from several independent formations.   Cenozoic Production.

Common Production from several independent Traps.   Paleozoic Production.

Inventors:
Robert A. Clark, Jr.,
James H. Starr,
Kenneth M. Watson &
Thomas A. Banning, Jr.

Paleozoic Production—
then Gas Injection.

Paleozoic Production.

Inventors:
Robert A. Clark, Jr., James H. Starr,
Kenneth M. Watson & Thomas A. Banning, Jr.

Relative Permeability. Oil.
Water Wetting Phase.

Relative Permeability. Gas.
Water Wetting Phase.

Inventors:
Robert A. Clark, Jr., James H. Starr,
Kenneth M. Watson & Thomas A. Banning, Jr.

Inventors:
Robert A. Clark, Jr.,
James H. Starr,
Kenneth M. Watson &
Thomas A. Banning, Jr.

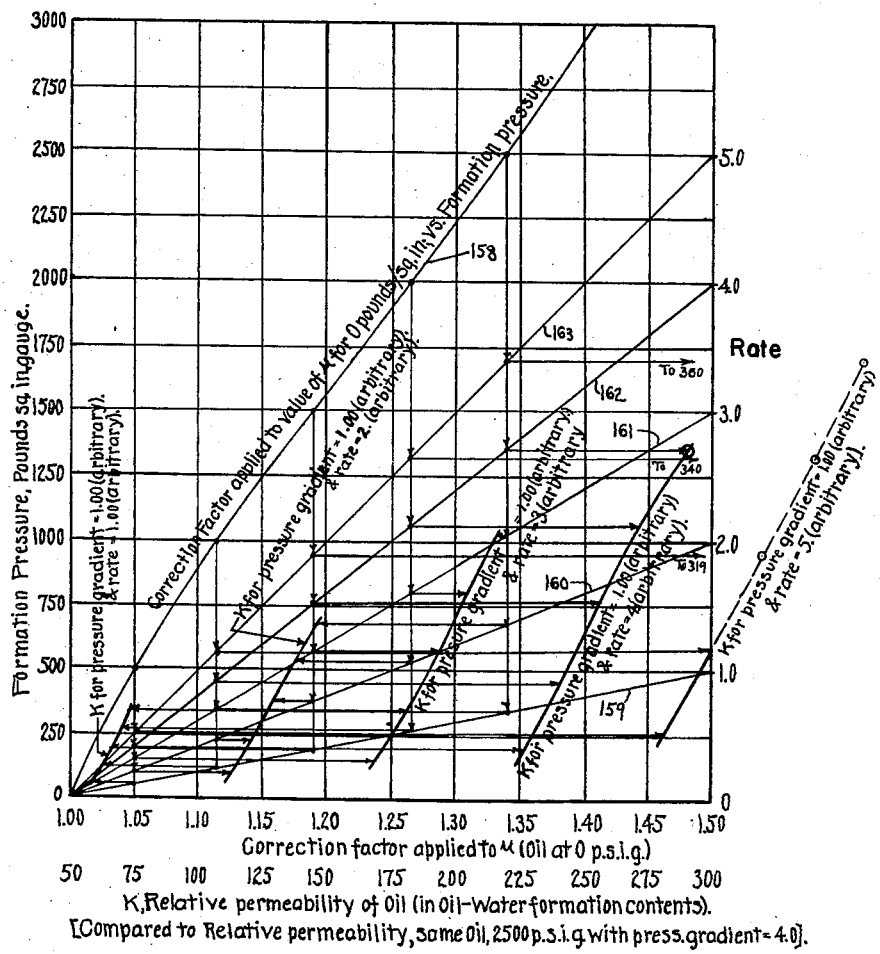

Fig. 34.

Sequence.

Move along "Correction Factor" line to intersection with the specified "Formation Pressure". Then follow the intersecting vertical correction factor value line to its intersection with the specified "Rate Line". Then move horizontally from such rate line intersection point to the corresponding $K_o$ line. Read the value of $K_o$ at such intersection with such $K_o$ line. This will be the value which $K_o$ must have for production of the specified rate (in arbitrary units of rate) by an assumed pressure gradient of unity (in arbitrary units of pressure gradient), and without correction for oil volume shrinkage accompanying reduction of formation pressure.

For the case of any pressure gradient other than unity on such arbitrary scale divide the value of $K_o$ as determined above by the value of such other pressure gradient on said scale.

To correct for oil shrinkage due to formation pressure divide the value of $K_o$ as determined above by the value of the "Formation Factor" for Oil, $(B_o)$, corresponding to the formation pressure at the test location.

Equations:

$R = PK/Mu_o$     $K_o = RMu_o/P$

Where: $R$ = Oil Rate, $K_o$ = Permeability to Oil, $Mu_o$ = Viscosity of the Oil, $P$ = Pressure Gradient.

Inventors:
Robert A. Clark, Jr.,
James H. Starr,
Kenneth M. Watson &
Thomas A. Banning, Jr.

Typical Three Dimensional Simulating Unit.

Inventors:
Robert A. Clark, Jr.,
James H. Starr,
Kenneth M. Watson &
Thomas A. Banning, Jr.

Inventors:
Robert A. Clark, Jr., James H. Starr,
Kenneth M. Watson & Thomas A. Banning, Jr.

Feb. 26, 1963    R. A. CLARK, JR., ET AL    3,079,085
APPARATUS FOR ANALYZING THE PRODUCTION AND DRAINAGE OF
PETROLEUM RESERVOIRS, AND THE LIKE
Filed Oct. 21, 1959    32 Sheets-Sheet 18
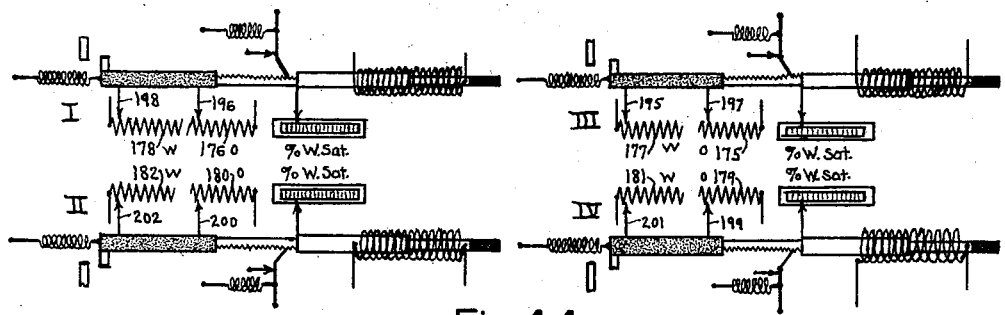
Fig. 44.
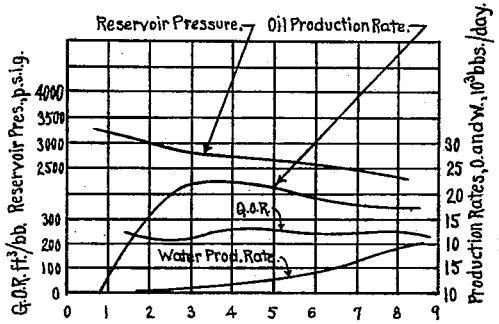
Fig. 47. Year of Production. Cenozoic Production.
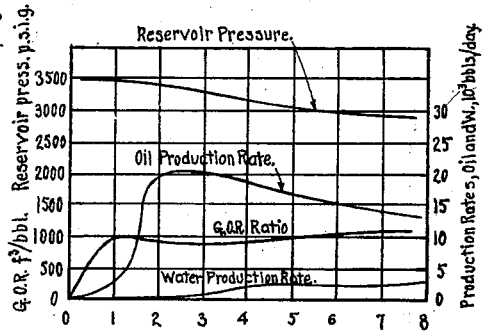
Fig. 48. Year of Production. Cenozoic Production with Gas Cap.
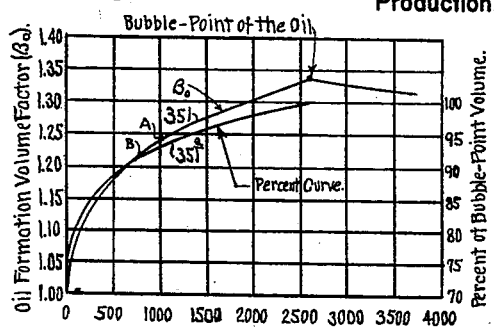
Fig. 50.    Fig. 46.
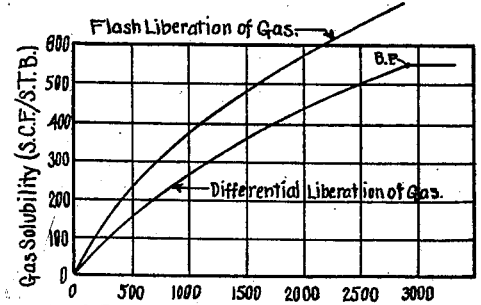
Fig. 45.
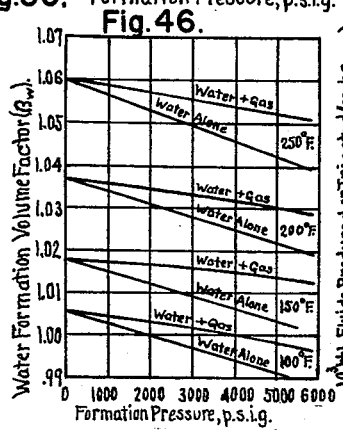
Fig. 49.
Water Injection Drive Production.
Inventors:
R. A. Clark, Jr.,
J. H. Starr,
K. M. Watson &
T. A. Banning, Jr.

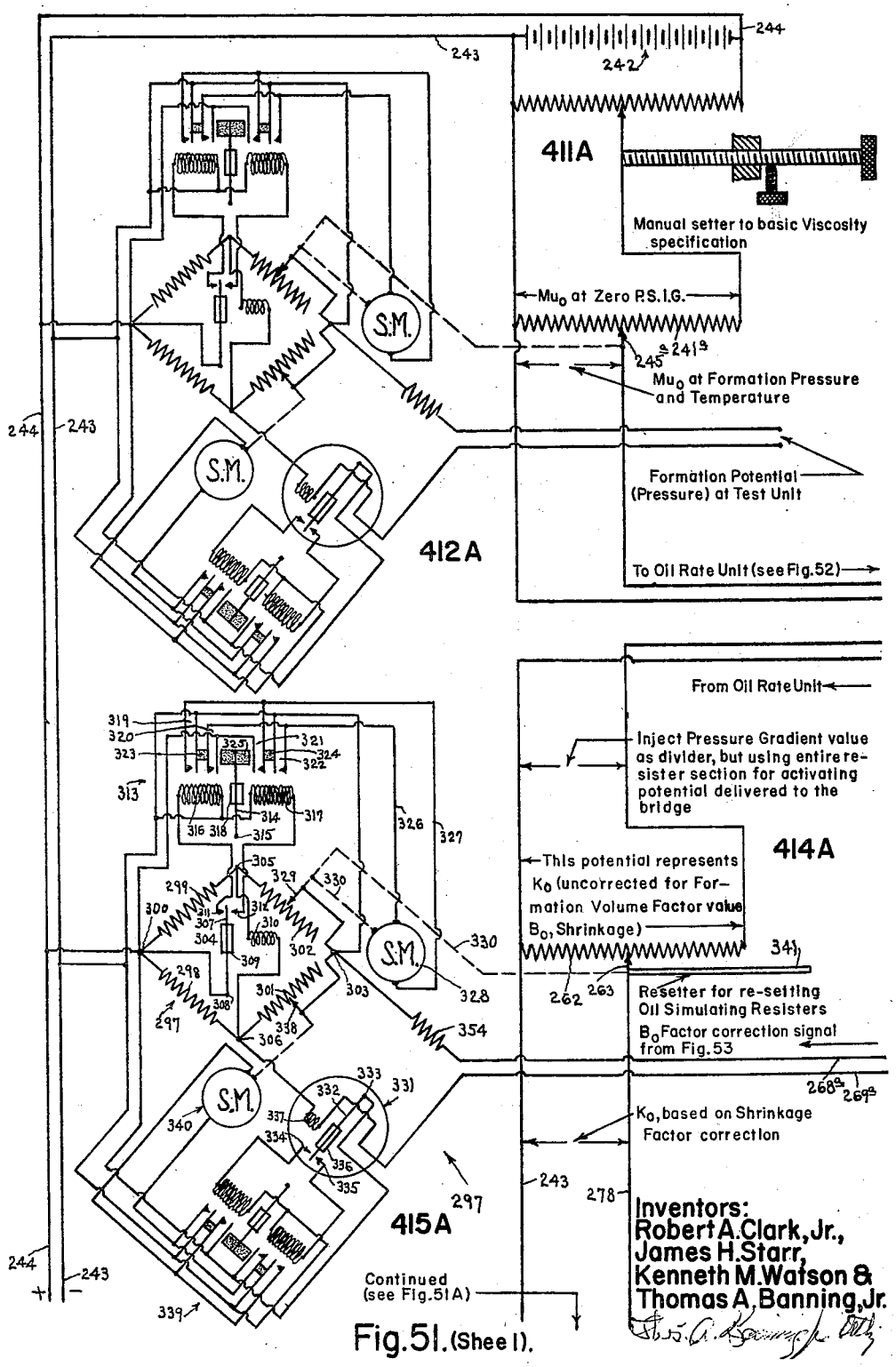

(Sheet 2.)

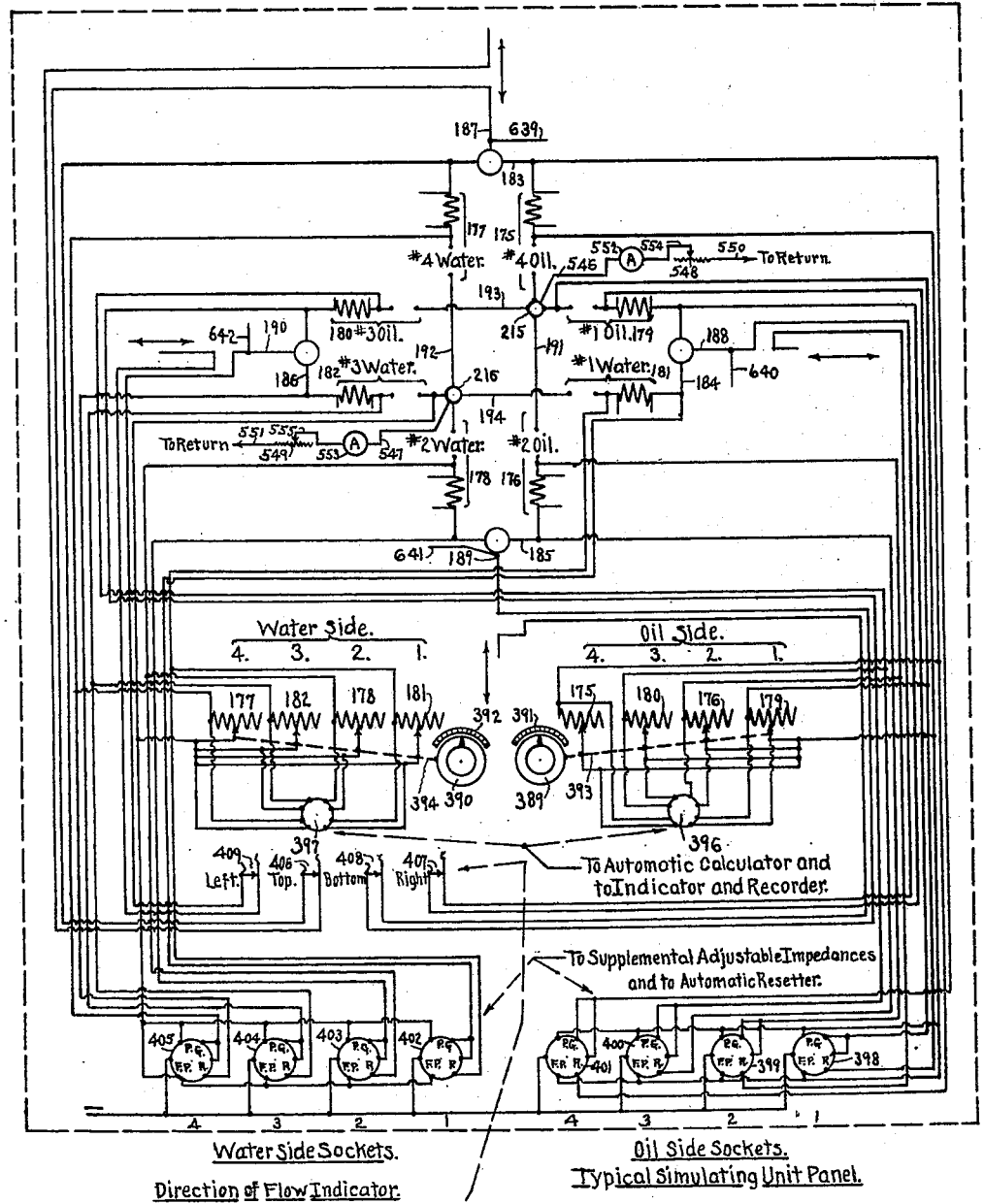
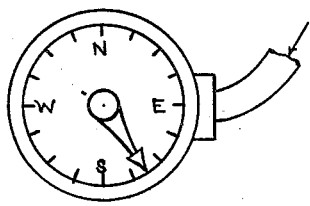
Fig. 56.
Inventors:
Robert A. Clark, Jr.,
James H. Starr,
Kenneth M. Watson &
Thomas A. Banning, Jr, Feb. 26, 1963    R. A. CLARK, JR., ETAL    3,079,085
APPARATUS FOR ANALYZING THE PRODUCTION AND DRAINAGE OF
PETROLEUM RESERVOIRS, AND THE LIKE
Filed Oct. 21, 1959    32 Sheets-Sheet 24

Inventors:
Robert A.Clark, Jr.,
James H.Starr,
Kenneth M.Watson &
Thomas A.Banning, Jr.

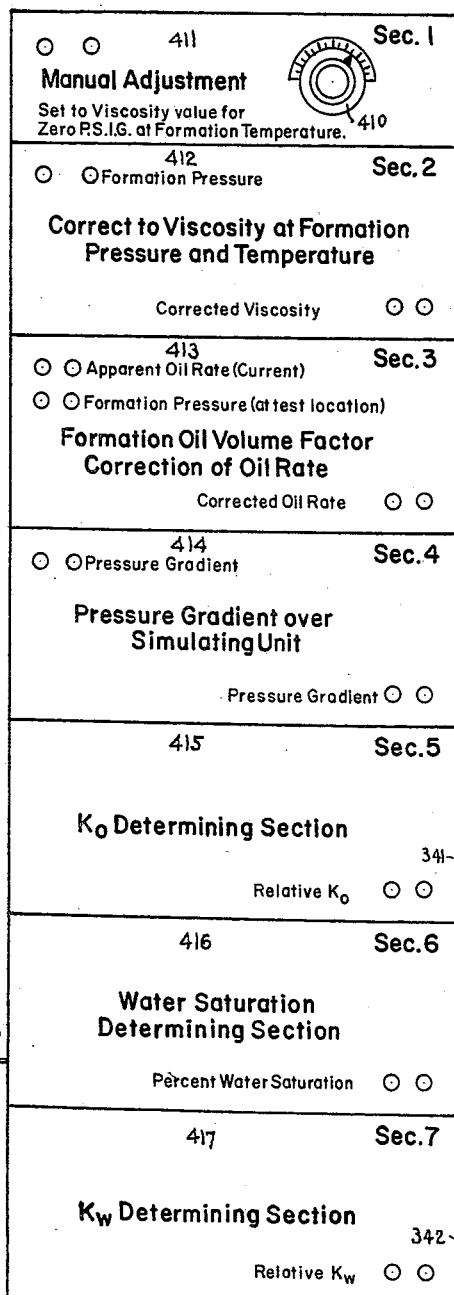
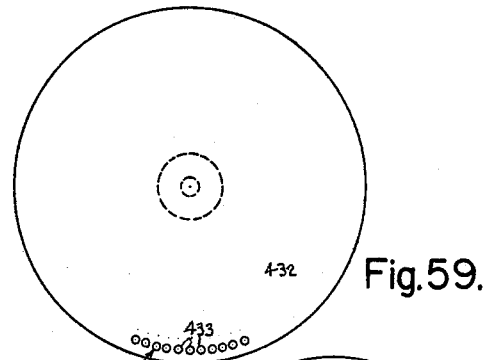
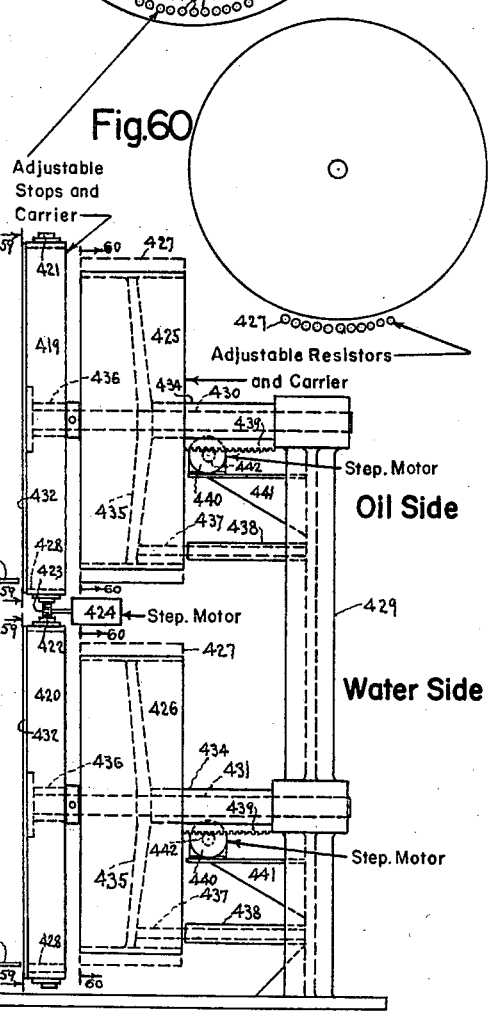
Fig. 58.
Fig. 59.
Fig. 60.
Inventors:
Robert A. Clark, Jr., James H. Starr,
Kenneth M. Watson & Thomas A. Banning, Jr.

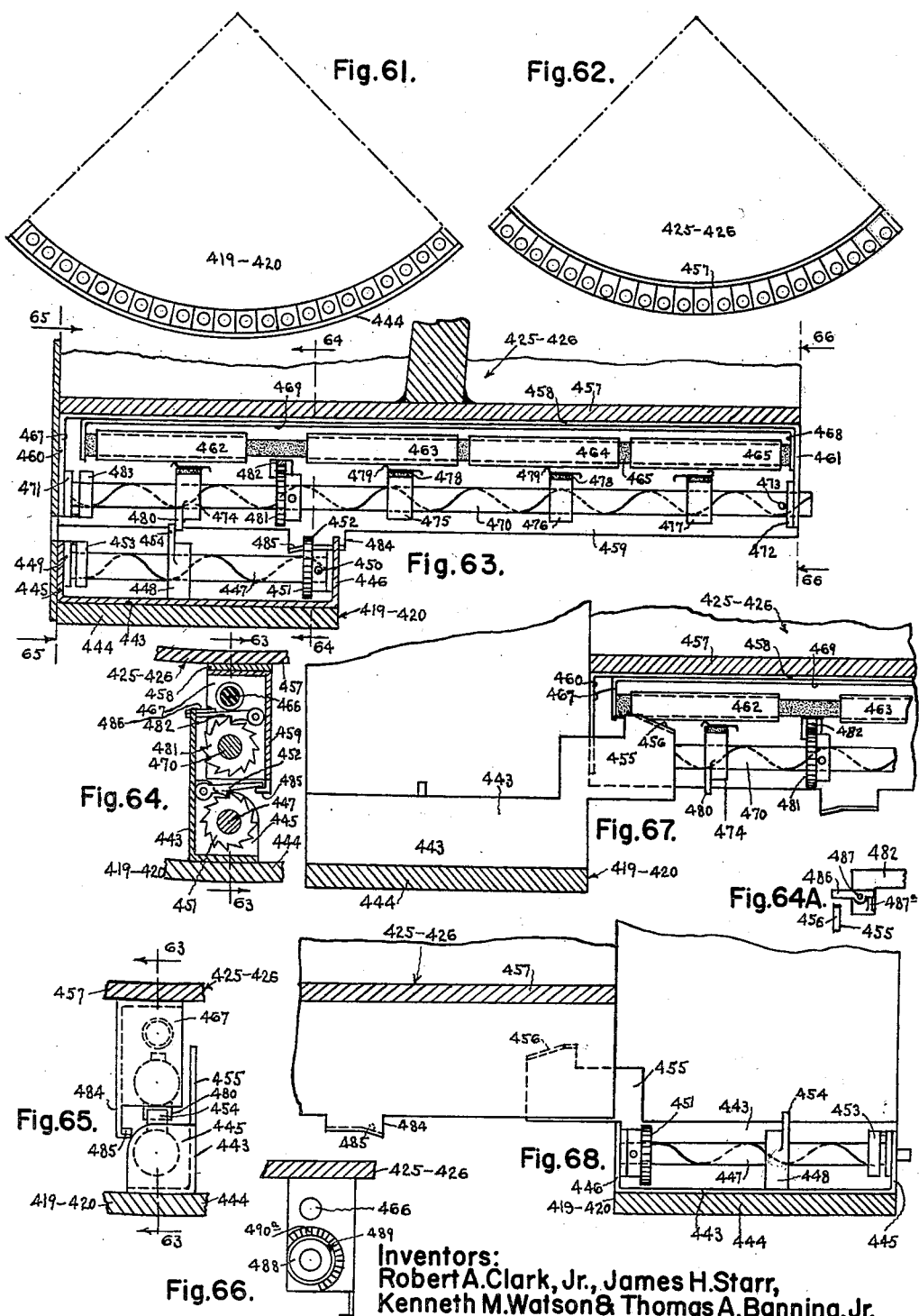

Programmer.

Inventors:
Robert A. Clark, Jr.,
James H. Starr,
Kenneth M. Watson &
Thomas A. Banning, Jr.

Inventors:
Robert A. Clark, Jr.,
James H. Starr,
Kenneth M. Watson &
Thomas A. Banning, Jr.

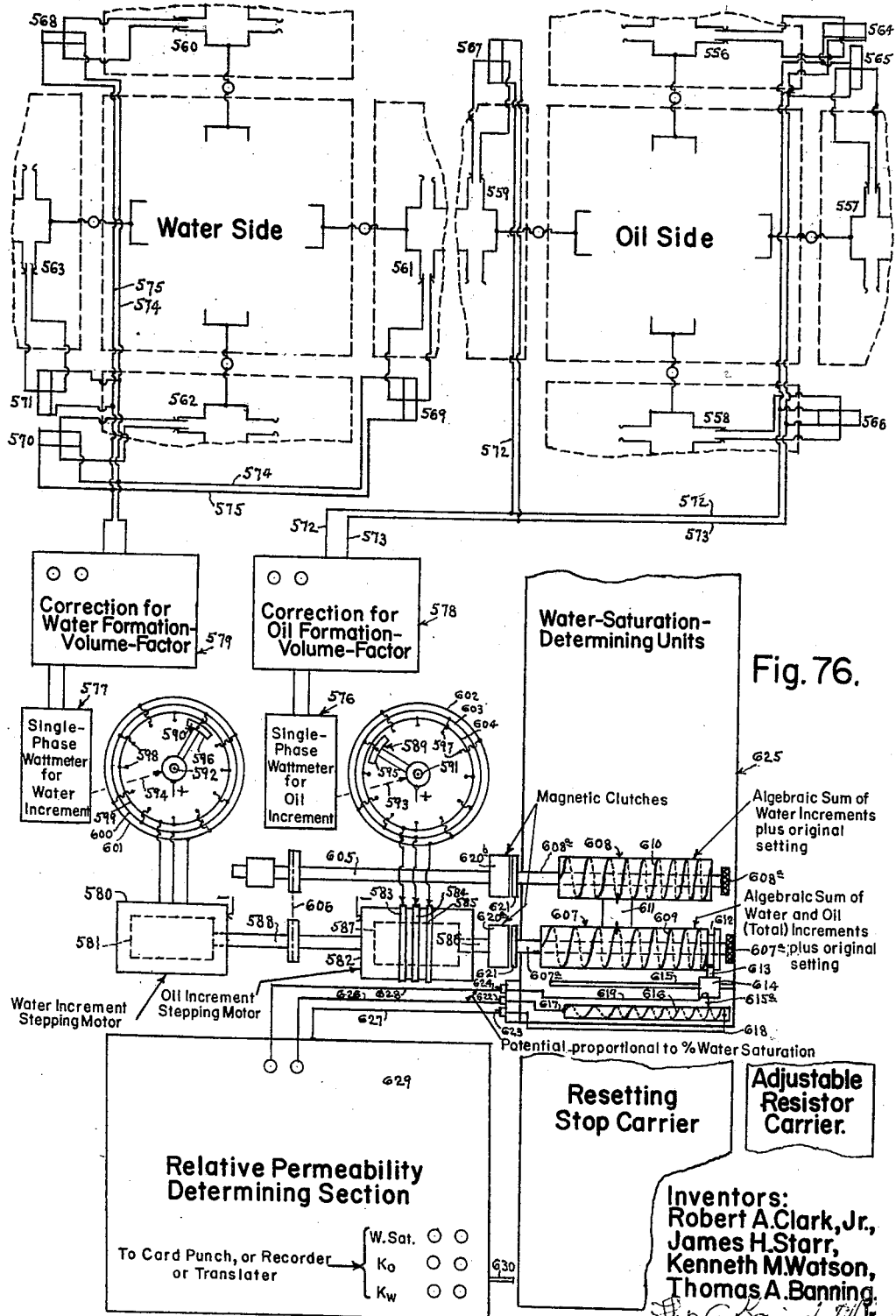

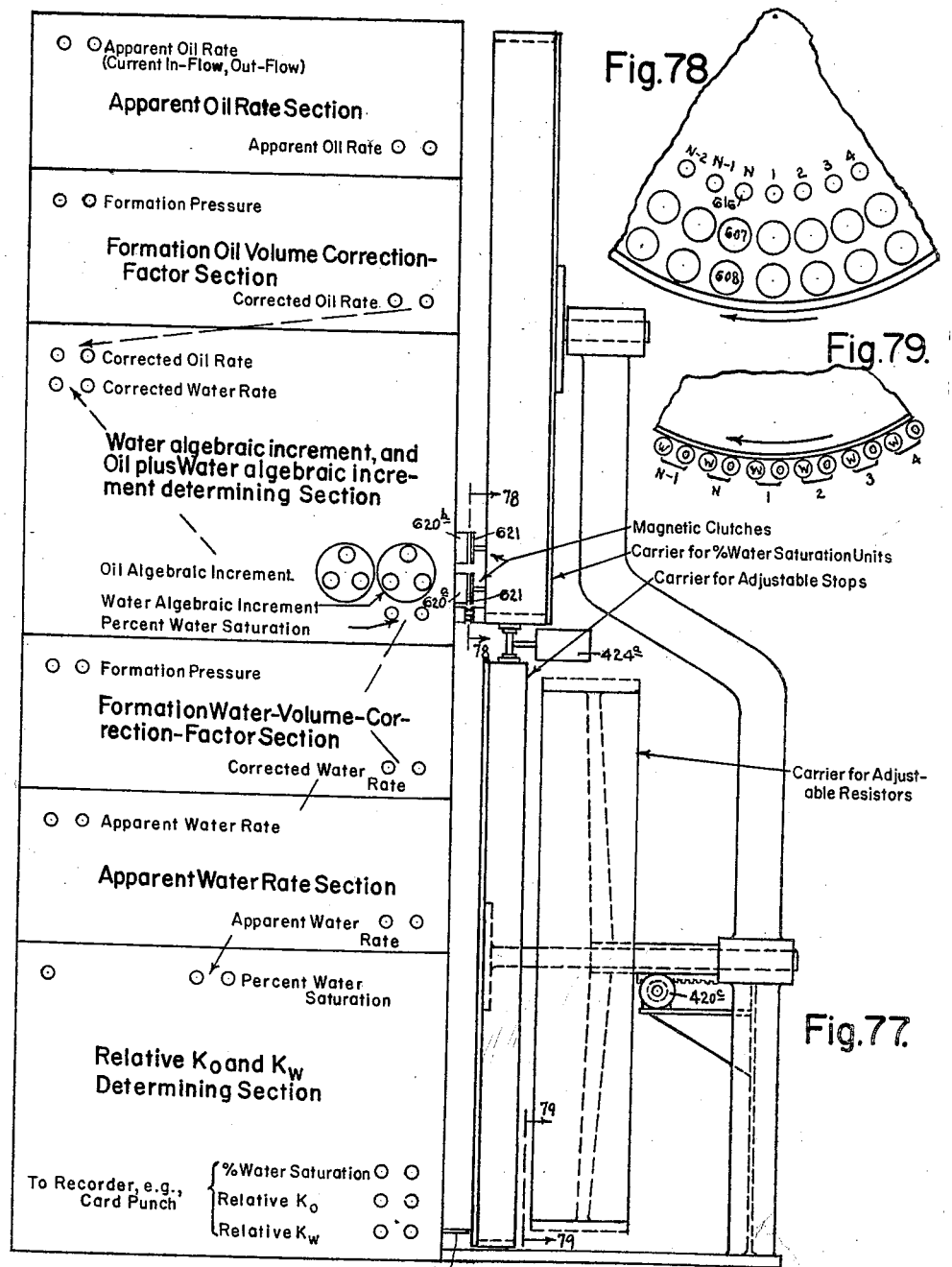

Feb. 26, 1963   R. A. CLARK, JR., ETAL   3,079,085
APPARATUS FOR ANALYZING THE PRODUCTION AND DRAINAGE OF
PETROLEUM RESERVOIRS, AND THE LIKE
Filed Oct. 21, 1959   32 Sheets-Sheet 31

Inventors:
Robert A. Clark, Jr.,
James H. Starr,
Kenneth M. Watson &
Thomas A. Banning, Jr.

Analog-Digital Flow-Sheet.

Inventors:
Robert A. Clark, Jr.,
James H. Starr,
Kenneth M. Watson &
Thomas A. Banning, Jr.

United States Patent Office 3,079,085
Patented Feb. 26, 1963

3,079,085
APPARATUS FOR ANALYZING THE PRODUCTION
AND DRAINAGE OF PETROLEUM RESERVOIRS,
AND THE LIKE
Robert A. Clark, Jr., River Forest, Ill. (5646 W. Race St., Chicago, Ill.), James H. Starr, 345 N. Spring Ave., La Grange, Ill., Kenneth M. Watson, Cuba Road, Lake Zurich, Ill., and Thomas A. Banning, Jr., Chicago, Ill.; said Banning assignor to said Clark
Filed Oct. 21, 1959, Ser. No. 847,756
91 Claims. (Cl. 235—185)

This invention relates to methods and apparatus for analyzing the production and drainage performance of petroleum reservoirs, and the like. The features of invention hereinafter disclosed are adapted to the analysis of reservoir production and drainage performance by the simulation in the presently disclosed equipment and apparatus, of certain known conditions existing in the reservoir at the present time, and when such reservoir may be subjected to selected operating conditions for its further production. The equipment and apparatus may thus be used to aid in determining the development of new reservoirs in order to ensure the highest economy in such development and production, when sufficient data are available for carrying forward such analyses; and also to aid in determining the probable effect of further development programs and further production operations to ensure highest economy overall and to ensure highest return to the point of abandonment of the field, based on the present condition of drainage of such field.

Various of the conditions which affect the performance of the reservoir under assumed development and production programs include porosity of the formation, permeability of the formation, homogeneity or heterogeneity of the porosity and permeability of such formation, both horizontally and vertically, thickness of the formation, whether or not it is lenticular, the general areal extent of the reservoir, the percent saturation of oil and gas in the formation, the viscosity of the fluid contents of the formation, pressures existing in the formation, including bottom hole pressures both under production and shut-in, whether the drive is an edge water contact drive or a saturated gas drive, or both, whether a gas cap is present, and various other conditions well known in the art of petroleum reservoir production and drainage. Various of such conditions change with differing degrees of such change during the drainage of the reservoir, so that future drainage programs to produce the most advantageous and desirable operations depend on the present condition of the reservoir and its past history and performance. Other conditions affect the drainage, including the dip of the formation, and various factors of a rather minor influence.

The equipment and apparatus hereinafter to be disclosed include provision for simulating various of the conditions above mentioned which affect drainage, so that, from presently known information respecting such so simulated conditions, and by use of the elements of equipment as hereinafter disclosed, it is possible to estimate probable effects of various programs of further drainage to determine the relative desirabilities of such programs, their probable relative benefits from the standpoint of ultimate percent depletion at the time of abandonment, as well as producing data of value in estimating the relative benefits which may be expected on the basis of investment and return of capital, operating cost, etc. Said features of invention will also be of value in analyzing effects and amounts of cross property line drainage produced by various well production programs, and in analyzing other problems of like nature. The effects of various well spacing programs may also be studied to determine the relative desirabilities of various of such programs, both from the standpoint of expected return from the property, and from the standpoint of percent fluid left in the formation at the time of abandonment, etc.

Such equipment and apparatus may also be of value in analyzing the effects of pressure maintenance, re-pressuring, cycling, and the like, in the case of natural gas pressure drive reservoirs, gas cap reservoirs, edge water intrusion, and the like; and for analyzing the probable performance of condensate reservoirs and others of special characteristics.

Briefly stated, we include in our present equipment and apparatus, means to simulate the known or probable characteristics and values of porosity, relative permeability, percent voidage of the porous formation at the present time, percent water saturation at the present time, and other known characteristics of the formation. Such simulation is effected by means of numerous electrical or like units, each of which includes adjustable impedance elements which may be pre-set, and may, from time to time, be re-set, to simulate the changing conditions within the simulated body of the real formation, so that the flowage or seepage of the fluid contents of the reservoir through such simulating unit may be caused to correctly reproduce the flowage characteristics of the reservoir, taking into consideration changes occurring in relative permeabilities, percent water saturations, formation pressures, and other vital factors, including gas saturation, etc. We interconnect these units together, either or both horizontally and vertically, in such manner as to simulate the real formation, each such network simulating unit corresponding to a body of the real formation. Each such simulating unit may also be pre-set to reproduce the known or probable characteristics of the simulated body at the present time, so that when the equipment is set up for commencement of a test such equipment may simulate the probable characteristics and conditions of the real formation over the full area of such formation and reservoir which is to be studied. If the real formation is known to be of substantially homogenous characteristics over its area which is to be studied, the pre-settings of such simulating units may be effected on the premise of such homogeneity; if a non-homogenous condition is known to exist in the real formation, the effects of such non-homogeneity may be taken into consideration in making the pre-settings of the simulating units. If the present conditions of depletion of the real reservoir are known, the pre-settings of the simulating units may be such as to reproduce the presently known conditions existing in the real formation. If the present conditions of various portions of the real reservoir are not known, other facts or data obtained during the production history of the reservoir up to the present time may be sufficient to enable the user of our equipment to reproduce the probable present conditions of various portions of the real reservoir. This may be done, for example, by running our equipment through a series of test operations representing the past history of the reservoir's production, to bring the simulating units of our equipment into adjustments and relations such as to probably simulate the present conditions of various areal elements of the real reservoir, thus bringing our simulating units into proper adjustment and relation to each other to simulate the conditions of the various elements of the real reservoir at the present time, and on the basis of such known past production history.

Having thus pre-set the simulating units, electric currents may be run through the thus inter-connected network. The potential drops across the various simulating units will be a measure of the drive forces existing through the various units and the magnitudes of currents flowing through various of the branches of the network will be a basis for determining the rates of flow of the fluid contents of the reservoir through the various simulating unit branches, subject to certain corrections. These corrections will be discussed presently, but as above stated, the magnitudes of the currents may constitute the basis on which the true rates of fluid flow through the various portions of the reservoir may be determined.

Having set up the network of simulating units, and having pre-set each such unit to simulate the present conditions which it is intended to simulate in the real reservoir, and having made provision for producing changes in the various units during the progress of a series of tests, or a study of the reservoir, the movements of the natural fluids through the real pay-zone may be reproduced under selected conditions of production and/or drive, and may be determined and recorded at various stages of the test. Thereby, the probable conditions of the reservoir and its contents will be determinable after any time lapse under such varying conditions of production as may be simulated during the test or series of tests. Thereby, also, the effects of various conditions and kinds of artificial drives either edge water, or gas, or both, or other artificial drives such as combustion or hot gas drives, may be determined. Also, the effects of changes made or suggested in such artificial drives during the production of the field, may be forecast. Numerous other possible uses of such arrangements as we shall disclose herein, will suggest themselves to the student of this specification.

The potential drop across each elemental electrical element of the simulating network is proportional to the impedance of such element, multiplied by the current flow through such element. Either direct current or alternating current may be used during the tests conducted on the network formed by such interconnected elements or units. In either case, the impedance characteristics of the elements must be such as to faithfully simulate the permeability characteristics of the individual real reservoir elements or areal bodies which such network elements simulate. It is here mentioned that in actuality the permeability and other characteristics of the real reservoir areal bodies so simulated change by large proportions during the depletion of the field. We have made provision for producing corresponding changes in the impedance values of the simulating elements of the network, either continuously or from time to time. Thus we reproduce faithfully (as nearly as may be possible on the basis of known characteristics of the pay-formation) the actual field flow characteristics of the real field through all of its simulated areas. Thus, too, we are able to determine the pattern of flow streams of the fluids through the field area so simulated, between the location of the simulated drive and the point or points of production. Thus, again, we are able to appraise the sweep efficiency of such simulated drive, either presently in operation in the real field, or proposed for future or further operation therein.

In connection with the above stated objective of our present disclosures it is here noted that when a test is commenced, using a simulating network embodying our invention, it is possible to pre-set the individual elements thereof to simulate the corresponding simulated areal bodies of the field so represented, so that each element of the simulating network will faithfully represent the corresponding real field's area. If such test represents the condition of the real field in the presently known condition of depletion, then the steps of the test as conducted will represent and simulate the future progress of the condition of the field in its various areal components (as nearly as may be possible on the basis of the available data concerning characteristics which shall affect the future production of such field). If the field has already been subject to production so that portions, at least, thereof have become partially depleted, it is evident that the elements of the simulating network should be pre-set to simulate the various real areas to which they correspond, since the flow streams through the individual elemental areas of the real field will be correspondingly affected. We are able to thus pre-set the individual network elements to simulate such real field areas. In this connection the following is noted:

When the production to which the real field has been subjected has been by edge-water drive, as distinguished from saturated gas pressure drive produced by the naturally present gases absorbed in the liquid contents of the formation (as distinguished from an artificial gas drive such as produced by cycling, re-pressuring, pressure-maintenance injection, etc.) the condition of depletion of such edge-water drive field in its various areal elements will be much different from the condition of depletion of a field of like area and permeability characteristics which had, due to its natural characteristics, origin, etc., been under production by such saturated gas pressure drive of its own gases released during the progress of such earlier depletion. In the former case of edge-water drive the characteristics of percent depletion, oil-water ratio, etc., will be much more uniform over the entire area to be simulated than will be the case in a partially depleted gas pressure drive field. By use of the improvements hereinafter to be disclosed we are able to pre-set the simulating elements or units to closely simulate the characteristics of permeability, pressure, etc., as actually existing in various portions of the partially depleted reservoir as of the time when the test is made, so that the final results of such test will most accurately indicate the probable results of the production program simulated during the test. In the case of simulation of either type of production field by use of our improvements, or simulation of a field which has previously been partially depleted by either type of production, we are able to determine, either continuously or from time to time the form of the flow streams, their pattern, etc., the approaching water flooding or breakthrough as it may approach any one or more of several producing wells, the desirability of closing off one or more producing wells to avoid excessive drive-water influx thereinto, the effects of a gas-cap on the approach of the contact surface of a water drive to producing wells higher up dip, and possible benefits of gas injection into such gas-cap to ensure higher ultimate sweep-efficiency, etc. Various other possible benefits and advantages to be gained in the production program of the field by use of analyses possible by the analyzer equipment herein disclosed will also appear from further study of the present disclosures.

The pressure differential through a body of the permeable formation of given dimensions of cross-section normal to the direction of flow, and length in such direction of flow, for a stated fluid flow rate per unit time is proportional to the resistance to such flow of such fluid through the formation. Such resistance to flow is inversely proportional to the permeability of the porous medium, and is also greatly affected by the nature of such fluid medium itself. Usually the fluid medium includes the liquid or liquids, water and oil, and the contained gas in saturation. These components vary, as to their relative proportions, during the depletion of any given elemental area of the formation, so that the permeability also varies as the depletion proceeds. The rate of fluid flow, the pressure gradient through the formation, and the permeability are therefore directly related to each other. Accordingly, as the permeability changes during the depletion of the formation, and during a given test or set of tests, it is necessary to correspondingly make changes in the simulating elements of the network. Such changes comprise changes of the elements corresponding to the real field areas. This has been referred to previously herein. Such changes or corrections may be easily made when the simulating elements comprise substantially pure resistances, free of reactive components, and such type of the simulating elements enable the use of either D.C. or A.C. in the network. By so doing, it is possible to use A.C. to enable various analyses of the current flows and interpretations based thereon to be conveniently made, as will presently appear. Included in such analyses are determinations of quantities of fluid flow, in addition to rates of such flow.

The foregoing statements have not distinguished between simulating network elements which are all located in a substantially common horizontal plane, and such elements which may be interconnected in a vertical relationship. The fluid movements through the formation usually include both horizontal and vertical components of motion; but of these the horizontal components are usually the most important by a large degree. Accordingly, in a simple embodiment of our network arrangement all of the simulating elements may be considered as corresponding to real areas of the real formation which areas are located in substantially a horizontal plane, or, in the case of a formation having a dip, as corresponding to the general surface of such formation dip. Under such an arrangement each simulating element may be provided with connections at its rear and front portions (considered from the standpoint of general direction of fluid flow through the formation), and with lateral or side connections to laterally adjacent simulating elements of the same plane. Thus, provision is made for lateral as well as forward flow of the fluids, considered from the standpoint of general direction of such flow. If the formation is substantially homogenous as previously referred to, such an arrangement will simulate the actual characteristics of the reservoir to an accuracy probably as great as the known characteristics of such reservoir based on available information from various sources. Such information will usually include, in the case of a partially depleted field, various cores and analyses from them obtained during the development of the field, and showing samples from which porosity, permeability, fluid contents, and other information may be secured. The bottom hole and closed in pressures which are available will also be of value in appraising the present characteristics of the field.

In the case of rather shallow formations such single plane arrangement of the simulating network elements will thus be sufficient. In the cases of thick formations, however, and certain others, it may be desirable to provide for two or more substantially planar series of such simulating network elements, covering the entire field or only portions thereof. In any such case of two or more vertically aligned sets of the simulating elements, the elements of such plurality of vertically displaced planar sets may be connected together in such manner as to simulate vertical movements or seepages of the fluid contents of the formation during travel of such contents in the general direction for exit from the formation into the producing well, or wells. Such provisions for vertical movements may, in the most complete representation of the producing formation, include the vertical transfer connections between each simulating element and corresponding simulating elements both above and below it, throughout the body of the formation. In other cases, such vertical connections will only be needed at special locations of the formation where the nature of the formation itself is such as to produce unusual interferences with the general direction of flow in a more regularly laid down formation. Included in such special kinds of formations as to which it may be desirable to use such vertical interconnections we may mention lenticular formations of rather thick body, but in which body the lenses of non-permeable materials produce local interferences such that the fluids must divert back and forth while still remaining within the body of the thick formation itself. In cases where such formations have been produced by wells penetrating two or more of the portions separated by such lenses, or where only a single portion of the formation has been under drainage, as between two such lenses, it is evident that the condition of the reservoir at the time of commencing the tests by use of equipment incorporating our present improvements would be such as to affect the results of the tests based on the incomplete simulation afforded by use of a single plane or layer of the simulating elements. Likewise, in the case where a well had penetrated two or more producing formations, one above the other, and where production had been taken from both such formations, the present conditions of the formations would generally be dissimilar.

Accordingly, as a further feature of our invention we have made provision for such vertical interconnections between simulating elements corresponding to vertically displaced portions of the real reservoir or field.

In the native or non-produced state the reservoir or trap will contain a mixture of water, oil and gas in varying proportions. All three of these constituents or phases will affect the relative permeability of the formation to the flow of such contents under drive pressure, and will also influence the effectiveness of that drive pressure to produce flow towards a producing well or wells. Considering only the two combinations of water and oil, or of oil and gas, being in each case a two phase combination, the relative permeability of the formation is affected in well known manner by the relative saturations of the two phases of each such two phase combination. Typical curves showing such relative permeabilities for successive saturations, for such two combinations (water and oil, and oil and gas) are shown herein (see FIGURES 24 and 25) and will be discussed hereinafter as they affect and may be used in analyses conducted by use of our present equipment.

Reservoirs generally fall into either of what are commonly termed "edge-water drive" or cenozoic production reservoirs, and what are commonly termed saturated gas pressure drive reservoirs, or paleozoic production reservoirs. Other reservoirs possess the qualities of both of these two broad categories in varying degrees. In the case of the simple cenozoic production type the drive pressure throughout the reservoir is continually produced and maintained at the water-oil contact, since the drive is produced at such surface of contact which is maintained during the life of the production. The drive pressure then descends from such surface of contact to the location of the producing well or wells, on the assumption that the drive pressure is maintained by the in-seepage coming from the out-crop or other location of water supply. If the rate of production is not greater than the in-seepage of the drive water, such drive effect, and the pressures throughout the reservoir will remain at such conditions of balance as correspond to the production, the condition of the various areas of the field, and other affecting factors. In other words, if the rate of drive water input is equal to the rate of fluid output at the production well or wells (taking account of shrinkage of volume of the liquid contents of the formation due to progressive reduction of formation pressure and corresponding gas release from solution in the liquid contents during travel of the liquid contents towards the production well or wells, such progressive reduction of formation pressure being due to approach of the liquid contents towards the producing well or wells), the pressures throughout the draining reservoir will remain sufficient at all points to produce the drive of the liquid contents of the pores towards the locations of lower pressure.

In the case of the simple paleozoic production type reservoirs, the drive pressure throughout the reservoir suffers a very different pressure life from that suffered by a reservoir of the cenozoic production type. This is because in the paleozoic production type the drive is due to the gas under high pressure contained in the liquid in the pores of the formation, and exerting driving forces in both directions against globules of the liquid contents of the formation contained in the passages between such pores, and elsewhere. The delivery of the liquid contents from passage to passage along the path leading to the low pressure location is effected by the expansion of gas bubbles contained in the pores acting in the direction of movement towards the location of lower pressure, and overcoming the surface tensions of the globules of liquid in stance across the passages wherein they are contained. The pressure needed to thus detach each globule of liquid from its adherence to the walls of its passage is also exerted backwardly against the globule of oil contained in its passage, thus adding to the resistance of such second globule against the expansive force being exerted against it by the gas in the second pore, being the pore just behind it. Thus, as we proceed backwardly from pore to pore we are building up the resistance available to withstand the high pressure within the reservoir, until finally we have gone far enough to thus build up a resistance equal to the full pressure exerted by the gas within the formation. That far and no farther can the drive be effected by gas expansion, so the radial distance through which such gas expansion drive may act to deliver the liquid contents of the formation to the well is limited, for the pressure sink created at the well is limited, for the conditions of permeability, viscosity of the liquid contents, relative saturations of oil and gas, and other factors, to that radius from the producing well at which a sufficient number of such minute resistancees have accumulated to balance the gas pressure exerted within the formation.

Thus the drainage produced by a well draining a reservoir under paleozoic production is limited substantially to a circle whose radius is of the order stated above. The production from such well is thus limited to that amount of liquid contents contained in the pores of a cylinder of such radius and of height determined by the thickness of the formation, and no more. In fact, the producible contents of such cylindrical body are only about one-third of the contents contained in such cylindrical body of the formation, since only those pores close to the well where the pressure sink is produced will yield all or nearly all of their contents, and as we progress radially outwardly from the pressure sink the proportion of such liquid contents which will be produced reduces regularly to zero at the full radius of the cylinder. Thus, the maximum possible yield from such a paleozoic production reservoir, delivering to a single well, is that portion of such liquid contents corresponding to a cone of radius equal to the aforesaid radius, and height equal to the thickness of the formation. Such volume is only one-third of the volume of the corresponding cylinder containing such cone.

The possible yield by paleozoic production stated as above is reduced by the amount of liquid contents remaining on the surfaces of the formation, any amount not yielded due to irregularities in the homogeneity of the formation, and other factors well recognized in the art.

It is now apparent that at the time of study of any paleozoic production reservoir which has been under production, there will be a great lack of uniformity in the water to oil, and in the gas to oil ratios, so that the initial condition of such partially depleated reservoir to be simulated at the start of a study by use of the equipment herein disclosed, will probably be entirely different from the substantially uniform condition existing above the water drive contact surface and below such contact surface in a cenozoic production reservoir at the start of an analysis or study of the further possible production of such a reservoir. In such paleozoic production reservoir there will be found around each producing well a pressure sink in which the liquid contents have been most completely produced from the formation close to the center of each such sink, with such liquid contents which remain unproduced in the pores of the formation increasing in percentage of the porosity as we proceed outwardly from the center of the sink towards its perimeter.

The possible radius of such sink will be proportional to the original formation gas pressure, and will decrease with decrease of formation pressure, permeability remaining constant. It is thus evident that by spotting the producing wells over the area of the field according to a regular plan of development, the distances between proximate wells, and the form of the production pattern will greatly affect the ultimate possible production under such natural gas drive, or any gas drive based on the introduction of gas through a well. Evidently too, by spacing such production wells closer together than twice the radius above defined, the pressure sinks of proximate wells will overlap, with corresponding reduction of available production per well, but with a possible higher total production for the developed portion of the field. Also, in such case a still different pattern of un-produced liquid contents will be left in the field than would otherwise be the case.

We have thus pointed out the importance of being able to pre-set the numerous simulating elements of our equipment to original conditions of relative permeability to correspond to the actual conditions existing in the field at the present time (based on available data and information), since the flow streams of any supplementary drive, such as an artificially produced edge water drive superposed on the formation of any previously produced field, must of necessity be influenced by the permeability and other characteristics and properties of the field at the time of institution of such artificial drive, and may also influence the progress of such drive towards conclusion of any stage thereof, as by encroachment of such artificial water drive on one or more of the producing wells simulated in the equipment as set up for the test.

Referring again to the use of substantially nonreactive resistances to simulate the real elemental areas of the reservoir, it must now be noted that the resistance to flow of each of the components of the fluid (water and oil, or oil and gas) depends, for a formation of stated permeability to either of such fluids alone, on the degree of saturation of such specified component of the mixture. Thus, it is possible to produce curves showing the relation, for each component of a two phase mixture, between that component's permeability as a percent of its permeability for such component alone, compared to the permeability of such component when it comprises varying percentages of the mixture. Thus, in the case of a fluid composed of water and oil, of the compositions found in the formation in question, two curves are drawn, one between water saturation or percent of water in the mixture, and relative permeability for such water component, or percent of the permeability of such water component at 100% saturation; and the other such curve being between water saturation or percent of water in the mixture, and relative permeability for such oil component, or percent of the permeability of such oil component at 100% saturation. Such curves are typically shown in FIGURE 24 of this case. Likewise, in the case of a fluid composed of oil and gas, of the compositions found in the formation in question, two curves are drawn, one between oil saturation or percent of oil in the mixture, and relative permeability for such oil component, or percent of the permeability of such oil component at 100% saturation; and the other such curve being between oil saturation or percent of oil in the mixture and relative permeability of such gas component, or percent of permeability of such gas component at 100% saturation. Such curves are typically shown in FIGURE 25 of this case.

Examination of each set of such curves shows very strikingly certain conditions affecting the design and functioning of the presently to be described equipment. First, in the case of the water and oil curves of FIGURE 24, the water curve rises from zero relative permeability at substantially 30% water saturation, to 100% relative permeability at 100% water saturation. Thus, when the water percent of the mixture falls to substantially 30% of the mixture, its permeability falls to zero, so that no water component will move through the formation for such percent and lower percents; and thus any resistance element simulating the water flow and whose value is such that the current flow through such resistance element shall simulate the rate of water flow through the formation, should become infinity (corresponding to no water flow through the real formation) when the percent of water in the mixture falls to 30% or less. The further conclusion is drawn that for such small percents as 30% and less, the water merely wets and adheres to the surface of the formation pores and passages, and does not move along with the oil of the mixture. Next, in the case of the water and oil curves of FIGURE 24, the oil curve falls to zero relative permeability at substantially 90% water saturation, being 10% oil, and said curve shows the value of 100% relative permeability for zero percent water saturation, being 100% oil. Thus, when the oil percent of the mixture falls to substantially 10% (being 100% minus the 90% water), the permeability of the oil component becomes zero. Thus, any resistance element simulating the oil flow and whose value is such that the current flow throught such resistance element shall simulate the rate of oil flow through the formation, should become infinity (corresponding to no oil flow through the formation) when the percent of oil in the mixture falls to 10% or less. The further conclusion is drawn that such small percent of oil in the mixture is probably locked into pores not readily reached by the fluid moving through the formation, and thus probably so inaccessible as to be forever lost to normal production.

Study of the curves of FIGURE 25, relating to mixtures of oil and gas, shows somewhat similar characteristics. First, it is noted that the oil curve for the relative permeability reaches zero relative permeability for approximately 30%, being thus in harmony with the zero relative permeability curve position for water relative permeability curve of FIGURE 24, it being also noted that in the oil-gas mixture the oil is the wetting agent, whereas in the water-oil mixture the water is the wetting agent. Next, it is noted that the gas curve for relative permeability reaches zero relative permeability for approximately 25% gas (being 100% minus 75% oil), such gas being apparently locked into inaccessible pores, or occupying the upper walls of the pore and other spaces so that the liquid component of the mixture does not produce a full flushing action thereon. Such gas is thus also probably so inaccessible as to be forever lost to normal production. Thus, any resistance element simulating the oil flow (in the case of the oil-gas mixture), and whose value is such that the current flow through such resistance element shall simulate the rate of oil flow through the formation, shall become infinity (corresponding to no oil flow through the real formation) when the percent of oil in the mixture falls to approximately 30% or less. And thus, too, when the gas percent of the mixture (in the case of the oil-gas mixture), falls to substantially 25%, any simulating element simulating such gas flow and whose value is such that the current flow through such resistance element shall simulate the rate of gas flow through the formation, should become infinity (corresponding to no gas flow through the formation) when the percent of gas in the mixture falls to such value of 25% or less.

It is here noted that the above discussions have concerned themselves with two phase mixtures, water-oil and gas-oil, the relative permeabilities of such mixtures and the effects of changes in proportions of the two components of each such mixture on the permeabilities of each component of such mixture, being susceptible of ready analysis as shown above. Furthermore, as will presently appear, such two component mixtures may be readily simulated to correctly simulate the flow conditions of such components through the real formation, by use of the simulating units already referred to. Furthermore, in actuality analyses based on the two component mixtures will generally be of at least as great accuracy as the accuracy of the available data and information on which the tests are of necessity made.

In addition to the above, in the case of natural water drive or cenozoic production reservoirs, the amounts of gas contained in the liquid mixture of water and oil will probably be so small as not to materially affect the relative permeabilities as already discussed; and likewise, in saturated gas pressure or paleozoic production reservoirs, the amounts of water contained in the liquid mixture of oil and gas will probably be so small as not to materially affect the relative permeabilities already discussed, insofar as such relative permeabilities affect the overall accuracy of the analysis. Accordingly, it will generally be found acceptable, from an accuracy standpoint in the use of the present equipment to treat the mixture as a two phase mixture, either of water and oil or of oil and gas, according to the nature and characteristics of the reservoir being simulated. Furthermore, the resistance elements to simulate the numerous areas of the real reservoir in its flow characteristics under drive, may be very readily and conveniently designed and constructed to simulate the flow characteristics of each of the two components of such a two phase mixture of either water and oil, or oil and gas under the changing proportions of the components of such two phase mixtures, based on information such as is shown in said FIGURES 24 and 25.

It is also possible to design and construct the resistance elements which simulate the numerous real areas of the real reservoir so that such resistance elements may be made and varied to conform to the relative permeability characteristics of the three phases of a three phase mixture of the water, oil and gas, should such refinement be desired. In this connection we have shown in FIGURES 28 and 29 typical characteristic curves for such three phase mixtures, comprising varying relative permeabilities of the water, oil and gas percentages contained in such mixtures through wide ranges of percentages.

At this point, however, we call attention to the fact that the viscosity of the fluid contents, and thus also the permeability of such contents, is greatly affected by the formation pressure to which such contents are subjected. The reduction of such formation fluid pressure also results in release of dissolved gas from the liquid contents. Thus the amount of dissolved gas contained in such liquid contents progressively reduces during the flow of such contents to locations of lower formation pressure, with corresponding change of the permeability of such liquid contents due to such circumstance. Thus all of the factors of formation pressure, dissolved gas, viscosity, and relative permeability are closely interrelated. We have made provision, as hereinafter disclosed, to effect proper compensations or corrections based on such interrelated factors. Such corrections are made in the impedance elements of each simulating unit during the progress of the series of tests, thus maintaining a high level of the accuracy of the simulations produced in such units during the progress of the series of tests from start to finish thereof.

It will be understood that the curves of all of the figures thus referred to (being FIGURES 24, 25, 28 and 29) are typical of the manners of variation of the various relative permeabilities, and are not necessarily correct as to the various values shown by such curves, except as such particular curves may have been based on data correctly representing the physical characteristics of a particular reservoir and formation. In the use of our present equipment data corresponding to the known physical characteristics of the particular reservoir and formation being simulated and studied must be used in the preparation of resistors or impedance elements corresponding to curves similar to those of said figures but based on such known physical characteristics of the reservoir in question to ensure correct results of analyses and studies performed on equipment embodying our present disclosures.

The rate of flow of a fluid through a specified permeable body of the formation is proportional to the permeability of such body in the direction of fluid flow and to the pressure gradient, and inversely proportional to the viscosity of such fluid under the conditions existing in the formation. Thus the viscosity is a determining factor in analyzing the flow characteristics of such fluid through such formation, and determining the effect and relation of pressure gradient to such flow. Increase in viscosity results in decrease of rate, and correspondingly, in volume of flow produced by a specified pressure gradient during a specified time interval; or makes necessary an increase in pressure gradient to maintain such rate of flow. This is an expression of Darcy's law.

The pressure to which the fluids are subjected in the formation is very great. This formation pressure reduces as the pressure sink is approached. The effects of pressure change must be explored with respect to both water content and the oils of the formation. Change of pressure to which the water component is subjected produces relatively small change of viscosity of such water, whether connate or interstitial, or drive water, so the effects of such pressure changes as occur, on the viscosity of the pure water are small. Thus, the change in viscosity of the pure water amounts to roughly 1% per 1,000 p.s.i. of pressure change. A change of two or three thousand pounds sq./in. will therefore produce a change in water viscosity probably not greater than the errors existing in parameters to which the equipment must be set and used, based on the available data and information concerning the reservoir and its contents, and on available past history of production. However, the viscosity of pure water changes very materially with change of temperature. Thus, raising the temperature of the water from, say 60 degrees Fah. to 200 degrees Fah. reduces its viscosity substantially 26½%. But in any given formation under study there will be only slight changes of temperature throughout the structure, so changes in viscosity due to changes in temperature may be safely disregarded. Thus, changes in viscosity of the water component due to both pressure and temperature changes, may be safely disregarded during the conduct of tests and analyses conducted on our present equipment. If necessary, provisions could however, be made for corrections due to such changes in viscosity as might be produced by such changes in pressure and temperature.

Next, changes in the viscosity of the oil component due to changes in formation pressure and also to changes in temperature must be considered. Changes in viscosity of such oil component due to changes in temperature may be disregarded for reasons similar to those stated in connection with the analysis of the viscosity of the water component—namely, that the changes in temperature of the oil component during the progress of such component through the reservoir formation to the pressure sink are small so that corresponding changes in viscosity thereby may be disregarded.

However, changes in the viscosity of the oil component due to changes in pressure (reduction of formation pressure during progress towards the pressure sink) must be considered in connection with corresponding changes in dissolved gas content of such oil component. Reduction of the formation pressure results in release of gas from solution in the oil contents, provided that the original formation pressure was above the bubble-point of such gas and oil components. In any case, a condition of formation pressure reduction will be reached when such release of dissolved gas will commence; and such release will continue during further pressure reductions. Such release results in increase of viscosity of the oil component. In FIGURES 30, 31 and 45 we have shown, by way of example only, the relation between gas solubility in cubic feet per barrel of oil, and viscosity of oils of various viscosities at the bubble-points; and also the absolute viscosities of oils above the bubble-points for a wide range of formation pressures; and in FIGURE 45 we have shown, typically, the relation of gas solubility to the formation pressure. It is seen that when the pressure falls to substantially 2760 p.s.i.a. the amount of gas in solution commences to fall, indicating that such pressure of 2760 p.s.i.a. is the bubble-point for the fluids in question. Continued reduction of formation pressure continues to allow further release of dissolved gas until the atmospheric pressure is reached. The curves of FIGURE 45 may now be studied in connection with those of FIGURES 30 and 31. From the former it is seen that during the reduction of formation pressure to the bubble-point the viscosity falls, whereas, from the latter curves (FIGURE 31) is seen that once the pressure has fallen to the bubble-point, further pressure reduction, with accompanying release of gas from saturation, results in increase of viscosity of the oil component and its contained gas. In the disclosures hereinafter to be detailed, we have made provision for compensation or correction of the viscosity of the oil component for changes in formation pressure, including provision for such corrections when there is a reversal of kind of the effect produced on the viscosity of the oil component due to such changes in formation pressure.

As the fluid contents of the formation move towards the producing well or wells the formation pressure to which such contents are subjected falls. In the case of a simple cenozoic production reservoir, and simulation thereof by numerous points of injection close together, the rate of pressure fall or pressure gradient will be large at locations close to each such point of injection; it will be even larger when there is but a single point of injection. As the distance from each point of injection increases the pressure gradient will decrease to a small value and will continue at small values during a considerable portion of the further travel towards the producing well or wells. As any producing well is approached the pressure gradient (still being a reduction of pressure) will increase at an accelerated rate of such increase. Finally, such gradient will attain a very high value as the approached well is reached. The corrections to be made in the use of our equipment should follow such changes in the value of the pressure gradient and be reflected in the adjustments made to proper elements of the equipment. The hereinafter disclosed equipment includes provisions for effecting such adjustments of the proper elements corresponding to such changing values of formation pressure.

Although we have, in the preceding paragraph made reference specifically, to the conditions existing in the case of cenozoic produced reservoirs, still it will be understood that insofar as respects the corrections for changes in formation pressures during progress of the formation fluids towards locations of less pressure are concerned, our present equipment is usable in the study and analysis of reservoirs which have been under paleozoic production, or combinations of cenozoic and paleozoic production; and for the study and analysis of further productions of such various kinds of reservoirs, such further studies being conducted according to production programs which would correspond to edge-water drive, or various forms of gas drive, or would correspond to paleozoic production of future program operations. We do not intend to limit ourselves to the use of our equipment for any specific form of production or program of operation, except as we may limit ourselves in the claims to follow.

The formation pressures at the locations of the various simulating units are readily determined by comparison of the electric potentials of such various simulating units with respect to a base or comparison potential of fixed value. We have included provisions for determining such formation potentials (and correspondingly, the simulated formation pressures), in the foregoing manner, with provisions for also adjusting the formation pressures with respect to such base potential for reasons which will presently appear.

It will also appear that pressure gradient values at various portions of the network are readily determined by tests of potential drop between successive elements of the simulating units, or between different portions of any given unit.

Rates of flow of the contents through any simulating unit may be based on current values flowing through the proper elements of such unit. However, it is now necessary to consider a further effect of the formation pressure on the liquid contents of any such simulating unit. The following exploration is therefore proper:

When the network is under test operation by supply of current through one or more injection points and corresponding delivery of current from such network through one or more "producing wells," it is evident that the total of all so-delivered current at any given instant must be equal to the total of all "injected" current (disregarding possible effects due to reactances in the system). Also, that under the network flow conditions the sum of all currents flowing through those units intersected by a line drawn across the network at any point between the injection and delivery wells, must be equal to such injected current and delivered current value. In other words, in the absence of some special provision for drawing current from one or more points of the network, it is impossible to "lose" current from such network. However, the volume of liquid contents delivered through the producing wells of the real reservoir being simulated is not the same as the volume of pore space originally occupied by such liquid contents so delivered, due to "shrinkage" occurring in such liquid contents, such shrinkage occurring as the formation pressure to which such liquid contents are subjected is reduced during travel of such contents towards the pressure sink.

Due to the foregoing condition it is not possible to use the current values flowing through network elements for directly showing the flow rates of the liquid contents intended to be simulated by such currents. Provision must be made for correction of the "apparent" rate, based on such shrinkage which has occurred during movement of the liquid contents to the location of the test unit. Thus it is necessary to apply a correction factor to the rate indicated by the current flowing through the network element under test. We have included in our presently to be disclosed equipment, means to effect such correction by various corrective operations. One such disclosed correction operation includes the application of the "Formation Volume Correction Factor" to the indicated or "apparent" rate as shown by the value of the current. In such case we apply the Formation Volume Correction Factor corresponding to the total shrinkage of such liquid contents which has occurred due to reduction of formation pressure from its value at the injection point or well, to its value at the locaton of the simulating unit now under test. We have included such provision and the means to apply the proper corrections to the indicated current rates at the locations of the simulating units throughout the network and continuously during the progress of the set of tests as such tests are conducted. Another form of correction operation will also be disclosed hereinafter. At this point the following further statements are pertinent:

In FIGURE 50 we have shown, by way of example only, a characteristic curve of "Formation Volume Factor" for an oil gas-saturated to bubble-point at 2515 p.s.i.g., plotted against formation pressure. It is to be noted that such "Formation Volume Factor" is equivalent to the volume of space occupied by a given amount of the gas-saturated oil in question under the condition of the stated formation pressure, divided by the volume of the space occupied by such amount of oil material when the pressure is reduced to zero p.s.i.g., with corresponding release of gas to its bubble-point at p.s.i.g. In other words, it is the volume occupied, gas-saturated in the formation at formation pressure, compared to the volume of standard tank barrels delivered from such liquid body when produced to atmospheric pressure. Thus, in the showing of FIGURE 50, the Formation Volume Factor at substantially 2600 p.s.i.g. for the oil there represented, is 1.335, being substantially 33.5% greater than the tank stock barrels which will be produced from such body of original oil material; the super-saturated gas having been released to the scrubbers or other equipment provided for the purpose, or to atmosphere.

Study of that curve of FIGURE 50 also shows that such curve actually rises in value with reduction of formation pressure, to such Formation Volume Factor to 2600 p.s.i.g., and then, as the pressure is further reduced, such Factor falls to unity at zero p.s.i.g. The reason for this reversal, in the instance shown, is as follows:

Normally a lowering of pressure will result in expansion of the body subjected to such pressure, so that normally the curve will rise, as shown during the pressure reduction to 2600 p.s.i.g. In such example, the gas present is of amount to saturate the oil only to such pressure of 2600 p.s.i.g., so that for higher pressures no further gas is driven into the body of the oil. Thus the bubble-point is 2600 p.s.i.g., and during lowering of pressure to that value no gas is being released from such oil. Thus the volume of the body of oil and contained gas expands according to normal expectancy until such bubble-point is reached. Then, further lowering of pressure permits release of gas with corresponding contraction of the volume of the oil body, so that lowering of pressure to atmospheric pressure results in progressive reduction of the volume of oil with its still contained gas, until the final value of unity (on the scale of "Formation Volume Factors") is attained at zero p.s.i.g.

It is now apparent that the progressive reduction of formation pressures encountered by the fluid progressing through the reservoir towards the pressure sink must result in corresponding reduction in the size of the liquid contents (oil) moving through the formation. But, as already pointed out, the magnitude of the current flowing through the entire network remains constant, assuming that the value of the input current remains constant. Also, that in the absence of provision for draining off a portion of the current corresponding to the shrinkage value, the value of the current delivered to the production wells or points of the network will be larger than the actual volume of the produced oil would require, due to the shrinkage of the oil component. As an alternative means to correct the operation of the network to make provision for corrections due to such shrinkages we have shown means to drain from each simulating unit an amount of current proportionate to the shrinkage occuring during flow of the liquid contents through such simulating unit, returning such so-drained current to the electrical system at a point or points beyond the production well or wells, so that such so-drained current does not flow through network elements beyond the location of such drainage.

In FIGURE 46 we have also shown, typically, the Formation Volume Factor for pure water as compared to unity and for pressures up to 6000 p.s.i.g., for several temperature conditions of the fluid body; and correspondingly, we have shown such Formation Volume Factor for each such case but with the water gas-saturated. As would be expected, the Factor for pure water increases continuously as the formation pressure is reduced, to the value of its volume corresponding to the temperature above the conventional base temperature value. It is also significantly noted that in the case of each example thus shown, when the water is gas-saturated the reduction of Formation Volume Factor for the higher pressures is much less than such reduction in the case of the corresponding pure water condition. Thus, for the condition of substantially 200 to 250 degrees Fah., there is a rise of Formation Volume Factor of only one or two percent for a reduction of pressure from substantially 6000 p.s.i.g. to atmospheric pressure. It is also noted that the contracting tendency of the release of the absorbed gas acts to largely counteract, by shrinkage produced by such gas release, the expansion of the material due to lowering of pressure. Thus, the combined effects of gas release and expansion, both due to lowering of pressure, almost balance each other. Thus, the effects of Formation Volume Factor may be largely disregarded in the case of the water component; but provision may be made, if desired, for corrections based on such water Formation Volume Factor.

We have made provision for ensuring, during a given test or series of tests, that the rate of flow as simulated, through the formation under study, shall be maintained constant, if desired, or shall vary according to a selected manner of such variation. When either of the provisions for correction based on Formation Volume Factor is used, our equipment may be adjusted to maintain the current delivery at the producing well or wells at a total value corresponding to the real rate of delivery of the oil component, or of both the water and oil components, taking into account the shrinkage previously discussed. We have also made provision for either automatically or manually adjusting the overall potential delivery to the network, and to other elements of the system, so that the potential drops shall simulate the real pressure reductions at various locations of the simulated reservoir.

It is noted that when correction is made, based on the Formation Volume Factor, the current flows through the numerous network elements will be correspondingly affected, since change of the flow conditions at any point of such network must be accompanied by corrective changes elsewhere in such network. Accordingly, the corrections, especially when made by draining off portions of the current flows through the oil flow simulating elements, will produce corresponding changes in potential gradients at numerous points of the network. These will in turn affect the current distributions at numerous points. The rigidly correct distribution of currents to simulate the flows of oil and water will actually be that in which the total flow is produced by use of a minimum energy input into the network, under the condition that the current flows at all points truly represent the oil and water flows at all points. In order to attain such an ideal representation of the operating conditions of the real reservoir under production it will generally be necessary to make a number of sets of tests, each such set including all of the simulating units, and with corrections of the numerous units progressively towards the final ideal operating condition. We have included in the hereinafter disclosed equipment, means to produce successive cycles of entire scannings and re-settings of the numerous simulating units, until finally a condition of operation shall be attained which closely approximates the ideal operating condition.

It is next noted that during the normal and generally expected production life of a petroleum reservoir, the water-oil ratio will change so that the relative permeabilities of the water component and of the oil component (and of the gas component, if that is to be taken into consideration) change as the production of the reservoir proceeds. Generally such change is in the direction of increase of the water saturation, being the percentage of water produced as compared to the total of liquid production, at the producing well. The curves of FIGURES 24 and 25 show that such changes of saturation effect very substantial changes in the relative permeabilities of the water and oil components moving through the formation. It is thus evident that as the series of tests proceeds from the settings of the numerous simulating units which settings were made prior to commencement of the tests, it becomes necessary to re-set the impedance elements of the various simulating units so that each such unit's impedances which represent water and oil relative permeabilities shall truly represent the then existing relative permeabilities during the next test of the series. We have made provision for effecting such re-settings of the numerous variable impedance elements of the simulating units, so that as each set of tests proceeds proper information shall be gained from which such re-settings may be correctly made in each of the numerous simulating units.

In connection with the foregoing it is noted that, having made the original settings of the variable or settable impedance elements of all of the simulating units representing the reservoir, the network is brought under electrical operation by flowing through such network from the injection point or points to the production point or points the proper overall or total current; such condition being on the basis of the specified formation pressure which normally exists in the formation. Having done this each of the simulating units is subjected to proper tests for determination of the formation pressure existing at its location, and for determination of such other factors as needed, such as current values flowing through the oil and water branches of each simulating unit, the total liquid rate of delivery into each simulating unit and the total rate of liquid delivery from such unit, the total rate of oil delivery into each simulating unit and the total rate of oil delivery from such simulating unit, the total rate of water delivery into each simulating unit and the total rate of water delivery from such simulating unit, and various other data as needed or desired, corresponding to the test of each simulating unit. Each simulating unit of the network is thus tested, preferably according to a regular progressive pattern of tests, and the necessary data recorded either manually or automatically, for further study and computations or like uses. During such set of tests of all of the simulating units no changes are made in their respective impedance elements, since any such change during a set of tests would cause the tests of the as-yet untested units to respond under conditions different from those conditions under which the previously tested units were tested. Accordingly, at the end of such set of tests there is available data from which corrections may be made in the values of the numerous impedance elements of all of the simulating units, to correspond to any indicated changes in flow conditions which have occurred during such set of so-completed tests. For example, from such data respecting rates of water delivery into and from each simulating unit and respecting rates of oil delivery into and from each simulating unit (when such rates are sustained for known and equal time intervals for all of the simulating units of the network), there may be gained data showing the total water component present in such simulating unit at conclusion of such test and total oil component present in such simulating unit at conclusion of such same test. This data will make it possible to determine the water saturation in such simulating unit at conclusion of such test. By reference to curves such as those of FIGURE 24 it may then be determined what change, if any, should be made in the impedance elements for the water and oil branches of such simulating unit in order that adjustments of the imepdance units for water and the impedance units for oil of such simulating unit shall correspond to the rates of flow of water and of oil through such simulating unit, corresponding to the water saturation of such unit as indicated by such test of such simulating unit. Such adjustments of the impedance units for water and the impedance units for oil, of such simulating unit, when such adjustments are made, will bring such simulating unit into corrected adjustment for the next set of tests of all of the simulating units. Thus the next set of tests will be conducted under correct water and oil impedance value conditions, and correspondingly, under correct values of relative permeabilities of the water and oil components flowing through such unit.

Corrections such as above briefly explained shall be made to the impedance elements of each of the simulating units, during an interval between two successive test sets. Thus, to simulate the probable production effects over a prescribed overall time interval, such a number of such sets of tests shall be made, with corresponding recording of data taken during each set of tests, and with corrections to the impedance elements of each of the numerous simulating units made between successive sets of tests, based on the data so secured during the preceding set of tests.

Now it is noted that as each simulating unit is thus tested during the course of each set of tests, it is necessary to record, either permanently or for the time being, the results and data secured corresponding to each simulating unit. Such recordings may be manually produced, or may be automatically produced, as by the use of punched cards or on magnetic tape recordings, or otherwise as desired. Such records are then held until completion of such set of tests. Thereupon, after proper calculations have been made, the new values for the oil and water relative permeability simulating impedances must be made, and after the completion of the set of tests proper corrections must be made in such of the impedances as require corrections, generally all of them. We have herein disclosed means to make such recordings automatically as the set of tests proceeds; and we have also provided means to automatically produce the necessary re-settings of the numerous impedance elements for both water and oil branches of each simulating unit. The means to effect such re-settings and recordings are such that all of the needed operations can be very quickly effected, even when provision has been made for study and analysis of large reservoirs, with correspondingly large numbers of the simulating units.

In the foregoing illustration we have briefly described the operational sequence in which the determinations of the newly to be adjusted impedance values for the water and oil branches are effected by measuring and recording directly the in and out flow quantities of water and oil, respectively, into and from each simulating unit to determine the newly to be set impedance values based on water saturation now existing in the simulating unit under test. Other operational procedures may also be used in the operation of network analyzers embodying features of our present invention. One such other operational procedure includes the following:

According to Darcy's law the rate of flow of a fluid body through a permeable medium is directly proportional to the relative permeability of the medium to flowage of such fluid body therethrough, and directly proportional to the pressure gradient through such permeable medium, and inversely proportional to the viscosity of the fluid medium under flowage conditions. Thus, if R designates the rate of flow, $K_o$ designates the relative permeability of the formation to flow of the oil therethrough, P designates the pressure gradient through the permeable body, and $Mu_o$ designates the viscosity of the oil component under the flowage conditions, then R equals $PK/Mu_o$. Thus, if we know R, P, and $Mu_o$ we can immediately determine $K_o$ by a simple mathematical operation. Then, knowing $K_o$ we can, by reference to such a curve as that shown for the oil component in FIGURE 24, immediately determine the percent water saturation; and finally, from such water percent saturation, we can at once determine $K_w$. Thus, by providing the means in our equipment for determining, at the conditions of formation pressure existing at each simulating unit and the manner of variation of the viscosity with such formation pressure, and for determining the manner of variation of water saturation with variation of relative permeability of the oil component, and the manner of variation of relative permeability of the water component with water saturation, which means we have provided as will presently appear, it is possible to automatically proceed through the necessary steps of equipment responses to determine directly both the relative permeability of the oil component and the relative permeability of the water component, as well as the percent water saturation existing under the test values as determined during the test of the simulating unit in question. We have also included, in such equipment, the means to effect correction of the apparent rate of oil flow as initially shown by the current value through the oil impedance element of the simulating unit so tested, and based on the actual oil viscosity under the formation pressure conditions existing at the location of such simulating unit, to thus obtain a value corresponding to the actual rate of oil flow through such simulating unit at the location of such simulating unit in the simulated reservoir. This will ensure correct results under the shrinkage conditions produced by reason of progressively reducing formation pressures. Such correction for shrinkage of the oil component is also included in the means for operation according to the first described scheme in which the net volumes of oil and water change in the simulating unit are used as the basis for the final determinations of the relative permeabilities and corrections needed to be made in the impedance elements.

Other operational procedures in the use of our presently to be described equipment will suggest themselves to the student of this specification.

Since during each of the above briefly described operational procedures the percent water saturation is determined as an element of each such test, it is possible, by examination of the data secured from each such test to produce a chart showing the approximate line of advance of the water saturation of any specified percentage, each such line being based on the tests of the individual simulating units during one of the sets of tests. By thus drawing such a line across the reservoir for such percent water saturation corresponding to each of the successive sets of tests, the approach of water intrusion to each producing well may be followed. If it be assumed that intrusion of a specified percent water saturation corresponds to a condition justifying abandonment, at least as far as concerns the producing well referred to, it is then possible to appraise the condition of the reservoir drainage at the time of such "abandonment."

A further operational benefit to be obtained from use of our presently to be described equipment concerns the ability of such equipment to supply information, during each of the sets of tests, and corresponding to each test of a simulating unit, from which information the direction of flow of the liquid contents of the reservoir through such simulating unit may be quickly determined, or even immediately made available, automatically. Such indicating means for direction of resultant flow of the liquid reservoir contents through such simulating unit is based on the relative rates of in-flow and out-flow of the total liquid components flowing into and out of each of the simulating units at its back or "entrance" face, its front or normal "delivery" face, and each of its two side or lateral faces. Such indicating unit may comprise a compass-like unit which is automatically connected to the proper elements of each simulating unit during each test of such unit. The direction of indication of such compass-like unit corresponds to the net direction of flow of the liquid reservoir contents (being the water-oil mixture) through the simulating unit in question. By producing a record of such directional indications for each of the simulating units and for each test of the series of tests it is possible to plot, for each set of tests, the stream flow lines existing between the injection points and the production points during the set of tests in question. Such so-recorded data will greatly assist in appraising the sweep efficiency of the operational conditions under which the set of tests was made, including location or locations of injection wells, location or locations of producing wells, rates of production, and other data of value to the user of such equipment.

The recording of various data produced during the operation of our equipment may be effected either manually, as by tabulation of various elements of such data, or automatically. In either case various computations must be made, based on the data secured during the testing of each simulating unit and during each set of tests of such unit. These computations include primarily the determination of the impedance values to which the re-settings of the impedances of oil and water relative permeabilities shall be made in order that during each succeeding test of such unit its functioning will be based on impedance values which reflect such changes in water saturation (and relative permeabilities for oil and water), as have occurred during the immediately preceding test cycle. We have herein disclosed means to readily and conveniently produce the needed re-settings by manual operations, as a simple form of equipment. The number of such simulating units needed to simulate a reservoir of specified size (areal) will depend on the magnitude of the area of real reservoir to be simulated by each unit. Even if each such unit shall simulate an area as large as 660 feet square, there will be needed 64 such units per square mile of reservoir extent; four times as many (256) when each unit simulates an area of only 330 feet square. It is thus evident that for study of a reservoir of even moderate extent a considerable number of the simulating units must be provided. Each of these must be re-set according to the calculations effected on the basis of the previous test of such unit, and all such re-settings must be made prior to commencement of the next set of simulating unit tests of the series of sets of tests.

Accordingly, we have herein provided means to automatically record, either or both temporarily or permanently, the test data secured for each simulating unit during a test set. The data of this record may be used for translating, automatically, such data immediately in such automatic means, and for storing the results of such translations and computations for use during the re-setting operations to be effected after completion of the test of all of the units during the test set then in progress, and for producing the necessary re-setting operations for the several impedance elements of each unit according to the results of such computations. Thus very fast operations may be produced by completely automatic operations, carried forward according to a definite sequence of operations, to produce accurate re-settings and with elimination of human errors which would probably creep into such a large number of data recordings and computations as would be needed for a manually conducted operation. Since we have herein included disclosures of two operational sequences which may be performed by use of the basic equipment herein disclosed, to both arrive at the same re-settings of the impedance elements, we have also disclosed two embodiments of the means to automatically perform the necessary functions and recordings.

The automatic equipment above referred to includes "cycling" means whereby the numerous simulating units are successively tested without material disturbance of the current flow conditions through the network, and with the simulating units set to their impedance values as previously determined for such test set, the proper recordings being produced as each unit is tested and the necessary computations also being made during such simulating unit's test. Provisions are also made for recording (both permanently and temporarily) the results of such computations, so that when the proper time in the cycle arrives all of the impedance elements of all of the simulating units will be re-set to their new values as determined aforesaid. Thus such cycling means also includes means to effect the proper recordings as the simulating unit tests proceed, and means to translate such test recordings to determine the values to which the impedances of the several simulating units should be corrected. Such cycling means also includes means to provide for re-settings of the impedance to such corrected values after all of the units have been tested to complete the set of tests of one of a series of sets.

Due to the progressive re-settings of the impedance elements of each simulating unit the flow conditions through such unit will reflect the changing values of relative permeabilities and corresponding changing conditions of percent water saturation at the real reservoir locations simulated by the various units. It will be expected when any series of test sets is commenced that such percent water saturation will rise progressively in certain portions of the simulated reservoir, and that finally a "breakthrough" of the drive water will occur at some point, so that the water-oil ratio of the produced liquids will rise with an accelerated rate. Such rise will be revealed by the results of the tests, but it is also desirable to give a signal or to discontinue the cycling operations when the water-oil ratio reaches a value of maximum permissible amount, or of amount at which such discontinuance of the cycling may be desired for other reasons. We have included such cycling and signalling means in the equipment hereinafter disclosed, and have also included such signalling and stopping means in connection with such cycling means.

Since the tests performed according to the disclosures of the present application include testing the operations of the simulating units under one pattern of settings of such units, and, based on such tests, producing a re-setting of all or various ones of the simulating units to more closely simulate the production or drainage characteristics of the reservoir, or to simulate a condition of such reservoir which will be attained at a later time in the production program, and for other operations; and since such re-settings of the simulating units are or may be based on computations derived from data produced during the preceding tests of the preceding scan of the reservoir's operations, the equipment hereinafter disclosed has been designed to meet the requirements of such procedure. Such equipment as illustrated and described is of a type which may be classed as "analog." The various elements of such equipment are designed and related to each other for inter-relation of their functions and operations to produce the intended end results. It will, however, be found that various, if not all, of the elements of such equipment, including their several and also their related functions, may be included and produced in other forms of equipment, including digital computers, when such computers have been set and programmed to bring their various elements into combinations corresponding in function and in operating elements, to like elements of the equipment herein specifically disclosed. For example, certain computations must be made, based on the tests presently being conducted on the simulating units, and the data thus secured, to determine new values of $K_o$, and water percent saturations, and new values of $K_w$. According to one operational procedure, data may be secured based on the present set of tests, to determine the increments of water and of oil algebraically added to the previous amounts of such components in the various simulating units, to thus determine what changes have been produced in percent water saturations contained in the various simulating units during a specified time interval of test. Computations are needed to then determine, on the basis of such so-gained data, the ratio of water contained in the simulating unit after a specified time interval, compared to the sum of both water and oil contained in such unit, thus determining the percent water saturation after such specified time interval; and based on such determination of the new percent water saturation after such specified time interval, the new values of $K_o$ and of $K_w$ are determined according to such curves as those shown on FIGURES 24 and 25. According to one operational procedure all such sequential operations may be produced by use of the specific equipment hereinafter disclosed; but it will also appear that, if desired, the data gained from such test may be then fed directly to a digital computer for certain computations, and the results of such computations may then be fed into another portion of our presently disclosed equipment, to produce other further computations, or to produce physical re-settings of the adjustable resistances to the new values determined as a result of or during such digital computer operations.

Accordingly, we also contemplate as being within the scope of our present invention various other forms of equipment, than the analog type equipment herein specifically illustrated and described, when such other equipment includes elements or units corresponding to elements or units herein disclosed, and operatively interconnected to produce operations and end results substantially corresponding to like operations and end results produced by our specifically disclosed equipment. We have also, to a like purpose, included hereinafter a flow sheet of operations constituting a program for operation of a conventional digital computer to produce certain of the computations based on data previously gained from tests herein disclosed, and to produce by such computations other successive settings and functions of additional portions of the equipment herein specifically disclosed in detail.

Other objects and uses of the invention will appear from a detailed description of the same, which consists in the features of invention and combinations of parts hereinafter described and claimed.

In the drawings:

FIGURE 1 shows in typical form the general form of the stream flow lines of fluid contents of the formation when under edge water or cenozoic production, the flow being up-dip towards the upper edge of the drawing, and there being no wells to the right of the area illustrated;

FIGURE 2 shows in typical form the general form of drainage of a reservoir under formation gas pressure drive and without edge water drive, being a formation under paleozoic production, and it shows how, under such production, by spacing the wells close enough to each other their pressure sinks may eventually overlap, one of the illustrated wells having developed a sink or larger radius than the other wells;

FIGURE 3 shows typically a section through an anticlinal cenozoic production formation and reservoir into which a number of wells have penetrated at each side of the cap, and the manner in which progress of the edge water drive up-dip will invade the wells in succession up-dip;

FIGURE 4 is a section similar to that of FIGURE 3, but it shows how the edge water drive, as in secondary production may be controlled and wells successively shut in to avoid water production through them when the water/oil ratio becomes excessive;

Figure 1:
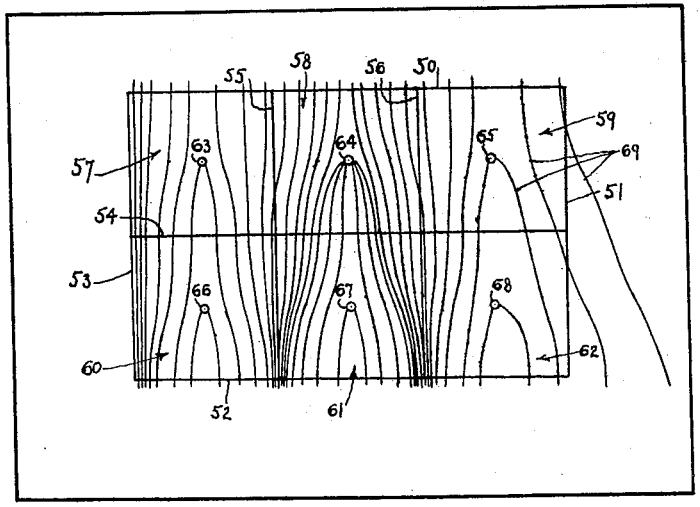
Figure 17:
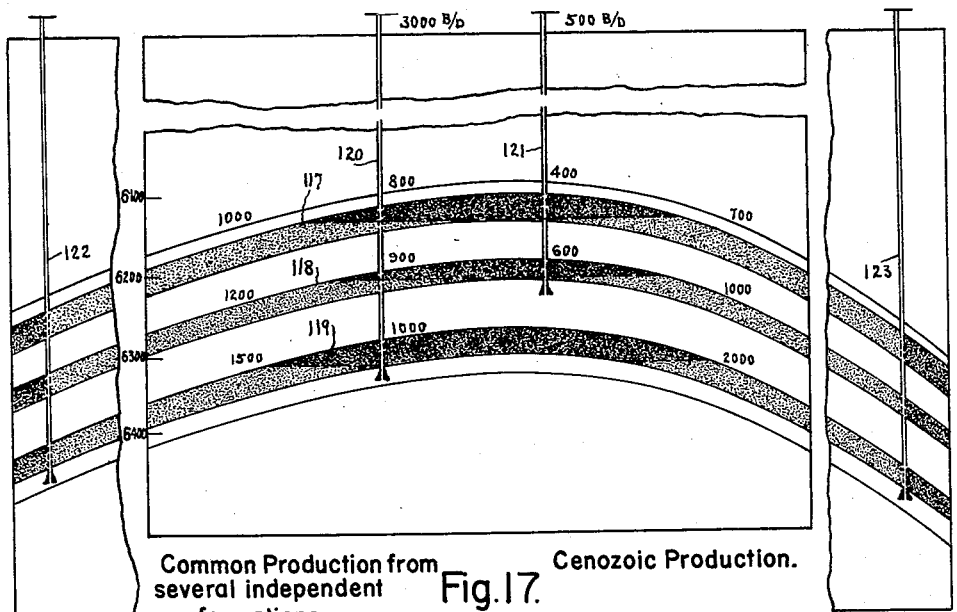
Figure 18:
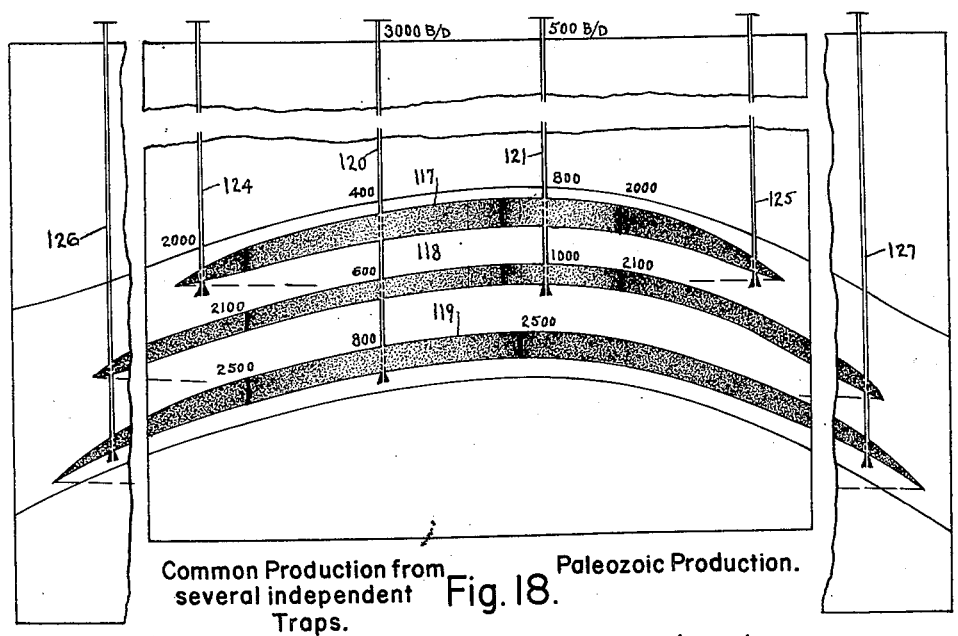
Figure 19:
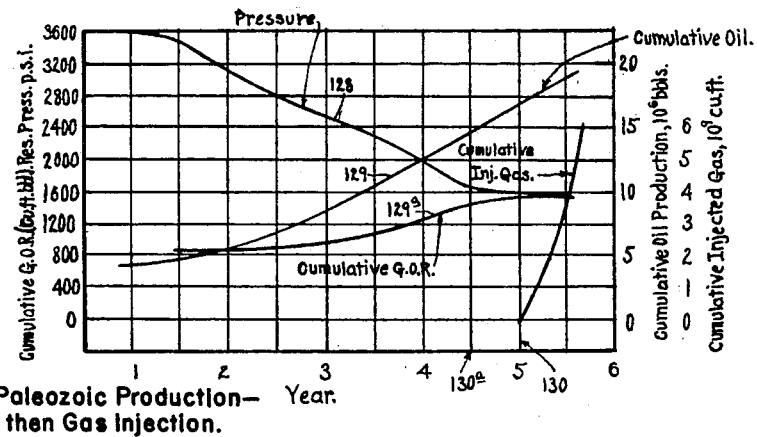
Figure 20:
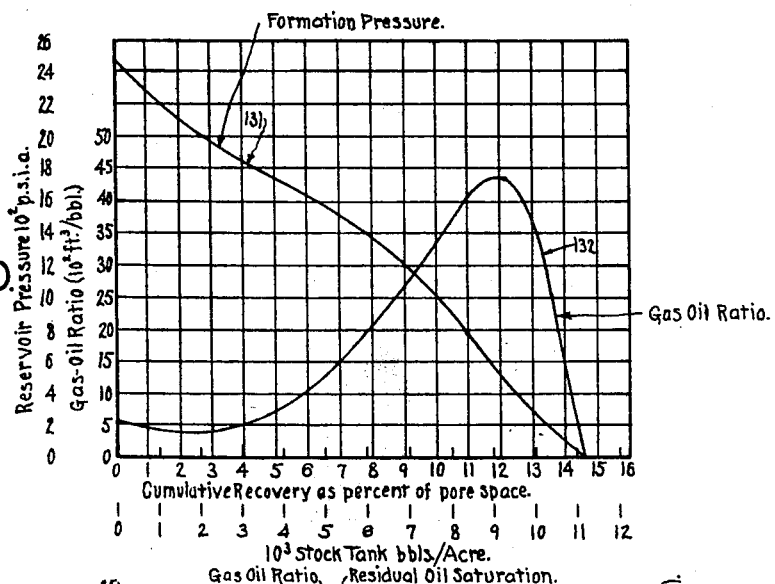
Figure 21:
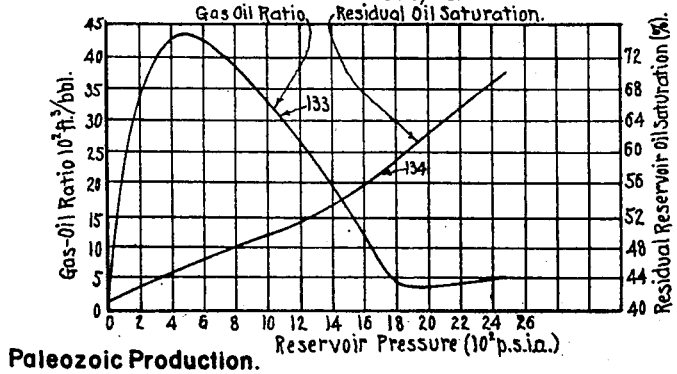
Figure 25:
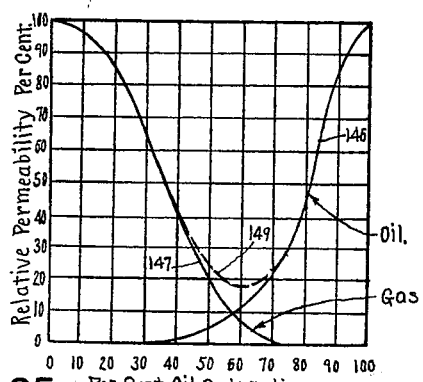
Figure 24:
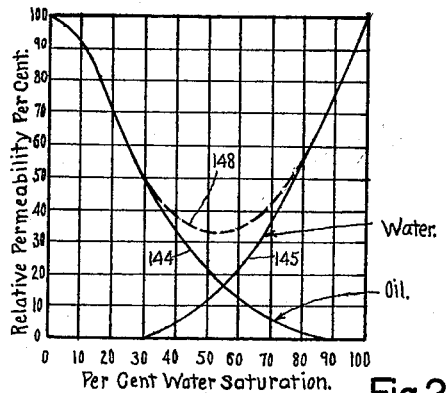
Figure 22:
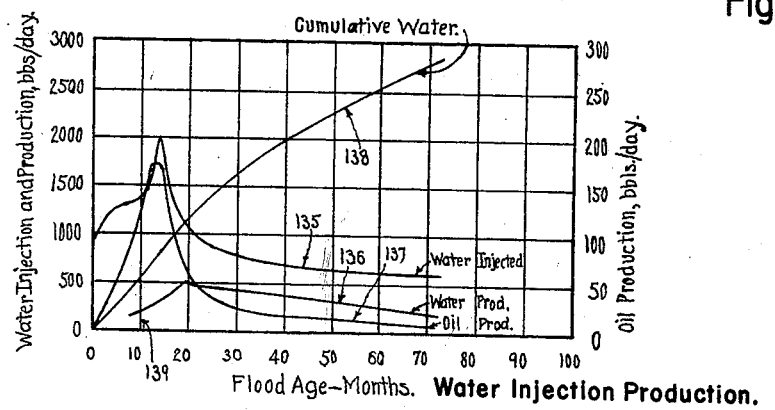
Figure 23:
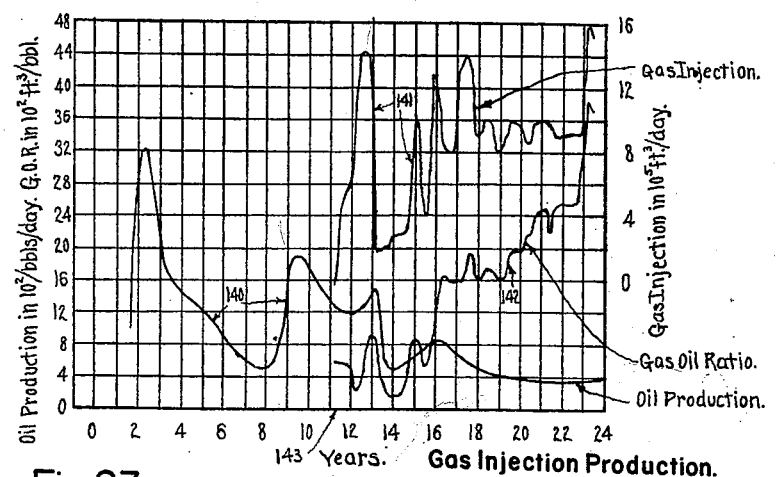
Figure 27:
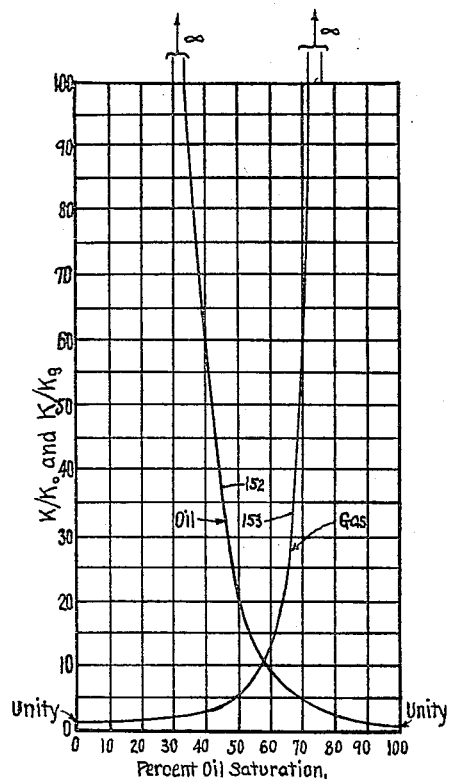
Figure 26:
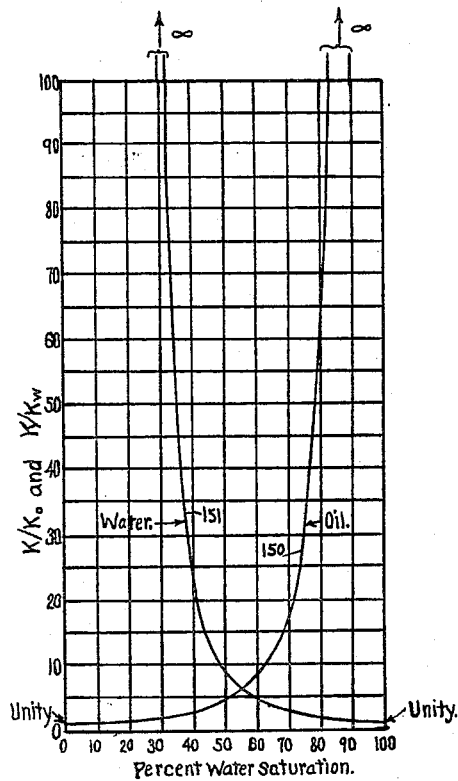
Figure 28:
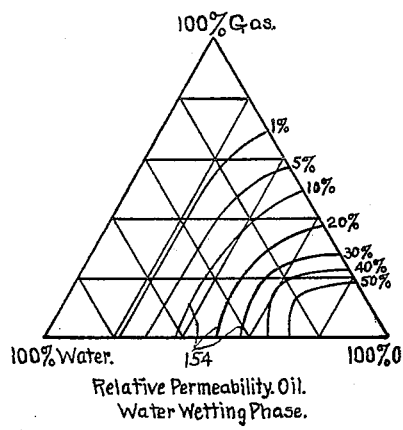
Figure 29:
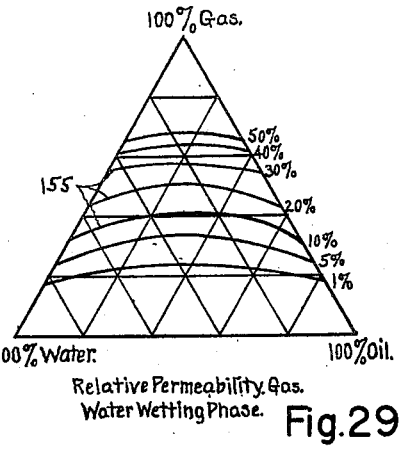
Figure 30:
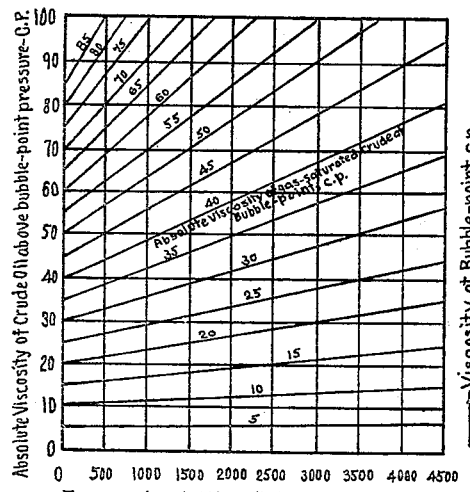
Figure 31:
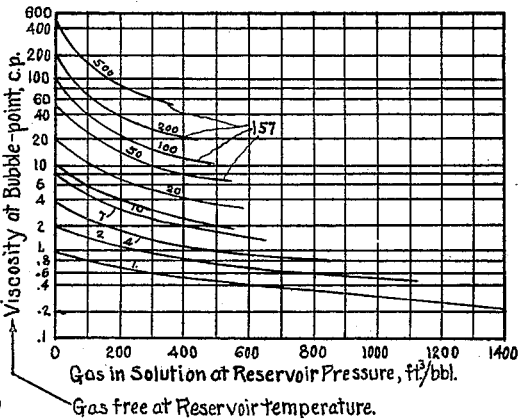
Figure 33:
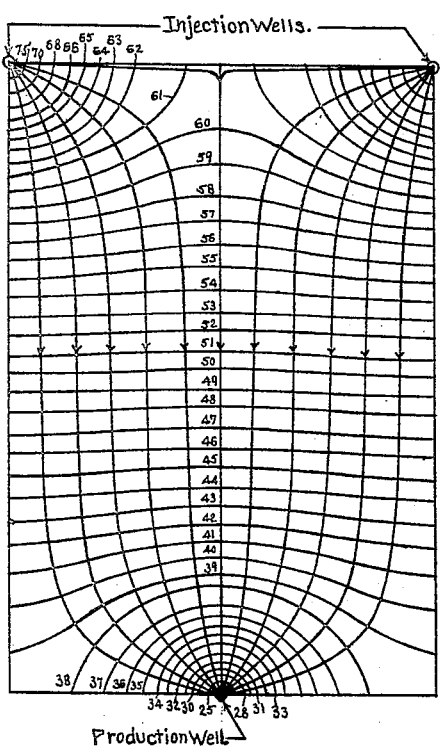
Figure 32:
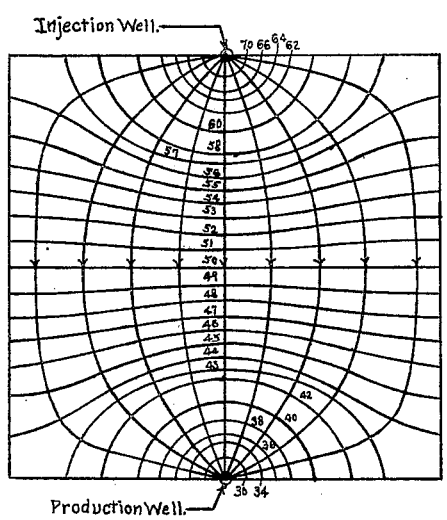
Figure 36:
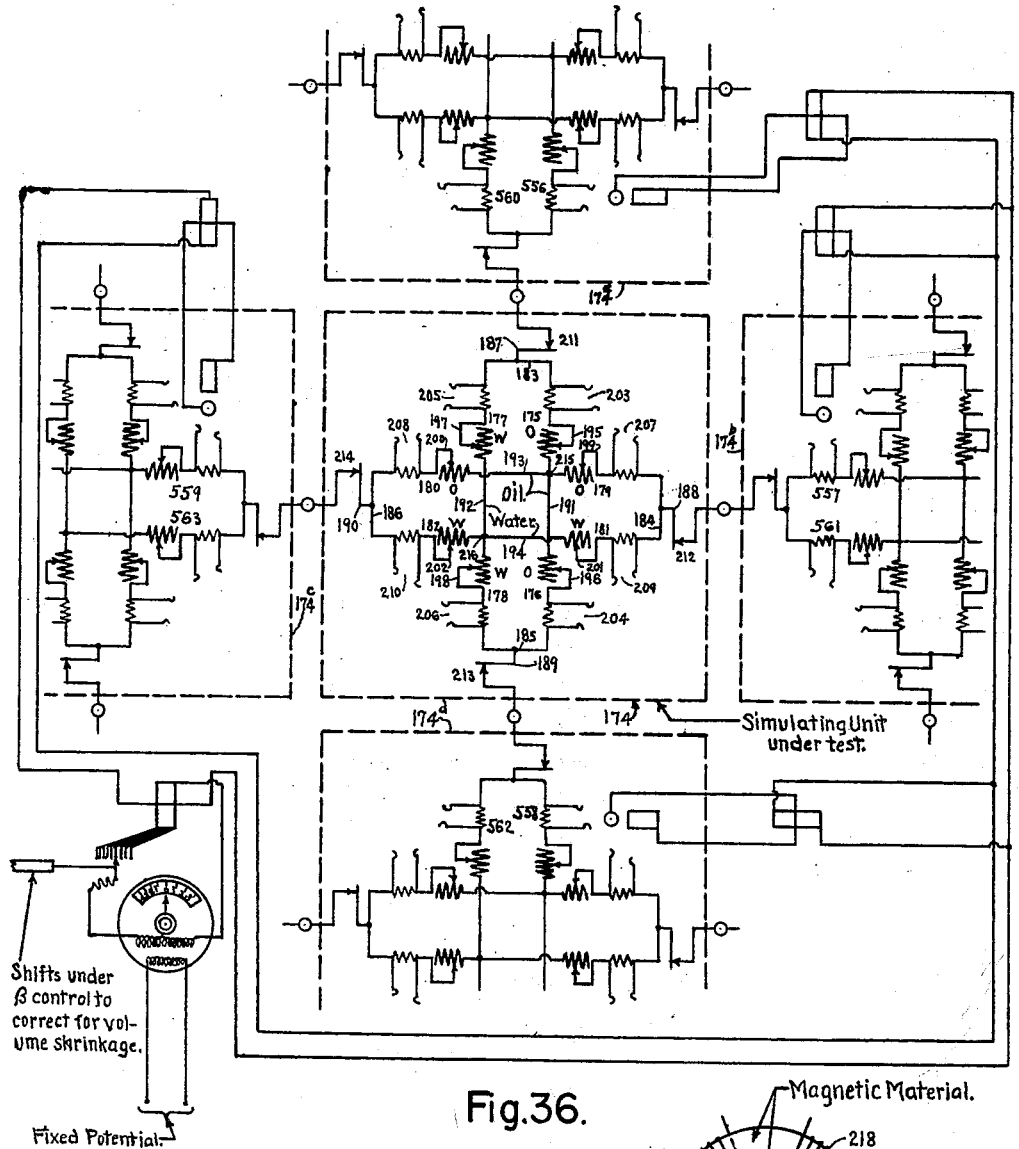
Figure 35:
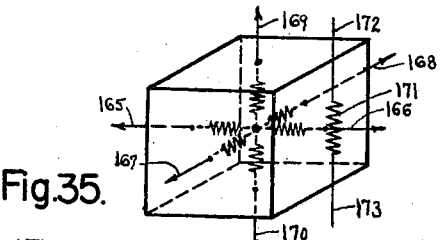
Figure 37:
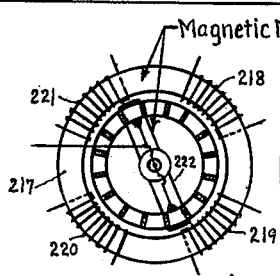
Figures 38, 39:
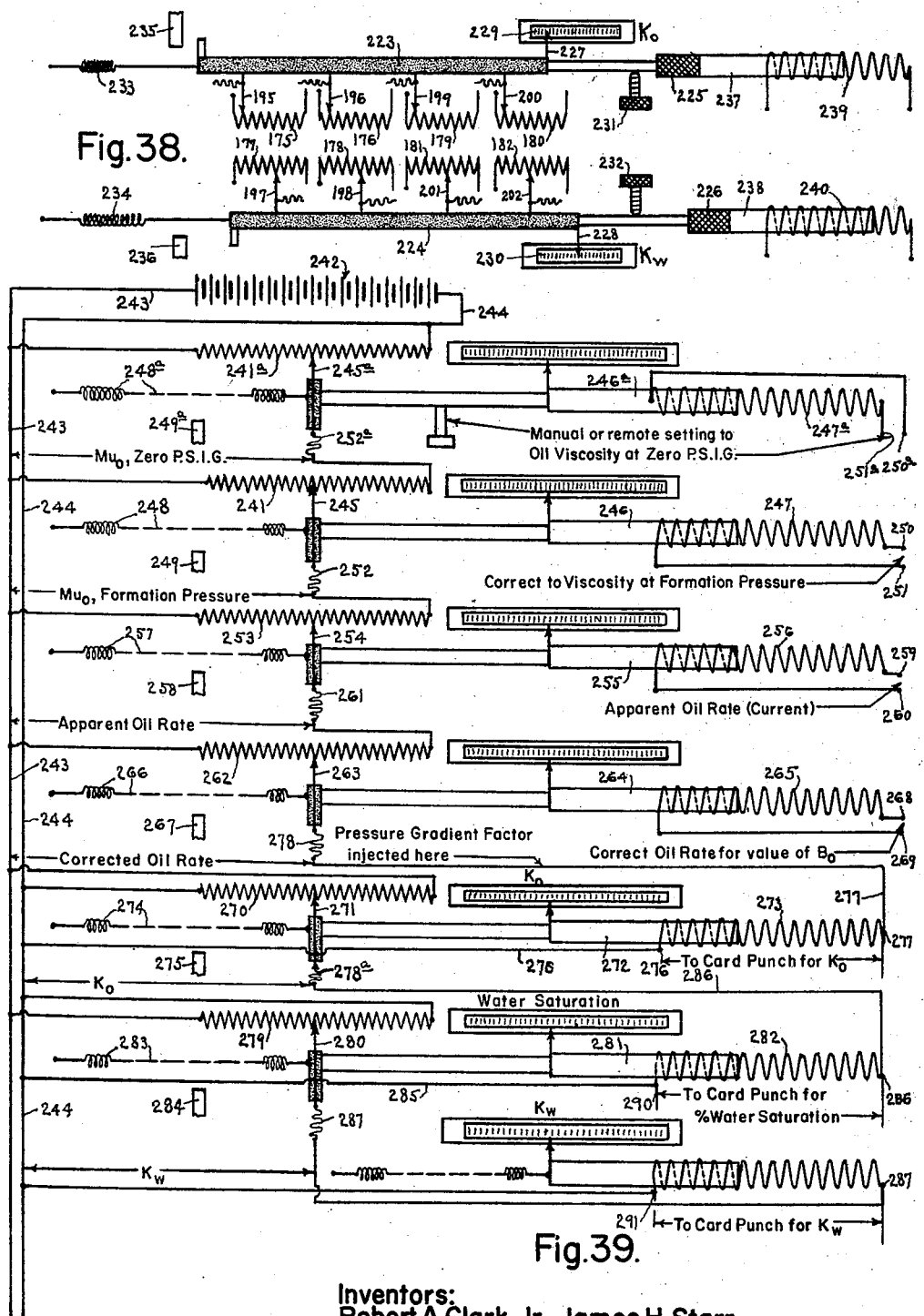
Figures 40, 41, 42:
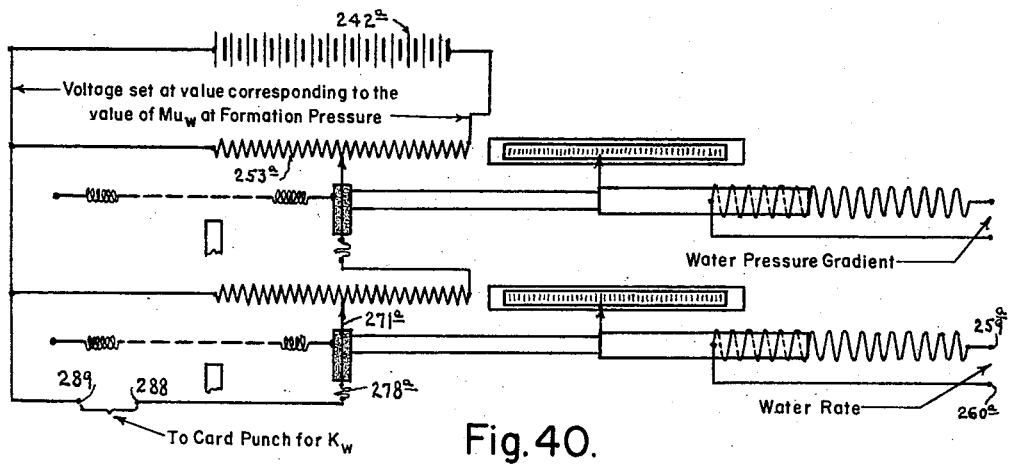
Figure 43:
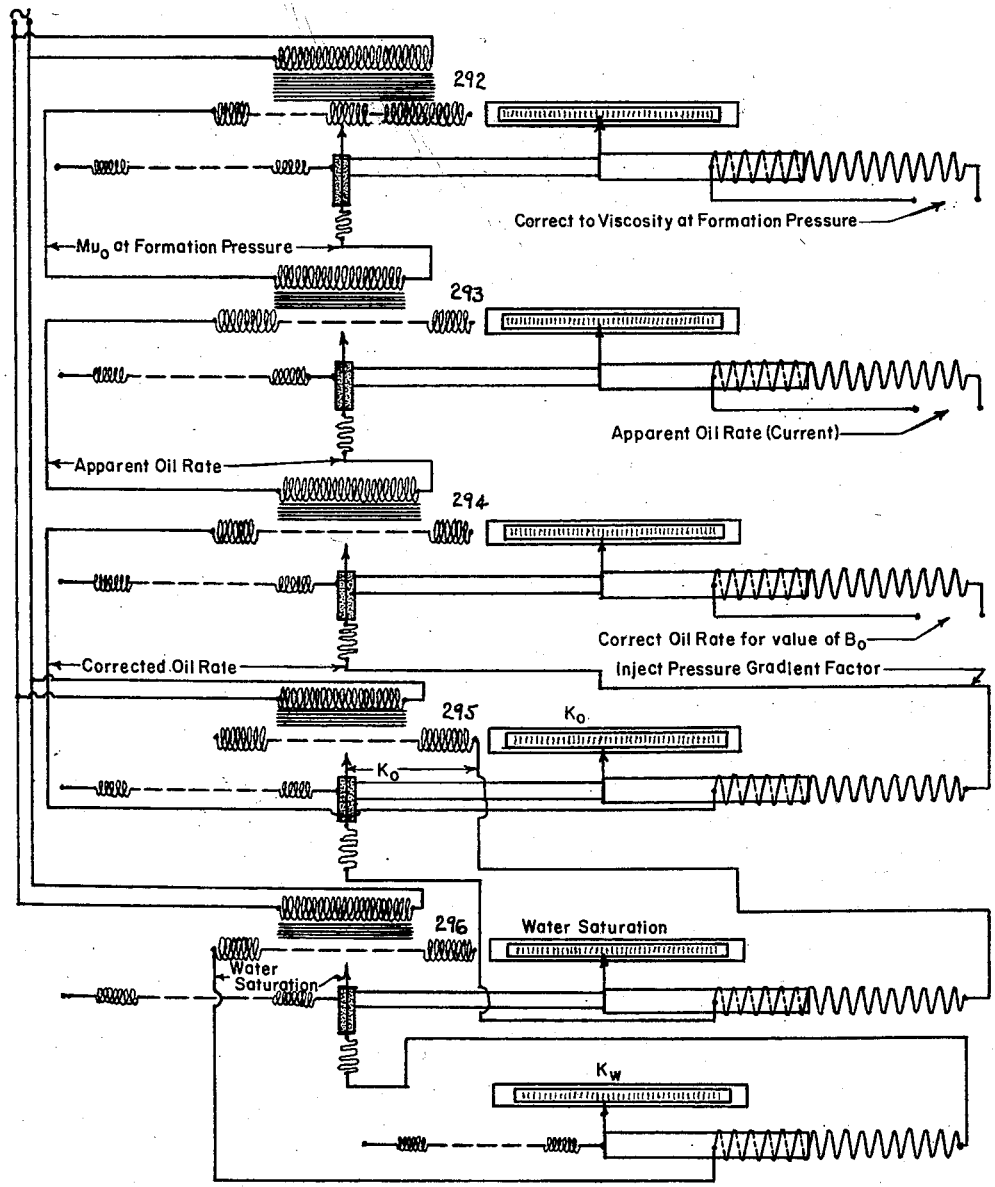

FIGURE 5 is a section similar to that of FIGURE 3, but it illustrates a trap without edge water drive, and producing solely by formation gas pressure drive under paleozoic production; and this figure shows, by the intensity of the stippling the general extent of depletion of the fluid contents of the formation adjacent to each of the producing wells, the lighter intensity of such stippling indicating the greater extent of the depletion close to the center of the pressure sink, and the heavier stippling at locations between the wells indicating substantially no depletion of the fluid contents of the formation in such locations; and in such relatively less depleted portions of the reservoir the percent of the original oil still remaining in the formation is high, so that the ratio of oil to connate water or to gas or both is still high, whereas in depleted sections of the water drive reservoirs the water remaining in the formation is high with corresponding effects on the relative permeabilities of the water and oil at various portions of the two types of production, cenozoic and paleozoic;

FIGURE 6 shows a section similar to that of FIGURE 5, but instead of showing the relative degrees of depletion of the original contents of the reservoir by gradations of shading of the stippling we have shown the non-depleted portions of the original contents by stippling of uniform degree, and have shown the volumes of delivered or produced fluid contents by the nonstippled areas; it being noted that the remaining volume of nondelivered formation contents comprises substantially two-thirds of the total such volume contained within a vertical cylinder co-axial with the well, and of hight equal to the thickness of the producing formation, only about one-third of the contents of the formation contained even in such cylindrical volumes being produced by natural gas pressure drive and leaving a very large percent of the original fluid contents of the formation still in place;

FIGURE 7 shows a portion of the formation of FIGURE 3, after normal edge water drive and prior to secondary production by water injection, the non-produced contents of the formation being shown by medium dark stippling;

FIGURE 8 shows a view similar to that of FIGURE 7, but after a portion of the formation has been subjected to secondary production by edge water drive injection;

FIGURE 9 shows a view of a portion of a trap shown in FIGURE 5, after normal formation gas pressure drive and prior to secondary production by edge water drive;

FIGURE 10 shows a view similar to that of FIGURE 9, but after a portion of the formation has been subjected to secondary production by edge water drive injection;

FIGURE 11 shows a portion of a producing field under edge water natural drive, showing the irregular spotting of the producing wells in relation to the contours of surface elevation;

FIGURE 12 shows a portion of a producing field under formation gas pressure natural drive, with the producing wells spotted according to a regular square spacing program and in relation to the surface elevation contours;

FIGURE 13 shows, on enlarged scale, that portion of the field shown in FIGURE 12 which includes the producing wells; and this figure also shows, more or less schematically, numerous of our simulating units located in regular order over the area of the field whose characteristics are to be simulated and tested and analyzed by use of our equipment and elements herein disclosed, the interconnections between the various simulating units not being shown in this figure due to the small size of the figure and such elements as shown thereon;

FIGURE 14, shows, also on enlarged scale, that portion of the field shown in FIGURE 11 which includes the producing wells; and this figure also shows, more or less schematically, our simulating units located in regular order over the area of the field whose characteristics are to be simulated and tested and analyzed by use of our equipment and elements herein disclosed, the interconnections between the various simulating units not being shown in this figure due to the small size of the figure and such elements as shown thereon;

FIGURE 15 shows in section a portion of a producing formation of rather thick structure and including a series of lenses scattered throughout the body of such formation, but included therein; and this figure also shows a number of producing wells penetrating said formation to various depths so that various portions of the formation otherwise difficult or impossible to drain by edge water natural drive may be drained by such well penetrations; and this figure also shows, more or less schematically, the flow streams of the fluid contents of such formation in respect to and as influenced by such lenses; the production of this showing being cenozoic production characteristics;

FIGURE 16 shows in section the same formation as is shown in FIGURE 15, but on the assumption that it is a sealed trap and is produced by formation gas pressure drive instead of by edge water drive, thus being according to paleozoic production; and this figure shows, by the density of the stippling, the approximate portions of the contents of such formation which may be produced by such natural pressure drive, the degree of non-production being shown by the darkness of the stippling; and this figure also shows how such formation may be subjected to second production by edge water injections from suitably located injection wells;

FIGURE 17 shows in section a number of separate formations not naturally connected together vertically, with provision for simultaneously producing two or more of such formations by use of producing wells common to such plurality of formations and not by "dual" or "multiple" completions; and this figure shows, schematically the formation pressures at different portions of the producing formations under drainage; and the several pay formations shown in this figure are under natural edge water drive or cenozoic production;

FIGURE 18 shows a section similar to that shown in FIGURE 17, but with the several pay formations in the form of traps without natural edge water drive, and under natural formation gas pressure production, the several formations being penetrated by one or more wells, for simultaneous production from such several formations, not by "dual" or "multiple" completions and this figure shows, schematically, the formation pressures at different portions of the producing formations under drainage; the formations shown in the figure being under paleozoic production;

FIGURE 19 shows typically, the curves of cumulative oil production, cumulative gas-oil ratios, and formation pressures, for a producing field under natural formation gas pressure production, over a number of years of life, and it also shows the effects of gas injection for pressure maintenance on the gas-oil ratio and the formation pressure curves;

FIGURE 20 shows, typically, curves of reservoir pressure, and gas-oil ratio plotted against cumulative recovery, on a hypothetical case of production;

FIGURE 21 shows, typically, curves of reservoir gas-oil ratio and reservoir oil saturation related to formation pressure for a typical formation gas pressure production; being a paleozoic production reservoir;

FIGURE 22 shows typically the curves of water injection, water production, and cumulative water for a water injection drive operation;

FIGURE 23 shows typically the curve of gas-oil ratio and other ratios and effects for a typical gas injection operation;

FIGURE 24 shows the relative permeabilities of water and oil with respect to water and oil saturations, for a typical specification of oil;

FIGURE 25 shows the relative permeabilities of oil and gas with respect to oil and gas saturations, for a typical specification of each such components;

FIGURE 26 shows curves corresponding to those of FIGURE 24, but instead of showing values of permeability of water and oil as percentages of the permeability of water and of oil for the permeabilities of said components at 100% saturation of water and of oil, respectively, the corresponding curves shown on FIGURE 26 are the ratios $K/K_w$ and $K/K_o$ related to percent water saturation;

FIGURE 27 shows curves corresponding to those of FIGURE 25, but instead of showing values of permeability of oil and gas as percentages of the permeability of oil and gas for the permeabilities of said components at 100% saturation of oil and of gas, respectively, the corresponding curves shown on FIGURE 27 are the ratios $K/K_o$ and $K/K_g$ related to percent oil saturation;

FIGURE 28 shows typically the relationships of various specified percentages of oil permeabilities to various percentages of water and of gas in three phase solutions of such components;

FIGURE 29 shows typically the relationships of various specified percentages of gas permeabilities to various percentages of water and oil in three phase solutions of such components;

FIGURE 30 shows typically a set of curves relating absolute viscosities of crude oils which are at pressures above the bubble-points for their contained gases, to pressures higher than such bubble-point pressures and these curves show that as the pressures to which such gas containing oils are subjected, are lowered to their bubble-point pressures the viscosities of such oils fall in a substantially linear manner;

FIGURE 31 shows a set of curves relating the viscosities of a number of oils to the amounts of gas in solution in such oils;

FIGURE 32 shows, more or less schematically, the fluid flow stream lines between a single injection well and a single production well, and includes intersecting curves passing through the stream lines at locations of equal percentage of the total drop between the injection well and the producing well;

FIGURE 33 shows, more or less schematically, the fluid flow stream lines between two injection wells and a single production well, and includes intersecting curves passing through the stream lines at locations of equal percentages of total pressure drop between the injection well and each producing well it being assumed that the pressure sinks at both production wells are at the same absolute pressure;

FIGURE 34 shows, typically, the relation between viscosity and formation pressure in the case of a gas-free oil, showing such relation by a correction factor to be applied to the viscosity of the oil, still gas-free, but at 0 p.s.i.g.; and the curves shown on this figure are usable for determining the values of $K_o$ corresponding to various liquid flow rates on an arbitrary scale, and under a pressure gradient of unity on an arbitrary scale when the formation pressures are of amounts between the legended values of 0 p.s.i.g. and 3,000 p.s.i.g.; and these curves emphasize the relationship between the factors of rate, viscosity, and $K_o$, as affected by the formation pressure; and this figure also shows various other relationships of factors; whereby it is possible to determine by simple graphical steps the value of $K_o$ for certain specified values of Formation Pressure, Formation-Pressure-Viscosity Correction Factor, arbitrary pressure gradients, and rates of flow, and other desired information;

FIGURE 35 shows a simple rectangular block of electrically conducting material, and of perimeter form to simulate a correspondingly shaped body of the permeable reservoir formation, and this figure shows typically the representation of such reservoir simulating unit in simple form;

FIGURE 36 shows in simple form the electrical conducting elements contained within one of the simulating units of our equipment, including the two branch parallel flow arrangements for the water and oil components contained within and flowing through the simulating unit; and this figure also shows the interconnections between such two branch current flow arrangements to enable transfer of currents between longitudinal direction flow simulating elements and lateral direction flow simulating elements, for both water and oil; and this figure also shows the adjustable impedance elements contained in the various branch elements of the parallel current flow conducting arrangements by means of which adjustable impedance elements (generally reactance free—simple resistance elements) the resistance elements of each branch may be adjusted to simulate the relative permeability values existing in the real reservoir body thus simulated under the percent water saturation existing in such unit during the test operation to be conducted on such unit; and this figure also shows portions of the adjacent simulating units at all four sides of the unit under test, together with the electrical connections between the branches of the unit under test and the branches of such adjacent simulating units; and this figure also shows a simple arrangement of supplemental connections, current transformers, and single-phase wattmeter for readily determining the changes of water content and of oil content produced in the simulating unit under study, during a prescribed time interval of conduct of such test, only the supplemental elements just referred to for the oil side of the simulating unit being shown for simplicity of illustration, it being understood that similar supplemental elements are also connected to the water side of such simulating unit during such time interval specified test so that changes or increments of both oil and water content contained in the simulated real reservoir body during the test interval may be determined to supply data from which the present condition of water saturation within the simulated unit or body may be determined, and therefrom the relative permeabilities of such body to movement of oil and of water therethrough may be determined, with supply of corresponding information as to new settings of the impedance elements of both branches of the unit preparatory to conduct of the next test of a set of tests;

FIGURE 37 shows, schematically, a simple form of "compass-like" unit for indicating the resultant direction of fluid flow through the simulating unit during the test thereof;

FIGURE 38 shows, schematically, a simple arrangement for enabling setting or re-setting of the adjustable impedances of a simulating unit, all of such adjustable impedances for the oil side comprising a group, and all of such adjustable impedances for the water side comprising another group, all of the adjustable impedances of each group being simultaneously adjustable to equal impedance values by either manual or automatically functioned means, and being temporarily lockable in adjusted position during the conduct of the set of tests to be conducted under such conditions of impedance adjustment;

FIGURE 39 shows, schematically, a simple set of operative elements by which determinations of the settings of impedances for the oil side may be automatically determined (as to impedance values) from certain test data procured during the conduct of a test on the simulating unit in question, and thence the water saturation percent may be determined, and thence the settings of the impedances for the water side may be automatically determined (as to impedance values); and this schematic showing also includes provision for delivering to suitable recorder elements, such as punched cards or magnetic tapes, the test data thus determined and other data obtained during the tests of the simulating unit in question, all for future reference or for use in determining other operational conditions under study; the schematic showing of this figure being usable according to the second operational sequence previously referred to herein;

FIGURE 40 shows, schematically, arrangements for determining the relative permeability for water without need of first determining the relative permeability for oil, the steps followed in the use of the arrangement of FIGURE 40 being of the same general pattern as those used in FIGURE 39 operations;

FIGURES 41 and 42 show typical punched cards provided with spaces to accommodate various data produced, and/or determined during a test operation on one of the simulating units;

FIGURE 43 shows schematically a modified arrangement of the operational elements shown in FIGURE 39, such modification being directed primarily to the use of components enabling the operations to be conducted by A.C. instead of D.C.;

FIGURE 44 shows schematically, a modified form of adjusting and setting means for the adjustable impedances of a simulating unit according to a grouping of such impedances different from that shown in FIGURE 38; the arrangement shown in FIGURE 44 being one in which the oil and water permeability simulating impedances of each branch of the simulating unit are jointly controlled and adjusted to correspond to the water saturation at the face of the simulating unit which is proximate to such branch pair of impedances.

Figure 51A:
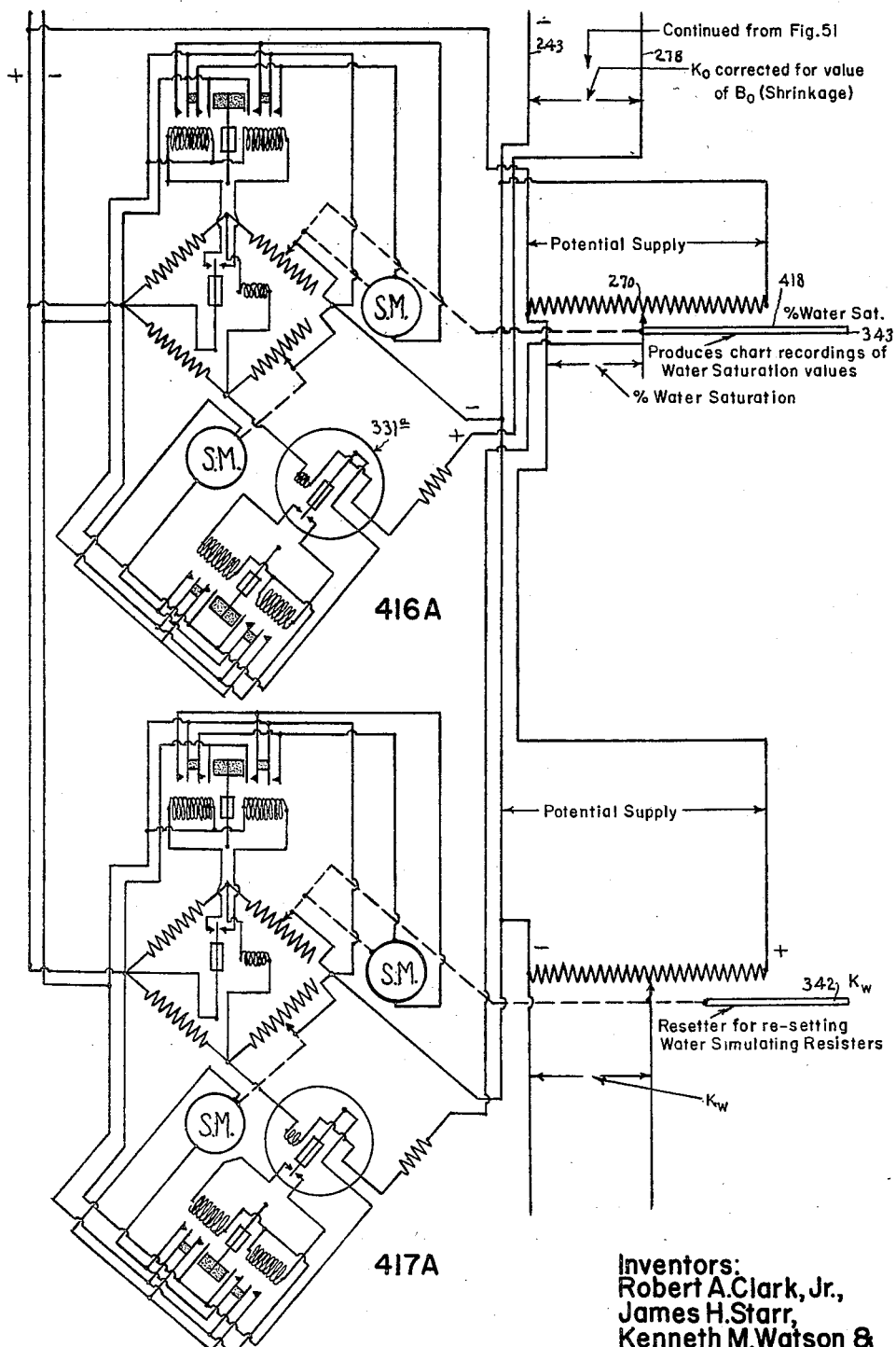
Figure 52:
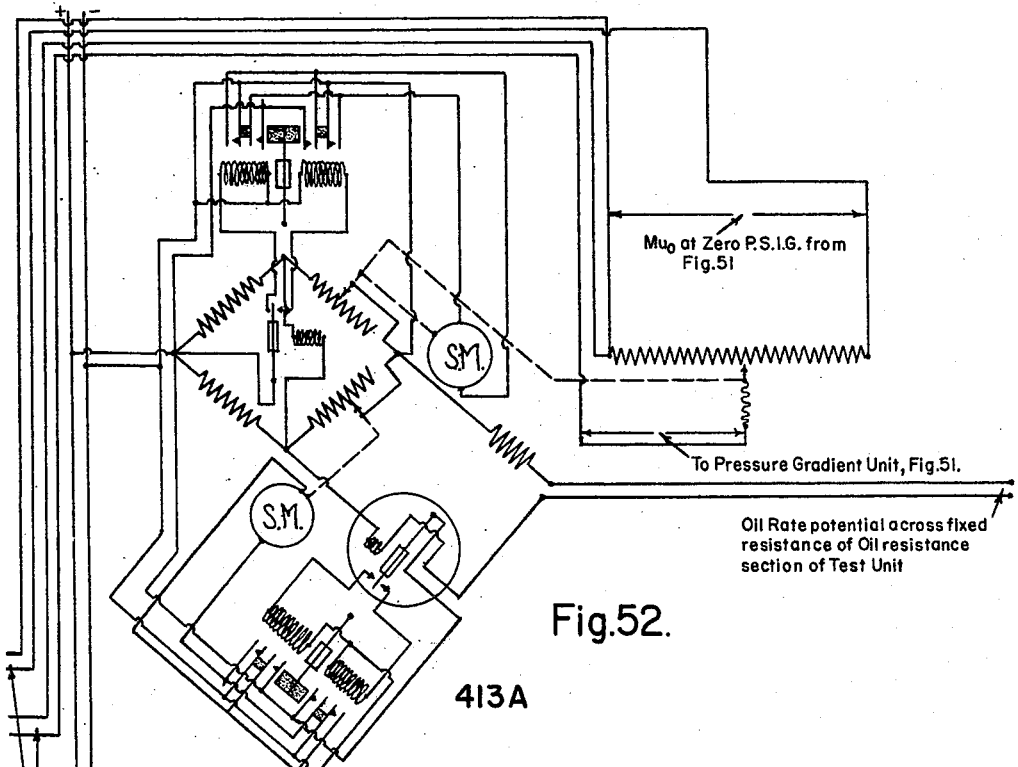
Figure 53:
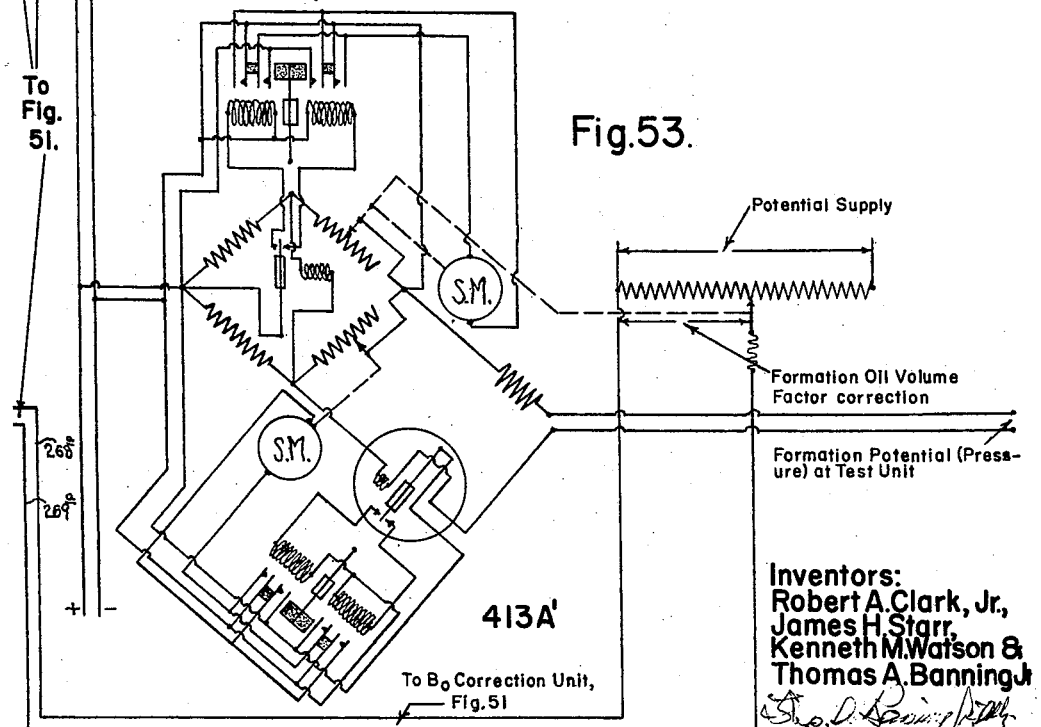
Figure 54:
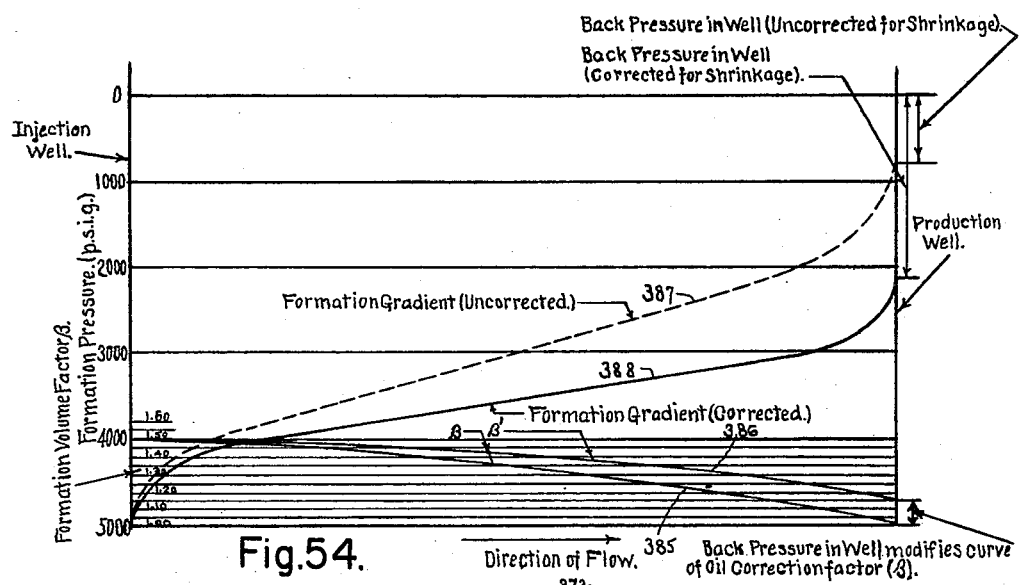
Figure 55:
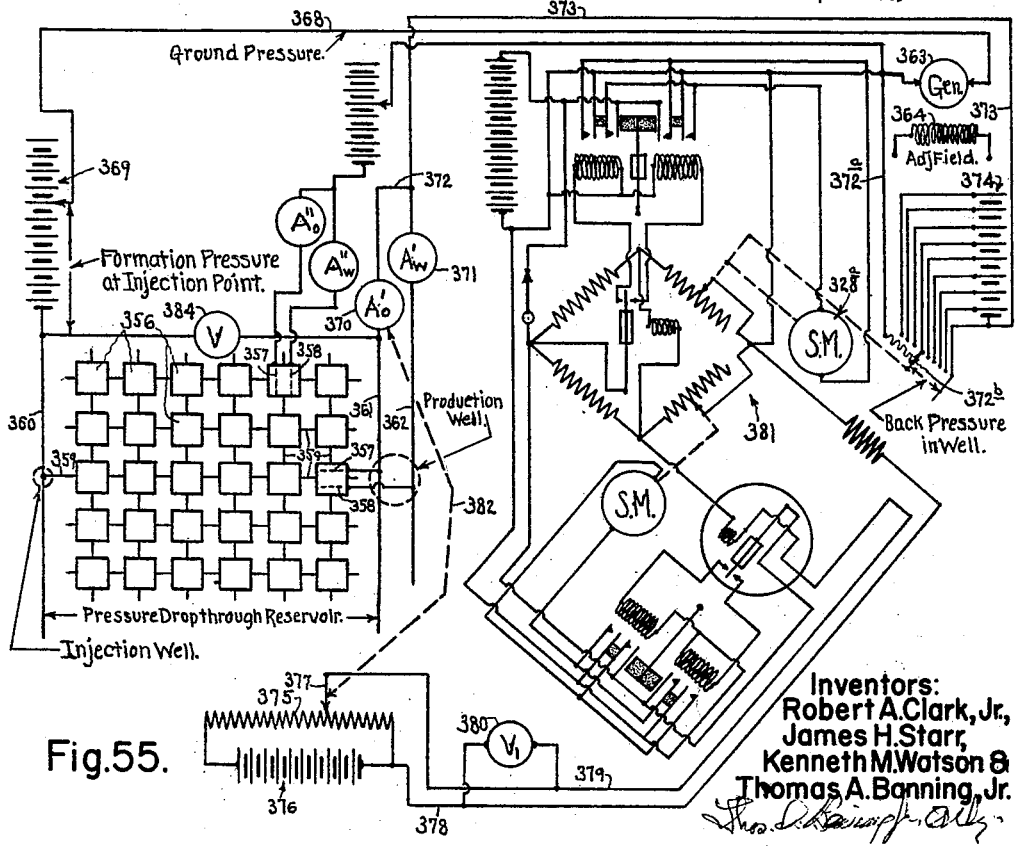
Figure 53A:
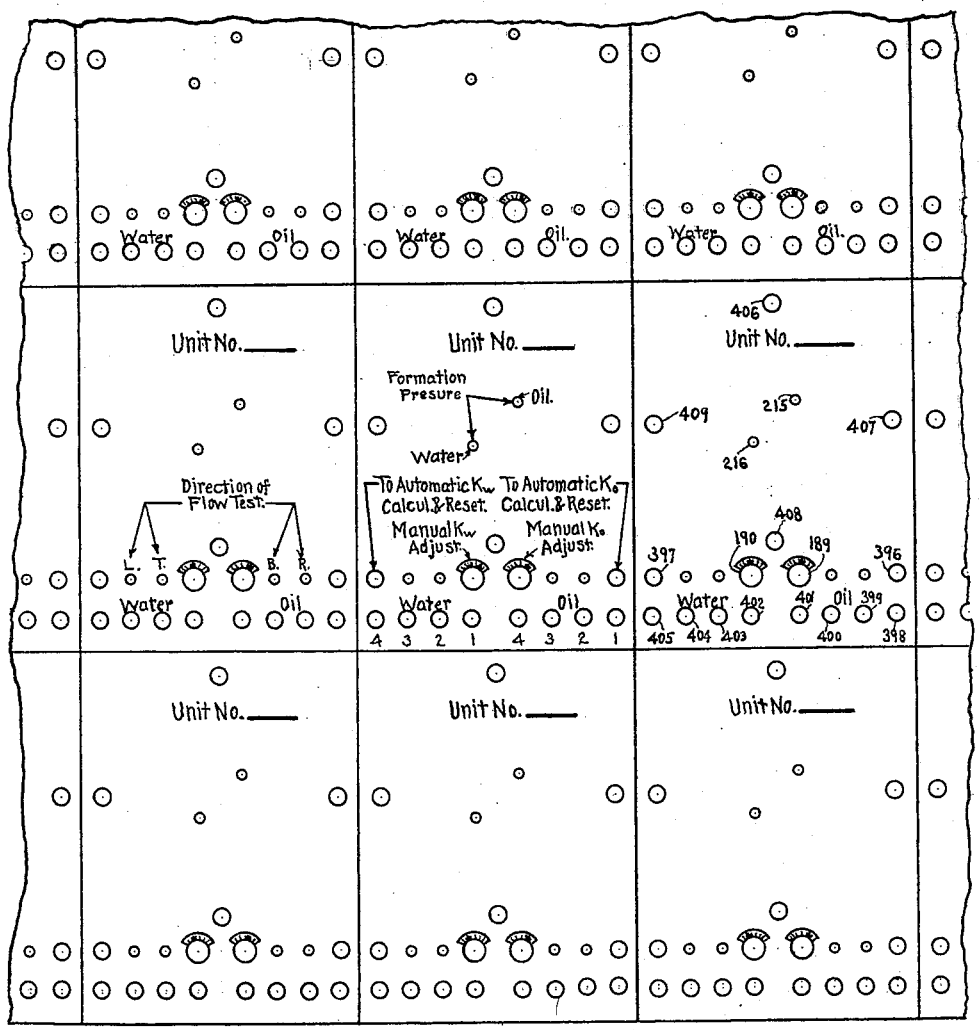
Figure 53B:
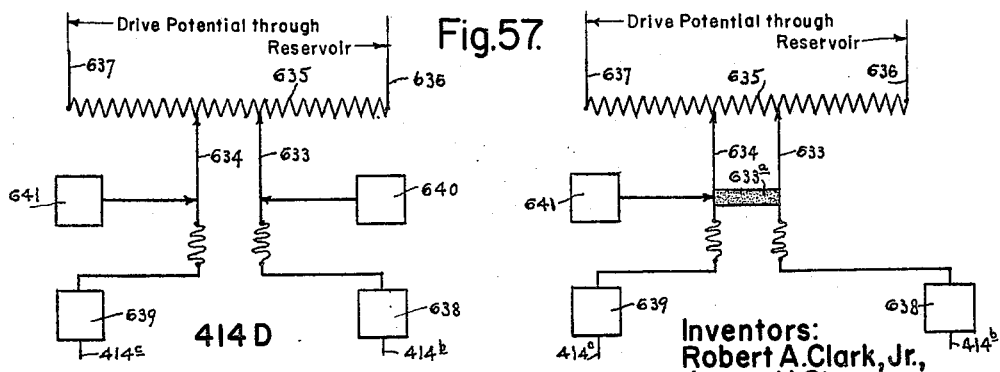
Figure 69:
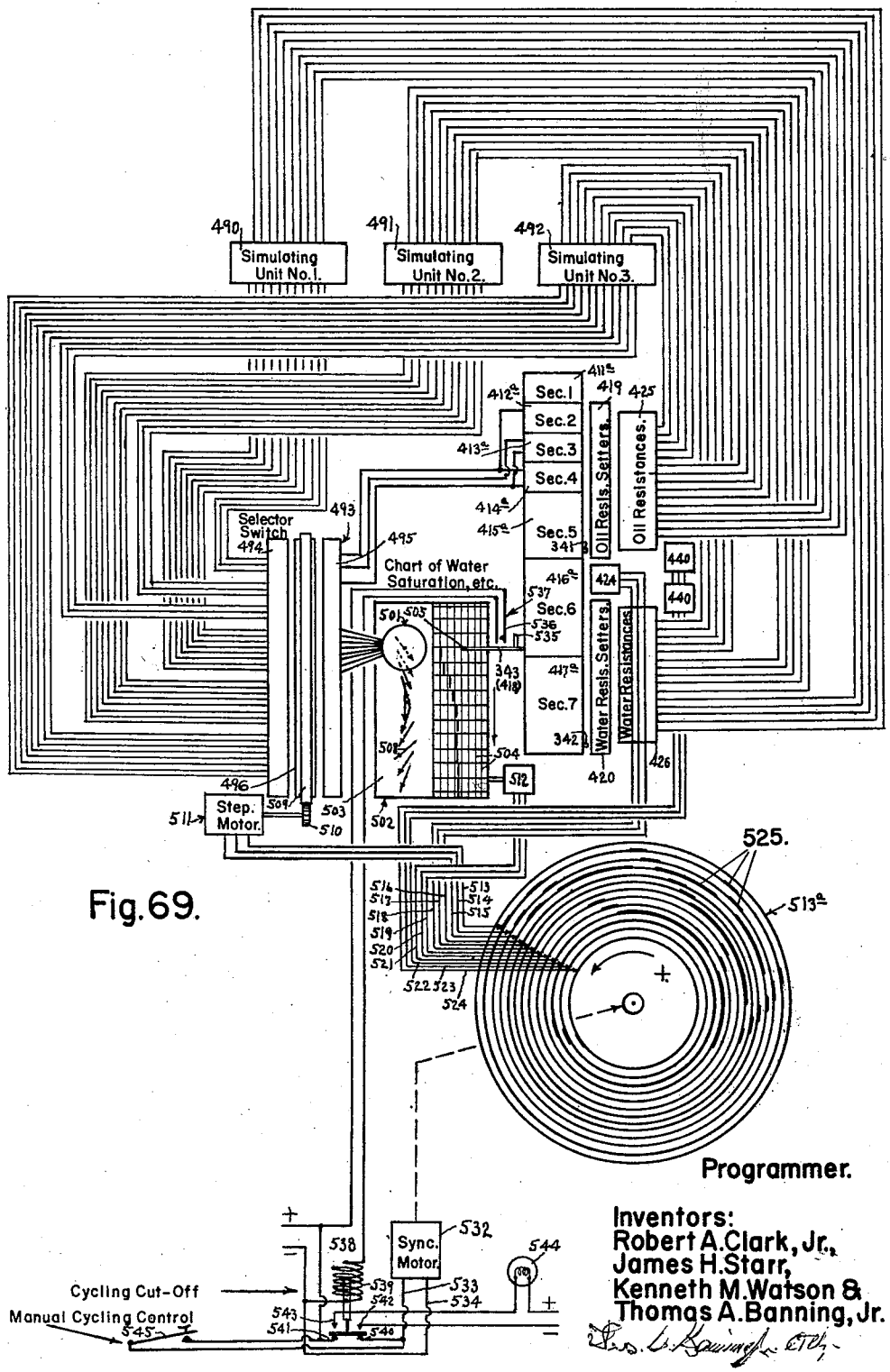
Figure 70:
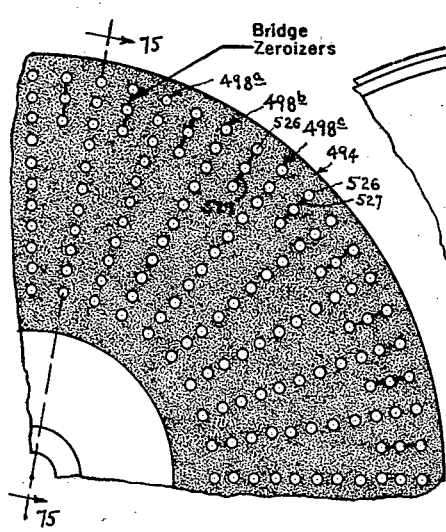
Figure 71:
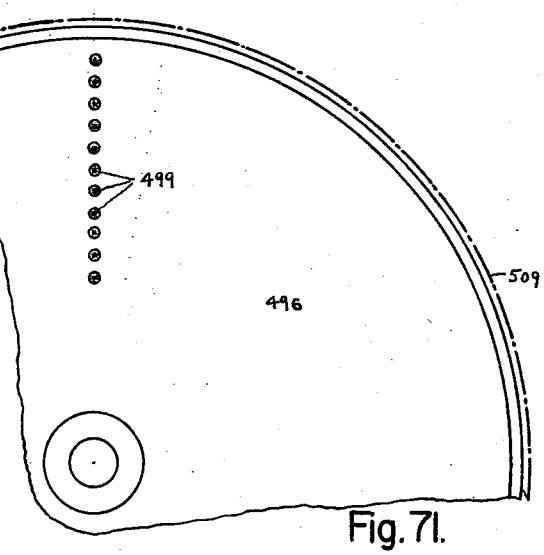
Figure 72:
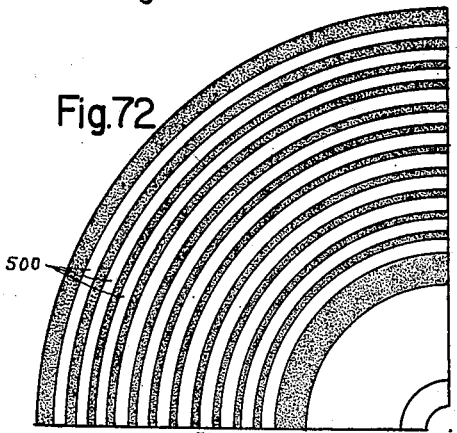
Figure 73:
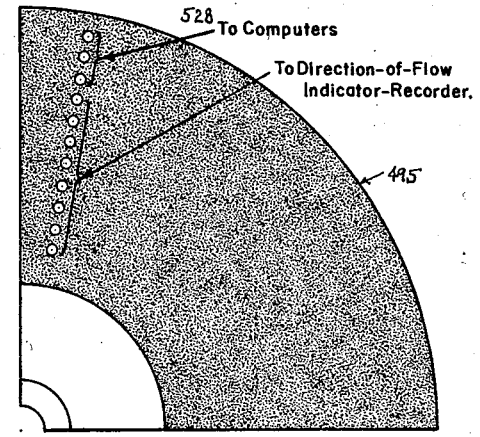
Figure 75:
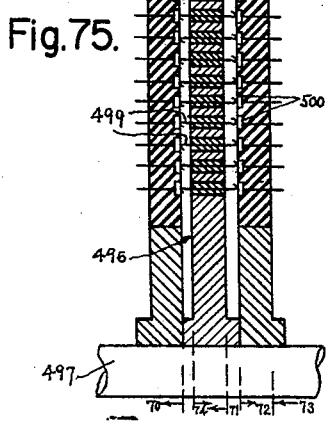
Figure 74:
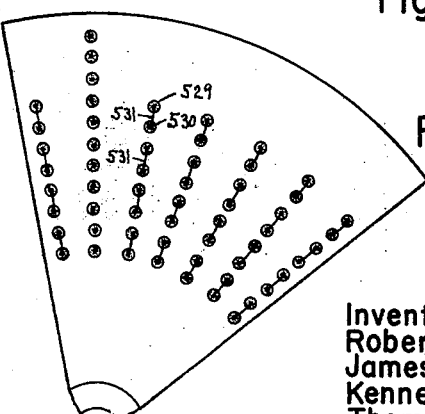
Figure 80:
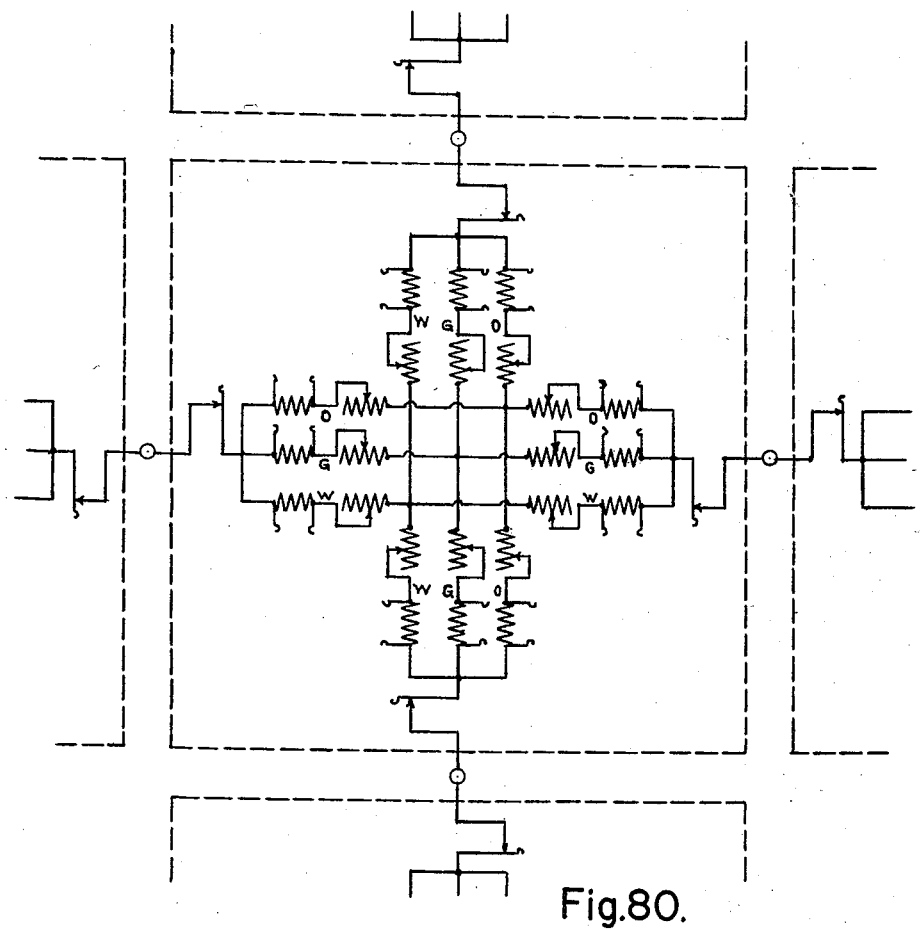
Figure 81:
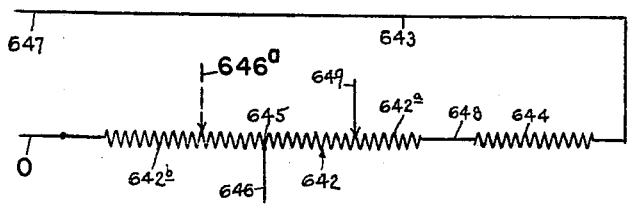
Figure 82:
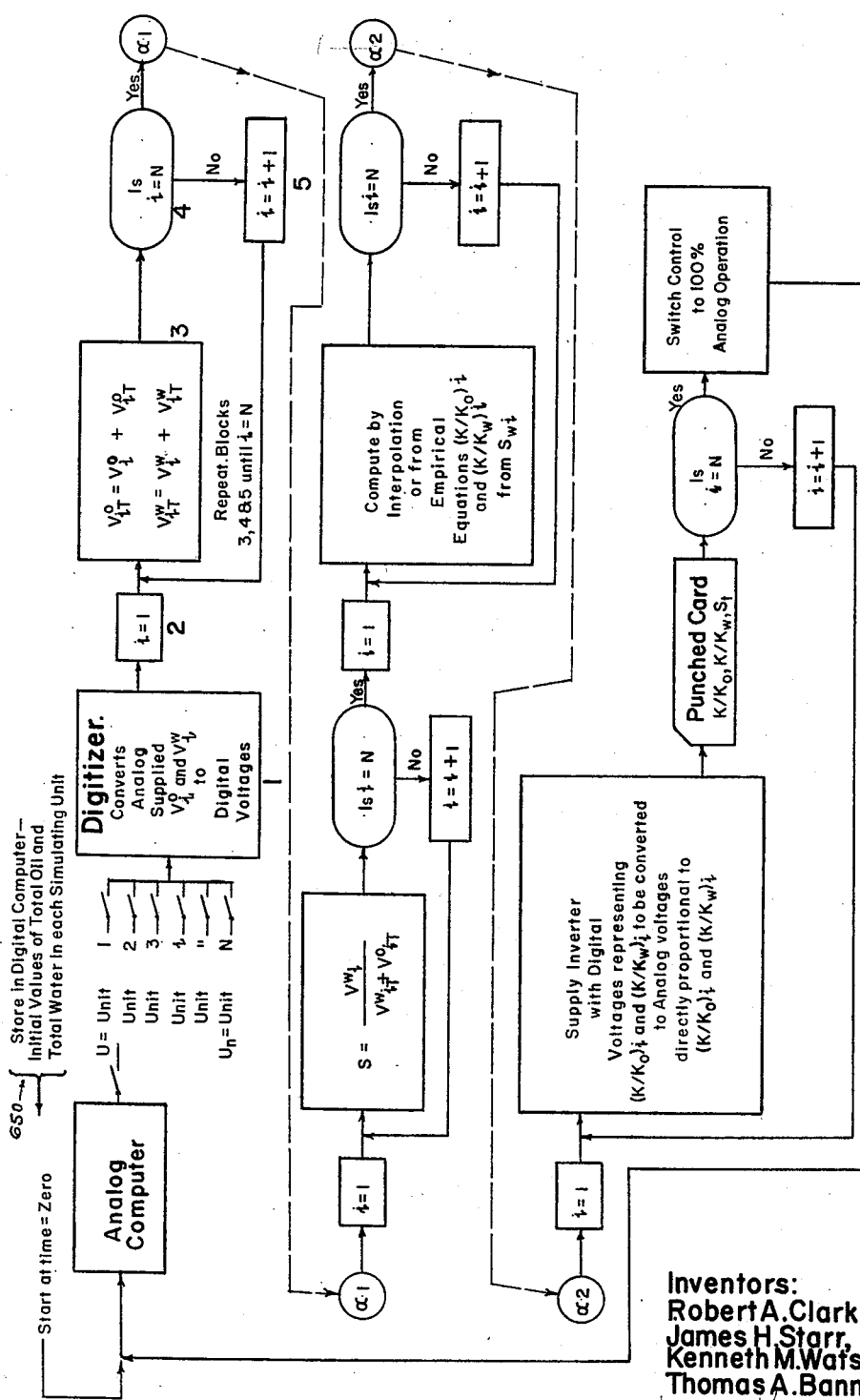

FIGURE 45 shows, typically, the relation of gas solubility by a typical oil for progressive changes of formation pressure, thus showing the amount of gas released from the gas saturated oil, for such progressive reductions of formation pressure; and this figure shows such relationship for the two broad types of such gas release, namely, "Flash Liberation" and "Differential Liberation" of the gas;

FIGURE 46 shows, typically, the relation of Water Formation Volume Factor to Formation Pressure, for several temperatures of the water, and includes such showing for both pure water and gas saturated water at the indicated formation pressures, for each such temperature condition;

FIGURE 47 shows a typical production history for a water drive reservoir, through a number of years of such production; and this figure shows the Reservoir Pressure, the Oil Production Rate, the Water Production Rate, and the Gas-Oil ratio, all with respect to the life progress of the reservoir;

FIGURE 48 shows a typical production history for a water drive reservoir having a gas cap, through a number of years of such production; and this set of curves includes curves for the same group of operational conditions as are shown in FIGURE 47;

FIGURE 49 shows a typical production history for a water injected drive reservoir during an interval of 7½ years, by six months intervals; and this figure shows the Oil Production, the Water Production, the Total liquids production, and the Water Injection, during the history shown in the FIGURE;

FIGURE 50 shows typically, the relation of Oil Formation Volume Factor (Beta), to the Formation Pressure in p.s.i.a. and this curve shows clearly the reversal of kind of the curve at the pressure condition corresponding to the bubble-point of the contained gas;

FIGURE 51 (comprising two sheets), shows more or less schematically, the functional elements and the wiring and related elements, for an operational sequence corresponding to that shown in FIGURES 39 and 43; but in the present case we have shown the use of bridges in the circuitry for controlling the operations of servomotors to effect settings of various potential changing potentiometers, certain of such servo-motor units also serving to produce re-settings or presettings of stop elements which are used to position the various adjustable impedances during the re-setting operations of the adjustable impedances after all of the simulating units have been tested and data from such tests recorded (as in the setting of such stop elements), such stop elements thus serving to store the information corresponding to their set positions as thus set by the servo-motors, until the transfer operation for all of the adjustable impedances for all of the simulating units occurs; and it is noted that provision has been made, in the showing of Sheet 1 of this FIGURE 51, for connection of a "correction unit" into the circuitry of FIGURE 51, to produce the desired corrections based on "shrinkage" and to which reference has already been made;

FIGURE 52 shows, schematically, the Oil Rate correction unit which may be used in connection with the elements shown in FIGURE 51, to effect changes of operations based on oil rate through a fixed resistance element of the oil side of the simulating unit;

FIGURE 53 shows, schematically, the Formation Volume Factor correction unit which may be used in connection with the elements shown in FIGURE 51 to effect "Rate" corrections, based on Formation Volume Factor, or shrinkage, to which reference has been made;

FIGURE 53A shows, schematically, another correction unit to introduce a correction factor based on the Formation Volume Factor $B_o$; by which unit a differential correction of the rate of oil flow through the oil branch of the simulating unit may be effected on the basis of the differential amount of the total Formation Volume Factor correction between the pressures of the formation at the point of injection, and at the well;

FIGURE 53B shows, schematically, another unit similar to that shown in FIGURE 53A, but of simpler form and based on a simple operation involving only a single bridge to produce the correction operation;

FIGURE 54 shows, schematically, what may be termed a "Potential of Formation" diagram; and it shows how the formation pressure simulating potential through the network changes from the injection point or points to the production point or points; and this figure also shows, schematically, how the correction factor for shrinkage increases and changes rapidly close to the injection point and also more rapidly close to the production well or wells;

FIGURE 55 shows a current supply arrangement for delivering the current into the simulating network through the injection well or wells, flowing such current through the network to the production well or wells; together with means to adjust the voltage through the system to produce and maintain a delivered "production" at that rate desired during the conduct of the tests, including means to automatically maintain the current at the proper value corresponding to such desired "production";

FIGURE 56 shows, schematically, a typical wiring diagram including the impedance components and connections for a single simulating unit, together with a schematic layout for panel board control of such unit; and this layout also includes manual impedance adjusting buttons or the like, located on such panel board, and also includes various jacks into which cord plugs may be inserted to interconnect various portions of the illustrated simulating unit to other like simulating units or elements of equipment according to the intended program of test operations;

FIGURE 57 shows a face elevational view of a convenient sectional panel board structure, each panel of which is provided with the elements of equipment shown schematically in FIGURE 56; it being possible with this arrangement to interconnect the numerous simulating unit terminals with the terminals of other like simulating units by use of cords and plugs of conventional form;

FIGURE 58 shows a convenient cabinet for accommodation of the calculating and transfer signal elements, which elements are used in succession in connection with all of the simulating units, to effect needed recordings of data during the test operations on each simulating unit, to produce the needed calculations of re-settings of the variou impedance elements or to produce settings of tranfer stops corresponding to each of the simulating units, so that at completion of the sets of simulating unit tests the impedance elements of all of the simulating units may be automatically, simultaneously re-set to the new settings as determined by such equipment, ready to commence a succeeding set of tests of the entire series of simulating units, with repetition through as many sets of the tests as may be desired, or as may be needed to bring the "production" of the simulated reservoir to conclusion at a specified water-oil ratio, or other specification;

FIGURE 59 is a face end view of the wheel unit which carries the stops corresponding to the numerous $K_o$ simulating impedances, each of which stops is set, during the progress of a set of tests, to position corresponding to the value of $K_o$ as calculated for such simulating unit during such test, such so-set stops afterwards being used during the transferring operation to produce re-setting of the simulating impedances to positions for the calculated new values of $K_o$ for such simulating impedances; after which transferring operations such stops are released and driven back to their base positions, preparatory to use of such stops during the succeeding set of tests; and this figure may also be considered as an end view taken on the line 59—59 of FIGURE 58, looking in the direction of the arrows;

FIGURE 60 is a face end view of the smaller diameter wheel unit which carries the adjustable simulating impedances corresponding to those simulating units to which the numerous stops of the wheel of FIGURE 59 refer, which wheel unit of FIGURE 60 is endwise shiftable into the wheel of FIGURE 59 to produce the transferring operation, by which shift each of the adjustable impedances carried by such wheel 60 is re-set to position corresponding to the set position of the companion stop of FIGURE 59, to thus re-set the simulating impedances carried by such wheel 60 to their corrected values, after which such wheel of FIGURE 60 is withdrawn from within the wheel of FIGURE 59, and is returned to its normal right-hand position, illustrated in FIGURE 58;

It is here noted that another stop wheel and corresponding simulating impedance wheel are also shown in FIGURE 58, which other wheels are for the $K_w$ section, and are of construction and overall functioning similar to the construction and overall functioning of the elements of FIGURES 59 and 60;

FIGURES 61 and 62 are enlarged quadrant figures corresponding to FIGURES 59 and 60, respectively; and these FIGURES 61 and 62 show the numerous impedance elements in end view (FIGURE 62) and the corresponding adjustable stop elements also in end view (FIGURE 61), more or less schematically;

FIGURE 63 is a much enlarged longitudinal section through one of the adjustable stop elements of FIGURES 59 and 61, and through the corresponding adjustable simulating impedance element of FIGURES 60 and 62, when the simulating impedance wheel element has been shifted endwise or laterally into the adjustable stop element, to produce re-setting of the impedances carried by the impedance wheel element to new positions corresponding to the adjusted positions of the stop wheel element; and in this FIGURE 63 such lateral shifting of the impedance wheel element into the adjustable stop element has been completely effected, with re-setting of the group of $K_o$ simulating impedances to their new positions, and with release of the adjustable stop element so that it will now be spring retracted into its base position (leftwardly) although such retraction has not occurred in the showing of FIGURE 63;

FIGURE 64 is a fragmentary cross-section taken on the line 64—64 of FIGURE 63, looking in the direction of the arrows; and it shows the screw-threaded shaft element of the simulating impedance carrier as in its pawl latched position to which it has just been shifted by the inter-engagement of the two wheel elements, the pawl for latching the adjustable stop of the companion wheel element having been released from its ratchet wheel element, but for purposes of convenience in illustration the retracting spring for the adjustable stop element has not yet acted to return the corresponding stop to its base or zero position, leftwardly in FIGURE 63;

FIGURE 64A shows a detailed plan view of the trigger element on the ratchet wheel pawl which engages the ratchet wheel on the contact block setting shaft;

FIGURE 65 is a fragmentary left-hand end view of the inter-engaged stop carrying and simulating impedance carrying wheels, taken on the line 65—65 of FIGURE 63, looking in the direction of the arrows: and is a view corresponding to that of FIGURE 64, but looking in direction opposite to that of FIGURE 64;

FIGURE 66 is a fragmentary right-hand face view of the simulating impedance element carrying wheel, showing the right-hand end bracket and the adjustable potentiometer or resistor contact carrying shaft, which shaft shifts such adjustable contact back and forth for adjustment of the impedance value; and this figure shows a hand button by which such impedance contact position may be adjusted for manual adjustment of the value of the impedance, as when originally setting the values of the simulating impedances to correspond to the known or estimated relative permeabilities of various portions of the reservoir;

FIGURE 67 shows a fragmentary face view of the companion portions of the stop carrying wheel and the adjustable impedance carrying wheel, when the latter wheel has been shifted to position just entering the adjustable stop carrying wheel, and locking in the same direction as FIGURE 63;

FIGURE 68 shows a view corresponding to that of FIGURE 67, but looking in the opposite direction;

FIGURE 69 shows, schematically, a simple form of wiring diagram and basic elements for practice of one of the operational procedures herein specially described by way of illustration of one use of features of our invention; and in the showing of this figure there are included, for purposes of limiting the complexity of the wiring connections, only three of the areal simulating units; and this figure also shows schematically, means to automatically test each of the simulating units of the entire network and to produce various recordings of significant test values determined by such test of such unit, and to immediately effect operations to determine the re-set values to which the adjustable impedances of such unit shall be set but without present change of the impedance values of elements of the simulating unit now under test, and to record the results of such operations including such re-set values to which the adjustable impedances of such simulating unit shall be adjusted for a succeeding series of tests; and this figure also shows means to produce such operations for each of the numerous simulating units in turn and according to a pre-determined spatial pattern of the simulating units to be thus successively tested and records so made; the test results and the determinations of the re-set values so made being recorded in the equipment shown in this figure until all of the simulating units of the network have been so scanned, tested, and determinations made for each such simulating unit; and this figure also shows means to simultaneously effect re-settings of the adjustable impedances of all of the simulating units of the network at conclusion of such scanning operations for all of such simulating units; and this figure also shows means to repeat all such operations cyclically through repetitive operations and cycles indefinitely, fully automatically; and this figure also shows means to terminate such cycling operations when a pre-determined operational condition of the reservoir has been attained—in the showing of this figure such pre-selected operational condition being the rise of percent water saturation in any simulating unit to a predetermined high value;

FIGURE 70 shows a quadrant face view of the right-hand or inner surface of the left-hand stationary terminal supporting plate of a "Simulating-Unit-Selecting-Switch" element, which switch element serves to progressively select the simulating units to be connected to other elements and units of the equipment shown schematically in FIGURE 69, and establishes terminal input connections to which succeeding elements of the equipment shown in FIGURE 69 are connected to enable performance of the functions previously mentioned in connection with FIGURE 69; the necessary input connections from each of the simulating units being brought to this switch element of FIGURE 70; such switch element also being shown schematically in FIGURE 69, and there legended as 493; and the showing of FIGURE 70 is on enlarged scale as compared to its showing in FIGURE 69; and FIGURE 70 may also be considered as a section taken on the line 70—70 of FIGURE 75, looking in the direction of the arrows;

FIGURE 71 is a section taken on the line 71—71 of FIGURE 75, looking in the direction of the arrows; and this figure shows the right-hand surface of the step-by-step rotatable transfer switching element and the right-hand brush contacts carried by such transfer switching element;

FIGURE 72 is a section taken on the line 72—72 of FIGURE 75, looking in the direction of the arrows; and this figure shows the left-hand or inner face of the right-hand stationary output connections supporting element; and shows the circular or ring contact elements which are swept by the brushes extending rightwardly from the step-by-step rotatable transfer switching element, so that as such rotatable switching element rotates to positions to bring its left-hand projecting brushes into engagement with sets of input connections from successive simulating units the input connections are correspondingly connected to proper output connections connected to such circular or ring contact elements;

FIGURE 73 shows a right-hand face view of the right-hand stationary element, and it shows the output terminal connections aforesaid;

FIGURE 74 shows a left-hand face view of the step-by-step rotatable transfer switching element; and this figure shows the short connectors carried by the left-hand surface of such rotatable switching element, and which short-connectors establish direct connections between pairs of the input connections from the several simulating units, corresponding to the lines by which the simulating units are connected together to form the network, such short connectors serving to perform such functions except when the rotatable switching element is in position for test of a specified simulating unit, at which time the input connections from such simulating unit are connected to proper terminals at the output side of the unit shown in FIGURES 70 to 75, inclusive;

FIGURE 75 shows a cross-section of the quadrant of switching unit shown in FIGURES 70 to 74, inclusive, being a section taken on the line 75—75 of FIGURE 70, looking in the direction of the arrows;

FIGURE 76 shows, schematically, a simple form of wiring diagram and basic elements for practice of another operational procedure than that operational procedure for which the showing of FIGURE 69 is intended; and the showing of FIGURE 76 includes provision for such operational procedures in the case of only a single simulating unit, for purposes of limiting the complexity of the wiring connections; and the showing of this FIGURE 76 does not include means to produce the cycling operations for successive tests throughout the entire number of simulating units representing the reservoir, since it is not believed necessary to make such showing, as such cycling arrangements as previously shown in FIGURE 69 are also largely usable in connection with the operational uses of the showing of FIGURE 76 for each of the numerous simulating units; it being here noted that the arrangement shown in FIGURE 76 and fully described hereinafter, includes means to determine the percent saturation of the water component (and the oil component, by an operation similar to that shown in FIGURE 76) by what may be described as a measurement of incremental changes, either positive or negative, of the amount of water (or oil) occuring in the simulating unit under test during a pre-determined time interval and under conditions standard for all of the simulating units of the network as respects the time interval used, and without change of the flows through the network during such time intervals;

FIGURE 77 shows a view similar to that of FIGURE 58, but modified to meet the requirements of the operational procedure for which the showing of FIGURE 76 is intended;

FIGURE 78 shows a fragmentary section through a portion of the rim of the water saturation percent calculating element wheel, taken on the line 78—78 of FIGURE 77, looking in the direction of the arrows; and this figure shows the relative positions of the driven clutch elements which drive the cylindrical elements of such calculating units; but in the showing of FIGURE 78 the radial positioning of the two calculating cylinders and the potentiometer of each unit have been reversed as compared to the arrangement shown in FIGURES 76 and 77, by locating the potentiometer of each unit closer to the wheel axis than the calculating cylinders which serve such potentiometer;

FIGURE 79 shows a fragmentary section through a portion of the rim of the resistor carrying wheel corresponding to the arrangement of FIGURES 76, 77 and 78; and this FIGURE 79 shows the two resistor sections for the oil and water components located side by side in the same wheel, instead of being carried by separate wheels, as in the arrangement shown in FIGURES 58, 59 and 60; it being noted that both of the studs which are projected outwardly (rightwardly) for re-setting the stops for the resistors in the arrangement of FIGURES 77, 78 and 79 are located side by side, extending rightwardly from the cabinet section titled "Relative $K_o$ and $K_w$ Determining Section," only the stud 341 for the water resistor re-setter being shown in FIGURE 77, as the stud 342 is behind such stud 341; and FIGURE 79 is a fragmentary section taken on the line 79—79 of FIGURE 77, looking in the direction of the arrows, but on enlarged scale as compared to FIGURE 77;

FIGURE 80 shows schematically and in skeleton form a modified form of circuitry of one of the simulating units, being a view similar to that of FIGURE 36, but showing an embodiment which is adapted to include the three phases of oil, water, and gas, with resistors corresponding to such three phases, for simulation of the three phase condition of flow through the permeable formation;

FIGURE 81 shows a simple form of potentiometer arrangement for simulating, by delivered potential, the values of a curve having a reversal in kind, of the ordinal values, such as is present in the curve 351 of FIGURE 50; and FIGURE 82 shows, by block diagram, a flow sheet and the calculating sections for a typical digital computer operation to produce a portion of the operations otherwise produced by the equipment fully disclosed in earlier portions of the present application; as, for example, such digital computer operations shown in block diagram form in FIGURE 82 correspond to settings and combinations of elements of a typical digital computer programmed to receive such data and information as is delivered by the rotations of the water shaft 605, and by the water and oil shaft 586 of FIGURE 76, to perform the calculating operations and deliver the calculated results of water saturations for the re-setting of the studs for the oil and water resistors used in completing the operations of re-setting both sets of resistors according to the operations for which the embodiment shown in FIGURES 76, 77, 78 and 79 is intended.

Before describing the units which simulate the elemental areas of the reservoir, and the manner of functioning and operation of such simulating units we shall first refer to FIGURES 1 to 12 and 15, 16, 17 and 18 in order to call attention to certain conditions of operation to which the simulating units and their ensemble must respond in order to faithfully perform their simulating operations. Some of these conditions of operation of the drainage of the reservoirs have already been referred to. Important differences between the operations of the edge water drive or cenozoic production type, and the natural formation gas pressure type, or paleozoic type of production, are shown by comparison of FIGURES 1 and 2.

In FIGURE 1 the bounds of the property are defined by the border lines 50, 51, 52 and 53, and the property itself is divided by the lines 54, 55 and 56 into six distinct areas, 57, 58, 59, 60, 61 and 62. A producing well 63, 64, 65, 66, 67 or 68 is centrally located in each such area. The formation is up-dip from bottom to top of the figure and the edge water drive is below the figure advancing upwardly to drive the fluid contents of the reservoir in a general upward direction. The advance of the water contact is therefore generally upwardly, driving the fluid contents upwardly of the formation when pressures at such higher locations are released or reduced sufficiently to enable such drive to occur. As long as the drive pressure of the water drive is of sufficient magnitude to overcome resistances to fluid flow the fluid contents of the reservoir will, to some extent at least, be driven from and delivered from one or more of such producing wells. Accordingly, such fluid contents will follow certain general stream lines of flow, some of which are shown by the stream flow lines 69 in FIGURE 1.

The following comments are pertinent respecting the general flow or seepage of the fluid contents as exemplified in FIGURE 1:

The producing formation is in this case subjected, in each of its elemental bodies to an internal pressure due to the gas in solution, and to a counter pressure produced by the drive water. As the edge water contact of the drive water advances towards the producing well the foregoing internal gas pressure and the drive water pressure maintain a condition of balance within the formation, taking into account both static and dynamic forces within the formation. If the influx of the drive water is fast enough to match the delivery of fluid contents through the producing well, the drive pressures at all portions of the formation will remain substantially constant when a given rate of production has been established at each producing well and after a lapse of time sufficient to allow the formation pressures within the various portions of the reservoir to become balanced under such rates of flow to the various wells. Change in the rate of production at any well will upset such balanced condition, and flow or seepage changes within the formation will occur to restore the balance of static and dynamic pressures at some new condition of flow through the porous and permeable formation.

Those wells lowest down on the formation will be subjected to highest drive pressures. This is true since the drive pressure needed against the surface of contact between the drive water and the natural fluid contents of the formation to produce advance of such natural fluid contents through the formation must be sufficient to balance and overcome the resisting forces at the production rate permitted through the production well or wells and also to move such fluid contents past producing wells draining the lower formation locations. Furthermore, as clearly shown in FIGURE 1, the stream lines entering the higher wells 63, 64 and 65 must flow past the lower wells 66, 67 and 68, thus producing greater "crowding" of the stream lines flowing between the lower wells 66, 67 and 68. Such lower wells thus "screen" the wells higher up, with consequent material differences of producing pressure as between the lower and higher wells. It will also be evident that the pressure gradient in the lower reaches of the producing formation will be considerably greater, due to this cause among others, than will be the pressure gradients higher up dip. This condition is due principally to greater rate of flow of the fluid contents in the lower reaches of the formation than in the higher reaches thereof, when the producing wells are scattered over the general area of the property.

Figure 2:
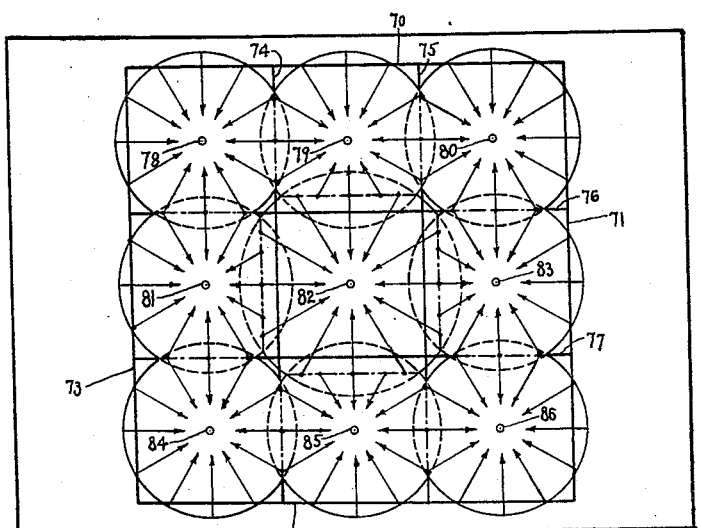

Next, examining the showing of FIGURE 2, in this case we have exemplified a producing property wherein the production is by formation natural gas pressure drive, otherwise called paleozoic production drive. In this case, as already pointed out, the release of pressure at the location of each producing well induces formation of a pressure sink due to the successive expansion effects of bubbles of gas contained in the formation between successive globules of oil (and water), each such combination of gas bubble and liquid droplet producing a resistance to flow towards the sink, and the effects of such successive resistances being cumulative backwardly from the center of the sink. This is known as the jamin effect. Accordingly, in any given reservoir producing under paleozoic production the natural gas pressure will determine, by its amount, the outward extent to which the production will extend from each pressure sink, the formation pressure rising according to a regular pattern from the center of the sink to its farthest perimeter from such center. Also, the amount of production possible by use of such natural gas drive is limited to a portion of the fluid contents contained (under ideal conditions) within a cylinder whose vertical axis is coincident with the center of the sink, and whose radius is determined by the pressure differential between the perimeter of such sink and the center thereof, acting through the specific formation in question, together with its fluid contents.

In FIGURE 2 we have shown a portion of a property bordered by the lines 70, 71, 72 and 73, and subdivided into nine well areas by the lines 74, 75, 76 and 77. The producing wells are shown at 78, 79, 80, 81, 82, 83, 84, 85 and 86, respectively centered within their respective producing areas. It is assumed that the production perimeters of the various wells are shown by the circles drawn around them, and that the stream lines of flow to the various wells are as shown by the inwardly pointing arrows extending from the production perimeters towards the respective wells.

It is now noted that the spacing of the wells is such on the basis of the available pressure differentials of the respective pressure sinks, that the diameters of the production circles overlap in their proximate portions, so that the spaces left between such production circles are of relatively small size; but such very overlapping results in a limitation of the amount of production which can be obtained from each well whose perimeter is thus penetrated. Accordingly, while the overall production available from the property is increased by such overlappings, still the production per well is lowered, with a corresponding interchange of economic balances between total production to abandonment and initial costs or investments. It is also noted that the center well and sink thereof are considerably larger than the surrounding sinks. This disparity emphasizes the effect produced by the existence of a larger differential of pressure in the case of the one well than in the cases of the others. Such larger differential of pressure is produced by operation of such particular well at a lower bottom hole pressure than the bottom hole pressure of the other wells of the group.

The example of the paleozoic drive shown in FIGURE 2 is based on the assumptions of homogeneity of the permeability of all portions of the formation, and uniformity of other factors of the formation affecting flowage or seepage of the contained fluids, as well as the assumption that there is no edge water intrusion; and that in fact the formation is sealed around its edges to produce a trap, so that there is substantially no loss of pressure in the perimeter of the field or reservoir. The effects of secondary drive treatment by injection of edge water or other drive fluid for the two cases of cenozoic production and paleozoic production will be considered presently, since the conditions of formations produced by the one type of production, after such production has proceeded a substantial portion of the reservoir's producing life, are very different from the conditions of formations produced by the other form of production, after such production has proceeded a substantial portion of the reservoir's producing life. The equipment which we have provided is capable for use and study of such secondary recovery operations by edge water drive or other forms of artificial drive, whether the reservoir has been previously produced by cenozoic production or by paleozoic production.

Next reference is made to FIGURES 3 and 4, and to FIGURES 5 and 6 as showing the production conditions in the case of cenozoic production history (FIGURES 3 and 4) and in the case of paleozoic production history (FIGURES 5 and 6), respectively. In FIGURE 3 the formation is shown as an anticline, with edge water drive around its lower reaches, 87, driving up dip towards the cap 88. Several producing wells, 89, 90, 91, 92 and 93 are shown, each fully penetrating the thickness of the formation, as shown by the small openings in each well where it extends through such formation. It is noted that as production proceeds up dip, first the lower wells 89 and 93 are flooded out and must be closed off, and that thereafter wells higher up dip must also be closed off for a like reason. Finally the top well 91 is reached by the drive water. In the absence of partially sealing off the openings or perforations in the lower end portion of such highest well its production will have to stop leaving still present in the formation considerable fluid contents as shown by the dotted line 94. By then sealing off the perforations in the lower portion of the penetration of such well some additional production may be secured through it up to the line 95, leaving then a small portion of unproduced cap fluid contents, 96.

Thus, in the case of such cenozoic production formation, the sweep produced by the natural edge water drive is quite effective, assuming that a sufficient number of wells are brought into production around its perimeter. However, it is still true that much valuable fluid contents is left unproduced in such a field, considerable of which may still be produced by a well projected plan of secondary production. The present equipment has, for one of its prime objects, the study and analysis of such future possibilities of secondary production, taking into account the condition of the field at the time such a secondary production program is instituted, and after the original production program has brought the field to a condition of residual contents, formation pressures, etc., which must be known to some degree of certainty or based on valid assumptions at the institution of the studies to be made by use of the present equipment.

In FIGURE 4 a secondary production edge water drive operation has been conducted to sweep the previously evacuated field and carry further production to the cap well or wells. A portion of such further production is shown by the stippling 97, including the darker portion 98 in FIGURE 4. By closing off the lower portion of the highest well 91 a portion of such cap material may then be produced as indicated in FIGURE 4.

It is now seen that when the earlier production history of the field has been one of production by edge water drive, cenozoic, the condition of the field over its full produced area is more or less uniform, both as respects the remaining unproduced fluid contents, and also as respects the internal pressure over such field. Accordingly, at the beginning of a test or analysis of such field to determine the probable effects to be expected by a secondary production program, our equipment should be initially pre-set to simulate, more or less uniformly over the entire produced area of such field, its probable condition of unproduced fluid contents, internal pressure, and other qualities, such as oil-water ratio at termination of the original program, etc.

Next we refer to FIGURES 5 and 6 which correspond in general to FIGURES 3 and 4, but FIGURES 5 and 6 are for the condition of a field which was originally produced by natural formation internal gas pressure drive instead of by edge water drive. Accordingly, the edge portions 99 and 100 of the formation 101 shown in FIGURES 5 and 6 are pinched together or otherwise sealed so that the trap is thus enclosed. The wells 102, 103, 104, 105 and 106 are shown which were used during the original production of such field. Since the original production was not by edge water drive each of such wells was probably used during all or most of the production program up to the point of original abandonment or to the time of discontinuance prior to commencing the tests and studies by use of our present equipment. Accordingly, it is important to see what are the present conditions of the formation at the present time, and as a basis for the tests and analyses now to be conducted.

In FIGURE 5 we have shown, by the intensity of the stippling, the relative amounts of production or non-production of the fluid contents of the formation, delivered towards or to each of the producing wells 102 to 106, inclusive. It is noted that the darker areas represent degrees of non-production, that is proportions of fluid contents non-produced and left in the formation and non-producible at all by the natural pressure drive operation. Thus, the darkest areas about midway between proximate wells indicate that substantially no or little production has been caused in such areas; and the progressive decrease of such darkening up to the wells themselves indicate that as the wells are approached more and more of the fluid contents of the formation is produced, up to substantially full depletion of the formation in its elemental volumes close to the centers of the sinks. This is in harmony with the showings of FIGURE 2 already described. In FIGURE 6 we have also shown, by the dashed lines 107, the overlapping of the production cylinders of the adjacent wells, as already explained.

Now it can be shown mathematically that under ideal conditions of such paleozoic production the jamin effect will result in production of one-third, only, of the original fluid contents contained in the cylinder which defines the perimeter of the production body. The remaining two-thirds of the original fluid contents are then locked into the pores of the formation against further production by natural formation pressure drive; but much of such non-produced contents can be produced by secondary production by edge water or other secondary operations. But the internal condition of such a formation previously produced by natural internal pressure drive is very different from the condition of a formation originally produced by edge water drive, as respects both the distribution and amount of the non-produced contents, and as respects the internal pressure within such formation at its various areas. Thus we proceed to analyze such formation and production as follows:

In the section of FIGURE 6 we have shown the residual fluid contents by the stippled portions between the adjacent wells, and including the volumes non-produced between the wells, but in this case such stippling is conveniently shown of uniform intensity or darkness. Such uniform intensity also corresponds to the lower portions of the formation, around and between the wells. The portions of the formation above such so stippled portions are left clear. These represent the volume and location of removed fluid contents as though such removed material was effected to completeness in the upper portions of the formation, leaving formation portions directly beneath non-produced and in their original condition. Thus, the volume of each white inverted cone whose axis is co-incident with the corresponding well, equals the volume of fluid contents produced through such well. Thus, also, the stippled portions extend around and between the several wells, and constitute two-thirds of the total original fluid contents. Also, if the height of the formation at any well be said to represent the original pressure within the formation, at the location of such well, in such case the height from the floor of the formation to any part of the white cone corresponding to such well will represent, proportionally to the total height of the formation at such well, the internal pressure of the formation at such location of the formation at the time of discontinuance of such paleozoic production operation. Thus, having knowledge of the terminal condition of the formation just prior to the commencement of the tests to be conducted by use of our present equipment, it is possible to pre-set our equipment to simulate the conditions of the formation at the beginning of such tests and analyses. These tests then conducted will faithfully represent the probable effects of the further production operation simulated and conducted on our equipment. Such pre-knowledge is of especial importance in the case of a reservoir which has been under internal natural pressure drive.

Next considering FIGURES 7 and 8, and 9 and 10, these show in brief the effects of the edge water drive when applied to a reservoir which has been under cenozoic production (FIGURES 7 and 8) and is then subjected to a secondary edge water production; and when an edge water drive is applied to a reservoir which has been under paleozoic production (FIGURES 9 and 10) and is then subjected to a secondary edge water production. The explanations already given in connection with FIGURES 3 and 4, and 5 and 6, are largely applicable to the present figures. It is especially to be noted that in the case of the paleozoic production reservoir a much greater benefit is generally to be expected from the secondary edge water drive operation than may be secured from such secondary production operation in the case of the cenozoic production reservoir. However, there are many cases in which such secondary production operation may well pay economically in the case of the cenzoic production reservoir.

In FIGURES 11 and 12 we have shown a field covering a portion of an edge water cenzoic production reservoir indicating thereon the well locations, and the surface contours, all in relation to the property lines (FIGURE 11), and a field covering a portion of a natural formation internal pressure drive, of paleozoic production, indicating thereon the well locations, and the surface contours, all in relation to the property lines (FIGURE 12). Each of these figures also shows the well locations it being noted that in the former (cenozoic production) case the wells are scattered irregularly over the area, whereas in the paleozoic production case the wells are spaced at regular spacing over the area.

FIGURE 13 shows a much enlarged scale reproduction of the field of FIGURE 12, and has indicated thereon a typical spacing of simulating units embodying the features of our present invention, over a part of such field. FIGURE 14 shows a much enlarged scale reproduction of the field of FIGURE 11, and has also shown thereon a typical spacing of simulating units embodying the features of our present invention, over all such field. It is here noted that at the location of each producing well a space is left open which would otherwise have accommodated one of the simulating units; and this fact will be referred to at a later time in this specification. It should also be here noted that in the case of FIGURE 13 we have also shown a hypothetical property line by dash and dot lines, dividing the whole property into two portions, for the purpose of showing how cross-property line drainage may also be included in the analyses which can be conducted by use of our present equipment. The approximate true distances between elements of the fields of FIGURES 11 and 12 are also determinable from such figures as the mile and half-mile distances are shown on said figures respectively. Thus, in the showing of the paleozoic production reservoir of FIGURES 12 and 13, the well spacing is ⅛ mile, or 660 feet.

It is also noted that in the showing of simulating units on FIGURE 13 the simulating units are shown spaced 82.5 ft. centers (64 to the mile), and on FIGURE 14 the simulating units are shown spaced 165 ft. centers (32 to the mile). The sizes of real reservoir thus simulated are intended to be such that realistic simulations shall be produced, and accordingly, the size of real reservoir to be simulated by each simulating unit should be considered in setting up the simulating field or reservoir. The sizes thus shown on FIGURES 13 and 14 are by way of example only. This condition will be considered later herein.

Reference has previously been made to special conditions in the physical structures of the simulated formations, and the ability to simulate such special conditions by use of our present equipment. FIGURES 15 and 16 show typical rather thick formation provided with a number of lenses of impermeable material, through which the fluid contents cannot drain, but drainage occurs around the edges of such lenses. Thus said lenses do not produce separate pay-formations, but merely interrupt the normal and regular flow or seepage of the fluid contents through one and the same formation. Furthermore, as will presently be shown, when it is desired to simulate a formation by use of a single set of simulating units representing a single layer of the formation, the conditions imposed by presence of such lenses may then be simulated by comparatively small groups of simulating units, interconnected together as a group, and such group may then be properly connected into the network of simulating units which represent the continuity of the reservoir in its generality. Thus, the use of such groups of simulating units in this manner is to be distinguished from an arrangement in which several complete sets of the simulating units, are provided, simulating successive laminations of the total formation, and the units of each such set being properly connected both up and down to corresponding areal units of the proximate vertically displaced laminations. In such latter case provision is made for vertical movements of the simulated fluids over all portions of the field, whereas in the special condition of simulation of a lenticular formation the vertical connections are only made at special and limited locations where transfer of the fluid contents of the formation would naturally occur from one face of the lens to the opposite face thereof thus using the simulating units of the present invention as two-dimensional units, and not as three dimensional units. This will be referred to hereinafter.

In FIGURES 15 and 16 we have shown the lenses 108, 109a and 109 contained within the body of the formation, and the proximate end portions of the lenses 110 and 111 extending into the body of formation illustrated in said figures. The wells 112, 113 and 114 are also shown penetrating to various portions of the thickness of the formation. Thus, the well 112 is shown as perforated to drain the lower two sections of the formation, being closed off where it penetrates the upper two sections; the well 113 is shown as perforated only for drainage of the intermediate section of the formation; and the well 114 is shown as perforated only to drain the top section and the next to the lower section of the formation. These well perforations are shown in both FIGURES 15 and 16, the former showing stream lines of fluid flow for the case of cenozoic production by edge water drive, and the latter showing stream lines of flow for the case of paleozoic production under internal formation natural gas drive. In both cases we have shown generally the drainage effects produced by the two forms of drive, according to the principles of stippling hereinbefore explained.

Examination of these figures shows that at certain locations the direction of fluid flow is reversed from that towards the draining well, but only to enable some portion of the fluid contents to gain access, by a continuous lowering of its pressure, to the drainage openings of that well to which its movement is dictated by the summation of all draining forces acting on such portion. Under these conditions the residuum of non-produced contents is different from that which would have been found had the lenses not been present. Nevertheless the above detail of special flowage movements within the body of the formation affects the overall pattern of the drainage and especially the forms of the equipressure curves which will be referred to hereinafter. The effects of such lenses on the amount of finally non-produced fluid contents is especially serious in the case of the paleozoic production operation shown in FIGURE 16.

In both of FIGURES 15 and 16 we have also shown the border wells through which water or other drive fluid may be injected for secondary production operations. These wells are shown at 115 and 116, and of course when the formation is a sealed trap for the paleozoic production such wells are located to meet the formation at a suitable slow location of the dip.

In FIGURES 17 and 18 we have shown another drainage condition which may be analyzed and studied under various conditions of operation by use of our present equipment, and in general by use of a single layer or set of the simulating units for each of two or more separate pay formations located in vertical alignment at different depths, and all drained by the same well or wells. In such case, assuming that the wells are perforated for production from two or more formations which have different formation pressures, it is evident that the drainage of each such formation is greatly affected by the conditions of pressures existing in its neighbors above and below, so that in such a case a proper study of the drainage effects of any given well or any given formation cannot be made without bringing into the study the related effects produced by all such other formations. Such a condition is to be clearly distinguished from the condition existing when a single well is of "dual" or "triple" or even "quadruple" completions, in which cases the production from each completion is kept separate from the productions of the other completions, and cross transfers between the various formations do not occur.

In FIGURES 17 and 18 we have shown the three formations 117, 118 and 119 located at successively lower levels. In FIGURE 17 each of these formations is subject to edge water drive, and the formations pressures of the three formations are different in values. The two wells 120 and 121 penetrate all three of the formations (120) and the upper two of the formations (121), respectively. The formation pressures at the well perforations are shown on the figure. The drainage limits of the formations are shown by the lines of change from light stippling to darker stippling in each case. The undrained caps are shown by the darker stippling; but these can be to some extent drained by closing off the lower perforations of each well. We have also shown the secondary edge water drive wells 122 and 123 by which such secondary drive water may be injected.

In FIGURE 18 the same formations as shown in FIGURE 17 are reproduced, but their edge portions are sealed or pinched off and no edge water drive is present. The wells 124 and 125 are also shown as penetrating the outer edges of the upper formation, and the additional wells 126 and 127 are also shown penetrating the outer edges of the two lower formations. The stippling shown on FIGURE 18 conforms to the varying intensity of stippling previously described herein. The formation pressures at the locations of input to the wells are also shown in FIGURE 18. It is noted that such pressures of entry to the different wells in the showing of FIGURE 18 are different from the formation pressures at entry of the same formations to the same wells in FIGURE 17.

It is noted that in simulating the conditions which will prevail for both of the showings of FIGURES 17 and 18 each of the formations may be simulated by a single layer or set of the simulating units since no direct transfer of fluid contents is transferred from any one formation to another formation except at the locations of the producing wells, and there such transfer is to such producing wells and not to the body of the next higher formation. The differences of pressure shown at the points of penetration of each well into or through a formation may be reproduced in our equipment, as will presently appear.

Various other formation characteristics than those herein shown may be correctly simulated by use of our equipment, but the few examples above briefly defined may serve as illustrations of the diversity of the problems which can be faithfully simulated and tested and analyzed by use of our equipment.

Although none of the examples of formation drainage which have been illustrated above include provision for incorporation within the simulating equipment more than a single layer of the simulating units (except in such cases as shown in FIGURES 15 and 16, and 17 and 18, in which cases the additional layer or layers is or are included for special purposes, and as parts of one and the same formation of homogenous permeability and porosity throughout its body, both vertically and horizontally). Nevertheless, as will hereinafter appear, it is possible, should the characteristics of the formation so dictate, to also simulate formations of varying thickness, non-homogenous porosity and permeability, and other conditions, by use of two or more layers of our simulating units, properly connected together vertically as well as horizontally being thus three dimensional simulating units. Reference to such matters will be made hereinafter.

The viscosity of the oil component changes with change of reservoir pressure. Such changes in viscosity (and also in permeability) are due primarily to release of gas from solution in the oil when the pressure is permitted to fall. However, the viscosity of the water component does not change appreciably with such lowering of pressure, and does not change to a degree or percentage greater than or comparable to the probable error of various parameters to which elements of the equipment herein disclosed must be set. Accordingly, it will generally be sufficient to make correction in certain of the elements of our equipment, to compensate for changes in viscosity of the oil component due to changes (lowering) of pressures as the fluid contents move through the formation. Then corresponding changes in the permeability of such component may also be made which changes will be reflected in the results of the test operations.

In the case of natural formation gas pressure drives, paleozoic, the formation pressure generally decreases according to a well known pattern during drainage of such a reservoir. By way of example of such change of formation pressure during drainage, reference is made to the curves of FIGURE 19. Therein the curve 128 shows generally the more or less regular fall of pressure against time lapse, and the curve 129 shows the cumulative oil production during the same history of the reservoir as shown by curve 128. These two curves show strikingly the relation of cumulative oil production to fall of formation pressure during the production history depicted by the curves. In the example shown by these curves a gas injection program was commenced at the time value 130, and the effects of such artificial injection operation are well shown by the sharp deflections of both curves 128 and 129 at such time value 130.

The curve 131 of FIGURE 20 relates the formation pressure to the cumulative recovery (in terms of percent of pore space), further emphasizing the effects of reservoir formation pressure on the recovery program. The gas-oil ratio is also related to the formation pressure and the cumulative recovery, by the curve 132 of FIGURE 20. In FIGURE 21 we have shown typically the relation between gas-oil ratio and reservoir pressure (curve 133), and between reservoir oil saturation and reservoir pressure (curve 134), it being noted that the curves of FIGURES 20 and 21 are hypothetical but illustrative of the stated relationships.

At this time it is noted that the reservoir pressures referred to in FIGURES 19, 20 and 21 are the full pressures of the reservoir (in each case) and not the decreasing pressure towards the pressure sink as the center of such sink is approached. Thus the indicated reservoir pressures are those pressures which directly affect the diameter of the sink and are capable of producing drive of the fluid contents towards such sink. This point will be referred to again when the curves of FIGURE 34 are discussed.

Curves 135, 136, 137 and 138 of FIGURE 22 show the typical relations between water injection (for an artificial water drive operation, curve 135), for water production (curve 136), for oil production (curve 137), and cumulative water injection (curve 138). The time of commencement of such artificial edge water drive is also shown by the arrow 139. The reservoir to which these curves relate was a solution-gas-drive or natural formation gas pressure drive production up to the time shown by the arrow 139, after which the water drive injection was in force with the modification of effects depicted by the curves.

Curves 140, 141 and 142 of FIGURE 23 show, respectively, the oil production, the gas injection, and the gas-oil ratio of a gas injection operation commenced at the time of the arrow 143, the reservoir having been a lenticular formation under gas drive of the natural formation pressure up to the date shown by the arrow, after which an artificial gas drive was in operation. The effects of such artificial operation are well shown by the curves.

Curves 144 and 145 of FIGURE 24 show, respectively, the relative permeability of the oil component of a typical water-oil mixture, and of the water component of such mixture, and curves 146 and 147 of FIGURE 25 show, respectively, the relative permeabilities of the oil component of a typical gas-oil mixture, and of the gas component of such mixture. The significance of these relative permeabilities has already been discussed, and will be further discussed herein. The dashed line curve 148 of FIGURE 24 shows the additive permeability (relative) of both of the relative permeabilities of the curves 144 and 145; and the dashed line curve 149 of FIGURE 25 shows the additive permeability (relative) of both of the relative permeabilities of the curves 146 and 147. All of these curves will be referred to further herein, in their relation to various settings of elements of the simulating units.

At this point it is emphasized that each of the curves 144 and 145, and 146 and 147, is not a curve of absolute permeability measured in darcies or milli-darcies but such curve shows the permeability, of oil, for example, in an oil-water mixture of, say 60% water (curve 145 of FIGURE 24), as compared in percent to the permeability of such oil when comprising 100% or all of the mixture (only oil). Thus, in the use of these curves, it must be borne in mind that the actual permeability of the oil (at 100%) in the formation in question, must be known, in order to determine what would be the actual permeability of the oil component flowing through such formation, when such oil component is 40% of the fluid flowing (being 100% minus 60%). This relationship must be applied in various cases where the permeabilities of the several components of a mixture are to be used, to determine the rate or quantity of such component's flow through such formation when such component comprises only a portion of the flowing fluids.

In the analyses hereinafter referred to it is sometimes convenient to make use of the inverse ratios of the permeabilities (relative) shown in said curves 144 and 145, and 146 and 147; that is, if the actual permeability of a component, oil, for example, is K, then its relative permeability as shown by one of such curves is $K_o/K$, being the percent indicated by the proper curve. It is, then desirable to be able to use the inverse ratio, $K/K_o$, or $K/K_w$, for example. Accordingly, we have in FIGURES 26 and 27 shown, by the curves 150 and 151 (FIGURE 26), and by the curves 152 and 153 (FIGURE 27) the inverse ratios corresponding to the curves 144 and 145, and to the curves 146 and 147, respectively. These inverse ratio curves will be referred to hereinafter in discussing the settings of various elements of the simulating units.

Referring next to FIGURE 28 we have therein shown by a three phase graph or set of graphs, the variations of permeability (relative) for an oil corresponding to various percentages of water and gas, when the percentage of such oil is of the value shown by a selected line of such graph, whether 1%, or 5%, or any of the other percentages shown by the several lines 154. Similarly in FIGURE 29 we have shown by another three phase graph or set of graphs, the variations of permeability (relative) for a gas corresponding to various percentages of water and oil, when the percentage of such gas is of the value shown by a selected line of such graph, whether 1%, or 5%, or any other of the percentages shown by the several lines 155. Such information may be useful in the operation of our equipment when it is desired to base a study or analysis on the more refined and complete data thus made available respecting relative permeabilities of the components present in the fluid contents of the reservoir under study.

The curves 157 of FIGURE 31 show the changes in viscosity of a gas of specified viscosity (gas free at bubble-point and reservoir temperature) as the gas in solution is raised to amounts shown in ft.³/bbl. oil, each curve showing the foregoing information for the gas which is of the viscosity indicated adjacent to such curve, when such gas is at bubble point and gas free at the reservoir temperature. Such data is useful in the operation of our equipment when it is desired to base a study or analysis on the more refined data thus made available respecting the relative permeabilities of the components present in the fluid contents of the reservoir under study.

In FIGURES 13 and 14 already referred to we have shown typical distributions of our simulating units uniformly over a part of the producing field shown in FIGURES 12 and 13, and over all of the producing field shown in FIGURES 11 and 14. Each of these simulating units includes various electrical components and interconnections, and conveniently, various jacks or other readily connectable elements well known in the electrical arts, which are shown by way of example, and on enlarged scale in FIGURE 36, presently to be described and fully explained. As will then appear, our equipment is capable of producing information and/or data by which the directions of stream line flows of the fluid contents occur, at the location of each of the simulating units comprising the set-up then under study. Such equipment is also capable of producing information and/or data by which curves of equal formation pressure (internal) may be shown or derived. Much other information may also be obtained, as will hereinafter appear. At this point, however, we have shown in FIGURES 32 and 33 typical charts of stream line flows and of equi-pressure curves for the simple case of a single well injecting a water drive at one point and a single producing well delivering the components (and water) at another point (FIGURE 32); and for the further simple case of two wells injecting water drives at two points symmetrical with respect to a third producing well. We have also shown stream line flows and lines of equi-pressure. These charts are typical of charts which may be and/or are produced, corresponding to such injection well locations and such producing well locations, when simulating units embodying our present inventive features are electrically located over elemental areas of the field being simulated, and when such units are electrically connected together as will presently appear in full detail. Thus, for example, there might be numerous such units uniformly spotted over the entire area of FIGURE 32 (or FIGURE 33) in manner similar to the distribution of such units shown in FIGURES 13 (partial) and 14 (entire), and such units properly connected sequentially together both north to south (one direction) and east to west (direction at right angles thereto), in a single layer of such units, or in multiple layers. In the latter case such units would also be sequentially connected together in vertical columns of vertically registering units. For purposes of simplicity in illustration, and to avoid confusion we have, in FIGURES 13 and 14 not shown such interconnections, and in FIGURES 32 and 33 we have not shown the simulating units; but we shall hereinafter show a single simulating unit in entirety, with adjacent simulating units at several locations around such single unit, and with the proper interconnections between such single unit and such surrounding units. The relative operations and functions then producible will be fully explained.

It is further noted that the elementary area of the real field which is simulated by each of the units should be of size not too large so as to ensure sufficient accuracy of the simulation, taking into account the rate of change of pressure from one such area to adjoining areas, the probable changes in rates of fluid flow or seepage at different sections of the field, changes in direction of such fluid flow or seepage, and other considerations which will suggest themselves to the student of this specification. Thus, for example, as the sink is approached the rate of reduction of formation pressure (pressure gradient) increases very rapidly, so that the simulating unit sizes (real areas simulated) should be not too great to simulate the true conditions of formation fluids at such locations, and the effects of such very rapid changes occurring in the formation. On the other hand, examination of the lines of equi-pressure and the stream lines shown in FIGURES 32 and 33 will show that for large portions of the area of the field the changes in pressure and direction of fluid flow are slow from point to point equi-distant from each other, so that in such simulated areas larger real areas may be simulated by single simulating units than in the real areas as the sinks are approached. It must be remembered, however, that proper successive interconnections between successive simulating units must be made to ensure proper cooperation of the units in the fluid flow stream lines. These matters will be considered in detail hereinafter.

Examination of FIGURES 32 and 33 shows that in each of the flow stream line showings of these figures, the lines of equipotential across the fields are substantially parallel in the central portions of such fields, being the equipotential lines both above and below the lines legended "50" in each such showing. Accordingly, in the central portions of such fields and for some distance from such central portions, measured towards both the input or drive wells and the producing wells, there is little lateral potential acting to produce lateral flow of the contents of the formation. Thus, too, in such central portions of these fields the flowage or seepage of the fluid contents is substantially directly between the input or drive wells and the producing wells, with little or no lateral movement of such fluid contents for a considerable portion of the total distance between such wells. Therefore, simulating units simulating such central portions of the field will also carry little or no laterally moving currents (currents between their side faces), but substantially all of the current transfers through such simulating units will be directly between their front and back faces.

Due to the foregoing circumstance it is possible to use, in the central portions of the simulating network, simulating units simulating much larger real reservoir areas than those units which simulate areas of the real reservoir closer to the wells. For example, each of the simulating units for the central portions of the reservoir (centrally between the input and producing wells), might be of double or treble the dimension used for the units closer to such wells. Thus, such larger units might simulate real areas four times or nine times the size of the units simulating areas closer to the wells. Such an arrangement would greatly reduce the number of simulating units needed to simulate the entire reservoir under study. Each such larger unit would have each of its faces connected to the faces of two or three proximate smaller units; and thus the connection 187 (see FIGURE 36) of such a larger unit would connect to the connections 189 of the two or three simulating units of smaller size proximate to such larger unit; the connection 188 of such larger unit would connect to the connections 190 of two or three of the laterally proximate smaller units, etc.

It must be noted that under the system of connections just above outlined, the adjustable impedance units of the larger simulating units would handle larger current values than handled by their smaller neighbors; and accordingly, proper provision would be made, both as to the calibrations of the impedance units themselves, and as to the values of the signals delivered from or based on such currents.

Such an arrangement would materially reduce the complexity and cost of the equipment, as well as the space required for its accommodation.

In FIGURE 34 we have shown, on larger scale than in FIGURE 30, the relation of viscosity of a typical oil when subjected to a wide range of pressures, as compared to its viscosity at sea-level or zero pressure (gauge).

As will be shown in the consideration of the construction and functioning of each of the simulating units, the viscosity of the oil component is a most material element in affecting the flow of the fluid contents through the permeable formation. Accordingly, any material variation in such viscosity, being the result of changes of formation pressure as the sink is approached, must be considered in relation to pressure gradient to which the oil is subjected during its travel through the formation, as well as the rate of such travel, in order to pre-determine the probable effect of any specified set-up, by use of our equipment, including its simulating units. Accordingly, FIGURE 34 also includes several curves by which the effects of various pressure gradients and rates of flow through the formation may be readily brought into proper relation to changes in formation pressure and corresponding changes in viscosity, during the fluid flow, during the use of our equipment.

Curves shown on FIGURE 34 include the curve 158 showing relation between formation pressure and a correction factor to be applied to the viscosity of the oil at zero pressure, p.s.i.g., and the curves 159, 160, 161, 162 and 163, show the relation between the value of the relative permeability of the formation to rate of flow or seepage of the oil in question, which permeability will permit such rate of flow at each of five values, when the pressure gradient through the formation is of an arbitrary value of unity, and corresponding to varying formation pressures. Thus, curve 159 shows the relation between the relative permeability of the oil component of the moving fluid contents of the formation under the assumed conditions of a pressure gradient of unity (arbitrary) and a rate of flow of 1.00 (arbitrary), for various values of viscosity (mu) caused by changes of formation pressure through a range of such pressure changes between 2,500 p.s.i.g., and 500 p.s.i.g. Likewise, curves 160, 161, 162 and 163 show similar relationships for the assumed conditions of pressure gradient of unity (arbitrary) in each case, and rates of flow (arbitrary) of 2.00, 3.00, 4.00 and 5.00, respectively. Accordingly, by use of the simulating units for determination of the formation pressure, the pressure gradient and the rate of fluid flow of the oil component at the location of each such simulating unit, use can be made of the information such as derived from the proper curve of FIGURE 34 (or a like curve) to immediately determine what must be the value of K at such simulating unit, and for such oil component, to maintain such rate of flow. Then, by reference to such a curve or set of curves as shown in FIGURE 24 (or FIGURE 26) the oil-water saturation can be at once determined, and also the relative permeability of the water component. It will presently appear that the values of formation pressure, pressure gradient and rate of flow are immediately determinable from our simulating units as electrical potentials, or as current values, or otherwise electrically.

It will be understood that curves similar or corresponding to 159, 160, 161, 162 and 163 of FIGURE 34 may be produced showing actual pressures, rates of flow, and viscosities and relative permeabilities corresponding to the parameters of information relating to the actual formation in question, the oil produced, and other factors involved in the relationship; and that the showings of FIGURE 34 are based on various arbitrary values for the several factors. To like effect it will also be understood that the values of relative permeability of oil and water shown on FIGURE 24 curves 144 and 145, or of relative permeability of oil and gas shown on FIGURE 25 curves 146 and 147, as well as the actual permeabilities of oil, water and gas at 100% saturation of each such component, must be known in order to apply the teachings of this case to a particular or actual problem under study.

Thus, by use of information derived from the individual simulating units during the test, or at various stages of the test, the changing conditions of flow, potential, rate (or volume) of oil flow, rate (or volume) of water flow, rate (or volume) of gas flow, pressure gradients, stream lines, and other desired information, can be gained, under the assumed conditions of reservoir production and drainage; and amounts of components remaining in the formation at various parts thereof, may be determined and recorded or used for further determinations. The information made available at various stages of the test or analysis may be manually reduced to desired end data, or such information may be fed through various forms of equipment, to store such information for future use, or to obtain the desired end data. In any case, the information derived from the simulating units is in a form and of a kind lending itself to ready use for further processing.

Referring next to FIGURE 35, the same shows, schematically, a simulating unit corresponding to a body of the real formation. Such body includes resistance values of known and adjustable amount in several directions through such body. Thus, such body has a known and adjustable resistance in the direction 165—166, likewise, in the direction 167—168, and again, in the direction 169—170. Also, such body is electrically conducting between each of such defined points 165, to 170 and any or all of the others. Such body constitutes one of a group which, when set together simulate certain of the formation values and flow conditions when current flows through such body between selected points. Conveniently, but not necessarily, each such body is of cubical form so that it is of the same dimension measured between opposite pairs of faces. When so connected together the connection 165 will be connected to the connection 166 of the next leftward body, the connection 166 will thus be connected to the connections 165 of the next rightward body, the connection 168 will be connected to the connection 167 of the next body further from the observer, and the connection 167 will be connected to the connection 168 of the next body closer to the observer. Such a grouping will then simulate a single layer or lamination of the formation. It is assumed that the formation is homogenous in its porosity and permeability throughout the areal extent of the reservoir being simulated or of a layer of such body. Also, when the formation is of considerably greater areal extent than its thickness such a simulation by a single layer group of such bodies will produce test results of an order of accuracy closely corresponding to the accuracy of the parameters of data respecting the real reservoir being simulated. This will be considered hereinafter.

If desired, two or more layers of such simulating units may be provided in vertical alignment with each other. In such case the connection 169 of the block illustrated will be connected to the connection 170 of the block above, and the connection 170 of the block illustrated will be connected to the connection 169 of the block below. Thus interchanges of current may occur between the simulating units corresponding to vertical movements of the fluid contents of the reservoir. This vertical connectability will be referred to further hereinafter.

Since it is necessary to originally adjust the resistance values of each block in order to simulate certain of the flow conditions of the contained fluid contents at the beginning of a set of tests, and to also simulate the physical properties of the formation itself; and since it is also necessary to change said resistance values as the permeabilities of the simulated bodies of the reservoir change during flow or drainage each of such blocks or units must be of nature and characteristics or properties such that these resistance values may be corrected at each stage of the tests to be carried through. One embodiment of block capable of use for the intended purpose comprises a block of resistance material having a temperature characteristic such that its resistance can be adjusted and controlled by suitable heating means in connection with each such block. By provision of a heater element 171 in connection with each of the blocks, and by controlling the current through such heater element, the desired controls of resistance through the block may be produced, the terminals of such heater element being shown at 172 and 173. By supporting all of the simulating units in a single layer and under proper ventilation, the heat produced by the units can be properly dissipated under production of the proper temperature of each unit.

Reference to FIGURE 36 shows, schematically, another form of simulating unit in which the controls of the various resistance elements can be very conveniently effected, and in which accurate simulations of various conditions of the formation and of the flow of the fluid contents may be made. This unit is as follows:

One of these units is defined by the rectangular enclosure (dashed line) 174, being of physical size to conveniently accommodate the electrical elements now to be described. To show the inter-relations between adjoining units we have also, in FIGURE 36, shown the proximate portions of the four adjoining units, $174^a$, $174^b$, $174^c$ and $174^d$. Each unit includes a pair of resistance elements 175 and 176 in series connection and another such pair 177 and 178, also in series connection, such two groups 175—176 and 177—178 extending in one direction (schematically) through the unit; and such unit also includes a pair of resistance elements 179 and 180 in series connection and another such pair 181—182, also in series connection, such two groups 179—180 and 181—182 extending in another direction (schematically, generally at right-angles schematically) through the unit. We have here used the term "schematically" to designate a direction through the real formation, which direction is to be simulated by such pair of series connected pairs of resistance elements. The ends of each set of pairs are connected together by the end connectors 183, 184, 185 and 186, and terminal connections 187, 188, 189 and 190 are connected to such end connections and constitute connecting means to like connecting elements of the proximately located other units of the areal simulation.

For purposes of identification, parts or elements of adjacent units $174^a$, $174^b$, $174^c$ and $174^d$ are provided with corresponding numbers, but carry suffixes to identify the individual units to which reference is made. The proximate ends of the resistance elements just defined are connected together (for the several pairs) by the connectors 191, 192, 193 and 194. The connectors 191 and 193 are also connected together, and the connectors 192 and 194 are connected together. These interconnections just defined will be referred to hereinafter.

All such resistance elements are adjustable, as shown by the movable contacts 195, 196, 197, 198, 199, 200, 201 and 202, so that the value of each resistance may be adjusted to an amount proper for simulation of the relative permeability of the fluid component whose flow such resistance simulates, based on the simulated relative permeability produced by such resistance. Each of such resistance elements comprises a portion of known and fixed resistance value, and a portion of adjustable resistance value in series therewith. The potential drop across any of such fixed value resistance portions will be a measure of the value of current flowing through the branch of which such fixed resistance comprises a portion. The said potential drop may be determined without appreciable disturbance to the flow conditions existing through such branch, either by use of leads permanently connected to the ends of such fixed resistance portions or by use of patch cords temporarily connected to such resistance ends for making a measurement, but without, in such case, opening the circuit of the resistance element or adding to its total resistance value. For the latter type operation we have shown the contacts 203, 204, 205, 206, 207, 208, 209 and 210, connected to the ends of such fixed resistance elements. Thus by insertion of a suitable plug into engagement with a pair of such contacts at the ends of a fixed resistance element, the current flowing through the corresponding fixed resistance (and also through the adjustable resistance connected thereto), may be determined as a potential value, substantially without interference with the intended current flow conditions. Such fixed resistance element then acts as a low resistance shunt across whose terminals the sensitive voltmeter will measure current as a potential value, and according to conventional practices.

The following further comments are now proper respecting such arrangement of a fixed resistance element and an adjustable resistance element in series therewith, for use in the presently disclosed equipment:

Each of the fixed and adjustable resistance sections comprises a unit whose resistance is to be set to a value to allow current flow under a given potential gradient, which current flow shall be of value to simulate the flow or seepage of the fluid component through the simulated body of the real reservoir and under the simulated conditions of drainage. Likewise, the adjustable resistances in the two branches (oil and water) which are in parallel connection through the simulating unit must be adjustable to values such that they shall simulate the flow conditions for the oil and water components, at any time, under the condition that the same potential drop occurs through both such branches; and also that the resistances of the two branches may be brought to values which will cause a division of current flow through the two branches in ratio corresponding to the relative permeabilities of such branches for the flow of oil and water, respectively, and under the percentage of water saturation existing in the body of the real formation being simulated by such simulating unit.

Reference has already been made to the curves of FIGURES 24 and 25, and others, showing such relative permeabilities in relation to percent water saturation. Since the permeability of the formation is a quality comparable to conductivity of an electric conductor, whereas the resistance values of the resistance sections are resistivities, we have, in FIGURES 26 and 27, shown by the curves 150, 151, 152 and 153, the inverse values of permeabilities corresponding to the true permeabilities shown by such curves of FIGURES 24 and 25, etc. Then, for any given percentage water saturation it is possible, by reference to such inverse value curves of FIGURES 26 and 27, to determine the resistance values to which such adjustable resistance elements must be set, for any stipulated or assumed percentage water saturation, in order to simulate the relative permeabilities of the oil and water (and gas) components, for such water saturation condition. Further consideration of this matter reveals the following additional important relationships which involve such adjustable resistances:

When the percent water saturation becomes such that the relative permeability of any fluid component (oil, water or gas) becomes zero, no flow of such component occurs through the simulated body of the real formation. Accordingly, the resistance value of the branch simulating such component must then become infinity (open circuited). At such time and just prior to the opening of the circuit the fixed resistance element as well as the entire amount of the adjustable resistance element of the section in question have been in circuit. Then the circuit opening function may be readily attained by having the adjustable contact move off from the high resistance end of the adjustable section.

On the other hand, when the water saturation becomes zero so that the percent saturation of the oil (or gas) becomes 100%, the relative permeability for such oil or gas component also becomes 100% or unity. Since the resistance value of the resistance section for each branch is the inverse of the permeability, as already explained, and according to the showing of the FIGURES 26 and 27, it follows that for such condition of 100% permeability of the simulated component the resistance section simulating the permeability in question should have a resistance value of unity (on the scale value to which the resistances are made). By making the fixed resistance element between each of the pairs of connections 203, 204, 205, 206, 207, 208, 209 and 210 of such unity resistance value it is possible to run the adjustable contact 195, 196, 197, 198, 199, 200, 201 or 202, as the case may be, which corresponds to such fixed resistance element, to the low resistance end of the adjustable resistance section, thus leaving only the fixed resistance element of unity resistance value, in the section. Such fixed resistance element will then simulate the permeability for 100% saturation of the oil (or water) phase.

The units particularly shown in FIGURE 36 are intended for tests or analyses to be conducted thereby, when only two fluid components are being provided for in the various adjustments of elements during the conduct of the tests. Thus, in the showing of FIGURE 36 provision may be said to have been made for corrections needed to simulate a two-phase mixture of water and oil. Accordingly, we have designated the series pairs 175—176 and 179—180 by the letter "O," and the series pairs 177—178 and 181—182 by the letter "W," designating "Oil" and "Water" respectively. As will presently appear, the adjustments of these various resistance elements may and will correctly simulate the conditions of relative permeability of the formation simulated by the unit in question to the flow of oil or water through such so-simulated unit, under the conditions of water saturation then found to exist in the flow through such so-simulated elemental area of the field. By proper corrections of the various resistance elements as necessary from time to time during the tests, the changing conditions of permeability to oil and water flow, with other changes affected thereby, may be made, to ensure correctly changing flow conditions as depletion of the reservoir proceeds.

As indicated in FIGURE 36, the terminal connections 187, 188, 189 and 190 are connected to like terminal connections of the proximate units, so that fluid flow through the entire ensemble of units may occur as dictated by the varying impedances interposed by the resistance elements. Here it is noted that the current flowing between the proximately connected elements of adjacent units represents the total fluid flow between such simulating units; but that within each simulating unit there is a division of such total current into two branches one representing the oil component, and the other representing the water component (for example). Thus it is possible to bring each such unit into a condition of its various resistance elements to simulate the flow conditions of each of the prime components of the mixture. By addition of another set of the resistance elements in each direction through the unit, and having its ends connected to the end connectors 183—184 or 185—186, and properly cross-connected centrally of the unit, to the central portions of the illustrated resistance elements, it would be possible to faithfully represent the flow characteristics of a three phase mixture, including the additional phase of the gas content. We have illustrated such greater refinement herein, in FIGURE 80. It is not deemed necessary to describe such embodiment in detail, since the principles therein used are the same as those governing the two-phase arrangement shown in FIGURE 36 and elewhere. This three phase embodiment of FIGURE 80 will be considered hereinafter.

We have also shown in FIGURE 36 the jacks 211, 212, 213 and 214 in the connectors 187, 188, 189 and 190 to test currents and potentials at such points; and, if desired, jacks 215 and 216 may be provided at the points of connection of the connectors 191—193 and 192—194 to test potentials at such points. The uses of the knowledge supplied by such potentials will appear hereinafter.

Before proceeding with an analysis of the mathematical significance of the simulating unit in comparison to the flow and pressure characteristics of the formation under fluid flow conditions, it is pointed out that with this arrangement as shown the fluid contents output at any one of the connectors 187, 188, 189 or 190 is the algebraic sum of all of the inputs at the other connectors, it being noted that in some portions of the field the stream lines draw together, while in other portions of such field such stream lines draw apart. Such stream line characteristics correspond to lateral movements of the fluid contents during traverse of the field, and accordingly also must be represented by inputs and outputs of fluid contents through the connectors 188 and 190 (assuming that the general direction of flow is towards the observer in FIGURE 36). In some cases fluid input will occur from both of the lateral connectors 188 and 190—in other cases there may be an input at one side and an output at the other side, either of the same rate as the input at the first side or of a greater or less rate than such first side input. In any case the algebraic sum of the rates at the four sides, taking into consideration the locations and rates of the inputs, compared to the rates and locations of the outputs will give an indication of the direction of travel of the fluid contents through the simulating unit in question. By making the jacks 211, 212, 213 and 214 of proper type it is possible to temporarily open each of the connectors 187, 188, 189 and 190 at the location of such jack, to divert the current temporarily through a suitable instrument, to test the magnitude and direction of current flow therethrough, thus making available information to immediately determine the net direction of fluid flow through the simulating unit in question. Such a test may be simply performed by use of the directional unit shown in FIGURE 37, or equivalent, as follows:

Such directional unit includes a ring 217 of magnetic material on which are wound the coils 218, 219, 220 and 221, all of equal magnetizing characteristics and equally spaced around the ring. A bar 222 of magnetic material is pivoted centrally within such ring so that it is free to swing in direction and amount to bring it into magnetic register with the net field generated by the currents flowing through all of the coils. By making the coils of characteristics such as to develop an appreciable magnetomotive force under passage of currents of the expected values from the network of simulating units, any tendency for the needle to move into North-South position will be readily overcome so that an accurate indication of the net direction of flow of the fluid contents through the simulating unit will be shown by the needle's position. During test of each of the simulating units in a series or group of tests of all of the units, the directions of fluid flow thus indicated may be recorded, and a pattern of stream line flows thus produced from such information.

It is also noted that by use of such directional unit a pattern of stream line flows of the oil component alone, or of the water component alone, may be produced for all or any portion of the field. Thus, by connecting the four coils of the directional unit into the jacks 203, 204, 207 and 208, on the oil side of the simulating unit, the needle 222 will be brought to show the net direction of flow of the oil component through the simulating unit, and a similar test may be run to determine the net direction of the water flow through such simulating unit. If the ratios of water content to oil content flowing through all four of the connectors 187, 188, 189 and 190 are the same, then the net directions of flow of the oil and water components will probably be severally the same as the net direction of flow produced by connecting the coils 218, 219, 220 and 221 to such connectors 187, 188, 189 and 190. Otherwise there will be differences between the net directions of flow of one or more, water, oil, or both, as the case may be.

Each of the simulating units is intended to represent an elemental volume of the real formation, on the basis that such real formation's elemental volume is homogenous, both in porosity and in permeability, and both throughout its hight and in each horizontal direction.

This hypothesis will be valid to all practical intents and purposes for real areal elements of considerable size, as for example, 100 feet on each side, or less, and for thicknesses of corresponding value. However, the smaller the real elemental volume to be simulated, the more accurate will be the simulation, since thereby changes of pressure or of rate of fluid flow from point to point and changes in relative permeability, etc., will thereby be the more accurately represented in the tests and analyses. However, the smaller the sizes of the real elements being simulated, the greater must be the number of simulating units, so there will be a practical balance between size represented, and number of simulating units necessary to cover the field. However, it has been previously suggested that, under certain conditions and for some portions of the real field represented, where the changes above stated are comparatively small for given distances, it is possible to use simulating units of larger size than are used in other more critical areas of the field.

Since it is assumed that the volume simulated by a given unit is substantially homogenous as to its porosity and permeability, and since all four of the resistors 175, 176, 179 and 180 simulate properties of the oil component, and since all four of the resistors 177, 178, 181 and 182 simulate properties of the water component, all of the resistors 175, 176, 179 and 180 as a group may be brought to substantially the same adjusted conditions when adjustments are made, and all of the resistors 177, 178, 181 and 182 as a group may be brought to substantially the same adjusted conditions when adjustments are made; the adjustments above referred to being for the purpose of bringing the one set of resistors into correct values for simulation of the relative permeability of the oil component, and for the purpose of bringing the other set of resistors into correct values for simulation of the relative permeability of the water component. Accordingly, means have been provided for simultaneously and to equal amounts, adjusting all of the contacts 195, 196, 199 and 200, and for simultaneously and to equal amounts, adjusting all of the contacts 197, 198, 201 and 202. Such means may be either manual or automatic, as will presently appear. Such adjustments of the resistors simulating the relative permeability of the oil component should be made by elements adapted to produce corrections based on changing values of viscosity (mu), as analyzed under the discussion relating to the curves of FIGURE 34. For reasons already explained it is not necessary to make provision for the slight changes in relative permeability of the water component due to changes in viscosity of such component, although corrections based on such viscosity changes might be included if desired.

In FIGURE 38 we have shown, schematically, a simple means to simultaneously adjust all of the resistors 175, 176, 179 and 180 to equal values either manually or by remote control and also means to simultaneously adjust all of the resistors 177, 178, 181 and 182 to equal values either manually or by remote control. Thus, the insulating rod 223 is connected to all of the movable contacts 195, 196, 199 and 200 for the resistors 175, 176, 179 and 180, and the insulating rod 224 is connected to all of the movable contacts 197, 198, 201 and 202 for the resistors 177, 178, 181 and 182. Suitable handles 225 and 226 are provided in connection with such insulating rods 223 and 224, and pointers 227 and 228, reading against the scales 229 and 230 provide means to enable setting each of the groups of resistors to readings corresponding to volumes of fluid movement (or rates of such movement in unit volumes per unit time), hereinafter referred to. Set screws 231 and 232 are shown for locking each group of contacts in its adjusted position.

A simple form of remote control is also shown for setting each such group of resistors to adjusted position, as follows:

The springs 233 and 234 are connected to the rods 223 and 224, respectively, urging return of such rods and the connected contacts to a base or zero position as limited by the stops 235 and 236, it being noted that the set screws should be released during an adjustment operation. The armatures 237 and 238 are connected to such rods, and solenoids 239 and 240, when energized draw the armatures and rods rightwardly to positions corresponding to the values of currents flowing through such solenoids. By supplying such solenoids with currents proportional to related values or to values which are to be simulated by the resistor settings, it is possible to draw each set of resistor contacts into position to bring the resistances to proper adjusted values, and by maintaining such current on the respective solenoids, the resistors may be held in such adjusted positions. Alternatively, the set screws may be tightened to retain the resistors in their adjusted positions, without need of maintaining current through the solenoids.

At this point it is noted that when the relative permeability of either the oil branch or the water branch of the simulating unit in question is to be reduced to zero by reason of the water saturation being brought to that value which corresponds to zero relative permeability of such component (see curves of FIGURE 24), the resistance of the resistors 175, 176, 179 and 180, or 177, 178, 181 and 182, must be made infinite corresponding to no oil (or water) flow through its branch. At such time the movable contacts 195, 196, 199 and 200, or 197, 198, 201 and 202, as the case may be, are set leftwardly far enough to just open their respective circuits by disengagement from their respective resistor elements, the stops 235 and 236 being properly located to allow such circuit opening to occur just prior to termination of leftward movement of the bars 223 and/or 224, under spring urge.

It is here noted that if desired each of the resistors 175, 176, 179 and 180 may be individually adjusted to a desired value, and likewise, that if desired each of the resistors 177, 178, 181 and 182 may be individually adjusted to a desired value. Such individual adjustability may be readily effected by disconnecting the movable contacts 195, 196, 199 and 200, or 197, 198, 201 and 202, from the respective bars 223 and 224 either temporarily or permanently, and then individually adjusting the several movable contacts as needed.

At this point the following procedural explanations are pertinent:

It is evident that at any time tests may be made to then determine the movement of the fluid contents through the simulated reservoir under the conditions of drive by injected edge water simulation, gas injection, or otherwise, and under the conditions of well production, rates, pressure, etc., then being simulated, as will hereinafter appear. By making a set of such tests after each pre-selected interval of operation, such as after each of equal time intervals, each set of tests including determination of the various conditions of operation obtaining in each of the simulating units during the duration of such test, and by then properly correlating such data from the numerous simulating units, it is possible to reset each unit to new conditions of values of its electrical components to simulate changes of flow or of oil or water saturation, or of pressure of the formation at the location of such unit, or of rates of fluid flow through such unit, and various other conditions of operation. One important condition which may be observed by study of the tests of such series is the advance of a front of rapid increase of water saturation, moving from the injection well or wells towards the producing well or wells being simulated. Such tests will reveal numerous changes from or by which data may be recorded and used in connection with the further progress of the same series of tests, or for use in connection with another future series of tests.

To this end we have already noted the ability to include in each such test for each simulating unit, data concerning the formation pressure existing at the simulating unit in question, data concerning rates of input and output to and from each such unit, data, concerning pressures existing across such unit in various directions, constituting data for determining pressure gradients through the unit under the fluid flow conditions then existing, data respecting the rates of flow through the oil and water simulating resistor sets, data showing direction of net fluid flow through the unit, and other data. Such data may be recorded in convenient manner for making determinations as to what changes should be made in the settings of the resistors of the various units, and otherwise, preparatory to commencement of the next tests of the series. Such tests to determine various values of flow of oil, and water (or gas, etc.) may be readily conducted and recorded manually by use of plugs inserted into the various jacks in proper sequence and combinations, accompanied by manual recordings of the large number of values thus observed, properly recording such values in tabular form, etc., followed by needed calculations of changes in resistor values, etc., to be made based on such data. Such data and various of the calculations may, however, be recorded and automatically brought into proper relation to immediately indicate (and/or record) the results of such calculations or evaluations and, if desired, to provide the means to thereafter produce automatically the necessary re-settings of the values of the several resistors, preparatory to conducting the next set of tests. One such means for automatically conducting the tests and recording them, and determining the proper succeeding settings of resistors, etc., is shown schematically in FIGURE 39, and alternatively, a part of such equipment, in FIGURE 40, to which figures reference is now made, as follows:

In FIGURE 39 a potentiometer 241$^a$ is supplied with current, as by the battery 242 over the lines 243 and 244. The movable contact 245$^a$ of this potentiometer is controlled by the armature 246$^a$ under pull of the solenoid 247$^a$, and the spring 248$^a$ urging return of such contact to its leftward or low potential position, limited by the stop 249$^a$. Current is supplied to such solenoid over the terminals 250$^a$ and 251$^a$. Alternatively, such potentiometer setting may be made manually as legended on FIGURE 39. This potentiometer is so designed, as respects movement of its movable contact under pull of the solenoid, that the potential delivered across the terminals 243 and 252$^a$ is directly proportional to the viscosity of the oil component at zero p.s.i.g., being a value known from test of the oil which exists in the formation, but under its zero pressure condition. This value would generally be one of the parameters or elements of data supplied to the user of the present equipment as a basis for the proposed tests. Next, a potentiometer 241 is supplied with current from the line 243 and the movable contact 252$^a$. The movable contact 245 of this potentiometer is controlled by the armature 246 under pull of the solenoid 247, the spring 248 urging return of such contact to its leftward or low potential position, limited by the stop 249. Current is supplied to such solenoid over the terminals 250 and 251. This potentiometer is so designed, with respect to movement of its movable contact under pull of the solenoid, that the potential delivered across the terminals 243 and 252 is directly proportional to the viscosity of the oil at the formation pressure of the simulating unit under test and according to the curve of variation of viscosity of the oil component with such pressure, examples of which curves are shown in FIGURES 30 and 31, already referred to. Next, a potentiometer 253 is provided, having one end connected to the line 243 and its other end connected to the terminal 252 of the viscosity potentiometer. The movable contact 254 of this potentiometer is controlled by the armature 255 under pull of the solenoid 256, the spring 257 urging return of such contact to its leftward or low potential position, limited by the stop 258. Current is supplied to such solenoid over the terminals 259 and 260. This potentiometer is so designed, with respect to movement of its movable contact under pull of the solenoid, that the potential delivered across the terminals 243 and 261, is directly proportional to the apparent rate of oil flow through the resistance section then under test. Next, a potentiometer 262 is provided, having one end connected to the line 243 and its other end connected to the terminal 261 of the "Apparent Rate" potentiometer. The movable contact 263 of this potentiometer is controlled by the armature 264 under pull of the solenoid 265, the spring 266 urging return of such contact to its leftward or low potential position, limited by the stop 267. Current is supplied to such solenoid over the terminals 268 and 269. This potentiometer is so designed, with respect to movement of its movable contact under pull of the solenoid, that the potential delivered across the terminals 243 and 263 is directly proportional to the oil rate of flow as corrected by the "Formation Volume Correction Factor" unit shown in FIGURE 53. This operation will be explained further hereinafter.

Next, a potentiometer is provided, supplied with current of the potential between the lines 243 and the contact terminal 263, and the movable contact of such potentiometer is shifted by a solenoid supplied with current of value proportional to the pressure gradient through the oil branch of the simulating unit under test. Accordingly, the potential delivered by the movable contact of such potentiometer will be proportional to the pressure gradient aforesaid. Such "Pressure Gradient" potentiometer is legended on FIGURE 39 by the legend "Pressure Gradient Factor Injected Here." The movable contact of such "Pressure Gradient" potentiometer thus supplies a potential proportional to the corrected value flow conditions on the basis of the actual rate of flow through the simulating resistance, the potential gradient at the location of the test, and the viscosity of the oil under the Formation Pressure existing at such location.

During conduct of the test of the simulating unit in question, the formation pressure is determined by connecting the terminals 250 and 251 to a point of the network which simulates the zero or ground surface potential, and to one of the jacks of the simulating unit, preferably one of the jacks 215 and 216 which will closely represent the formation pressure of the real reservoir body being simulated. It is noted that each of such jacks of the simulating unit is at some other potential than such jack 215 or 216, but that the difference of potential across any simulating unit is much less than the formation pressure potential, so that no substantial error will be produced by selecting any one of such jacks which is convenient for such use. It is also noted that the formation pressure actually existing in the simulated reservoir will depend on many factors, including the elevation of the out-crop from which any drive water may be derived to produce production from such reservoir. Accordingly, the actual formation pressure should be simulated by comparison of the potential of the element of the network where the formation pressure is to be simulated, with any reference element of the electrical system whose potential is sufficiently different from that of the network simulating element to simulate the formation pressure at such location to a degree of accuracy compatible with the accuracies of the parameters on which the operations are based.

Next, the "Oil Rate" simulating potential is applied to the terminals 259 and 260 conveniently by plugs connected into one of the jacks 203 or 204, thus testing the potential across the fixed resistance portion of the resistor section 175 or 176 of the oil side; and next, the "Pressure Gradient" producing drive through the oil side resistor section under test, is tested by connecting the terminals of its actuating solenoid across the full resistor section 175 or 176 to include both the fixed resistance and the adjustable resistance of such section. Thus the drop of potential across such full section is tested to determine the Pressure Gradient. It is here noted that although, when the water saturation is of such percent that the oil relative permeability of the formation body being simulated is zero, with corresponding shift of the movable contact of the adjustable resistor element of such resistance section, to its open circuit or infinity resistance position, under such conditions no current will flow through such resistance section so that no potential gradient will be indicated although the full potential of the simulating unit may, at such time, be impressed across such open circuited resistance element.

The tests thus far made will enable an immediate determination of the value of $K_o$, being the relative permeability of the formation to the flow of the oil of the mixture therethrough. Such relative permeability is shown by the curve 144 of FIGURE 24. Knowing such relative permeability for oil it is at once possible to also determine the value of the percent water saturation corresponding to such relative permeability for the oil component. Therefrom, also, the relative permeability for water is also made known, although such water component was not actually included in the flow simulated by the current flowing through the test elements.

Continuing this exploration, the circuitry schematically shown in FIGURE 39 includes means to further determine, automatically, the water saturation and the relative permeability to flow of the water component. Such means are as follows:

A potentiometer 270 is connected across the battery or source of potential. The movable contact 271 of this potentiometer is controlled by the armature 272 under pull of the solenoid 273, the spring 274 urging return of such contact to its leftward or low potential position, limited by the stop 275. Current is supplied to such solenoid over the terminals 276 and 277, which are connected, respectively, to the line 244 from the battery 242, and to the terminal 278 to which the movable contact 263 is connected. This potentiometer is so designed with respect to movement of its movable contact under pull of the solenoid, that the potential delivered across the terminals 244 and 278a is directly proportional to the water saturation corresponding to the value of $K_o$ as determined by the foregoing description. Thus the potential between the terminals 244 and 278a is proportional to the percent water saturation which corresponds to the value of $K_o$ previously explained. In this connection it is to be noted that rising values of $K_o$ correspond to lowering values of water saturation (see curve 144 of FIGURE 24), so it is noted that increase in pull of the armature 272, corresponding to increase in potential which represents $K_o$ results in decrease of the potential across the terminals 243 and 278a. Next there is provided the potentiometer 279 having its terminals connected to the terminals 243 and 244, being across the battery 242. The movable contact 280 of this potentiometer is controlled by the armature 281 under pull of the solenoid 282, the spring 283 urging return of such contact to the leftward or low potential position, limited by the stop 284. Current is supplied to such solenoid over the terminals 285 and 286, which are connected, respectively, to the line 244 and the terminal 278a to which the movable contact 271 is connected. This potentiometer is so designed, with respect to movement of its movable contact under pull of the solenoid, that the potential delivered across the terminals 243 and 287 is directly proportional to the value of the relative permeability of the water component at the value of water saturation corresponding to the potential between the terminals 243 and 278a.

It now appears that the following information and data are directly determinable from the various potential differences delivered by this schematic arrangement of FIGURE 39, namely:

(A) The relative permeability of the oil component, being the potential between terminals 276 and 277;

(B) The water saturation, being the potential between the terminals 278a and 244;

(C) The relative permeability of the water component, being the potential between the terminals 287 and 244.

It is also noted that the foregoing determination of water saturation and relative permeability of the water component have been determined without use of the "water branch" of the circuitry shown in the schematic showing of the simulating unit of FIGURE 36. The ability to determine these water solution and relative permeability factors for water is due to the flow relation defined by Darcy's law, and the mathematical analysis presently to be considered, and also the curves of FIGURE 24.

It is also noted that all of the factors as thus determined have been on the basis of the value of the viscosity of the oil component as affected by formation pressure. It is also possible to determine the value of the relative permeability of the water component independently of such oil component determination by use of a potentiometer circuitry similar to that just previously described, but in which the potentiometer provision for taking care of change of viscosity of oil due to formation pressure is not included, it having been earlier shown that the change in water viscosity due to change in pressure is small in comparison to other variables affecting the solution of the problems herein presented.

If desired the relative permeability of the water component may be determined independently of determination of the relative permeability of the oil component, and without correction due to any slight change of viscosity of the water due to pressure or change of pressure. Accordingly, reference is now made to FIGURE 40, as follows:

In this figure we have repeated the elements shown in FIGURE 39 which relate directly to the determination of $K_w$ from measurement of the pressure gradient across the water flow simulating elements and the rate of flow of the water component through the water branch of the simulating unit, and on the assumption that the viscosity of the water does not require correction due to change in formation pressure. The elements shown in FIGURE 40 are therefore numbered the same as like elements shown in FIGURE 39, but with the suffix "a." The potential delivered between the terminals 288 and 289 will be proportionate to the value of $K_w$ thus determined, being the relative permeability of water component flowing from the unit under test.

The unit shown schematically in FIGURE 38 is for the purpose of re-setting one of the sets of resistors to correct the values of such resistors preparatory to the succeeding set of tests of all of the simulating units representing the field. We shall presently describe a convenient means to effect such re-settings by currents delivered to the solenoids or by other automatically controlled means, after the necessary computations have been made to determine what are the present values of the various operational factors, corresponding to each of the simulating units, and on the basis of flow operational conditions revealed by the present set of tests. It would be possible to produce such re-settings of the resistance elements of each simulating unit directly upon determination of the present values of $K_o$, $K_w$, and water saturation, by proper calculations. However, such an immediate re-setting would be improper since it would directly affect all tests of the current series or scanning, yet to be made on as yet untested simulating units for determination of values of $K_o$, $K_w$ and water saturation. Therefore, instead of producing such immediate re-setting of simulating units as the present set of tests proceeds, various data are to be recorded, including $K_o$, $K_w$, water saturation, rates of flow, quantities of oil and water exchanged between proximate simulating units, and various other factors, on the basis of the presently existing set-up of the entire field. Such information and data so gained for each simulating unit must be recorded and stored for use in conducting re-setting operations of all of the units after the presently being conducted set of tests has been completed, so that prior to the next set of tests of all of the simulating units, corrections to the settings of their respective resistance elements may be made, based on the informaton and data previously gained and recorded concerning the other simulating units proximate to the simulating unit now being corrected. Accordingly, it is desirable to also provide automatic means to effect such recordings during or immediately after completion of the test of each simulating unit, so that as each simulating unit is tested during the current series of tests, its informaton and data shall be individually recorded.

A simple recording means for this purpose comprises punched cards carrying thereon locations for key numbers, and columnar locations for each of the numerous kinds of information and data to be recorded, according to conventional card punching operations. Thus, in FIGURES 39 and 40 we have shown various terminal points or connectors, including the following: The terminals 276 and 277 designated "To Card Punch for $K_o$," the terminals 278$^a$ and 290 designated "To Card Punch for Water Saturation," and the terminals 287 and 291 designated "To Card Punch for $K_w$," and in FIGURE 40 we have shown the terminals 288 and 289 designated "To Card Punch for $K_w$," it being understood, as previously explained, that the detailed schematic showing of FIGURE 40 is in addition to or in substitution for the elements of FIGURE 39 directly related to the production or determination of the value $K_w$ (and of the Water Saturation).

In addition to the foregoing information and data, there may also be recorded, for each simulating unit and for each test thereof, much other data by other punchings on such cards, including "Pressure Gradient" through each resistance element (being the potential drop across such element), "Formation Pressure" (being the full potential of the unit simulating the particular real area of the formation, measured with respect to sea-level pressure or other base potential), "Fluid Flow" through each of the terminals 211, 212, 213 and 214 of the simulating unit (being current value and direction of current flow at each of such terminals), "Algebraic Sum of Input and Output Flows" as applied to the directional unit of FIGURE 37 (being the effects of the several currents flowed through the coils 218, 219, 220 and 221 of the unit of that figure), "Indicated Net Direction of Fluid Flow Through the Simulating Unit," (being the general direction of fluid flow or stream line flow at the location of the simulating unit in the field), "Fluid Flow Rate" in each of the branches of the simulating unit, (being the current value and direction of flow through such branch), and such other data and/or information as may be desired and obtainable from tests of the simulating unit under the conditions now existing in such unit. In place of such an automatic recording of the information and data, the same may be manually recorded; or other forms of automatic recording may be used for the various elements of information and data. For example, such information and data may be recorded on magnetic tape, or punched tape, or various of the well known or conventional recording mechanisms, such as "Memories" and the like; the special form of punched cards previously referred to being by way of example, and not as a limitation, except as we may limit ourselves in the claims to follow.

Since the magnitude of the current flow at any point of the network is not a true measure of the rate of fluid flow through the network element in which such current flow occurs, there must be applied to the current rate indication a Formation Volume Factor, in order to correct the "Apparent" flow rate to the real flow rate of the fluid body. We have also shown that such Formation Volume Factor is a variable according to the release of gas from solution in the oil flowing through the reservoir formation body under study, and according to the specifications of the oil. Said factor also changes in value with progressive lowering of the formation pressure. We have herein made provision for such corrections, and for automatically introducing the proper correction factor into the rate of flow determination before such rate of flow is recorded or used in succeeding calculation operations of the equipment. We have already pointed out that, although the value of the current flow through the water branch is also not truly an exact measure of the rate of water flow, since a correction factor for change in volume due to formation pressure must be introduced in order to obtain an exact determination of the rate of water flow, still such correction in the case of the water component is much smaller than that in the case of the oil component. This is mainly due to the fact that only a small amount of gas is absorbed in the water, even under high pressure, so the change in volume of such water due to release of such gas when the pressure is lowered, is small and generally insignificant. However, if desired, position can be included in our equipment for effecting correct ion due to water formation volume factor, such water rate correction being produced by means similar to that presently to be described in connection with the correction for oil formation volume factor.

At this point we direct attention particularly to the fact that the formation pressure above frequently referred to is that pressure existing within the body of the formation under the conditions of production or otherwise existing at the time of the test in question. This pressure will vary from place to place throughout the formation, particularly when the formation is under production at one or more wells, and at rates which vary from time to time. This formation pressure is thus to be clearly distinguished from the differential of pressure between points separated from each other flow-wise through the formation. Such differential of pressure, or pressure gradient, is also variable as related to the rate of flow through the formation and to the relative permeability of such formation for flow of the fluid in question. Even when a reservoir is produced with the producing well or wells wide open, and with little or no back pressure being exerted against in-flow into the producing well or wells, the formation pressure back a distance from such well or wells may be high, since a high rate of fluid flow through the formation requires a correspondingly high pressure differential to produce that high rate of flow. In fact, there is usually a maximum rate of production through any producing well notwithstanding a high formation pressure, due to turbulence, etc.

For reasons stated above, it is evident that the formation pressure producing shrinkage for which the foregoing correction must be made depends on the real areal body which is simulated by the simulating unit in question or under test. The variations in value of such shrinkage factor applicable at different portions of the simulated reservoir depend, therefore, on the absolute formation pressures at such different reservoir locations, and not on differentials of pressure induced by fluid flow rates through various sections of such reservoir. The truth of this statement will be recognized when it is also realized that the currents through various cross-sectional slices of the reservoir always total to the same value, so that in reality the corrections must be made with respect to the final real volume of produced fluid, oil or water, gas free. Our presently to be described correctional element makes its corrections on that basis.

The equipment shown in FIGURES 39 and 40 is schematic and incorporates potentiometers connected in a sequence such that at various points of such sequence desired operational information and the values of desired operating functions and results thereof, may be obtained. Such schematic arrangement also produces such desired information, values, and results in the form of potentials whose magnitudes correspond to the values of such factors, information and other matters. We will also disclose sequential arrangements, based on the general sequence used in FIGURES 39 and/or 40, but wherein use is made of bridges or like operational elements, together with servomotor drives controlled by such bridges, for producing various mechanical movements needed to produce the intended re-settings and other physical changes, according to the results of the tests made on the various simulating units, and the calculations based on such results.

It is also noted that in such arrangements of FIGURES 39 and 40 such potentiometer arrangements are usable with either D.C. or A.C. but that the potential values produced as end results of some of the potentiometer operations will be rather small. It may therefore, in some cases, be desirable to use the alternating current potentiometer arrangement shown in FIGURE 43 by which "boosting" effects in the values of the potentials produced to represent values of factors obtained as a result of the sequential operation of such arrangement, may be obtained. Without repeating in full detail the functional operations produced by the arrangement of FIGURE 43 the following brief description of the elements of FIGURE 43 is presented:

The transformers 292, 293, 294, 295 and 296 correspond generally to the potentiometer units 241—245, 253—254, 262—263, 270—271 and 279—280, respectively. In the foregoing comparison it is noted that in FIGURE 43 does not include a potentiometer corresponding to the potentiometer 253—254, which is set according to the pressure gradient. This omission is made since for some purposes it is unnecessary to obtain the pressure gradient, since in fact the drop across one of the fixed resistors of one of the resistance sections is in fact a pressure gradient, although of small value, but nevertheless sufficient to constitute a basis for measurement of rate of flow of the fluid contents through the corresponding branch. In view of what has been earlier said about the showing of FIGURE 39 further description of FIGURE 43 seems needless to an understanding of the disclosures of that figure.

In the various disclosures thus far described the resistors simulating oil component relative permeability and those simulating water component relative permeability have been treated as two groups corresponding to those relative permeability simulations, and provision has also been shown in FIGURE 38 for effecting the adjustment of all of the resistors of each group simultaneously and as a group and all to the same value. Reference particularly to FIGURE 36 will show that with this grouping of the two kinds of resistors (those simulating the relative permeability of the oil component, and those simulating the relative permeability of the water component) the simultaneously adjustment of all of the resistors for each such group will be correct for the condition that the water saturation is the same at the entering face of the simulated body (for example, the top face of such body in FIGURE 36) as at the leaving or delivering face of such body (the lower face of such body in FIGURE 36); and also that the water saturation is the same at one of the lateral faces (for example, the right face) of the simulating body, as it is at the other (left) face of such body. In point of fact the water saturation is continually changing throughout the body of the simulated formation, as drainage occurs, although such change may be slow and hardly appreciable except over a considerable time interval. However, we have also, in FIGURE 44 shown another grouping of the simulating resistors into four groups for each simulating unit, as follows: Group I, resistors 176 (Oil) and 178 (Water), Group II, resistors 180 (Oil) and 182 (Water), Group III, resistors 175 (Oil) and 177 (Water), and Group IV, resistors 179 (Oil) and 181 (Water). It is noted that when so grouped—one oil and one water simulating resistor in each group, both of the resistors of such group will have their contacts moved simultaneously and by equal amounts in the same direction. Since the relative permeabilities for these two liquids change in opposite directions (one for increase and the other for decrease) as we move to the right or to the left in FIGURE 24 or FIGURE 26, it follows that the fixed end connections of such two resistors should be oppositely located, so that as the resistance contained in the one is increased the resistance contained in the other is decreased. It also follows that in the arrangement of FIGURE 44 we are setting the combination of each group to a common position corresponding to the water saturation to be simulated by that portion of the simulating unit in which such group of resistors simulates. It also follows that the setting of each group of resistors may be made to simulate the water saturation condition at one of the faces of the simulated body, being either an entering face or a leaving face. Thus, the setting of such group may also correspond to the water saturation condition of the combined liquid being transferred from or to each face of the simulating unit in question. We contemplate both forms of groupings as being within the scope of our present invention.

In FIGURES 51-51A we have shown in fuller detail than in FIGURE 39 a series of units for progressively processing the information gained by test of each simulating unit. This equipment is used during the processing of information supplied by each simulating unit in turn. This more detailed showing includes for each of the elements to which a signal is delivered from the simulating unit under test, a servo-motor driven element controlled by a bridge and null-tester thereof, for translating the information represented by such signal in such manner that the calculated operation to be performed as a correction of the resistor elements of the simulating unit in question may operate to set a holding element to position corresponding to the new value of resistance to which each such resistor element is to be set. This when the entire series of simulating units simulating the entire area and body of the reservoir has been scanned and tested, all such holding elements will be in correct positions to simultaneously cause re-settings of the numerous resistor elements to their newly determined values. The means which includes such holding elements, and the means whereby the re-settings of the resistor elements are produced will be fully disclosed hereinafter. We shall also hereafter disclose another operational procedure for processing the data obtainable from tests performed by use of our simulating units, for determining the new values to which the resistor elements for relative permeabilities of oil and water may be determined. This alternative operational procedure includes direct determination of the increments (either positive or negative) of water and of oil delivered into and/or from each simulating unit during a closely metered time interval. Then, by algebraic addition of such increments to the oil and water values previously known to be contained in each simulating unit, the present values of water and oil contained in such simulating unit may be determined. From such determinations the present percent water saturation may be immediately determined for such simulating unit body. Therefore the relative permeabilities of the oil and water components can be determined, and suitable holding elements may be positioned to correspond to such new relative permeability values and held until completion of the scanning and testing of all of the simulating units. Thereupon all of the resistor elements for such arrangement and operational procedure may be reset to their calculated new values, based on such so-determined percent water saturation values. The means whereby all such operations, calculations, and re-settings, etc. may be conveniently produced will be fully disclosed hereinafter.

We thus proceed to study of the showings of FIGURES 51–51A, and 52 and 53 which are supplemental thereto, as follows:

In order to avoid appreciable disturbance to the current flows through the numerous network branches by changing resistances of such branches during each of the tests, we have, in various figures, shown arrangements by which the current flows are measured by slight potential differences across resistances which comprise portions of the network itself. Thus it is unnecessary to open network branches for diversion of the currents flowing therein through measuring instruments. In some cases such arrangements are not feasible, and others are such that slight changes of resistances produced by the interposition of instrument resistances into the branches during measuring operations are not likely to produce appreciable errors in measurements. It is, however, desirable to produce as little change in the simulating impedance resistors as possible during the tests which must be made. For this reason, among others, we have shown the arrangement illustrated in FIGURE 36 wherein the current flows through the various simulating resistors are measured by test of potential drops across the fixed resistance elements or portions of the relative permeability simulating sections. Such potential drops are thus measured between the terminals 203 to 210, inclusive. Such potential drops are then used to activate suitable bridge arrangements controlling servo-motors for drive of the necessary adjusting elements. Several such units are shown in the schematic arrangement of FIGURES 51–51A and FIGURES 52 and 53. Accordingly, it is unnecessary to describe more than one such unit, as follows:

In FIGURE 51 the linear rate of oil flow through the oil branch is measured as a potential between the two lines 268ª and 269ª connected to the terminals such as 204 from the ends of the fixed resistance element of the simulating unit to be tested. Said lines 268ª and 269ª of FIGURE 51 correspond schematically to the lines 268 and 269 of FIGURE 39. Such potential is then to be used as the primary control for setting the movable contact 263 to position along the potentiometer 262 dictated by such potential between the said lines. The bridge 297 is provided having the two fixed resistances 298 and 299 connected together at the point 300, and also having the two adjustable resistances 301 and 302 connected together at the point 303. A fixed potential is supplied between the points 300 and 303, as by a battery 242 over the lines 243 and 244, and suitable connections to such lines. The null responsive element 304 is connected between the point 305 at which the ends of the resistances 299 and 302 are connected together, and the point 306 at which the ends of the resistances 298 and 301 are connected together. By making the two resistances 298 and 299 of equal resistance value it is evident that the null indicator will respond to the null condition only when the currents through such two resistances 298 and 299 are of equal value. Then the potentials at the two points 305 and 306 will also be equal.

The null responsive element 304 includes the spring leaf contact element 307, secured to the frame of the device at the point 308 and deflectable in either direction, being normally biased to stand in its central position as illustrated in the figure. This leaf element carries the small permanent magnet element 309. The small solenoid 310 is supported in proximity to such permanent magnet, and has its terminals connected to the points 305 and 306. Accordingly, any difference of potential between such points 305 and 306 will be reflected as a current through the solenoid 310, and the direction of such current will depend on which of the two branches, 298 or 299, carries the larger current. When the currents through such two branches are equal the null indicator will stand in its central position. When inequality between the two connection potentials exists current must flow through the solenoid in one direction or the other dependent on which of the connections 305 and 306 is at the higher potential. Accordingly, current will flow through the solenoid in direction dictated by the kind of such inequality of potentials. Since the leaf contact element is polarized (the element 309 being a permanent magnet) it follows that the direction of deflection of the leaf contact element 307 will depend on which of the two connections 305 and 306 is at the higher potential. This in turn will depend on which of the resistances 298 and 299 is then carrying the higher current (when such resistances are equal in value).

The stationary contacts 311 and 312 are supported at opposite sides of the leaf element, which leaf element normally stands free of them both. A relay 313 is provided corresponding to and controlled by the leaf 307, and thus also controlled by the condition of balance or unbalance of the bridge. This relay includes the spring leaf element 314 having its end secured at the point 315. The two solenoids 316 and 317 are supported at opposite sides of such leaf element, a small block of magnetic material 318 being carried by the leaf in position for magnetic action thereon by the one or the other solenoid according to which solenoid is energized. One end of each solenoid is connected to one of the terminals of current supply 243. The other ends of the solenoids are connected to the two contacts 311 and 312, respectively. The leaf 307 is connected to the other one of the current supply terminals 244. Thus deflection of such leaf element 307 in either direction will produce energization of the one or the other of the solenoids according to the kind of unbalance existing in the bridge. The amount of such unbalance is not determinative of such operation, as long as a sufficient unbalance (which may be very small) exists in the bridge.

Located at opposite sides of the leaf 314 are the two pairs of flexible leaf spring contacts 319—320, and 321—322, right and left sides of the relay, respectively. The pairs 319 and 320 are operatively connected together by the small block of insulating material 323, and the pairs 321 and 322 are operatively connected together by the small block of insulating material 324. The leaf 314 carries a block of insulating material 325 which extends both right and left therefrom to correspondingly engage either the pairs 319—320 or the pairs 321—322, as the case may be, and thus also according to the direction of unbalance in the bridge. Current is supplied to all of such pairs over connections such that upon shift of the leaf 314 to the right current is delivered through the leads 326 and 327 in one direction, whereas shift of such leaf to the left produces delivery of current through such leads 326 and 327 in the opposite direction. Such leads 326 and 327 supply current to the permanent magnet servo-motor 328, so that the direction of rotation of such motor is dependent upon and controlled by the direction of flex of the leaf 314, and thus also upon the kind of unbalance existing in the bridge. Drive of such motor will continue in such direction as thus dictated as long as the condition of unbalance within the sensitivity of the arrangement continues. Restoration of the condition of bridge balance will immediately terminate corrective operation of the motor, and this condition will continue as long as the bridge remains in balance.

The servo-motor, produces two effects; such servo-motor is connected to the adjustable contact 329 for the adjustable resistance element 302 in such manner that when the condition of unbalance occurs such contact will be shifted by servo-motor drive in direction needed to reduce the condition of unbalance, finally restoring the condition of balance with simultaneous discontinuance of servo-motor operation. Such an original condition of unbalance will be caused by a disturbance in the condition of the other leg of the bridge, namely, that leg containing the adjustable resistance 301. We shall consider the factors which will produce such conditions of original unbalance presently. Here we call attention to the fact that the servo-motor 328 drives the adjustable contact 329 by means of the connections 330. Such connections 330 also drive the adjustable contact 263 of the potentiometer 262, already referred to. The arrangement is such that such drive of such adjustable contact 263 is in direction to produce the intended response of potential delivered to the terminals 243 and 278 supplied by such potentiometer adjustment, and already referred to. Thus such potentiometer setting is adjusted harmoniously with the shifting of the adjustable contact 329 of the bridge in the corrective direction.

As already explained, the shifting of the potentiometer adjustment (potentiometer 262) is to be in accordance with the value of the signal received from the element of the simulating unit to which element such potentiometer corresponds. In the case of such potentiometer 262 such control signal is the potential delivered over the terminals 268$^a$ and 269$^a$, and represents the apparent (or, in case of provision for correction according to the value of the Formation Volume Factor), the actual or true rate of flow (linear) of the oil component through the simulating unit under test. Accordingly, it is now desired to provide instrumentalities which will produce an unbalance in the condition of the bridge in amount and direction corresponding to any change which may have occurred in the potential delivered between such terminals 268 and 269. Such further instrumentalities as here disclosed, are as follows:

A test section is connected in parallel to the adjustable bridge section between the points 303 and 306, between which points the adjustable resistance element 301 is located. This test section includes the null detector and indicator element 331 including the flexible leaf contact element 332, supported at the point 333, and deflectable between the stationary contacts 334 and 335, but normally standing free of both of such contacts, as shown in FIGURE 51. Such leaf element also carries the permanent magnet element 336. The small solenoid 337 is supported in position to influence such permanent magnet element whenever any current flows through such solenoid; and the deflection of the leaf contact element 332 produced by the energization of such solenoid will depend, as to direction of such deflection, on the direction of current flow through the solenoid. Accordingly, current flow in one direction will produce attraction of the permanent magnet and thus deflection of the leaf towards the solenoid—current flow in the opposite direction will produce repulsion of the permanent magnet and thus deflection of the leaf away from the solenoid. Such condition of deflection in the one direction or the other will continue as long as current flow through the solenoid continues. Upon restoration of the desired condition of balance such current flow will cease, with corresponding return of the leaf to its central or undeflected condition. Such deflection in either direction will produce engagement of the leaf contact with one or the other of the stationary contacts 334 and 335, as the case may be.

The development of a condition of unbalance such as just previously discussed will be due to the following conditions, and arrangements:

One terminal of the small solenoid 337 connects to the point 306 of the bridge, the other terminal of such small solenoid connects to one of the potential delivering terminals 269$^a$, and the other of such potential delivering terminals 268$^a$ connects to the point 303 of the bridge (preferably through a resistor for reasons presently to be explained). Now, when the bridge is in a condition of balance the potential across the adjustable resistance 301 must be the same as that across the adjustable resistance 302 (both of the resistances 298 and 299 being of the same value, or at any rate, the drop across the one such resistance being equal to that across the other such resistance). Under these conditions the current flow through the branch 301 has been adjusted to value to produce such condition of balance. Any change in current flow through such branch 301 will produce a change in the potential drop through such branch, thus upsetting the conditions of the bridge and producing a condition of unbalance therein. Whenever the potential delivered between the two terminals 268$^a$ and 269$^a$ (from the simulating unit under test) is the same as that potential then existing over the bridge branch 301, no current will be delivered through the said branch due to inflow or outflow through the terminals 268$^a$ and 269$^a$, but, the connections having been properly made, no current will flow from or to such terminals 268$^a$ and 269$^a$ and no current will flow through the small solenoid 337. In other words, since the potential across between the terminals 268$^a$ and 269$^a$ is the same as that across the bridge branch 301, no current will flow to or from such terminals 268$^a$ and 269$^a$, or through the solenoid 337.

If thereafter the potential delivered over the terminals 268$^a$ and 269$^a$ increases or decreases, as by a change in the fluid flow conditions through the simulated element of the formation, a current will now flow from the one such terminal to the other such terminal, and such current must of necessity flow through the small solenoid 337 in direction dictated by the kind of such change of potential delivered to such terminals 268$^a$ and 269$^a$, and by them, to the bridge unit. Also, such current thus flowing through such small solenoid must also flow through the resistance element 301 or other elements of the bridge, thus upsetting the condition of balance, and instituting a corrective operation in the bridge itself. Such corrective action will, as thus far disclosed, comprise a disturbance in the null detector and indicator unit 297, and will institute a corrective movement of the servo-motor 328 to try and bring the adjustable resistance element 302 into a new condition for restoration of balance. However, any such correction movement made in the position of the adjustable contact 329 of such resistance element 302 must be accompanied by a corresponding corrective movement in the position of the adjustable contact 338 of the resistance element 301 in order to maintain or restore the bridge in its condition of balance. Such second or ancillary balance restoring condition is produced as follows:

There is a second relay 339 similar to or the same as the relay 313, corresponding to such null detector and indicator 331. Accordingly, it is not deemed necessary to described this second relay in full detail. However, it is noted that such second relay controls a second servo-motor unit 340 which is rotated in direction according to the direction of flow of the disturbing current from or to the terminals 268$^a$ and 269$^a$; or, to put it another way, if the potential delivered over the terminals 268$^a$ and 269$^a$ should rise, no change having occurred in the adjustments of the bridge, there would be a condition of unbalance created, causing flow of current through the local circuit including the null detector and indicator 331. In case such change of potential occurring at the terminals 268$^a$ and 269$^a$ should be in direction of reducing the delivered potential across such terminals, the flow of current through such local circuit including such null detector and indicator 331 would be reversed. Accordingly, in either case the response of the null detector and indicator 331 will be in such direction, and will produce responsive current supply to the servo-motor 340 in such current direction, that a corrective movement of the drive from such servo-motor 340 to the adjustable contact 338 will be in direction to either increase or decrease the resistance effectively contained in the branch 301, until a condition of bridge balance is again attained. Then such servo-motor corrective operation will terminate, leaving the system again in a condition of balance. Such condition of balance is a condition under which the potential between the terminals has dictated the potential across the adjustable resistance branch 301, and has brought such potential across such branch to the same value as the imposed potential between such control terminals 268ᵃ and 269ᵃ. Under such conditions, no current is flowing between such two terminals nor through the connections thereof to the corresponding element of the simulating unit. Thus the setting of the bridge is effected finally under the condition that no drain of current from any portion of the simulating network is now occurring to such automatic re-setting equipment.

The net effect of the foregoing described equipment is that the position of the adjustable contact 263 of the potentiometer 262 has been brought to exactly simulate the value of the operating condition of the simulating network to which the test potential between such terminals 268ᵃ and 269ᵃ corresponds. Also, that when so adjusted, no current is being drained from the simulating network, and the current flows through that network are therefore not disturbed by ancillary current flows, which ancillary current flows are not properly any portion of the network stream flow simulations.

The next important feature of this so-described element of equipment for re-setting elements of the network is as follows:

The layout of equipment shown in FIGURE 39 is of schematic form, and the setting of each potentiometer movable contact thereof, produces a potential at the position of such contact, measured from one end of the potentiometer or the other end thereof, proportionate to the section of potentiometer embraced between such adjustable contact and such end of the potentiometer to which reference is made. However, upon drawing current from such adjustable contact to another element of the equipment further in the direction of the analyses to be produced by the entire ensemble, it is evident that such so-drawn current may and probably will upset the previous balance of potentials. When this potentiometer arrangement is repeated through a series of stages or sections, as shown in FIGURE 39, each section representing a correction or introduction of another factor into the solving of the problem under study or consideration, it is evident that some means should be introduced into the system to effect the desired settings of elements such as the adjustable contacts, other than by the use of current from such potentiometers themselves. The arrangement shown in FIGURES 51–51A and FIGURES 52 and 53 effects the actual settings of necessary elements by power triggered or controlled by the potentials to be simulated, and without use of current flow produced by such potentials, after the re-adjusting operation has come to balance.

The importance of the foregoing beneficial arrangement will be apparent from further examination of FIGURES 51–51A and FIGURES 52 and 53, as follows:

The leads 243 and 278 extending from the adjusted position of the potentiometer 262—263, serve the next potentiometer of the series, but in this case, the potential delivered over such leads 243—278 is used to effect corrections in the bridge of such next section, as seen from examination of FIGURE 51A. Since such bridge arrangement of such succeeding potentiometer does not require current for its operation, except during the production of the adjustments themselves when a slight current will flow through the local circuit which includes the null detector and indicator 331ᵃ, and since the current flow through the potentiometer element 270 itself is supplied over the power supply lines, it follows that the energization of such potentiometer 270 does not produce any drain through the lines coming from the preceding potentiometer, but such lines only supply potential of value as determined by the functional effects of the preceding section.

A further desirable function produced by this bridge arrangement is as follows:

Certain of the sections, notably those which produce potentials proportional to $K_o$, to water saturation percent, and to $K_w$, are to be operated in such manner that their significant end values of $K_o$, water saturation percent, and $K_w$ are to be recorded for future use, and without presently producing any corrections in the settings of elements of the simulating units to which they correspond or which are to be re-set according to the values of such elements. Also, such re-settings, when performed require the delivery of considerable forces, considering the nature of the equipment which is not a power system. The bridge arrangements thus already described do include servomotors for driving the adjustable contacts shown in FIGURES 51–51A and 52 and 53. It is also possible to use such same servomotors to drive additional contact or stop setting elements, comprising portions of a recorder or retaining unit so that the stops thereof may be shifted to positions corresponding to the re-settings to which adjustable contacts of the simulating resistances are afterwards to be set. Thus, in FIGURE 58 to be hereinafter described we have shown the studs or pins 341 and 342 projecting from the "Relative $K_o$ Determining Section" and from the "Relative $K_w$ Determining Section," and in FIGURE 69 we have also shown such studs or pins, as well as the stud or pin 343 projecting from the "Water Sat." section. These studs or pins are connected to or constitute extensions of the corresponding servo-motor driven connection such as the extension 341 of the connection 330 in FIGURE 51, and thus are driven accurately and under power drive to the exact pre-setting positions as determined by the other elements of the equipment, and without need of providing any duplications of such servo-motor elements to effect such results. These additional functions thus performed by such servomotor drive units will be further described hereinafter.

It is here mentioned that in somewhat simplified embodiments of our present invention provision may be made for re-setting the various relative permeability sections to their new permeability simulating values by manual operations, in which case the test data may also be manually noted and recorded, or recorded by punched card operations, magnetic tape recordings, and other conventional recording operations, from which the necessary computations for re-settings, etc., may be made. We shall hereinafter disclose embodiments which include provisions for such manual settings of various elements, either without automatically produced further processing operations, or otherwise.

It is also here noted that in the showing of FIGURE 39 we have included a section actuated by "Correct Oil Rate for Value $B_O$", and also a succeeding section designated as "Pressure Gradient Factor Injected Here," such latter section being actuated by the total potential drop across the resistance section under test, including both the small fixed resistance and the adjustable resistance of such section. Accordingly, we have shown, as FIGURE 52 a section to be included in the showing of FIGURES 51–51A just after the section which delivers a potentiometer potential titled "$Mu_o$ at Formation Pressure and Temperature," and in advance of the section titled "Potential Represents $K_o$ (uncorrected for Formation Volume Factor value $B_O$), Shrinkage." Such unit of FIGURE 52 introduces the Pressure Gradient factor into the calculating operations.

Frequent reference has also been made to the need of making correction of the Apparent Rate as indicated by the value of the measured current of the oil section, based on shrinkage at the location of the simulating unit under test. To make such correction at the location of each simulating unit the formation potential of such location is indicated by the network potential with respect to the base value, as already explained. Such formation pressure will then be applied to a Formation Volume Factor curve, such as the curve 351 of FIGURE 50. When there has been no draining off of current at the location of each simulating unit to effect the correction for Formation Volume Factor at such unit, it is evident that the full value of the injected current is flowing through the network to the location of the producing well or wells. Thus, when using the correctional operation already described, in which a correction factor is applied to the indicated current through the oil resistance section of any simulating unit, to determine the true or corrected rate of oil flow through such unit, the amount of such correctional factor to be applied for the oil simulating rate at such unit shall be the total correction indicated on such curve 351 between the original bubble-point at high pressure, and the formation pressure at the simulating unit being tested. No duplication of such corrections is thus produced since the full amount of current is still flowing through the network. Since the formation pressure falls progressively as the fluid contents of the reservoir approach the producing well or wells, such shrinkage corrections will be progressively greater as such producing well or wells is or are approached.

As an illustration of the application of such shrinkage factor reference is again made to curve 351 of FIGURE 50. In the illustration of the oil for which such curve 351 was made, the correction factor, when such oil was reduced from its original formation pressure of substantially 2600 p.s.i.g. to zero or atmospheric pressure, the volume of oil present contracted or shrank from 1.335 (barrels, for example) to 1.000, so that its delivered volume was only 1.000/1.335 or 0.748 of its original volume. This is a reduction to substantially 74.8% of its original volume. In FIGURE 50 we have shown, by the curve 351ª the percentages of the original volume to which the volume of such oil has shrunken for pressure reductions to various values. It is noted that the final percentage indicated on this curve is such 74.8% for the base or zero pressure point. When effecting the correction by drainage of current from the network at the location of the simulating unit under test, the amount drained at each simulating unit location should be the differential portion of such total loss of volume, produced by the drop of formation pressure through such individual simulating unit. Thus, for such a correcting operation the total correction will be the summation of the corrections at all simulating units lying in any flow path from the injection point to the production point. This will be referred to hereinafter when further considering such alternative means for correcting for shrinkage.

In FIGURE 53 we have shown a Formation Volume Pressure correction section embodying the operational features discussed above when using the first or non-drainage of current arrangement. This section of FIGURE 53 may be introduced into the showing of FIGURES 51-51A as shown by an examination of both such figures together with FIGURES 52 and 53.

It is noted that when the condition of balance has been attained in the bridge 297 by re-setting the two adjustable contacts 329 and 338 to positions such that the voltage across each of the resistor sections 301 and 302 is the same as the test voltage arriving over the leads 268ª and 269ª, the servo-motor 328 (and also the servo-motor 340) are stopped by termination of current supply to them. They continue in such stopped condition until a condition of unbalance again occurs, as by change of the test voltage. Also under such conditions there is no current flow through the local circuit which includes the null detector and indicator 331, since the test voltage has now caused the voltage across the resistor section 301 to come to its value. It is also noted that whenever such test voltage falls to zero, as when changing connections from one simulating unit to another such unit, the condition of balance in the bridge will continue since under such condition no local current can flow through the local circuit which includes the two terminal connections 268ª and 269ª. However, when thereafter such terminals are connected to the proper points of a succeeding simulating unit, having a potential difference different from that previously tested, a current will flow through such local circuit, of value proportionate to the difference between the then existing voltage across the resistance 301 and such newly presented test voltage. Accordingly, if such difference happens to be rather large it will produce a substantial current through the local circuit. The small resistor 354 included in such local circuit will limit such sudden increase of current to a value low enough to avoid damage to any of the elements contained in such local circuit, such as the small solenoid 337. The presence of such current limiting resistor will, however, not interfere with the intended operation of the assembly since the final condition of balance is due to the comparison of voltages and not comparison of currents.

At this point it is noted that, in order to produce each re-setting operation of the adjustable contact elements for various simulating sections of the units, it is necessary, in certain embodiments hereinafter described, to start a count from the zero position of each such so-to-be re-set element, then counting and/or moving such element to its new and re-set position. Such new position may of course be either higher or lower in value than the just used position. Although, as pointed out above, merely opening the circuit between the terminals 268a and 269a with reduction of the applied potential coming from the test unit does not of itself cause any shift of the position of the adjustable contact 263 (see FIGURE 51) to occur, it is possible to cause such adjustable contact to be driven back to its zero position in the following manner:

By temporarily short-circuiting such terminals during a short interval between termination of one test and commencement of the next test, the condition of balance of the bridge 297 will be disturbed since such short-circuiting operation will greatly reduce the drop of potential across the resistance element 301. Such reduction of potential must then result in a corresponding reduction of potential across the companion resistance element 302, with corresponding corrective operations in such bridge. Such corrective operations will result in running the motor 328 to drive the adjustable contact 263 back to its zero position, in which position it will remain as long as such short-circuiting condition continues, and for a further time interval until the terminals 268ª and 269ª have impressed on them a new test voltage. Such new test voltage will thus act to reset such contact 263 to its proper position corresponding to the new test voltage, either a higher or a lower position than before.

It is also noted that no damage can be produced to elements of the equipment by such short-circuiting operation, since actually a short-circuited condition is not produced, due to the interposition of the resistor 354, and the fact that in any event there will be some portion of the adjustable resistance 301 in the circuit at the time such short-circuiting occurs. When the contact 338 has been run back to its zero position there will still remain the resistor element 354 in the local circuit thus produced. The means to produce such a temporary short-circuiting condition between such terminals 268ª and 269ª will disclosed hereinafter when the structure and operations of certain recording and cycling equipment are explained. Although, in the preceding statement we have referred to an operation in which the adjustable contact is run "back to its zero posiiton," still, due to the fact that the non-used position of the adjustable contact in certain potentiometers is actually the high reading position, it will be understood that in such cases the adjustable contact is run to such high reading position, being the original or non-used position.

Reference is next made to FIGURES 54 and 55 which disclose a convenient means to supply the current flow through the network under such conditions of control as will ensure proper simulation of the flow conditions of the real reservoir. It is noted that a convenient and desirable operational condition is one under which the delivered rate of the oil-water mixture or the oil alone is maintained constant at a pre-selected value. It is also noted that such delivery rate should usually be determined by the rate of stock tank delivery in barrels per day or other time unit. Then the water rate will be determinable either by measurement of water delivery rate or from the oil-water ratio. It is also noted that the stock tank rate is on the basis of the pressure released condition, so that the application of the shrinkage factor due to pressure release already discussed, will ensure an operation of our equipment under the conditions needed to conform to such basis of oil rate delivery measurement.

It is also noted that the total voltage or potential needed for operation of the equipment includes several elements of potential drop as follows:

First, the difference of potential between the injection point and the production well or wells. If this delivery potential is the bottom hole pressure simulation, then a further potential is needed, as follows:

Second, the drive potential to simulate the difference between bottom hole pressure and atmospheric. In any case there will be absorbed some driving force to overcome the rise resistance of the fluids contained in the production wells. If such wells are operated under liquid seal it is evident that the bottom hole pressure will have a value, with respect to the top open hole pressure of amount corresponding to the hydrostatic column filling production well in question; if the top of such well is partially closed, thus restricting the rate of delivery, the pressure drop produced through such restriction will also be added to the pressure due to the liquid column, plus the bottom hole pressure.

Third, the voltage or potential needed to drive the injection water or other drive fluid down through the injection well, not including the columnar pressure of such drive water or other fluid, but including the dynamic loss due to rate of flow of such drive liquid down through such injection well.

Thus, the actual potential needed to effect drive of the fluids through the formation, being the first pressure above listed, is only one element of potential needed to drive the simulating equipment, since it is also necessary to produce a potential simulating the reservoir formation pressure, due to the depth of such reservoir below ground surface, or below the outcrop, or due to seal of such reservoir under high original pressure or other cause. Under the flow conditions simulated during any given test the actual reservoir formation pressure varies throughout the reservoir; but it is convenient to use the reservoir formation pressure at the high pressure or injection end of the formation as the starting point from which to measure the progressive pressure reductions during flow through the formation to the production well, and to which we have already made reference. That pressure may then be simulated by the injection drive potential in volts delivered to the input connection. Means must however, be provided to regulate that input potential so as to maintain the rate of delivery through the production well at that oil rate which is pre-selected. Various potentials throughout the formation may then be measured, either as absolute potentials or as differences of potential, as needed.

Referring to FIGURES 54 and 55, we have shown a portion of the simulating unit network by the blocks 356, each of which conforms to the disclosures already made. In a few of these we have also shown, by dotted lines, the oil and water branches in simple form, being the lines 357 and 358, respectively for the oil and water branches. It will be understood that such branches are contained in all of the simulating units. The successive units are also connected together into the network by the connections 359, corresponding to like connections previously described.

A single input well is simulated by the input current connection 360 connected to the connector 359 of the simulating unit closest to such input well location. Such input connection delivers directly to such common connector 359 which in turn is connected to both oil and water branches of the proximate unit, from which point distribution of the input current to successive simulating unit proceeds according to the previous disclosures.

At the output or production well location we have, however, made provision for separate delivery of the currents from the oil and water branches of the simulating unit or units closest to such production well. This separation makes it possible to measure and control the oil and water delivery components separately to the extent necessary to derive all of the desired information, and also to enable control of the operation to ensure desired rate of tank stock oil. Accordingly, the two delivery lines 361 and 362 are shown, for the oil and water production, respectively. Thus, at the location of the final simulating unit of the network, the two sides, oil and water, are kept separate instead of being connected together as elsewhere in the network under usual flow simulation.

Conveniently a variable voltage generator 363 is provided as a source of current supply, being shown in FIGURE 55 as a D.C. generator with controllable field 364. The positive terminal of the generator connects to the input line 360 by the lead 368, and a battery 369 is shown in such lead 368. This battery is so connected that it acts as a booster so the voltage delivered by the generator is boosted by the amount of boosting action produced by such battery. To this end the lead 368 connects to one of the cell terminals of the battery, and may be set back and forth to produce the desired amount of boosting action.

Current responsive instruments 370 and 371, such as ammeters are included in the production leads 361 and 362, and then such leads are connected together by the common lead 372. The return line to the generator is shown at 373. The lead 372 is connected to such generator return lead 373 and a battery 374 is included in such connection. To this end one terminal of such battery connects directly to the lead 373. A generator return lead 372$^a$ connected to the return side of the generator may be connected to a selected cell of the battery by the movable contact 372$^b$ so that a controllable potential may be produced between the lead 372 and the return side of the generator. Thus a potential of controllable value may be established between the return line 372 and the return side of the generator. If the potential of the line 368 be assumed to simulate the gauge pressure at the ground level above sea-level pressure then the sum of the adjusted generator potential plus or minus the amount of the adjusted potential of the battery 374 (depending on which way the battery is connected into the system) will simulate the bottom-hole pressure, or pressure at entry of the production into the well. Usually this will be a positive pressure and will constitute a resistance to the flow of fluid contents from the reservoir into the well. The potential delivered by the battery 369 (at the adjusted point of connection of the line 368 to the battery) will determine the "Formation Pressure" of the reservoir at the location of the injection well, and the reference of any point of the network to the line 368 will determine the Formation Pressure at the location of any selected simulating unit.

With the above arrangement the bottom-hole pressure can be raised or lowered to any selected value within the adjustment range of the battery 374.

The drive pressure through the formation will be the difference of potential between the lines 360 and 372. Evidently any change in the bottom hole pressure (simulated by the potential of the line 372) will correspondingly change the total drive force through the formation between the lines 360 and 372 with corresponding change in the rate of flow or rate of production. Thus the effect of throttling the control valves at the upper or ground level end of the well may be simulated. Thus, too, the production rate of the fluid contents may be controlled.

The adjustment of the movable battery contact 372$^b$ may be effected manually or automatically. In FIGURE 55 we have shown means to effect such adjustment automatically under control of the rate of oil production so that if desired such rate may be maintained constant at a selected value. Such means is as follows:

Inserted in the leads 361 and 362 through which the oil and water simulating currents are delivered are the two ammeters 370 and 371 already referred to. The voltage delivered to the generator field terminals may be regulated either manually or automatically, to retain the current through the one or the other or both of such ammeters constant at its selected value. Usually the oil production will be selected. We have provided the potentiometer 375 served by the battery 376, such potentiometer being provided with the conventional adjustable contact 377. The leads 378 and 379 extend from one end of such battery and from the adjustable contact, respectively, so by the setting of such adjustable contact the potential between such leads may be adjusted to a proper value. The voltmeter 380 is connected across such leads.

We have provided the bridge section 381 similar to the bridge arrangement already described in full detail, so it is not necessary to describe such bridge 381 in detail. In the present case, however, the servo-motor element 328$^a$ serves to drive the adjustable contact 372$^b$ of the battery supply 374. Then the two leads 378 and 379 are connected to the terminals of the local circuit which corresponds to the local circuit of the earlier described bridge arrangement. Thus the adjustable contact 372$^b$ which controls the potential of the line 373 will be shifted in one direction or the other as necessary to conform to the potential existing between such leads 378 and 379. If desired the voltmeter 380 may be provided with a scale carrying indicia of current. However, the current actually flowing through the production and on either the oil or water sides of the network will in any case be indicated by the one or other of the ammeters 370 and 371. Whenever desired or necessary the setting of the adjustable contact 377 of the potentiometer 375 may be changed, either manually or automatically. In the latter case such change may be effected by suitable potentiometer arrangements controlled by the ammeter 370 or 371, as the case may be, acting to control the voltage delivered to the terminals of the local circuit of the bridge.

It is also to be noted that the foregoing arrangement acts to maintain the total current constant at its intended setting. In this FIGURE 55, however, we have also shown schematically, the operative connection 382 between the oil rate measuring and indicating meter A$_o$ and the adjustable contact 377 of the potentiometer 375, such that variations in the oil rate are immediately reflected in the setting of such adjustable contact and are thence reflected in the form of controlled changes in the potential of the line 373, to thus vary the delivered voltage thereof as necessary to maintain such oil rate constant. It is not deemed necessary to show such connections between such meter 370 and the adjustable contact 377 in full detail. It is also noted that such connection 382 may be effected between the meter 371 and such adjustable contact, or between a like meter inserted in the line 372 at a point to respond to the total liquid products (oil and water) produced by the reservoir. Thus we do not intend to limit ourselves to the automatic control as applied to the oil production, except as we may do so in the claims to follows.

In FIGURE 54 we have shown generally, by conventional curve arrangements, the manner of voltage variation through the system thus disclsed in FIGURE 55. In this FIGURE 54 we have included the Formation Volume Factor curve 385 and also the curve 386 corresponding to the Formation Volume Factor between the original or high pressure limit of the reservoir, and the bottom-hole pressure at which the production enters the producing well. It is noted that in the showing of this curve 386 it is assumed that such bottom-hole pressure is above the atmospheric pressure so that such curve is not carried fully down to the value of 1.00 or unity, but terminates at the value of 1.15, corresponding to such assumed bottom-hole pressure. It is also pointed out that in the illustrated typical showing of this figure the original or high formation pressure was 5000 p.s.i.g. The curves 387 and 388 show typically how the formation pressure which determines the Formation Volume Factor falls as the producing well is approached, and, on the basis of the changeing pressure, how the oil rate also is affected.

Reference is next made to FIGURE 56 which shows a simple wiring diagram of a typical simulating unit embodying the features previously explained in connection with earlier figures. However, in this FIGURE 56 we have shown the adjustable resistance elements of the various relative permeability simulating sections, removed from their original locations, but connected to the proper terminals of the wiring of the simulating unit. We have done this since various convenient practical embodiments of the equipment include automatic means to produce re-settings of the values simulated by such adjustable resistances and such adjusting means is conveniently brought into an ensemble adapted for such operations. In this FIGURE 56 we have also included various plug in provisions for producing needed connections to various of the elements of such simulating unit to effect connections to other similar simulating units, and to other elements of equipment, especially when certain manual adjustments are to be effected instead of producing such adjustments automatically.

Thus, in FIGURE 56 we have shown the two manually operable buttons, one each for the setting of the oil relative permeability simulating unit and the water relative permeability simulating unit. These are the buttons 389 (oil) and 390 (water). Such buttons are provided with conventional pointers to be read in comparison with the scales 391 and 392, indicating in darcies or millidarcies, as desired, or other scale values. Each such button is connected to all four of the adjustable impedance resistances of its group according to one of the showings previously described herein, and shown schematically by the dashed lines 393 and 394 in FIGURE 56. The several adjustable resistances are numbered to correspond to like elements of FIGURE 36 and elewhere; and various other elements of the simulating unit are also designated in FIGURE 56 by numerals the same as previously used elsewhere.

By use of these hand buttons the various relative permeability simulating resistances can be set to settings which with their companion fixed resistances, will correctly represent the corresponding relative permeabilities as determined by calculations based on the previous test of the simulating unit of which they constitute a part. It is also noted that such hand buttons may be rotated far enough to shift the corresponding adjustable contacts of the resistances off from the resistances so that such resistances and directly associated elements of the simulating unit as shown in FIGURE 56 will be cut out of the system. Such an operation then make it possible to effect the proper settings of simulating resistances by other means, presently to be described. In this connection it is noted that the various resistances shown on FIGURE 56 are, of course, connected into the other elements of the simulating unit in proper manner by various connections as shown in such FIGURE 56, and which connections it is deemed unnecessary to describe in full detail in view of the earlier description of the showing of FIGURE 36. Included in such connections are the leads between such resistances and the corresponding adjustable contacts, and the small fixed resistors which correspond to the various resistances of adjustable form, and other elements of the simulating unit.

When the automatic operation, presently to be described is to be used, which automatically operational equipment includes a duplicate set of resistances and other elements, it is necessary to connect such duplicate resistances into the simulating unit represented in FIGURE 56, this being true also for each of the simulating units to be contained in the automatically controlled and operated network. Accordingly, we have provided an eight contact socket for each of the fluids whose flow conditions are being simulated, namely, oil and water in the present case. These are the sockets 396 and 397 for the oil and water sides respectively, of the simulating unit. The eight contacts of each such socket connect to the proper leads between which the corresponding resistance element terminals are connected, thus bridging such resistance element terminals when a proper plug is inserted into such socket. Thus, by running both of the hand buttons 389 and 390 around far enough to move the corresponding adjustable contacts off their resistance elements, and then plugging in the proper eight-terminal plugs into the sockets 396 and 397, the operations of the duplicate set of automatically controlled and operated resistances will not be interfered with by false connections to the resistances which are manually used.

We have frequently referred to operations by which the formation pressure is tested by testing the potential of a convenient point of the simulating unit in comparison to the base or original potential, such as the potential at the line 368 (FIGURE 55). The points 215 and 216 (in FIGURES 36 and 56) are convenient test points to either of which one of the test line terminals may be connected, the other test line terminal being then connected to the lead 368, such lead being at "atmospheric" pressure. Also, the apparent rates of liquid flow through either the oil section or the water section of the simulating unit may be determined based on tests of the difference in potential through either the fixed element of the proper resistance section simulating the liquid whose rate is to be determined, or, to determine the pressure gradient, testing the drop across both the fixed and adjustable resistance elements. The pressure gradient through either the oil section or the water section may thus be determined by a similar test between two points of the current carrying circuit simulating the liquid whose pressure gradient is to be determined.

In FIGURE 56 we have shown the eight multiple contact sockets 398, 399, 400, 401, 402, 403, 404 and 405 corresponding to the four resistance sections of the oil side (sockets 398, 399, 400 and 401) and to the four resistance sections of the water side sockets 402, 403, 404 and 405). Each of these sockets includes three pairs of contacts which are connected to points of the simulating unit corresponding respectively to Formation Pressure (F.P.), to Fixed Resistance of the section (R.), and to Pressure Gradient (P.G.). Thus, by inserting suitable plugs into these eight sockets proper lines may be connected from the simulating unit in question to elements of automatic equipment which are to respond to such three tests values in order to carry through various computations and re-settings of the adjustable resistance elements, and also to effect corrections of rates based on Formation Pressure, etc.

In FIGURE 56 we have also shown the four conventional jacks 406, 407, 408 and 409 which are included in the connections 187, 188, 189 and 190 by which the simulating unit in question is connected to adjacent similar simulating units of the network. These jacks are normally closed so that such network connections between simulating units are properly established. Upon inserting a proper plug into any one of such jacks a diversionary circuit is established sending the current of the network connection through some other element for a test. Upon removing such plug from its jack the normal connection between the two adjacent network simulating units is restored.

We have previously referred to the "direction of flow" unit shown in FIGURE 37 and briefly described the same. The four coils of that unit can be connected into the proper network connections 187, 188, 189 and 190 by use of the jacks 406, 407, 408 and 409, so that such unit of FIGURE 37 will give a direct indication of the resultant direction of liquid flow through the simulating unit. Upon removing the plugs from the jacks the network connections will continue as before but without the interposition of such coils of the direction of flow unit. It should be noted that although such temporary connection of a coil of such direction of flow unit into each of the network simulating unit interconnections produces a temporary and localized change in the resistance of the network and thus correspondingly disturbs the distribution of currents through such network, still the coils of such direction of flow unit may be made of small resistance compared to the relative permeability simulating resistances, so that no appreciable depreciation of the accuracy of the operation of the network and its numerous elements will be thus produced.

In FIGURE 57 we have shown a typical panel arrangement by which numerous of the simulating units may be conveniently mounted together for ready interconnection of their elements to produce the desired network. Various of the sockets and elements already referred to are legended on this figure, so it is not deemed necessary to describe such figure in detail.

FIGURE 58 shows, more or less schematically, a control and calculating cabinet equipped for the operational sequence previously explained, in which the rate of flow (oil) corrected for Formation Volume Factor according to shrinkage, is used, when the viscosity of the oil is known and is corrected for the pressure and gas content conditions, for determination of $K_o$, and thence for determination of water saturation percent, and finally, for determination of $K_w$. The sections of this cabinet correspond generally to the sections shown in FIGURES 51–51A, when the corrective section of FIGURE 53 is included. Thus, the panel section titled "Manual Adjust." (at the top of FIGURE 58) corresponds to the section including the potentiometer $241^a$—$245^a$ of FIGURE 51. In FIGURE 58 the hand dial 410 has been substituted for the knurled hand grip of FIGURE 51. This hand dial is set to the viscosity position which identifies the viscosity of the produced oil, gas free, at atmospheric pressure. This top panel is numbered 411.

Next below such panel 411 is the panel titled "Correct to Viscosity at Formation Pressure and Temp." This panel is numbered 412. It produces a correction of the value of the viscosity according to the correction produced by the section numbered $412^a$ in FIGURE 51, and delivers to the panel 413 next below and titled "Formation Oil Volume Factor Correction Oil Rate" a potential proportional to the apparent rate; that is, proportional to the potential drop across the fixed resistance element of the relative permeability resistance section which simulates such relative permeability when properly adjusted.

Next below the section numbered 413 is the section 414 titled "Pressure Gradient Over Simulating Unit Section." This section produces the correction based on shrinkage, already explained in detail. This is the section shown on FIGURE 53, and numbered $414^a$. Next below such section 414 is the section titled "$K_o$ Determining Section," and numbered 415. This section corresponds to the section $415^a$ of FIGURE 51. Next below such section 415 is the section titled "Water Saturation Determining Sec.," numbered 416. It corresponds to the section $416^a$ of FIGURE 51A. Finally, the section titled "$K_w$ Determining Section" is set at the lowest location of such panel element shown in FIGURE 58, being numbered 417, and corresponds to the section 417ᵃ of FIGURE 51A.

Each of the panel sections thus referred to includes electrical and related elements the same as or corresponding to elements shown schematically in FIGURES 51–51A, 52 and 53, so detailed description thereof is not necessary. However, it is here pointed out that from the panel section 415 there projects rightwardly the stud 341, also shown in section 415ᵃ and which is servo-motor driven by the servo-motor 328 to position corresponding to the new setting of the adjustable contact of the resister section of the corresponding simulating section for oil. It is also pointed out that from the panel section 417 there projects rightwardly the stud 342, also shown in section 417ᵃ and which is servo-motor driven rightwardly by the corresponding servo-motor 328 of such section 417ᵃ to position corresponding to the new setting of the adjustable contact of the resister section of the corresponding resistance for water. It is also here noted that in FIGURE 51A there is a stud 418 which is driven rightwardly by the servo-motor 328 of the section 416ᵃ to position corresponding to the percent water saturation of the previously mentioned oil and water settings. Such stud might also have been shown in FIGURE 58 projecting from such Water Saturation section 416, since the servo-motor to drive such stud is contained in such panel; but since such stud is not needed in the panel arrangement now being described it is not shown in F'GURE 58. It is, however, shown in the circuitry of FIGURE 69. It is also shown in another operational procedure presently to be described and which is illustrated in various figures. In each such case such stud is used for a setting operation, and it will be shown and described in connection with such other use.

Next, in FIGURE 58 there are shown the two wheel-like elements 419 and 420, in vertical alignment and having their lower perimetral portions in proximity to the projecting studs 341 and 342, respectively. These wheels carry numerous stops which can be pressed rightwardly by the corresponding studs 341 or 342 to positions dictated by the amounts of projection of such studs produced during the correctional operations of the sections 415ᵃ and 417ᵃ, so that, under servo-motor drive each of such studs 341 or 342 will press a stop rightwardly to a position wherein such stop's adjustment corresponds to the $K_o$ value or to the $K_w$ value which has just previously been calculated by such section 415ᵃ or 417ᵃ, as the case may be. Having thus driven such stop of the wheel rightwardly, during a short time interval before the next similar operation shall occur, such stud shall be withdrawn leftwardly out of the way of the wheel with which it cooperates, to its zero non-interfering position, and before it is again driven rightwardly to position to correspond to the value of $K_o$ or $K_w$, as the case may be for the simulating unit next to be tested and re-set. During such short interval both of the wheels are advanced and then locked in their new angularly adjusted positions, for an interval during which correctional operations are produced for both $K_o$ determination, Water percent Saturation Determination, and $K_w$ determination, for the next tested simulating unit, and the studs 341 and 342 are now driven rightwardly to positions corresponding to the values of $K_o$ and $K_w$ for such next being tested simulating unit; then the operations are repeated, the wheels being again advanced a small angle, brought to stop and locked in such newly advanced positions, etc.

Such wheels and their stops are so designed that each stop when so driven rightwardly will be locked against retrograde or leftward returning movement, so that as each stop is thus set to its position it will be retained there for the time being. However, spring means is provided for urging return of each stop leftwardly to its original or base position, and there is provided means to release each stop to its leftward position when the set position of such stop has been transferred to a corresponding adjustable resistance element, so that by such transferring operation the adjustable resistance element has now been brought to a condition of adjustment (as to its resistance value) corresponding to the position at which its stop had been set during the preceding testing operation. Thus, the stops of the wheels 419 and 420 constitute information storing elements, and store such information until all of the simulating units of the network have been tested and calculations made on the basis of such tests, thus progressing through the entire areal extent of the simulating network; and then, when proper operations have been produced, all of such so-set stops serve to dictate to the corresponding adjustable resistance elements the values which they shall assume and act on during the tests of all of the simulating units next to be produced over the entire network.

Each of the wheels 419 and 420 is journalled for rotation step-by-step. Each includes a series of identical stop elements and operating means in connection therewith, such stop elements being spaced equal angularly around the inside of the rim of such wheel. Thus, in the showing of FIGURE 59, which is a face view of one the wheels, looking rightwardly thereof, there are provisions for ninety such stop units, spaced 4 degrees centers, and such wheel is advanced four degrees at each intermittent step, held stationary during an interval while its stop is being set to its new position corresponding to the resistance value which has been calculated to be correct, based on the tests of the corresponding simulating unit, locked in such so-advanced position, and the stud 341 or 342 corresponding to such wheel is then retracted leftwardly to its base position, clear of the wheel's perimeter, and the wheel is then again advanced another step of four degrees, and the operation thus repeated.

It is thus evident that the successive stop elements carried by each wheel are successively brought into register with the stud 341 or 342 as the case may be, so that the successive setting operations are produced on successive stop elements corresponding to definitely synchronized simulating units of the network. In other words, as the test operations proceed over the area of the network, so too the wheels advance to bring successive stop elements into position synchronously with the testing of the simulating units. Such testing of such units proceeds according to a predetermined plan or pattern; the stop elements of the wheels always correspond to particular ones of such simulating units.

It is thus evident that each of the wheels 419 and 420 must carry a number of the stop elements and actuating means therefor corresponding to the number of simulating units included in the network. Accordingly, each such wheel must be of diameter such as to provide sufficient perimeter to such wheel to accommodate such number of the stop elements and actuating means. Otherwise it is possible to provide a multiplicity of such wheels, each carrying a portion of the total stop elements and actuating elements therefor, with means to bring such wheels successively into position for actuation by the studs 341 and 342, respectively. We contemplate such multiple wheel embodiments as being within the scope of our invention.

We shall presently disclose the construction and mode of operation of such stop and actuating means therefor in combination with transfer means to effect transfer of the setting of each stop to a corresponding re-setting of the adjustable contact of the adjustable resistance element which corresponds to such stop.

It is also noted that both of the wheels 419 and 420 must be advanced simultaneously, step-by-step in order to ensure that both the oil and water simulating units shall be properly synchronized for each test operation. As shown in FIGURE 58 we have provided a ring gear around each of the wheels 419 and 420, being the ring gears 421 and 422, together with a common drive gear meshing with both such ring gears, being the drive gear 423. Such common drive gear may be intermittently advanced for each step-by-step operation an amount to produce the proper wheel advances. In the arrangement shown in FIGURE 58 and elsewhere we have provided for such purpose a "stepping" motor 424 drivingly connected to the drive gear 423. Such stepping motors are presently well known in the electric motor arts. One such construction of motor is known as the Ranseen type, being disclosed in Letters Patent of the United States, No. 2,797,346, issued June 25, 1957. In that type of motor there are provided, generally, three stator and corresponding rotor sections, with a magnetizing coil for each such stator section. The arrangement is such that by energizing such stator coils according to one progression of coil energizations, such as "A," "B," "C," "A," etc., rotor rotation occurs in one direction, whereas by energizing such stator coils in a reversed order of progression, such as "A," "C," "B," "A," etc., the direction of rotor rotation is reversed. Also, such motors are produced wherein the excitations of the successive stator coils slightly overlap so that at no time is there a loss of control of the rotor's angular position. Thus, for operation of such type of motor it is only necessary to provide means to deliver to the stator coils impulses in an order of progression according to the desired direction of rotor rotation, and in number proper to produce the necessary number of rotor advances each such advance being of exactly known angular amount, so that exact angular positioning of the rotor is produced by the control of the impulses delivered to the stator coils. We have therefore made provision, as will hereinafter appear, to deliver to such stepping motor 424 the proper number of impulses, and according to the progression needed to ensure rotor rotation in direction to properly advance the two wheels 419 and 420. We shall disclose such means hereinafter.

It is here noted that such wheels do not shift axially, but only advance angularly as explained. It is also noted that the arrangement should be so proportioned that one full rotation of each wheel is produced corresponding to the scan of all of the simulating units, being a full scan of the simulated reservoir. By so doing each of the stop elements, previously re-set to proper position corresponding to the test of the corresponding simulating unit, will be returned to its original position of angular status.

Corresponding to each of the stop elements carried by each wheel is an adjustable resistance element or section which is to be set, at conclusion of the scanning of the entire field, to resistance value corresponding to the stop which is its partner, and which was re-set to proper position during the operations previously described. That is, there is such an adjustable resistance element corresponding to each of the stop elements already referred to. These resistance elements are carried by a shiftable element which can be moved into engaging position with the corresponding wheel 419 or 420, as the case may be, to thus cause the adjustment elements of all of the resistance elements carried by such shiftable element to move into engagement with their corresponding stops, to thus cause such adjustment elements of the resistances to shift to positions corresponding to the stops. Such shiftable element is thus laterally shiftable towards and from the corresponding stop element wheel, but is not rotatable. Since the wheel has made a full rotation during the scanning of the simulating units and has come back to its original position, each of the stops carried by such wheel is now in lateral or axial registry with the corresponding adjustable resistance element. Accordingly, by shift of the shiftable element with the resistance sections which it carries, into proper engagement with the stop carrying wheel, each such stop will act to shift such adjustable element of the resistance which corresponds to such stop, to a re-set position corresponding to the previously set position of such stop. Having made such transfer of information to the adjustable element of the resistance, such shiftable element, with its resistances now re-set to positions corresponding respectively to their companion stops, is returned to its original position of disengagement from the wheel. Provision is also made for releasing each of the stops from its previously set position, to allow it to be restored to its original or base position, ready to receive a new resetting to the same or some other setting, either lower or higher than its previous setting, as dictated by the results of the test of the simulating unit.

Such shiftable elements are shown in FIGURE 58 at 425 and 426 corresponding to the wheels 419 and 420, respectively. FIGURE 60 is a left-hand face view of one of such elements. The resistance sections whose value is to be re-set at conclusion of a field scanning operation are shown at 427 in outline. The settable stops of the wheels are shown at 428 also in outline. It is here shown that such settable stops are carried by the inner surfaces of the wheels, extending inwardly radially from such surfaces, whereas the resistance elements are set against the outer surfaces of the shiftable elements, extending outwardly radially from such outer surfaces. Also, that such shiftable elements are of smaller diameter than the corresponding wheels, so that, during a transferring operation each shiftable element may be run axially into the body of the corresponding wheel. During this movement each of the resistance elements is brought into radial register with its corresponding stop element of the wheel so that inter-operation of the stop carried by the wheel and the adjustable resistance element carried by the shiftable element 425 or 426, as the case may be, can occur. Having thus re-set such adjustable resistance element to position corresponding to its companion stop, such shiftable element, carrying the adjustable resistances, and with its thus re-set resistance elements, is returned by rightward shift to its normal position, being the position shown in FIGURE 58. The details of such stop mechanism and of such adjustable resistance elements, will be described hereinafter (see FIGURES 61 to 68).

It is thus seen that each of the wheels 419 and 420 rotates step-by-step without axial movement, whereas each of the shiftable elements 425 and 426 reciprocates axially, but does not rotate. By such relative movements it is possible to produce setting of each of the entire group of stops to position corresponding to tests of successive simulating units, leaving all of the resistance elements in unchanged value positions, and, after all of the stops have been set to their new positions as determined by such tests, it is possible to bring all of the resistance adjustments to new positions corresponding to such stop settings, by a single quick operation. It is also possible to produce the successive settings of all of the stops carried by each wheel by use of a single servo-motor operation, under control of the proper calculating elements, and with a single set of calculating elements. It is also possible to avoid use of any slip rings or other moving contacts between the resistance elements carried by the shiftable element, and other elements of the circuitry, all connections between such resistance elements and such other circuitry being by use of a multiple conductor cable flexible enough to accommodate the small distance of back and forth shift of such shiftable element.

Conveniently both of the wheels 419 and 420, and both of the shiftable elements 425 and 426 are carried by a stationary stand 429 having the two stiff shaft rods 430 and 431 projecting towards the wheel 419 and shiftable element 425, and towards the wheel 420 and shiftable element 426, respectively. The left face of each wheel is closed by a plate 432 to which the lefthand end of the corresponding rod 430 or 431 is secured. Such rods are journalled for rotation in the stand 429. Each such plate 432 is provided with holes 433 around its peripheral portion, spaced according to the spacings of the successive stop elements, and located at positions radially from the wheel's axis such that as the wheel progresses step-by-step one of such holes will register with the stud 341 or 342, as the case may be, to thus allow such stud to move through one of such holes and to act on the aligned stop which is carried by such wheel, and lies to the right of such face plate 432.

Each of the shiftable elements is provided with a sleeve 434 slidably journalled on the corresponding rod 430 or 431, so that such sleeve and the shiftable element of which it comprises a part may be shifted back and forth, and so that the rod shaft on which such sleeve is mounted may rotate as its corresponding wheel rotates, step-by-step. Also, it will be seen from examination of FIGURE 58 that the peripheral flange portion of each shiftable element is connected to the corresponding sleeve by a broad conical radially extending flange 435. Such flange is, in each case, so designed and located that the corresponding shiftable element may be run into the corresponding wheel element across substantially the full width of such wheel element, without jamming against a collar 436 secured to the shaft rod. A pin 437 extends rightwardly from such flange 435 of each wheel and is freely reciprocable in a corresponding tubular element 438 carried by the stand 429. Thus each of the shiftable elements is retained against rotation but is allowed to shift axially.

Such axial shift of each of the shiftable elements is produced by a stepping motor operation. For this purpose a toothed rack 439 is secured to the bottom surface of each of the sleeves 434. A stepping motor 440 is mounted on a bracket 441 carried by the stand 429, and a pinion 442 secured to the shaft of each such motor engages the corresponding rack. Thus each of the shiftable elements 425 and 426 may be shifted back and forth by impulses delivered to the stator coils of the two stepping motors.

The stepping motor 424 as well as the two stepping motors 440, are controlled by the delivery of impulses to the stator coils of each of them in progression and number proper to produce the intended movements of the wheels 419 and 420, and of the shiftable elements 425 and 426. These motor movements are properly interwoven into other functional relations of the system according to the requirements of the operational program to be produced. We shall hereinafter disclose operational connections between such motors and other elements to ensure proper sequence of overall operations.

Reference is now made to FIGURES 61 to 68 in which are shown various details of the particular constructions of settable stop unit, and adjustable resistance element, carried by the wheels 419 and 420, and by the shiftable elements 425 and 426, respectively. These are shown as embodying simple arrangements, largely mechanical in construction and operation, and as readily disclosing various functional relations which are used in the operational scheme so far chiefly described. Other arrangements may of course be substituted for those now to be described.

FIGURES 61 and 62 show, on larger scale than FIGURES 59 and 60, quadrant face views of the wheel construction and the shiftable element construction, respectively. Both of these views are looking towards the right-hand faces of the respective elements, but without showing of details thereof. FIGURES 63 to 68 show various elevations and sections through the stop and resistance elements on larger scale than FIGURES 61 and 62.

Each stop unit includes a base or frame member of generally angle-shape, 443, secured to the inner face of the wheel rim 444. Such frame 443 is provided with the end flanges 445 and 446 at its left-hand and its right-hand ends, respectively. The shaft 447 is journalled in such end flanges. A stop block 448 is set onto such shaft for free rotation thereon. Both the shaft and such stop block are threaded with a large pitch screw thread, and the lower portion of the block is of rectangular form so that its bottom and left-hand (when viewed as in FIGURE 64) surfaces may ride on the bottom surface of the frame member and against the inner surface of the wall of the frame member, respectively, thus retaining such block against rotation when the shaft is rotated; or conversely, retaining the block against rotation when it is forced endwise, and thus causing the shaft to rotate during such endwise shift of the block. Also, the shaft is shouldered at its left end to set against a shim 449 which spaces the shaft endwise, and a retaining pin 450 is set through the right-hand end of the shaft to retain such shaft against rightward withdrawal until such pin is removed.

A ratchet wheel 451 is secured to the right-hand end portion of the shaft. The teeth of such ratchet wheel face as shown in FIGURE 64, and a small pawl 452, pivoted to the upper portion of the wall of the frame member, is spring pressed into tooth engaging mesh with the ratchet. The right-hand (when viewed as in FIGURE 64) end of such pawl may be raised to release the pawl from the ratchet, thus permitting the ratchet and the shaft to rotate counter-clockwise, viewed as in FIGURE 64. A spiral spring 453 is mounted on the left-hand end portion of the shaft (see FIGURE 63), the inner end of such spring being secured to the shaft, and the outer end of the spring being held stationary. This spring is so set onto the shaft that it urges shaft rotation counter-clockwise when viewed as in FIGURE 64.

It is now evident that by forcing the block rightwardly when viewed as in FIGURE 63, the shaft must rotate clockwise, the ratchet and pawl permitting such operation; but likewise such ratchet and pawl will retain the block in its most rightwardly moved position until at a later time the pawl is raised to release the ratchet. When that is done the spring will rapidly rotate the shaft and thus run the block leftwardly until the zero or base position of such block is reached. The means to thus release the pawl will be disclosed presently. The time needed for such return movement of the block will be small, probably less than a second.

There is a stop lug 454 extending upwardly from the block 448, and one of the holes 433 in the peripheral portion of the front plate 432 of the wheel registers with such lug, so that when the stud 341 or 342, as the case may be, is driven rightwardly (in FIGURE 58) it will move through such hole and drivingly engage such stop lug 454, and will drive such stop lug rightwardly to an extreme position corresponding to the amount of rightward drive of such stud 341 or 342 under servomotor drive. Thus the stop lug will be brought to a set position corresponding to the determined value of $K_o$, or of $K_w$ (or of water saturation) as the case may be. Such stud will then retain such set position until it is positively returned to its base position by release of the pawl 452. Such release is produced by the leftward movement of the shiftable element to its extreme leftward position, and after transfer of the setting of the adjustable resistance has been completed. It is noted that the ratchet teeth should be small enough to ensure retention of the block at correct position, and without excessive back lash when the drive of the stud 341 or 342 is discontinued.

The wall of the frame member 443 is provided with a raised portion 455 as shown in FIGURES 64, 65 and 67 which has one end portion of its right-hand end slanted to produce the cam edge 456 against which a pawl element of the adjustable resistance element will engage during the lateral shift of the shiftable element, as presently to be explained.

The adjustable resistance elements or units are carried by the outer peripheral surface of each of the shiftable elements 425 and 426. Such surface comprises the flange 457 in each such shiftable element. Thus such adjustable resistance units project radially outward as shown in FIGURE 60. Each such unit comprises a generally angular element having the top 458 set against and secured to such flange 457; and such unit also includes the right-hand side wall (see FIGURE 64), 459, and the ends 460 and 461. It is here noted that since all four of the adjustable resistances for each side (oil and water) of each simulating unit must be adjusted to a common resistance value (when using the operational scheme shown in FIGURE 38), the unit now being described is long enough to accommodate such four adjustable resistance elements. Accordingly, the shiftable element 425 or 426 must be of axial dimension substantially four times as great as the axial dimension of the corresponding wheel. However, the actual adjusting of shifting movement of the adjustable contact for any such resistance element is only the length of such element (plus a slight over-run to enable complete disengagement of such adjustable contact from its resistance element). Accordingly, the axial or width dimensions of the adjustable elements and wheels are as shown in FIGURE 58 and also in FIGURE 63 now being described.

The four resistance elements are shown at 462, 463, 464 and 465 in FIGURE 63. Conveniently they are all mounted on suitable insulating sleeves carried by a supporting rod 466. Such supporting rod is then set into the ends 467 and 468 of a U-shaped sheet metal bracket 469 which bracket is then secured to the top of the frame element 458 already described. By this arrangement it is possible to build and bring into adjustment of winding the four element resistance section, and then insert it to such frame member as a unit.

The screw-threaded shaft 470 is journalled in the two end flanges 460 and 461, and preferably the flange elements 471 and 472 are set onto such shaft to prevent end play thereof. In this connection such shaft is shouldered at its left-hand end to accurately space such flange 471; and a pin 473 is set through the projecting end of such shaft to prevent rightward shift of the shaft and unintended removal thereof from the frame element.

The four contact carrier blocks 474, 475, 476 and 477 are screw-threaded on such shaft 470 by a large pitch screw-thread. Also, the right-hand (see FIGURE 64) surfaces of such blocks are flat and ride against the right-hand surfaces of the frame member, thus retaining all of the contact-carrying blocks against rotation. Each block has an insulating plate 478 secured to its top surface, and a flexible contact 479 is carried by such plate and engages the resistance element. A conventional flexible lead connects to each contact and to the proper circuit element.

One of the blocks (the left-hand one in the embodiment shown in FIGURE 63) has the downwardly extending lug 480 which depends low enough to be well engaged by the upwardly extending lug from the block 448. Such lug 454 lies to the left-hand side of such lug 480. Accordingly, the rightwardly driven position of the lug 480 serves to dictate the position finally to be assumed by the block 474 through engagement between the lugs 454 and 480. Furthermore, since the shaft 470 is screw-threaded to such block 474 it follows that such shaft will be rotated to a position corresponding to such setting of the lug 480. Also, since all of the blocks 475, 476 and 477 are screw-threaded to such shaft they too will be set to positions exactly corresponding to the position of the block 474. Thus all four of the contacts will be set to positions to cause their contacts to engage the several resistance elements at points of like resistance value.

Such shaft 470 also carries a ratchet wheel 481 having its teeth facing against clockwise rotation of the shaft; and a small pawl element 482 is pivoted to the top portion of the frame element 459 as shown in FIGURE 64, a light spring serving to urge such pawl into engagement with the ratchet teeth. The left-hand (see FIGURE 64) portion of such pawl element will be engaged and raised by the riding of the cam edge 456 under such pawl element to release the ratchet at the proper time in the cycle of operations, as presently explained. Thus all of the adjustable contacts for all of the resistances will be retained in adjusted position until released by release of such pawl. The spiral spring element 483 has one end connected to the shaft 470 and its other end held stationary. This spring urges rotation of the shaft clockwise (viewed as in FIGURE 64). Thus, during the setting setting operation rightward shift of the lug 480 with corresponding counterclockwise rotation of the shaft 470 may occur, the pawl riding over the teeth and serving to retain the shaft in its most rightwardly set position. Upon release of the pawl the shaft may rotate clockwise to allow the blocks to be run to their fully leftward positions.

The wall 459 of the frame element 458 is provided with a downwardly extending flange 484 whose lower edge portion is extended leftwardly (FIGURE 64) for enough to move under the right-hand end of the pawl 452 which controls the release of the shaft 447 under spring urge. Such lower edge portion 485 has its left-hand portion cammed downwardly, thus enabling such edge portion to ride under the pawl and produce the desired raising operation thereon.

The following sequence of operations is produced by the elements above described:

Normally the shiftable element stands far enough to the right to entirely clear the flanges 455 of the wheel elements so that wheel rotation may be produced without interference from such flange elements. It is thus apparent that in FIGURES 67 and 68 the shiftable element has been shifted somewhat towards the wheel element to which it corresponds. Assuming that a test operation has been going on, and that the numerous simulating units have been successively under test, the wheels have been advanced step-by-step and their adjustable stop elements 454—448 have been successively set rightwardly by amounts corresponding to the relative permeabilities determined for the various simulating unit resistance sections. As each such rightward setting occurs its stop lug 454 will remain in set position due to engagement of the pawl 452 with the ratchet 451 corresponding to such lug. Finally, the simulated field having been completely scanned, the wheels will have come around to their original or "home" positions, their stop lugs retaining such set positions. Thereupon the cycling elements presently to be described will function to transfer such settings of the studs to like settings of the adjustable contact elements of the resistance sections corresponding to the lugs. Such transferring operation will then proceed as follows:

The two wheels will remain locked in their final positions to which they have returned during the transferring operations. This will assure against false transfers of the settings to the wrong resistance sections. Next the stepping motors 440 will be actuated a proper number of electrical impulses to shift the two shiftable elements into engagement with their respective wheels 419 and 420. As such movement of the shiftable elements occurs under stepping motor drive the rate of such drive may be controlled by control of the rate at which the impulses are delivered. As the face of the shiftable element comes to the right-hand face of the wheel to which it is companion, each of the resistance sections carried by such shiftable element will enter the wheel with its outer or larger radius portion travelling close to the inner or shorter radius portion of such wheel. Presently the lug 480 carried by the resistance section will approach the lug 454 which had been set to its new position. If such new position of the lug or stop 454 is farther to the right than was its previous setting (corresponding to the set of tests just completed) the lug 480 will contact such stop before the leftward movement of the shiftable element has been completed. In such case further leftward movement of such shiftable element to its final position of full engagement with the wheel will result in the following operations: The lug 480 will engage the stop 454 and be arrested but the shiftable element will continue its leftward movement to termination of such leftward movement. Thus the shaft 470 will be rotated to set the adjustable contacts to new positions of engagement with the resistors. Thus each adjustable contact will be in engagement with its resistor at a position farther from the left-hand end of such resistor than before. If, on the contrary, the new and present position of the stop 454 is farther to the left than it was previously, then at completion of the leftward movement of the shiftable element none of the blocks 474, 475, 476 or 477 will yet be shifted from its previously set position. Such re-setting will, however, be now made in the following manner:

A short distance of travel of the shiftable element prior to completion of such travel leftward the left-hand end portion of the pawl element 482 (see FIGURE 64) will engage the slanting portion of the flange 455 (see FIGURE 67), thus raising such pawl from engagement with the ratchet wheel 481, and releasing such ratchet wheel, and allowing the spring 483 to quickly run all of the blocks 474, 475, 476 and 477 leftward (FIGURE 63) until the lug 480 comes into engagement with the stop 454, whereupon such shifting will cease. Thus the adjustable contacts will be set farther to the left than before, and each will engage its resistance element at a point closer to the left-hand end of such resistance element than before. It is here also noted that the lug 455 does not extend leftward far enough to retain such pawl in raised condition for more than a short travel of the shiftable element, so such pawl will drop back against the ratchet wheel after a very short amount of leftward travel of the shiftable element. However, by delivering the impulses to the stepping motors 440 slowly during this operation, and providing a rather stiff spring 483, the pawl 482 will be held in its raised position long enough to ensure release of the ratchet wheel 481 and full run of the block 474 with its lug 480 into engagement with the stop 454 which stop is still in its position of setting presently being used for the re-setting of the adjustable contacts of the resistance elements. Up to this stage of the operations the pawl 452 for the ratchet wheel 451 has not been released, so that the stop 454 is still in its position presently correct for re-setting of the contacts.

Just before the shiftable element reaches its most leftwardly moved position (FIGURE 63) the flange 435 will run under the right-hand end of the pawl 452, raising the same and thus releasing the shaft 447 for spring drive to restore the block 448 to its most leftward position, previous to a new rightward setting of such element, with its stop 454, to correspond to a new test to which the simulating unit represented by the resistance section presently being adjusted corresponds. Thus, in any case the adjustable contacts of the resistances simulating relative permeabilities or other factors will be set to new positions corresponding to the calculated results of the just completed set of tests conducted during the scanning of the entire area under study. Also, each of the adjustable contacts of the resistance elements for the entire field so studied will be thus re-set to its now correct position, all such re-settings occurring simultaneously and in a very short time.

After the foregoing leftward shifting of the shiftable element to its fully leftward position it is to be returned to its rightward position where it normally stands during the conduct of the set of tests now to be conducted for each of the simulating units, again over the entire area being studied. To effect such return movement pulses are delivered to the stepping motors 440 in sufficient number, but in reversed sequence so that such motors will be driven in reverse direction. This will be further explained when the cycling means is described.

It is here noted that during the returning movement of such shiftable element the pawl lug 482 for the ratchet 481 must be movable out of the way from the flange 455 so that such returning movement of the shiftable element will not again raise such pawl and thus interfere with the operations just previously explained. To this effect we have shown the small trigger element 486 pivoted to the main body of the pawl at the point 487 (see FIG. 64A).

Such trigger element is normally held in its extended position shown in FIGURE 64 by a light spring (not shown), and is in contact with a stop 487ª which prevents backward (towards the observer in FIGURE 64) movement, but allows such trigger to drag by reason of rock of such trigger on such pivot against the urge of such spring. Thus, during return of the shiftable element the pawl 482 will remain in locking engagement with the ratchet 481, and the shaft 470 will be retained against improper rotation by its spring 483.

The right-hand ends of the shafts 470 may be provided with hand grip buttons 488 carrying pointers 489 to be read in comparison with the scales 490ª. By turning these buttons the adjustable contacts of the resistance elements may be pre-set at the beginning of a series of tests of a reservoir field to those relative permeabilities and/or other factors which should be thus pre-set. When such pre-setting requires shaft rotation in direction contrary to that permitted by the engagement of the pawl 482 with its ratchet wheel 481, such pawl may be temporarily disengaged from the ratchet manually.

It may be desired to provide means to control the various operations previously explained by various of the units thus far described by automatic control and programming means which, when set into operation will cause the various operations, resettings, etc., to be produced for successive sets of the tests, the calculations, the re-settings, the production of desired records, etc., without manual attention or control. We have provided such control and programming means, and have shown the same schematically in FIGURE 69 to which attention is now directed:

In FIGURE 69 we have, for purposes of simplicity and to avoid needless duplication of wiring, etc., shown only three of the simulating units by block showing at 490, 491 and 492. Each of these units includes the elements shown in FIGURE 36 and elsewhere, and the means illustrated in FIGURE 69 includes the necessary elements for producing interconnections between these units as portions of the simulating network, according to the principles already explained in detail. Also, various of the connections to elements of such simulating units, necessary to the conduct of the tests and to ensure proper re-setting operations, are shown in FIGURE 69. We have hereinbefore referred to the fact that the simulating units themselves may be used for the desired tests and for producing and delivering desired information, by more than one operational procedure. One such procedure has been explained in detail. Another such operational procedure will also be explained herein. The schematic programming arrangement shown in FIGURE 69 is usable with such first and already described operational procedure.

The elements shown in FIGURE 58 are reproduced on much smaller scale in FIGURE 69, including the wheels 419 and 420 and the shiftable elements 425 and 426. Also are reproduced the stepping motors 424 by which the wheels 419 and 420 are advanced intermittently, and 440 by which the shiftable elements are shifted leftwardly to effect the transfer operation, and then rightwardly to restore such shiftable elements to their original or "home" positions. The leads from the plugs which shall be inserted into the multiple contact sockets 396 (oil) and 397 (water) (see FIGURE 56) of each of the simulating units are brought to the corresponding resistance elements for oil and for water carried by the shiftable elements 425 (for oil) and 426 (for water), respectively; and, as already explained, since such shiftable elements do not rotate but merely exercise a comparatively small lateral shift back and forth, it is possible to effect the connections of such leads to the proper points of the resistance elements carried by such shiftable elements by use of flexible cables, and without need of any sliding or like contacts. Thus, in FIGURE 69 such connections are shown as permanent and not sliding connections.

From each of the simulating units there must be taken a connection and lead from either or both of the points 215 and/or 216 (see FIGURE 36) to test formation pressure. Also leads must be connected to the terminals of such of the small resistances as are indicated opposite to the numerals 204 and 206 in FIGURE 36 in order to test oil and water rate, respectively. In the present case we have provided one such lead connected to either 215 or 216, and have also provided two leads from each of the connections 187, 188, 189 and 190 by which the simulating unit in question is connected to its four neighbors, each such pair of two leads being connected to the sides of an opening in such connections 187, 188, 189 or 190, instead of using the jacks shown in FIGURE 36. Each such pair of leads is shown in FIGURE 56, being there brought down to the jacks 406, 407, 408 and 409 by which the direction of flow unit may be inserted into the showing of that figure. In the connections shown in FIGURE 69 all eight of the leads thus provided at the sides of the breaks in such connections 187, 188, 189 and 190 have been brought to a switching unit, presently to be described, and from such unit the proper ones of such pairs may be used in connection with the single leads already mentioned as being connected to the small resistance elements for the oil and water rates, for testing potential drop across such small resistance elements for determination of oil and water rates, respectively. It is, however, here noted that in the operational procedure previously explained, and which is schematically shown in FIGURES 51–51A, 52 and 53, it is not necessary to test the rate of water flow, but only the rate of oil flow through the simulating unit in question. Accordingly, in FIGURE 69 are shown only the two leads testing the oil rate, being the two leads connected into the unit 413$^a$ of FIGURE 69. The Pressure Gradient may be determined by use of one of the leads from the points 215 or 216 as one terminal, and with use of the lead from the far end of the fixed resistance of the resistance section whose pressure gradient is being tested, as the other terminal.

It will by now be understood that the set of units 411$^a$ to 417$^a$, serve all of the simulating units, one at a time, such service including the making of the required tests of potentials, performing the necessary calculations, to determine the $K_o$ value, the percent water saturation, and the $K_w$ value, all for such unit, and delivering the results of such calculations in the form of projections of the studs 341, 342, and 418 (343). It will also be seen that provision has already been described of means to store up or register the results of such calculations of the values of $K_o$, percent water saturation, and $K_w$, and provision has also been made for transfer of such stored data to the proper resistance sections, by a single fast transferring operation effected after all of the simulating units have been scanned according to a pre-selected pattern of such scanning. It will also now be evident that since the testing of the successive simulating units is a progressive operation, it is necessary to provide means to effect connection of the proper electrical elements of each simulating unit to such units 411$^a$, 412$^a$, 413$^a$, etc., of the cabinet. It is also necessary that such operations be properly synchronized with the advancements of the two wheels 419 and 420, so that the results of the tests and calculations shall be transferred to the correct adjustable resistance elements or sections. We have provided the switching unit 493 of FIGURE 69, and shown in detail in FIGURES 70 to 75, inclusive, to effect the proper connections of the elements of the successive simulating units to the sections 411$^a$, 412$^a$, etc., of the equipment, step-by-step as required. We have also provided a single control and programming means in connection with all such elements, to ensure correct relative functioning of the various elements, and to ensure proper interconnections of them step-by-step and in proper synchronism. We next refer to such switching unit as shown in FIGURES 70 to 75, inclusive, as follows:

Such switching unit includes the two stationary sections 494 and 495 facing each other but separated from each other to accommodate a step-by-step rotary advancing switch element 496. All three such elements are carried by a common rod or shaft 497 suitably supported stationary. The section 494 is the signal input section, the section 495 is the signal output section, and the section 496 is the signal transfer section establishing connection from the proper terminals carried by the input section to the output section for each step of advance of the transfer section. At each step of advance a complete set of leads from one of the simulating units is placed in connection with the single corresponding set of output leads which in turn are connected to the proper terminals of the sections 411$^a$, 412$^a$, 413$^a$ and 414$^a$. Thus the leads coming from each simulating unit are in turn connected to the corresponding input leads of such sections 411$^a$, 412$^a$, 413$^a$ and 414$^a$ to ensure testing and calculating of the desired factors, and corresponding to such particular simulating unit so under test. The input section 494 thus carries a complete set of input terminals corresponding to each of the simulating units to be served by such switching unit. On the other hand the output section 495 carries a single set of the necessary output terminals connecting to the sections 411$^a$, etc., so that as the step-by-step rotary section 496 is brought to its successive stepped positions each of the set of simulating unit terminals is connected to the sections 411$^a$, etc., and retained in such connection for a sufficient length of time to ensure correct functioning of the electronic or other elements needed to produce the proper output values, and to ensure delivery of such output values to the stops of the wheels 419 and 420. To the foregoing ends the following further structural elements are included:

FIGURE 70 which is a quadrant face view looking at the inside or right-hand face of the section 494 shows the radially extending sets of terminal button contacts 498$^a$, 498$^b$, 498$^c$, etc., corresponding to the input leads of three simulating units such as those shown at 490, 491 and 492 in FIGURE 69. Here it is also noted that the eight leads from the four interconnections 187, 188, 189 and 190 by which the simulating unit in question is connected to its neighbors, are also brought to such input section 494. It is thus possible to provide for operation of the direction of flow indicating unit of FIGURE 37 for each simulating unit.

In FIGURE 73, which is a right-hand face view of the output section 495 we have shown the output terminals which shall be connected by the rotary section 496 to each of the sets of input terminals in succession. To this end the rotary section 496 is provided with through conductors 499 corresponding to the radial positions of the input and output terminals. Corresponding to each of the output terminals there is provided on the left-hand or inner face of the output section 495 a set of circular contacts 500. Each of such circular contacts is connected to one of the output terminals, and the right-hand end of each through conductor 499 is continuously in contact with the corresponding circular contact and thus always in contact with the corresponding output terminal shown in FIGURE 73. The three upper output terminals shown in FIGURE 73 connect to the sections 411$^a$, 412$^a$, 413$^a$ and 414$^a$ of FIGURE 69 so that the necessary input signals for corresponding calculating operations are ensured. The eight lower terminals shown in FIGURE 73 connect to the direction of flow indicator 501 shown in FIGURE 69. In this connection we have also made provision for producing a continuous record of the percent water saturation of the simulating units as calculated for each test, and corresponding to each simulating unit, and also for producing a continuous record of the resultant direction of flow of the liquid contents through each such simulating unit as tested. Such a unit is shown in FIGURE 69 as follows:

The recorder 502 is provided with means to advance the paper strip 503 towards the observer step-by-step with the testing and calculating of data for each simulating unit in turn. Between such steps such paper strip preferably remains stationary. The longitudinally extending lines 504 define percentages water saturation. The stud or pin 418 (343) for percent water saturation projects leftwardly over the surface of the paper strip and carries a suitable pen or stylus 505 which will mark on the surface of the paper strip at that location corresponding to the then calculated water saturation percent, and by proper timing of the paper strip advance it is possible to thus produce a slightly elongated mark for each such water saturation recording as shown by the marks in FIGURE 69. Thus, by examination of such a record it is possible to quickly see how the percent water saturation is varying as successive simulating units are tested. If, as in the showing of FIGURE 69, such percentages are progressively becoming smaller, the student of the record can draw corresponding conclusions, based on his knowledge as to the manner in which the scanning is being progressed, whether across the field from one side to the other, or lengthwise of the field from one end to the other.

We have also, in FIGURE 69 shown the vertically reciprocatable direction of flow indicating stamp 501 mounted above the paper strip and adapted to print on the face of such strip a line, such as one of the lines 508 indicating the direction of flow of the liquid contents moving through the simulating unit in question for the corresponding test. This unit 501 is of the type and mode of operation of the unit shown in FIGURE 37. It is connected by eight lines to the terminals legended on FIGURE 73 so that it is actuated directionally according to the resultant of the simulating currents entering and leaving the simulating unit under test. Study of these lines 508 will thus enable the user of the equipment to quickly determine and to plot charts of the flow or stream lines for the liquid contents, oil and water, over the full area of field covered by the tests. It is not deemed necessary to illustrate and describe in full detail the construction of such printing unit, as many forms and kinds of such units are presently available in the arts. It is, however, necessary that such unit include means such as shown in FIGURE 37 for determining and indicating the resultant direction of flow, such as based, for example, on the resultant of the several currents whose effects are brought together in the device shown in FIGURE 37. The supporting device by which such unit 507 is carried will also be provided with means to depress such unit after it has reacted to the resultant of the four currents simulating the four simulated rates of liquid flow through the four connections 187, 188, 189 and 190 connected to the simulating unit under test.

The central rotary signal transmitting section 496 of the switching unit shown in FIGURES 70 to 75, inclusive, is provided with an annular gear element 509 with which is engaged the pinion 510 of a stepping motor 511. By delivering pulses to such motor in proper timing with respect to other functions to be performed, the switching unit will produce the proper sequence of connections between the successive simulating units and the sections 411ª, etc. Also, by delivering pulses to the strip driving motor 512 which drives the recorder strip 503, in proper timing, both of such elements will be advanced in synchronism with other operations to produce the desired functions and recordings.

It is now apparent that the desired programming and cycling of various units may be produced by a proper system of pulse delivery to the stepping motors 424, 440 (two motors), 511 and 512. We shall next describe the schematic showing of such means, by further reference to FIGURE 69, as follows:

Each stepping motor has three leads to be successively served (the common return lead not being shown in the schematic showing of FIGURE 69 since it is not necessary to bring such lead to the programming control unit). We have shown the pulse delivering rotary element, conveniently shown as a disk, 513ª, of radius to accommodate the three leads for each of the motors 424, 511 and 512, and another set of three such leads for the two motors 440. Such two motors may be served by a common set of leads since they must at all times remain in exact synchronism. Thus there are shown the twelve leads 513, 514, 515, 516, 517, 518, 519, 520, 521, 522, 523 and 524 coming to the disk 513ª. These are provided with contact brushes indicated by the arrow heads on the disk contacting ends of such leads. Preferably such contact brushes engage the disk surface on a radius line, but this is not necessary. The disk is supplied with current of one polarity, and each of the motors to be served has its common return line of opposite polarity. Over the face of such disk are the exposed contact surfaces 525, arranged for the engagement of each contact brush, in circular fashion around the disk. The disk areas other than such contact surfaces are insulated. Thus the contact areas are schematically shown by the lines 525 already referred to.

At this point it is mentioned that the sets of input contacts 498ª, 498ᵇ, 498ᶜ, etc., of the switch unit section 494 are spaced angularly from each other far enough to provide non-signal transmitting spaces between them. The contacts of the programming disk 513ª may be so related that the stepping motor 511 will produce a pause of predetermined duration at each such blind space between the sets of input contacts. It has also been mentioned previously herein that the pulse delivering means for the stepping motors may be so designed and constructed that the impulses delivered to the successive stator coils shall overlap so that the rotor is at all times under positive magnetic control; and also so that even when a pause of indefinite duration is to occur, such rotor may be locked against movement by retaining current on the last coil pulsed during preceding operation. Thus there is no danger that the motor and the switch element 496 may get out of phase relation during any such intermediate stoppage of rotation. With this preliminary statement, let it be assumed that at start the rotary switch unit 496 is in its contacting position for the previous simulating unit. The next operation produced by the programming disk 513ª will deliver pulses to the motor 511 to drive the rotary switch element to its non-contact engaging position, just referred to. In such position, the shiftable elements 425 and 426 having been returned to their rightward positions at some previous time when the previous complete scanning of the field had been finished, the studs or pins 341 and 342 will have been retracted fully, as will hereinafter appear, so that the wheels 419 and 420 can be advanced such angle as to bring the next set of stops of such wheels into alignment with such studs or pins. Thus the units are now ready for the testing and calculations to be performed for the next simulating unit. Therefore, after advancing the rotary element of the switching unit to its open-circuit position, the next pulses shall be delivered to such motor 424 for advance of the wheels 419 and 420 into registry with the studs or pins 341 and 342.

The next operation will be to again advance the rotary element of the switching unit to bring the contacts of the next simulating unit into circuitry with the units 411ª, 412ª, etc. Thus the disk 513ª is provided with a next set of pulse delivering contacts for the motor 511. As soon as the rotary switch element has been thus advanced and the circuitry for the next simulating unit established, the tests and calculations for such presently connected simulating unit will proceed with great rapidity, and result in drive of the studs or pins 341 and 342 to new positions corresponding to the relative permeabilities of oil and water for such present simulating unit (and also drive of the stud or pin 418 for percent water saturation to its new position). At the same time the motor 512 will be pulsed to drive the recorder sheet a slight distance to produce the water saturation record on the paper strip, and the direction of flow unit 507 will be depressed to record such direction as an arrow on the paper strip in proximity to such water saturation record. Thus all of the desired records will be produced, and also the studs or pins for $K_o$ and $K_w$ will have set corresponding stops of the two wheels to their new positions.

Next, the contacts on the disk 513a in radius to engage the leads for the motor 511 for the next pulsing of such motor will come to the brushes for such motor, and deliver the pulses needed to drive such motor a further amount to advance the rotary switch element 496 to its next open circuit position. Thereupon the studs or pins 341 and 342 will be again retracted, permitting pulses delivered to the motor 424 to again advance the two wheels to their next position, and the operation will be thus repeated until all of the simulating units have been tested, calculations made, and proper recordings of data produced; it being assumed also that the wheels will have just completed their full rotative cycles.

It now remains to produce the operations needed to effect transfer of the settings of the stops of the two wheels to their companion shiftable elements. By causing the final operation of the motor 511 to advance the rotary switch element 496 to its open circuit position so that the studs or pins 341 and 342 are retracted the shiftable elements 425 and 426 may be moved into the wheels 419 and 420 to effect the desired transfers of recorded resister settings to the resistances carried by such shiftable elements. Then, having thus advanced the rotary switch element to its open circuit position, suitable contacts of the disk 513a will deliver pulses to the two motors 440 (for the two shiftable elements) to drive such elements leftwardly into the wheels and effect the desired transfers of adjustable resistance settings. Then, by delivering pulses to such motors 440 in reverse sequence and number proper to return such shiftable elements, they will be returned to their rightward positions, the adjustable contacts of all of the resistance sections having been set to their new settings as determined by the disclosures already fully described.

At this point it is mentioned that the stepping motors may be designed to produce small angular advances for each successive pulse. For example, when each of the stator sections is provided with thirty teeth, and each of the corresponding rotor sections is also provided with thirty teeth, with the teeth of the three sections staggered relatively to each other so that at each pulse delivered to a stator coil the rotor teeth of a section are drawn into registry with the stator teeth of the same section, there must be provided ninety pulses per revolution of the motor. Accordingly it is evident that usually there will be several or a considerable number of pulses delivered to each of the motors to produce the desired angular advance thereof, according to the function such motor is producing. Accordingly, although in FIGURE 69 we have shown only a single set of three contacts producing only three pulses, for each illustrated motor operation, still there will in actuality generally be a number of repetitive sets of the contacts to provide a corresponding number of pulses for each motor operation, as required by the operation.

We have mentioned that in order to cause each of the studs or pins 341 and 342 to be retracted to its base position to allow the wheels 419 and 420 to be advanced without interference from such elements the control or local circuits of the proper servo-motor sections may be "short-circuited" temporarily. In fact a complete short-circuit is not needed for each such operation, and the presence of the resistors such as 354 may be used to limit the currents flowed during such operations. We have provided means in the switch unit of FIGURES 70 to 74 and 75, inclusive for producing the desired connections to produce such functions after each simulating unit has been tested, and during the advance of the switch unit to its position intermediate between such just completed test operation and the next test operation to be produced.

Thus, in FIGURE 70 we have shown, at radius positions proper for engagement by the through connectors 499 corresponding to the three outermost sets of terminals, and between each set of the input terminals 498a, 498b, 498c, etc., the contacts 526, three in number at radial distances outward from the shaft proper to be engaged by the corresponding brushes 499 at the intermediate positions. Each set of three of these contacts is connected together by the line 527 so that each time the rotary switch element 496 comes to its position halfway between the contacts for successive simulating units, the three lines 528 leading to the sections 411a, 412a, 413a, and 414a are directly connected together for the duration of a pause produced at such position of the rotary switch element 496 long enough to enable the studs or pins referred to to be restored to their base positions.

It is also noted that since all of the leads from the circuit openings in the connections 187, 188, 189 and 190 (see FIGURE 56) are brought to the input side of the switch unit, being the element 494 of FIGURE 75, all of the connections between adjoining simulating units are thus broken, subject to control at such switch unit shown in FIGURES 70 to 75, inclusive. With the arrangements thus far described the only ones of such connections 187, 188, 189 and 190 which would be properly joined together at such switching unit would be those for the particular simulating unit under test. Therefore the network would, in such case be rendered inoperative since the remaining simulating units would not be connected together into the network. To meet and remedy this condition we have made the following provision:

Referring to FIGURE 74, which is a face view of the left-hand face of the rotary element 496, and looking in the direction shown by the arrows in FIGURE 75, we have provided the pairs of brushes 529 and 530 extending towards the right-hand or inner face of the stationary element 494, and in radial registry with the corresponding contacts of the eight lines coming from such connections 187, 188, 189 and 190 for each simulating unit, so that such pairs of brushes engage all of such line contacts for all of the simulating units except for the particular simulating unit presently under test. Such pairs of brushes are directly connected together by the short lines 531. Thus, whenever the rotary element stands in its operative or testing position for any simulating unit, and with the eight lines from that simulating unit connected through such rotary element to the sections 411a, 412a, 413a and 414a for the test operations, the eight lines for each of the other simulating units are properly connected together in pairs by such brushes and such connections 531 to restore the intended connections of each simulating unit of the network to all of its neighbors.

The contact disk 513a is driven in convenient manner, preferably but not necessarily at uniform speed. In FIGURE 69 such drive is shown by the synchronous motor 532 supplied over the lines 533 and 534. Any suitable control may be provided for terminating motor drive. However, it may sometimes be found desirable to provide for termination of such drive, and corresponding termination of the operations of the various units of equipment, upon the happening of some event, such as the attainment of a "breakthrough" of the water drive, resulting in a sudden rise of percent water saturation as indicated by the chart produced by the recorder 502.

Conveniently the conduct of a series of tests of the simulating units might include the start of such series of tests at a critical point of the field under study; for example, at one corner or at the location of the water drive injection well. Then the scanning might proceed over the area of the simulated field, simulating unit by simulating unit according to a preselected pattern, to termination of the entire series of unit tests upon arrival, for example, at the simulated production well. The pattern selected for such a progress might include advance crosswise of the field from simulating unit to simulating unit in successive rows, approaching the production well as the successive rows of simulating units were tested. Upon completion of such series of tests of the individual simulating units the data thus obtained, including percent water saturation determined for each simulating unit, could be brought into recorded form to enable ready analysis of the operations revealed by such test series and such scanning of the entire field. Such analysis could include plotting of lines of equal percent water saturation across the field from simulating unit to simulating unit. It could also include the plotting of stream lines of flow of the liquid contents, oil and water, between the injection and production wells. It could also include production of lines of equi-potential across the field, shown either as actual formation pressure lines, or as lines of equal percent of the total pressure differential between the injection and production wells. Other forms of data collation could be produced, as will suggest themselves to the student of this specification.

An important objective which is facilitated by use of our disclosed equipment is the ability to produce such results as previously suggested for successive scans of the entire field, all such successive scans being produced according to a common spatial pattern of simulating unit tests so that the results of such successive scans may be readily compared. Such comparison will reveal the progress of increasing percent water saturation, over the entire field. Such comparison will also reveal the effectiveness of sweep of the injected drive agent, generally water, and provide information from which to modify the injection or secondary production program, for further tests.

At this point we call attention to the fact that the percent water saturation and the direction of stream line flow existing for each simulating unit for each test are visually recorded on the recorder unit shown at 502. We have also provided means to produce, for each test of each simulating unit, a permanent record of much additional information and data, the specific recording means including the use of punched cards. It is evident, however, that any other suitable record producing means may be used, within the scope of our disclosures, deriving its data and information from the successive simulating unit tests. Thus we do not limit ourselves to the particular record producing means herein illustrated or disclosed, except as we may do so in the claims to follow.

Since we are able, by use of the disclosures already exposed herein, to produce the tests of the simulating units by series of such tests, each such series including tests of all of the simulating units between a starting point and a terminal point, it is also possible to conduct successive series of such sets of tests, as already evident. For this purpose it is convenient to use an arrangement of control of the various stepping motors or other drive elements, in which each rotation of the disk 513ᵃ or equivalent element shall cycle all of the simulating units in progression determined by the delivery of the successive signals for motor control, for the simulating units in the intended order of progress. Thus, such disk would in such case be of size to carry contacts in groups, each group including the contacts needed to successively pulse the several stepping motors through all movements needed to produce a complete test of a simulating unit. In the case of equipment having provision for simulating, say 500 areal bodies of the real field, such pulse producing unit would thus include contacts for each of such 500 simulating units. Alternatively, such pulse delivering means might comprise a magnetic tape arrangement, with such tape provided with signal producing means for the successive pulses to be delivered to the several stepping motors in proper progress of advance. In any case, however, provision must be made for delivering the pulses to the motors 440 for actuation of the shiftable elements 425 and 426 at conclusion of each complete set or series of tests, so that the corrected resistance values will be produced in all of the adjustable resistance sections for conduct of the succeeding set or series of tests.

With provision for such repetition of complete series of tests over the entire field, already referred to, it may be desirable to make provision for termination of the operations thus automatically produced, upon the happening of some event. Such event might be the drive water breakthrough already mentioned, and as evidenced by a sudden rise of the percent water saturation to a pre-selected value. Accordingly we have made provision for stopping the cycling operations, and also for giving a signal of such high percentage condition, as shown in FIGURE 69. In this case the stud or pin 418 which is driven leftward with increase of percent water saturation carries a shouldered projection 535 which, when such stud or pin has been projected leftward a pre-selected amount, corresponding to such high limit of percent water saturation, will engage a flexible contact 536 of the switch element 537 to close a circuit. Such circuit includes the relay 538 having the solenoid 539 which is controlled by such switch 537, to raise the armature of such relay when the switch closes due to attainment of the high percent water saturation pre-selected. Such relay includes the normally closed contacts 540 and 541 which are included in the line supplying current to the drive motor 532. Upon energizing such solenoid the motor circuit will thus be opened, and will remain open until the happening of some other event.

Such relay also includes the normally open contacts 542 and 543 which will be closed by the raising of the armature due to attainment of such high percent water saturation condition. A signal element, such as the lamp 544 is controlled by such contacts 542 and 543, and will signal, by its illumination, the termination of cycling due to the attainment of the operating condition which is conclusive. Further testing may, if desired, be conducted by closing the switch 545 which will then bridge the contacts 540 and 541 of the relay, thus re-commencing motor operation, and corresponding cycling.

Consideration has been given to the effect of the Formation Volume Factor (see curve 351 of FIGURE 50, and the companion curve 351ᵃ of that figure) on the rates of oil and water component flow through the simulating unit under test; and we have also shown how a correction of such rates of flow may be and is produced by use of our already described equipment to produce a value of the true or corrected rates of flow of such components. Such corrected flow rates have then been used for determination of the values of $K_o$ and $K_w$ then existing in the simulating units so tested and subjected to such corrections. Such corrections are proper and valid to the extent that they make available information on the basis of which such values of $K_o$ and $K_w$ are correct on the assumption that the distribution of fluid flows, and the stream lines depicting such flows remain unchanged and are correctly depicted under the so-corrected rates for oil (and water, if desired). Thus the results of tests conducted as previously explained herein, and the data derived from such tests, are approximately true and correct and thus sufficiently dependable for many practical studies and analyses to be conducted on such equipment. However, the following further explanations are now in order:

The potentials of various points of the network produced by the interconnected simulating elements, and the values of the resistance sections of such units, directly affect the distribution of currents through the many branches of the network. Change of the resistance value of any such branch must be accompanied by changes of current values and potentials of numerous points of the network, to restore the condition of balance over the ensemble. The effects of such a change at any selected point could be determined mathematically only by the solution of exceedingly complex equations, or of many such equations.

Since the effect of such a correction of "rate" as we have provided dictates that the current flow through the oil (or water) branch would actually be different from that indicated by the value of the measured current flow through such branch, if no provision is made for actually effecting a change of such current flow conformable to such indicated "correction" then the measured potentials and current flow values at other points of the network will not exactly represent the actualities of the operation. Still, as stated above, such inaccuracies as will exist due to the failure to actually modify the current flows through the branches for oil and water will generally be of proportion not greater than errors of value of the paramaters on which the whole operation is conducted, and will thus not be sufficient to condemn the tests.

However, it is possible to actually produce corrections in the values of the current flows based on tests incorporating such corrections as we have been discussing. Such further corrections shall involve the actual discharge of a portion of the current from each branch of each simulating unit, oil and water, for return of such portion of current without flow thereof through other elements of the network beyond the location of such discharge of such element of current, such current being returned to the return side of the circuitry through conductors independent of the network conductors. The portions of current so diverted and returned to the current drive source should be proportionate to the formation volume factor corrections, serving to reduce the current values representing oil and water by proportional amounts, so that the values of the currents then delivered to successive simulating units of the network would be correspondingly reduced. Such overall progressive reductions of current will also reduce the drive potentials, or gradients through successive simulating units by corresponding amounts. Thus, in making such corrections by actual diversion of current from each branch so that it does not then flow through other successive simulating units, a new operational condition will be produced over the simulation field. Upon now conducting a set of further tests based on such revised network a new complete set of data will be obtained from which still further and more refined tests and data may be obtained; to thus finally, after two or three such readjustments and new sets of tests, a condition of distribution of currents through all branches of the network, both oil and water, will be obtained requiring no further readjustments.

In FIGURE 56 we have shown the branch lines 546 and 547 connected to the points 215 and 216 of the simulating unit, respectively. Each of these lines 546 and 547 feeds through an adjustable impedance, such as a pure resistance, 548 or 549, to its terminal conductor 550 or 551, as the case may be, to the return side of the electrical system. An ammeter or other instrument 552 or 553 is included in each such line arrangement, and the adjustable contacts 554 and 555 may be set to bring the current values which are drained away from the network through such connections, to those amounts needed for correction of the remaining current values through the oil and water branches as determined on the basis of correction for Formation Volume Factor.

Considering further the application of the Formation Volume Factor correction depicted in FIGURE 50, to the oil side the portion of the oil flow simulating current to be drained from the network through the correction lines 546—550 and/or 547—551 (see FIGURE 56) should be that portion of the total current represented by the change in value of formation volume factor, between the values of the curve 351 corresponding to change in value of the formation pressure between the points of entrance of the fluid into and exit thereof from the simulating unit in question. For example, if the formation pressure at entrance to the simulating unit represents 1000 p.s.i.g., and at exit represents 750 p.s.i.g., then the corresponding change in value of the Formation Volume Factor between the points "A" and "B" of FIGURE 50, curve 351, corresponding to change of formation pressure during flow through such simulating unit, would be from 1.240 to 1.215, a change of 0.025 of the total formation volume factor. This amounts to a change of 0.025 out of the total of 1.240, or 2.015 percent. Thus, of the oil simulating current entering such simulating unit, substantially 2.015 percent should be drained away at the location of such unit.

We have previously shown that when making the correction for Formation Volume Factor by use of such a unit as that shown in FIGURE 53, such correction unit should function to make correction according to the total reduction in the value of the correction factor due to reduction of pressure from the point of injection to the location of the simulating unit in question. On the contrary, when the correction is made by drainage of a portion of the current from the network at the location of the simulating unit, the amount of correction to be thus made should be in proportion to the differential of the values of such Formation Volume Factor produced during flow through the simulating unit in question.

To produce such correction we have shown in FIGURE 53A an additional correction unit 414$^d$ which produces a potential between the two contacts 633 and 634 of a potentiometer 635 proportional to the change in the value of the Formation Volume Factor between such points as "A" and "B" of FIGURE 50, curve 351. This unit 414$^d$ is as follows:

The potentiometer 635 (FIGURE 53A) is formed to produce changes of potential along its length, measured from its high or from its low potential end, proportional to the changing values of formation volume factor along the curve 351 of FIGURE 50, corresponding to equal increments of physical movement of a contact along such potentiometer from end to end thereof, such equal physical movements corresponding to equal changes of formation pressure. The ends of such potentiometer should then be connected by the lines 637 and 636 to the lines 368 (low) and 360 (high) of FIGURE 55. Then by setting the contacts 633 and 634 to points physically corresponding to the formation pressures at the oil entering and departing locations of the simulated reservoir body, the potential between said contacts 633 and 634 will simulate the percent or portion of the loss in oil volume during flow through the simulating unit. This will also be a simulation of the percent or proportion of current to be drained from the network by the drainage branch 546—550 (for the oil simulation), FIGURE 56.

An exact operation based on the foregoing principles should include provision for effecting both such formation pressure tests, together with means to produce corrections of the positions of the contacts 633 and 634, individually. Such an arrangement might include the provision of the bridges 640 and 641 of the type shown in FIGURES 51, 51A, 52 and 53, and elsewhere. Such a refined arrangement is contemplated; but it is possible to produce a correction operation closely approximating such individual adjustment arrangement in the following manner:

Since the spacing between the two contacts 633 and 634 is dependent on the pressure gradient between the faces of the simulating unit at which the liquid arrives to and departs from the unit, a compromise value of such pressure gradient may be used, taking into account the fact that the gradients near the injection and producing wells are much greater than elsewhere. By assuming a uniform gradient of value considerably higher than that in the central portion of the reservoir, but also less than that near the injection and producing wells, and connecting the contacts 633 and 634 (see FIGURE 53B) together physically by a non-conducting link 633$^a$ of proper length, a single driving bridge servo-motor may be used to drive both of such contacts step-by-step from position to position, as the successive simulating units are tested. In any case it must be remembered that the tested potential between the arriving and departing faces of the simulated reservoir body is an increment of the total drive potential through such reservoir, and that the summation of all such increments along any selected flow path between the injection and production locations must be equal to the actual total potential between such drive and production locations, namely, between the lines 360 and 361 (or 362) for the produced oil or water (see FIGURE 55).

It is also noted that when using the correction operation by drainage of small portions of the current from the network, the total drive potential will be less than that required when such drainage is not produced. Accordingly, under this more exact form of correction based on formation value correction or shrinkage, the potential through the network required to produce the specified rate of production of oil (or water) will be less than that needed when no drainage of current is produced, as in the earlier described means for producing the correction for shrinkage. The automatic means for adjusting the drive voltage, such as shown in FIGURE 55, will ensure such drive voltage changes as needed from time to time, to continuously produce the specified rate of oil (or water) production.

If necessary transducers, such as shown at 638 and 639 may be included in the lines 414$^b$ and 414$^c$ leading from the contacts 633 and 634 to other elements of equipment.

The following comments are also pertinent respecting the corrections based on Formation Volume Factor:

*First.*—Means similar to the foregoing disclosures may be provided in connection with the water simulating elements.

*Second.*—If the current flow simulating one component only, be corrected by draining a portion of the oil simulating current from the system, it is evident that the current flow through the water side will also be disturbed. This is true since in each simulating unit the water and oil branches are joined together by the connectors 183, 184, 185 and 186 at which points potentials of both water and oil branches must be balanced.

*Third.*—If desired, corrections of actual current flows through the simulating units may be effected in the connectors 187, 188, 189 and 190 by draining from such connectors the calculated portions of current corresponding to the sum, in each case, of the corrections (drained currents) for both the oil and water components in the corresponding simulating unit; the amount of current thus drained for each component being determined according to the principles already explained herein. For such a combined drainage arrangement, we have shown in FIGURE 56, schematically, the leads 639, 640, 641 and 642, connected to said connectors 187, 188, 189 and 190, respectively.

The operational procedure conducted by use of the equipment specially shown in FIGURES 56 to 75, inclusive, includes the use of the adjustable impedance branches for the oil and water (and, if desired, gas) components flowing through each of the simulating units, together with means to test each unit during a set of tests scanning the field, and the re-setting of such impedance's adjustments for corrected values corresponding to the relative permeabilities as revealed during each such test. Specifically, such thus far described operational procedure includes the ascertainment of the value of $K_o$ based on the known value of the viscosity of the oil under the conditions of pressure existing in the formation, and the tested "rate" of the oil component through the simulating unit. Then, such operational procedure reveals the percent water saturation based on the curves available disclosing the relation of percent water saturation to such relative permeability for oil; and then such operational procedure includes the revealing of the value of $K_w$ corresponding to such percent water saturation. We shall next describe another operational procedure also of simple nature, under which alternative procedure much of the equipment thus far described may be used, including the use of the simulating units provided with the adjustable impedance branches for the two (or three) components, and related equipment of various kinds. Such alternative operational procedure is as follows:

Instead of determining the relative permeability for the oil component first, and from it, determining the percent water saturation (and from such water saturation determining the relative permeability for water), our alternative operational procedure includes the direct determination of the percent water saturation by a special procedure, and, having such value of percent water saturation it is then possible to directly determine the relative permeabilities for both the oil and water components independently of each other. In other words, by the first operational procedure the determination of the relative permeability for oil (or water) precedes the determination of the percent water saturation, and the determination of such percent water saturation is dependent, for accuracy of determination, and other qualities, on the original accuracy of the determination of the relative permeability for oil (or water, if the operation is reversed, as well it may be in some cases). Thus, the determination of the relative permeability of the one component lies at the base of such operational procedure. On the contrary, or alternatively, by our alternative operational procedure, the percent water saturation is first made, and the relative permeabilities of the oil and water (and gas) components are then based on such so-determined percent water saturation. Thus the operational sequence is reversed.

Under certain conditions the first and already described operational procedure is most desirable; under other conditions, the reverse may be true. But basically, both procedures include much of the same elements of equipment for their conduct. Thus, when we use the terms "first operational procedure" and "alternative operational procedure" we do not intend to express a preference for the one or the other procedure, except as we may do so by other language or statements.

Referring to FIGURE 36 in particular, it is evident that the fluid flows between neighboring simulating units must occur through the connections 187, 188, 189 and 190 by which each simulating unit is connected to its neighbors ahead and behind it, and to the right and left of it. Also, that the algebraic sum of the flows through all four such connections must equal zero, except as modified by any Formation Volume Factor, applicable to the simulating unit under test. That is, there will be as much output from as input to such simulating unit, but modified, as stated, by any correction factor necessary due to changes occurring in the formation. At this time we are concerned with liquid flows, oil and water, and not gas flows, except as the gas may be in solution in the liquids present. Our present concern is to determine what the present water saturation is in the simulating unit now under test. Knowing what were the amounts of water and of oil originally present in such simulating unit (and based thereon, the original percent water saturation in such unit) it is possible to determine the present percent water saturation as follows:

By determining the increments of water added, either positively or negatively, and the increments of oil added, either positively or negatively, to the amounts previously in such simulating unit, the present totals of water and of oil will be determined, and by comparison of the total of water with the total of both water and oil the percent water saturation presently in such unit will be immediately revealed. Then the present relative permeabilities of oil and of water can be immediately determined by use of data such as supplied by the curves 144 and 145 of FIGURE 24.

It is noted that the above outlined operational procedure requires that the increments (either positive or negative) of the oil and the water be separately known, so that the present totals of such two components may be separately known, since the determination of the water saturation presently existing in the simulating unit is determined on the basis of comparison of total water presently in the simulating unit with the total of both water and oil presently in such unit. Thus the increments of water and oil are not to be compared, but only the totals of the components, of which totals such increments comprise parts only.

Although the liquid flows through the connections 187, 188, 189 and 190 are total liquids, both water and oil through such connections, it is possible to determine the oil and water flows separately as follows:

By measuring the oil flows through the elements 556, 557, 558 and 559 of the neighboring simulating units the increment of oil may be determined by algebraic addition of the increments of flow through such elements; and by measuring the water flows through the elements 560, 561, 562 and 563 of such neighboring simulating units the increment of water may be determined by algebraic addition of the increments of flow through such elements. (The foregoing elements, 556 to 563 are shown on both FIGURES 36 and 76, which latter will be discussed in detail presently.) It is here noted that such increments of oil and of water are quantities of such liquid ingredients added or subtracted during specified equal increments of time, in order that all such increments may be properly compared to determine the desired saturations. If such increments of quantity are to be based on rates of flow through the elements above defined by number, then the times of flow must be known; but if all such times of flow are exactly equal then the rates as such may be used for the determinations, the original quantities of oil and water contained in the simulating units being known and constituting a base on which to build the successive increments, either positive or negative, for present quantity determinations.

If the rates of flow through such elements 556 to 563 inclusive, are used as the basis for determinations of the quantities of oil and water incremental changes in the simulating unit in question, then means must be provided for algebraically adding the four amounts of each component. Such additions may of course be produced by manual operations, or by suitable automatic equipment. However, in FIGURES 36 and 76 we have shown means to effect automatic algebraic additions of the oil and water increments. Reference is first made to FIGURE 36 in this connection, as follows:

The primaries of current transformers 564, 565, 566 and 567 for the oil side, and 568, 569, 570 and 571 for the water side, may be connected to the elements 556 to 563 in two groups, one for the oil side and the other for the water side, such connections being made, if desired, by suitable jacks to temporarily divert the current flows through such primaries. Such jack elements are shown in FIGURE 36, but non-engaged by the corresponding plugs. For the oil side the secondaries of the four current transformers 564, 565, 566 and 567 are connected in parallel to the lines 572 and 573, and similarly, for the water side the secondaries of the four current transformers 568, 569, 570 and 571 are connected in parallel to the lines 574 and 575. (See FIGURE 76 for all such connections and transformers.) At this point we mention that two single-phase wattmeters are provided, one for the oil side and the other for the water side, such being shown at 576 and 577, respectively. Then the lines 572 and 573 are connected to the current coil of the wattmeter 576, and the lines 574 and 575 are connected to the current coil of the wattmeter 577. Such connections to the respective wattmeters are, however, shown as including the units 578 and 579 by which corrections in current values delivered to the wattmeters are corrected to Formation Volume Factor corrections, according to the principles already described in detail hereinbefore.

Since the secondaries of the four current transformers for the oil side are all connected in parallel, and since the secondaries of the four current transformers for the water side are also all connected in parallel, it follows that the current values delivered to the units 578 and 579 will in each case be the resultant values of currents flowing into and out of the oil side, and flowing into and out of the water side, respectively. Thus the corrected current values delivered to the current coils of the two wattmeters will also be proportional to the net gains or losses of oil or water as the case may be, in the simulating unit under test. The voltage coils of both wattmeters are connected to the same source of current supply, and are therefore equal and in phase.

It remains to show how the increments, either positive or negative, measured by such wattmeters are used for further operations in the determination of the values of $K_o$ and $K_w$, and also water saturation. The means to effect such determinations are shown on FIGURE 76, as follows:

We have shown the two stepping motors, of equal specifications to the extent that they both produce rotor angular advances of equal amount per pulse delivered to their coils. These motors are conveniently mounted with their shafts in alignment as shown in FIGURE 76. The stator element 580 of the left-hand motor is supplied with pulses under control of the water wattmeter 577. The rotor element 581 of this motor drives the stator element 582 of the right-hand motor. The stator element of such right-hand motor is supplied with pulses under control of the oil wattmeter 576, slip rings 583, 584 and 585 being provided to deliver such pulses to such stator element notwithstanding that such stator element is rotated by the rotor 581 of the motor 580. Thus the shaft 586 of the rotor 587 of the right-hand motor is rotated by an amount which is the algebraic sum of the pulses delivered by both of the wattmeters, and thus represents the total increment, water and oil, delivered during the test operation in question. On the other hand, the shaft 588 of the left-hand motor, 580, is rotated only an amount proportional to the increment on the water side.

The pulses for the two stators are delivered proportional to the rotations of the wattmeters, either positively or negatively, as follows:

For each wattmeter there is provided a rotary contactor, being the units 589 and 590 for the two wattmeters respectively. The light shafts 591 and 592 of these contactors are drivingly connected to rotary elements of the corresponding wattmeters as by the dashed line connections 593 and 594, so that each shaft executes a predetermined angular movement corresponding to a known quantity of watthours measured by its wattmeter; and both wattmeters are equally calibrated in this value. Each shaft 591 or 592 carries a light contact finger, 595 or 596, which thus rotates exactly in harmony with its wattmeter quantity measurement. Around such contact finger 595 are located, at equal angular spacings a set of stationary contacts 597 as a multiple of three, and a like set of stationary contacts 598 is spaced around the contact finger 596. The successive contacts 598 are connected in sequence to the three lines 599, 600 and 601; and likewise the successive contacts 597 are connected in sequence to the three lines 602, 603 and 604. Each of the contact fingers 595 or 596 is provided with a widened outer end contact which engages the corresponding contacts of its set 597 or 598, as the case may be, and such engagements are such as to produce slight overlaps in passing from contact to contact of either set. The lines 599, 600 and 601 connect to the stator coils of the stator element 580, and the lines 602, 603 and 604 connect to the stator coils of the stator element 582 through the slip rings already described.

It is now apparent that pulses are delivered to the stator 580 proportionately to the increment of water, if any, delivered into the simulating unit during the test interval of known time value; and also that pulses are delivered to the stator 582 proportionately to the increment of oil, if any, delivered into the simulating unit during the same test interval. The shaft 588 is thus advanced (either positively or negatively) an angular amount proportional to such water increment pulses, and the stator 582 of the oil motor will be advanced or retarded an equal angular amount. Then, the delivery of pulses to such stator 582 of the oil side will result in rotor advances or retardations of such oil side rotor with respect to the oil side stator as correspond to such oil side delivered pulses. If such pulses are in sequence for advancement of the oil side rotor with respect to the oil side stator, such pulses will be additive to the angular advances produced by the water side unit. Otherwise such pulses of the oil side will be subtractive from the pulses delivered to the water unit. In any case the water shaft 588 will be advanced proportionately to the pulses delivered by the water side wattmeter, and the shaft 586 will be advanced or retarded proportionately to the algebraic sum of the pulses delivered by the two wattmeters.

In order to simplify the further processing of the information thus made available by the rotations of such two shafts 588 and 586, we have provided a back shaft 605 parallel to the shaft 588 (and to the shaft 586), and driven by a chain and sprocket drive 606 at the same speed as such shaft 588. Thus such shaft 605 may be brought rightward parallel to the shaft 586 and to a position in line therewith, as shown in FIGURE 76.

Corresponding to the two shafts 586 and 605, and conveniently in line therewith during a processing operation, are the two cylindrical elements 607 and 608, respectively. Each of these elements is provided with a cylindrical surface groove formed with a logarithmic pitch along such element, being the two logarithmic grooves 609 and 610. The pitches of both grooves are the same. The element 608 is journalled for rotation, but is held against endwise movement. The element 607 is also journalled for rotation, but it is also capable of endwise movement of amount needed to accommodate the range of division required between zero percent and 100 percent on the scale to which the device is designed. A slide element 611 is set between the two elements 607 and 608, and is provided with radially extending pins engaging the grooves of both of the elements 607 and 608. Thus the element 607 may be shifted endwise in amount proportional to the difference between the logarithms indicated by the two elements 607 and 608. Such endwise shiftable element 607 is also provided with an encircling groove 612 which is engaged by a stud 613 carried by a slide element 614 non-rotatably mounted on the square rod 615 on which such slide element may shift back and forth through a range proportional to the zero to 100 percent range of percent water saturations. Such slide element 614 carries a contact 615ª which engages with a potentiometer 616 wound according to logarithmic variations along its length. The two terminals of this potentiometer are shown at 617 and 618, and it is supplied with a fixed and known potential between such terminals. The contact 615 is connected to the terminal 619. Thus the potential between the terminals 617 and 619 will be proportional to the log of the difference between the amounts of rotation of the two elements. The real number of such log will then be the percent which the rotated position of the element 608 (for water) (expressed as a log) is of the rotated position of the element 607 (for both water and oil) (also expressed as a log). Thus, by translating the potential delivered between the terminals 617 and 619 into real numbers, as by a suitably wound potentiometer corresponding to the potentiometer 616, it is possible to deliver a signal whose potential will be proportional to the percent water saturation.

It must now be noted that there is a unit including the two cylindrical elements 607 and 608, the slide block 611, the logarithmically wound potentiometer 616, the contact 615 and the slide 614 for each of the simulating units. Each such group unit is carried by a suitable carrier by which each such unit may be brought into correlation to the two shafts 586 and 605 during the test of the corresponding simulating unit. Conveniently all such group units are carried by a wheel and around its perimeter, so that by advancing such wheel step-by-step equal angles for successive test operations on successive simulating units, such group units will be successively brought into alignment with the shafts 586 and 605.

There is a magnetic clutch unit between each of the shafts 586 and 605, and the corresponding shafts 607ª and 608ª of the cylindrical elements 607 and 608, respectively. Each such clutch element or unit includes the section 620 in connection with the drive shaft 586 or 605, and the armature plate 621 in connection with the driven shaft 607ª or 608ª, as the case may be. These clutches may be of the type produced by Warner Electric Brake & Clutch Co., of Beloit, Wisconsin, and shown in their Service Manual for electric stationary field clutch couplings, Form No. WEB 6174. In that type the section 620 is provided with a stationary field exciting coil which, when energized produces by induction a field to draw the armature 621 against the driving element of the section 620, for driving purposes. As soon as such energization is terminated such driving effect is also terminated; and the armatures are so mounted on the driven shaft elements that slight axial shift may occur to ensure good release of the armature from the driving element. Also, such slight axial shift which is permissible in such armature plate will provide sufficient clearance between such armature plate and its companion element to allow for lateral movement of the unit which includes the two shafts 607ª and 608ª away from the two clutch elements 620ª and 620ᵇ, and permit alignment of the logarithmic computing unit for the next simulating unit to be produced so that such next simulating unit may now be tested according to the principles hereinbefore described.

It is here noted that only one of the units which includes the two wattmeters, the two units for correction due to Formation Volume Factor, the two contact and pulse producing elements 589 and 590, the two stepping motors and shafts, etc., and the two clutch sections 620ª and 620ᵇ is required since all such elements serve the entire group of simulating units in succession, the logarithmic calculating units being successively brought into registry with and magnetically engaged with the clutch sections 620ª and 620ᵇ, as already explained. It is also noted that there are provided the three stationary but flexible contacts 622, 623 and 624 carried by a stationary element and connected to proper elements of the further processing equipment. Also, that the movable element 625 which carries the logarithmic calculating sections for the simulating units is provided with terminal contacts for the lines 617, 618 and 619, which contacts engage such flexible contacts 622, 623 and 624 for production of the circuitry needed for the processing of the information and data corresponding to the logarithmic unit then in service.

The potential signal delivered between the terminals 617 and 619, corresponding to the calculated percent water saturation is delivered by the contacts 622, 623 and 624 over the lines 626, 627 and 628 into the section 629. This section is provided with means such as fully shown in various of the figures already described herein, for translating the percent water saturation signal into both the $K_o$ and $K_w$ value signals. The servo-motors of such section 629 then drive the studs or pins 630 and 631 rightwardly for re-setting of the stops such as shown in FIGURES 61 to 68, inclusive (the stud 631 is not shown in FIGURE 76 since it lies behind the illustrated stud 630). In such an embodiment the stop sections for the oil and water re-setting operations, may be located in alternation, equally angularly spaced around a single wheel. Also the adjustable resistance sections, carried by a single laterally shiftable element, may be correspondingly located in alternation, equally spaced angularly around such a single shiftable element. Since we have already illustrated and described such stop arrangements and corresponding adjustable resistance section arrangements in full detail it is not deemed necessary to include complete detailed illustrations and descriptions of the present modified embodiment thereof. The following important feature of the present modified equipment, for practice of the operational procedure to which it relates, is noted:

The operations produced by the wattmeters 576 and 577 and dependent equipment are based on incremental oil and water components, either positive or negative in nature, to ascertain the changes which have occurred in the percent water saturations present in the numerous simulating units, as compared to the percent water saturations there present during previous tests. Such incremental changes are determined by the equipment set out previously, but such incremental changes must be added to the water and oil amounts previously present in such simulating units to determine the present amounts of water and oil therein contained, and then such present amounts of water and water-and-oil must be compared to determine the present percent water saturation. Accordingly, the positions at which the two cylindrical elements 607 and 608 are brought during each testing operation must be left undisturbed until the next test occurs on that simulating unit which they represent. Then further increments, if any, of the water and oil will be measured by the wattmeters and such increments are then added (algebraically) to such previous total. Thus the operation is a continuing one, and at no time during the scanning of the entire field must any of such cylindrical elements be shifted except during the test operation presently being conducted. In fact, the settings of such cylindrical elements must not be disturbed except as just explained, until all scans of the field have been completed, to determine the manner of advance of the drive water front during a complete series of scanning operations. This is a reason why it is necessary to provide a set of such logarithmically grooved cylindrical elements, and such logarithmically wound potentiometer and other related elements corresponding to each of the simulating units to be tested.

In connection with the foregoing need of retaining the logarithmically grooved cylinders in the positions to which they have been brought by any incremental changes of water and oil, it is noted that it is not necessary to set the wattmeters or the stepping motors, or any ancillary equipment to a base position between tests on successive simulating units, since such wattmeters, stepping motors, and other equipment serve only the function of determining and delivering operations based on the increments observed during the test of the simulating unit presently under such test.

The right-hand ends of the logarithmically grooved cylinders may be provided with hand buttons 608$^a$ and 607$^a$ by which they may be pre-set at the beginning of a series of sets of tests, to positions corresponding to the known water and oil contents of the real reservoir bodies which they simulate, as far as then known, so that as the tests proceed such water and oil contents of the bodies will be brought from test to test to new simulations corresponding to the increments of such components of either positive or negative character. Such pre-setting buttons may be readily adjusted for the foregoing purposes since they may be made readily accessible as is evident from examination of FIGURE 77.

Reference is now made to FIGURE 77 to show, more or less schematically, a grouping of the various sections of the equipment used in the practice of such alternative operational procedure.

Reference to FIGURE 77 will reveal a convenient arrangement of the various sections for practice of the alternative operational procedure. The various sections there shown and legended, with the exception of that which determines the changes of volumes of water and oil in the simulating unit, and the wheel element 632 to the right thereof, are similar to and perform functions corresponding to like sections of the showing of FIGURE 58. However, in FIGURE 77 the sections there shown are conveniently arranged in a different order of physical sequence, largely dictated by the vertical dimensions of the change of volume section, and of the bottom section in which both of the relative impedance values—for $K_o$ and $K_w$—and the related elements are contained. The circuitry of the sections themselves and of the connections between various sections are fully disclosed previously herein. It is not deemed necessary to repeat such circuitry.

However, for convenience of physical arrangement, in the showing of FIGURES 77 and 78 the logarithmic potentiometers 616 (see FIGURE 76) are set above the two cylindrical elements 607 and 608 instead of below such elements (that is closer to the wheel axis than the cylindrical elements, instead of at greater radii as in the showing of FIGURE 76). Also, in FIGURE 77 both sets of the adjustable stops for $K_o$ and $K_w$ (and the adjustable resistance sections corresponding thereto) are contained in one rotary wheel and one shiftable element, being alternated around the circumferences of the wheel and of the shiftable element, so that such wheel must be advanced step-by-step by double the perimetral distances necessary in the arrangement shown in FIGURES 58, 59 and 60. Also, in FIGURE 77 the single stepping motor 424$^a$ drives the stop carrying wheel and the water saturation recording wheel in exact synchronism, instead of driving the two wheels for the $K_o$ and $K_w$ stops as in the previous arrangement. Also, only a single stepping motor 420$^c$ is needed for shifting drive of the shiftable element, since only a single such shiftable element is required in the arrangement of FIGURE 77.

It is also noted that the programming and cycling circuitry required for the alternative operational procedure is similar to that shown in FIGURE 69, but is modified to meet the requirements of such alternative operational procedure. Such modifications include provision in the contact carrying disk for delivering current to the two magnetic clutches at proper times in the sequence, no such clutches having been shown in the first described operational procedure; and such programming and cycling circuitry for the alternative operational procedure requires provision in the switching unit 493$^a$ to produce shift of the connections of the two wattmeter current responding coils from simulating unit to simulating unit, as evident for testing the inflow and outflow of the oil and water components to the simulating unit presently under test. It is believed that, in view of the extensive showings of various elements, both structurally and functionally, already included herein, further specific showings respecting the elements and connections for the equipment used in connection with such alternative operational procedure are not needed.

Reference has been made to the provision of potentiometer means to produce a signal of potential proportionate to the ordinal value of such a curve as 351 of FIGURE 50 when such curve includes a reversal of kind such as the point marked "Bubble-Point of the Oil," at pressure substantially 2600 p.s.i.g. In FIGURE 81 we have shown a potentiometer arrangement which will produce such a signal as above desired. This arrangement is as follows:

The potentiometer element 642 includes the right and left-hand sections 642$^a$ and 642$^b$, and the central terminal connection 646. The two ends of the sections 642$^a$ and 642$^b$ are connected together by the line 643, but with the additional resistor element 644 included between the section 642$^a$ and such connection 643. The high potential terminal of the current supply is connected to the point of junction 645 between the sections 642$^a$ and 642$^b$, such high potential supply connection being shown at 6. The low potential terminal is connected to the line 643, such low potential terminal being shown at 647. The sections 642ª, 642ᵇ and 644 are so proportioned that the central point 645 is maintained at the potential representing the high point of the curve 351 the left-hand end of section 642ᵇ being at zero potential, and the potential of the connection 648 between the two sections 642ª and 644 is at the potential representing the ordinal value of the right-hand end of the curve 351. Thus, while such connection 648 is at potential below the central point it is nevertheless at a potential sufficiently above zero to represent the magnitude of the ordinal at the right-hand end of such curve 351. The adjustable connection 649 may be moved fully between the location of such connection 648 and the left-hand or zero potential end of the section 642ᵇ. With this arrangement the following operations are produced:

With the adjustable contact 649 located adjacent to the connection 648 the delivered potential will be considerably above zero (depending on the relative resistance values of the three sections 642ª, 642ᵇ and 644). As such contact is moved leftwardly its potential will rise until the maximum value is attained at its registry with the supply point 645. Then, as such adjustable contact is moved further towards the left its potential will fall until it becomes zero at the left-hand end of the section 642ᵇ. By properly proportioning the variations of the resistance of the three sections such changes in delivered potential will be caused to follow the form of the curve 351, for equal increments of horizontal shift of such adjustable contact. In FIGURE 81 we have shown such adjustable contact at one of its shifted positions by the dashed line 646ª.

Reference is next made to the showing of FIGURE 82 wherein we have shown by block diagram and schematically a program for operation of a digital computer in connection with the previously described embodiments of analog nature for solution of portions of the calculations needed during the carrying forward of a study of a reservoir performance, when it is desired to perform such calculations by use of a digital computer instead of performing all of the operations, including such calculations, by the previously described equipment. In the showing of such FIGURE 82 it is assumed that the operational procedure is that already described under which the changes in values of $K_o$ and $K_w$ at the various simulating units are determined by first determining the changes in water and oil amounts contained in the simulating unit under test, by determining the algebraic increments of such changes during a specified time interval (standard for all of the simulating units), then determining the total water contained in such simulating unit at the end of such time interval, and also the total of water and oil contained therein, and then determining the percent water saturation by determining the ratio of such total water content to the total water plus oil content of the unit. Having made such determinations, and knowing the percent water saturation of the unit after such specified time lapse, reference to the curves of FIGURE 24 enable immediate determination of both the $K_o$ and the $K_w$ values, and thus the determination, by reference to the curves of FIGURE 26 the proper new settings of the resistance sections of such simulating unit.

The digital computer operations shown on FIGURE 82 are produced on the assumption that the operational procedures up to the commencement of the digital computer operations have supplied information as to the incremental changes in the oil and water contents of the individual simulating units and also information as to the amounts of water and oil, respectively, contained in the individual simulating units at commencement of the digital computer procedure. Thus, for example, the data respecting the water and oil contents of the individual simulating units at the time of commencement of the digital computer operations, may be supplied on punched cards, such as shown in FIGURES 41 and 42; and the information and data respecting the incremental changes in the water and oil contents of such units may also be supplied by sets of such punched cards, one set of such cards being produced for the individual simulating units, and corresponding to each set of tests of the units, produced by each complete scan of the simulated reservoir bodies. All this desired data is shown on such cards as that of FIGURE 41, in the columns shown on the right-hand half of such card.

The data thus made available for use in programming the digital computer is indicated at 650 in FIGURE 82. However, it is noted at the outset that the data originally supplied to the "Memory" unit of the digital computer comprises the information as to amounts of water content and oil content (and, if desired, percent water saturation) corresponding to each individual simulating unit at commencement of the operations of such digital computer. Thereafter, as the operations proceed, as the successive simulating units of the analog are scanned, and data procured based on such scans, individual punched cards are produced corresponding to the individual simulating units, such cards carrying data as to the incremental amounts of water and of oil (or of water and oil), algebraically added to the individual simulating units during such scan of the field. Having thus now procured a set of such cards corresponding to the individual units, such cards may be fed to the digital computer for processing according to the sequence and operations shown on the flow sheet of FIGURE 82. Thus, the combined operation of the analog and the digital computer would include the following sequence:

(A) Storing in the Memory of the Digital Computer the initial information as to initial values of total oil and total water for each simulating unit.

(B) The proper elements of the analog would be preset to total oil and total water values of the individual resistors the same as such total oil and water values stored in the Memory of the Digital Computer.

(C) The simulating units of the analog would next be scanned according to the same spatial pattern of scanning as was used in storing the total oil and total water data in the Memory of the Digital Computer.

(D) During such scanning of the entire field according to such spatial pattern, there would be produced punched cards corresponding to each simulating unit, each such card including data showing the increment of oil and the increment of water (algebraic in each case) added to the contents of the corresponding simulating unit.

(E) Having completed such scan of the entire field and produced such punched cards carrying such information, such cards would be fed to the Digital Computer in conventional manner, one by one.

(F) As each card was translated in the Digital Computer such computer would function according to the flow sheet of FIGURE 82, to produce, corresponding to the unit represented by such card, new punched cards (or other records) showing the new settings of the resistors as determined by the operations of the Digital Computer; or, alternately, or as a supplement to such new punched cards, voltages directly proportional to the calculated new resistor settings. Such voltages would then be fed to the analog system to produce re-settings of the various resistors, or otherwise translated, or such operations could be performed by suitable equipment under punched card control.

(G) Having thus re-set the resistors of the individual simulating units, the entire field would be again scanned according to such spatial pattern, new data procured as to the incremental amounts of water and of oil and water recorded during such new scan, etc.

Thus, according to such a combined operation, wherein some of the operations were performed by the analog and some of them by the Digital Computer, the desired series of complete sets of scans would be produced, data procured and recorded showing the new increments of oil and of water (or of oil and of oil plus water), and such data would be supplied to the Digital Computer for such computer to determine the new values of water saturation, the new values of $K_o$ and of $K_w$, and the new values of the resistances to which re-settings should be made, etc. Thus the operations would proceed for as many successive scans of the entire field as desired.

The flow sheet of FIGURE 82 shows a combined analog and digital computer operation of the general form just above described. This operation shown on FIGURE 82 may be briefly explained as follows:

The output from the analog machine, when used in the combination shown in FIGURE 82, can be considered as follows:

For each simulating unit, called $u_i$, where $i$ equals 1, 2, 3, . . . $n$, the analog machine will supply the analog voltages $V_i^o$ and $V_i^w$. These voltages represent the incremental change in oil content of the simulated body of the reservoir being simulated, and the incremental change in water and content of the simulated body of the reservoir being simulated, both during a fixed time interval. From these two voltages it is required that the digital machine (1) compute the water saturation for each simulating unit on the basis of total water content and total water and oil content of such simulating unit as caused by such incremental changes, for each of such fixed time intervals; (2) from such computed water saturation for each such simulating unit, to calculate the values of $K/K_o$ and of $K/K_w$, being the inverse values of the corresponding relative permeabilities for the oil and water components present in the several simulating units at the end of the fixed interval of time of the test on which the incremental changes were determined; and (3) feed back to the analog machine voltages directly proportional to the computed $K/K_o$ and $K/K_w$ values. The flow sheet shown on FIGURE 82 produces these operations. In view of the extensive legending shown on FIGURE 82 it is deemed unnecessary to describe the operations thereon depicted in detail.

It is now noted that when using the Digital Computer according to the combined operations above explained, or for production of all of the operations needed to produce a complete study of the reservoir by use of the Digital Computer, numerous of the electronic elements contained in such computer must be and are pre-set or pre-combined to correspond to elements of the analog equipment previously described herein. Usually such pre-settings of the elements of the Digital Computer are effected by proper patch cords used in connection with the panel or panels which are then set into electrical connection with the contacts of the Digital Computer body. Thus the electrical components of the digital computer are grouped and brought into function producing units, which, when connected together to produce a sequence of operations such as shown in FIGURE 82 respond to various "means" for producing the functions which they then perform.

The following is a mathematical analysis of the analogy of the parallel electrical resistor units herein disclosed, and the fluid flow characteristics of the two phase component mixtures, under the conditions herein considered:

(1) $$Q = \frac{KA}{mu} \frac{dP}{dL} \text{ cm.}^3/\text{sec.}$$

where:

$Q$ = quantity of fluid flow
$K$ = permeability of the formation in darcies (typically $10(10^{-3})$ to $300(10^{-3})$)
$mu$ = viscosity of the fluid in centipoises (typically 15 to 3500)
$A$ = cross-sectional area of the permeable body in cm.$^2$
$\frac{dP}{dL}$ = pressure gradient in $\frac{\text{atmospheres}}{\text{cm. of flow}}$ In practical units, (2) $$Q = 1.126 \frac{KA}{mu} \frac{dP}{dL} \text{ bbls./day}$$

where:

$Q$, $K$ and $mu$ are as defined above,
$A$ = cross-sectional area in ft.$^2$
$\frac{dP}{dL}$ = pressure gradient, $\text{lbs.}/\text{in.}^2 / \text{ft.}$ For a cubic element of volume of length L, if sufficiently small it may be written, (3) $$Q = 1.126 \frac{KL}{mu} \Delta P \text{ bbls./day}$$

where:

$\Delta P$ = pressure difference, face to face, in lbs./in.$^2$ (opposite faces assumed to lie in isobaric surfaces).

Next, under definitions, 1 per unit flow rate = $q$ bbls./day
1 per unit pressure difference = $p$ lbs./sq. in.
1 per unit resistance = $p/q$, (lbs./in.$^2$)/(bbls./day)

Then, from (3)

$$\Delta P/Q = \frac{mu}{1.126 KL} \text{ (lbs./in.}^2\text{)/(bbl./day)}$$

$$= R \text{ in practical units}$$

(4)

Also, $R$, per unit = $R$ (lbs./in.$^2$)/(bbl./day) ÷ $\frac{p}{q}$ $$= \frac{mu q}{1.126 KLp}$$

In case the elementary volume is a parallelopiped:

$$R = \frac{mu b}{1.126 Kac} \text{ (lbs./in.}^2\text{)/(bbls./day)}$$

where:

$a$ = width of elementary volume, $b$ = length of such volume, and $c$ = height of such volume.

Then, (5) $$R = \frac{mu b q}{1.126 Kacp}$$

in per unit.

Equation 5 may be a convenient form when the vertical thickness varies; however, when so selected that $a = b$, Equation 5 reduces to (6) $$R = \frac{mu q}{1.126 Kcp}$$

per unit.

The foregoing analysis is of a general nature. In the case of a two fluid flow $$Q_o = \frac{K_o}{K} \frac{KA}{mu_o} \frac{\Delta P}{L} = \frac{K_o L}{mu_o} \Delta P$$

for a cube of side L $$Q_w = \frac{K_w}{K} \frac{KA}{mu_w} \frac{\Delta P}{L} = \frac{K_w L}{mu_w} \Delta P$$

for such cube of side L $$R_o = \frac{\Delta P}{Q_o} = \frac{mu_o}{K_o L}$$

and $$R_w = \frac{\Delta P}{Q_w} = \frac{mu_w}{K_w L}$$

When R the combined value of $R_o$ and $R_w$ in parallel, $$R = \frac{R_o R_w}{R_o + R_w} = \frac{mu_o/K_o L \times mu_w/K_w L}{mu_o/K_o L + mu_w/K_w L} = \frac{mu_o \times mu_w}{K_o K_w L^2}$$

$$\times \frac{K_o K_w L}{mu_o K_w + mu_w K_o} = 1/L \times \frac{mu_o mu_w}{mu_o K_w + mu_w K_o}$$

To permit the parallel resistance analogy, the same value of R must apply to a single resistance carrying $Q_o + Q_w$. Then, $$Q_o + Q_w = \Delta P(K_o L/mu_o + K_w L/mu_w)$$

$$= \Delta P \left( \frac{K_o mu_w + K_w mu_o}{mu_o mu_w} \right) L$$

and $$\frac{\Delta P}{Q_o + Q_w} = 1/L \left( \frac{mu_o mu_w}{mu_o K_w + mu_w K_o} \right)$$

Thus, Equation 6 becomes, for the two fluid flow condition (6a)  $R_o = q/1.126 Kcp (mu_o)(K/K_o)$
$= (q/1.126 Kcp)(mu_o/K_o/K)$ and (6b)  $R_w = q/1.126 Kcp)(mu_w/K_w/K)$ NOTE: The term $(q/1.126 Kcp)$ is constant for any specific elementary volume: $mu_o$ and $mu_w$ are constant for any problem; but $(K_o/K)$ and $(K_w/K)$ are variables.

Since it is convenient to use the reciprocals of $K_o/K$ and of $K_w/K$ in determining the values of the simulating resistances, the curves of FIGURES 26 and 27 have been provided, corresponding to the relative permeabilities shown in FIGURES 24 and 25.

We claim:

1. In apparatus for simulating the drainage and flow characteristics of a porous-permeable-fluid-containing reservoir in which reservoir are contained a mixture of at least two fluid components in a changing ratio of said components and wherein the permeabilities of such fluid components to flow through a body of the reservoir are of values which vary with change in the ratio of such fluid components, one of said fluids being characterized by the quality of wetting the permeable reservoir and constituting a wetting agent of the material of said reservoir, and the material of said reservoir and of said fluid components being characterized by the fact that when the percent of the wetting agent component comprises one hundred percent of the fluid flowing through the formation the relative permeability of the formation to flow of such wetting agent component comprises one hundred percent, and also characterized by the fact that when the percent of the non-wetting agent component comprises one hundred percent of the fluid flowing through the formation the relative permeability of the formation to the flow of such non-wetting agent component comprises one hundred percent, and also characterized by the fact that for progressive reductions of the percent of each component of the mixture, the relative permeability of the formation to the flow of such component through the formation decreases, and further characterized by the fact that the permeability of the formation to the flow of at least one such component becomes zero when the percentage of such component is more than zero, means to simulate the fluid flow characteristics of said fluid mixture through a body of such reservoir, comprising a simulating unit including at least two electrically conducting adjustable impedances, one such impedance constituting a permeability simulating element for one of the fluid components and another such impedance constituting a permeability simulating element for another fluid component, means to connect said impedances together in parallel relationship including common terminal connections for both such impedances, current flow through the impedances of said unit from one terminal to the other simulating the fluid mixture flow through the simulated body of the reservoir, each of the impedances being adjustable in impedance value to simulate inverse values of the relative permeability values of the formation to flow of the component to which such impedance corresponds, for changing values of the percent of such component contained in the fluid mixture; together with means to adjust the impedance value of each of said impedances to correspond at such ratio of the fluid components, to the relative permeability of the corresponding fluid component, to flow through the simulated body of the reservoir.

2. Means as defined in claim 1, wherein each of the impedances comprises a substantially non-reactive resistance element.

3. Means as defined in claim 1, wherein the means to adjust the impedance value of each such impedance is manual.

4. In apparatus for simulating the drainage and flow characteristics of a porous permeable fluid containing reservoir in which reservoir are contained a mixture of at least two fluid components in a changing ratio of said components and wherein the permeabilities of such fluid components to flow through a body of the reservoir are of values which vary with change in the ratio of such fluid components, one of said fluids being characterized by the quality of wetting the permeable reservoir and constituting a wetting agent of the material of said reservoir, and the material of said reservoir and of said fluid components being characterized by the fact that when the percent of the wetting agent component comprises one hundred percent of the fluid flowing through the formation the relative permeability of the formation to flow of such wetting agent component comprises one hundred percent, and also characterized by the fact that when the percent of the non-wetting agent component comprises one hundred percent of the fluid flowing through the formation the relative permeability of the formation to the flow of such non-wetting agent component comprises one hundred percent, and characterized by the fact that for progressive reductions of the percent of each component of the mixture, the relative permeability of the formation to the flow of such component through the formation decreases, and further characterized by the fact that the permeability of the formation to the flow of at least one such component becomes zero when the percentage of such component is more than zero, means to simulate the fluid flow characteristics of the fluid mixture through the body of such reservoir, comprising a simulating unit including at least two sets of electrically conducting adjustable impedances, said sets simulating flows of the fluid mixture in different directions through the reservoir, each set including at least two electrically conducting adjustable impedances, one such impedance of each set constituting a permeability simulating element for a first defined one of the fluid components and another such impedance of each set constituting a permeability simulating element for another second defined fluid component, means to connect the impedances of each set together in parallel relationship including common terminal connections for both such impedances of such set, means to connect together the adjustable impedance simulating elements of all sets for the first defined fluid component intermediate between the terminal connections of said sets, means to connect together the adjustable impedance simulating elements of all sets for the second defined fluid component intermediate between the terminal connections of said sets, current flow through the impedances of said unit from at least one terminal to at least one other terminal simulating the fluid mixture flow of fluids through the simulated body of the reservoir corresponding to the direction between such terminals of such simulating unit, each of the impedances being adjustable in impedance value to simulate inverse values of the relative permeability values of the formation to flow of the component to which such impedance corresponds, for changing values of the percent of such component contained in the fluid mixture; together with means to adjust the impedance value of each of said impedances to correspond at such ratio of the fluid components, to the relative permeability of the corresponding fluid component, to flow through the simulated body of the reservoir.

5. Means as defined in claim 4, wherein the connections together of the adjustable impedance simulating elements of all sets for the first defined fluid component are connections between the central portions of such elements, and wherein the connections together of the adjustable impedance simulating elements for the second defined fluid component are connections between the central portions of such elements.

6. Means as defined in claim 5, wherein the terminal connections of each set of adjustable impedances are located substantially opposite to each other in the simulating unit.

7. Means as defined in claim 6, wherein imaginary lines extending through the terminal connections of the respective sets are non-parallel to each other.

8. Means as defined in claim 7, wherein such imaginary lines which extend through terminal connections of the respective sets extend in directions substantially ninety degrees from each other.

9. Means as defined in claim 5, wherein the means to adjust the impedance value of each of said impedances to correspond at such ratio of the fluid components, to a function of the permeability of the corresponding fluid component, to flow through the simulated body of the reservoir, includes means to cause all of the adjustable impedances of the set which constitutes a permeability simulating element for the first defined fluid component to have equal impedance values, and includes means to cause all of the adjustable impedances of the set which constitutes a permeability simulating element for the second defined fluid component to have equal impedance values.

10. Means as defined in claim 5, wherein there is a section of adjustable simulating element for each defined fluid component connected to each terminal and extending between such terminal connection and the aforesaid connections together of the central portions of the simulating elements, said sections constituting a terminal pair to simulate the permeabilities of the fluid components of the mixture flowing between the portion of the reservoir body at the position simulated by such terminal and the central portion of such simulated reservoir body, and wherein the means to adjust the impedance values includes means to adjust the impedance values of the sections of such pair to simulate the permeabilities of the reservoir body to the fluid components at the ratio of such components flowing between such terminal connection and the simulated body of the reservoir.

11. Means as defined in claim 4, wherein there are three sets of electrically conducting adjustable impedances, each set including at least two electrically conducting adjustable impedances, and wherein there are common terminal connections for both such impedances of each set, and wherein there are means to connect together the adjustable impedance simulating elements of all sets for the first defined fluid component intermediate between the terminal connections of said sets, and means to connect together the adjustable impedance simulating elements of all sets for the second defined fluid component intermediate between the terminal connections of said sets.

12. Means as defined in claim 11, wherein the connections together of the adjustable impedance simulating elements of all sets for the first defined fluid component are connections between the central portions of such elements, and wherein the connections together of the adjustable impedance simulating elements for the second defined fluid component are connections between the central portions of such elements, and wherein the terminal connections of each set of adjustable impedances are located substantially opposite to each other in the simulating unit, and wherein imaginary lines extending through the terminal connections of the respective sets extend in directions substantially ninety degrees from each other.

13. Means to simulate the drainage and flow characteristics of a porous permeable fluid containing reservoir in which reservoir are contained a mixture of at least two fluid components in a changing ratio of said components and wherein the permeabilities of such fluid components to flow through said reservoir are of values which vary with change in the ratio of such fluid components, comprising a plurality of simulating units corresponding to bodies of such reservoir, each simulating unit including electric conductor means for transmission of currents between input and output terminals of such simulating unit, means to adjust the conductivity through each simulating unit for current flow between the terminals of such unit to simulate the permeability of each of the fluid components for flow through the body of the reservoir to which such simulating unit corresponds, and means to connect together the proximate terminals of adjacent simulating units to produce an electrical network of connected units simulating the proximate and fluid flow connected bodies of the reservoir.

14. Means as defined in claim 13, wherein each of the simulating units is of polygonal form and wherein there are terminals corresponding to selected perimetral elements of the units and wherein the connected together terminals of adjacent simulating units comprise terminals corresponding to proximate perimetral elements of the adjacent simulating units.

15. Means as defined in claim 14, wherein each of the simulating units is of rectangular form, and wherein there are terminals corresponding to the four side faces of such units, and wherein the connected together terminals of adjacent simulating units are terminals corresponding to proximate side faces of the adjacent simulating units.

16. Means as defined in claim 14, wherein all of the simulating units correspond to adjacent bodies of the reservoir extending in a continuous path of fluid flow towards a point of drainage from such reservoir.

17. Means as defined in claim 14, wherein all of the simulating units correspond to adjacent bodies of the reservoir which lie within a surface substantially parallel to the formation gradient of the reservoir.

18. Means as defined in claim 14, wherein a plurality of the simulating units correspond to adjacent bodies of the reservoir which lie within a surface substantially parallel to the formation gradient of the reservoir, together with other simulating units corresponding to bodies of the reservoir not lying within such surface, and means to connect together the proximate terminals of such other simulating units and of units lying with such surface.

19. Means to simulate the drainage and flow characteristics of a porous permeable fluid containing reservoir in which reservoir are contained a mixture of at least two fluid components in a changing ratio of said components and wherein the permeabilities of such fluid components to flow through said reservoir are of values which vary with change in the ratio of such fluid components, comprising a plurality of simulating units corresponding to bodies of such reservoir, each simulating unit including at least two electrically conducting adjustable impedances, one such impedance constituting a permeability simulating element for one of the fluid components and another such impedance constituting a permeability simulating element for another fluid component, means to connect said impedances together in parallel relationship including common terminal connections for both such impedances, current flow through the impedances of said unit from one terminal to the other simulating the fluid mixture flow through the simulated body of the reservoir, together with means to adjust the impedance value of each of said impedances to correspond at such ratio of the fluid components, to a function of the permeability of the corresponding fluid component, to flow through the simulated body of the reservoir, and means to connect together the proximate terminals of adjacent simulating units to produce an electrical network of connected units simulating the proximate and fluid flow connected bodies of the reservoir.

20. Means as defined in claim 19, wherein the current flow through each of the means which connects together the proximate terminals of adjacent simulating units simulates the combined flow of the simulated fluid components between the adjacent reservoir bodies simulated by such simulating units.

21. Means as defined in claim 20, together with current responsive means in connection with selected ones of such means which connect together the proximate terminals of adjacent simulating units.

22. Means as defined in claim 21, wherein there is a current responsive and directional responsive means in connection with each such means which connect the terminals of a selected simulating unit to the terminals of adjacent simulating units.

23. Means as defined in claim 22, together with a direction of fluid flow indicator, and operative connections between said direction of fluid flow indicator and the current responsive and directional responsive means, effective to indicate a direction which is the algebraic resultant of the current flows through the means connecting together the proximate terminals of the selected simulating unit and of the adjacent simulating units, said algebraic resultant direction being the direction of flow of the fluid mixture through said selected simulating unit.

24. Means to simulate the drainage and flow characteristics of a porous permeable fluid containing reservoir in which reservoir are contained a mixture of at least two fluid components in a changing ratio of said components and wherein the permeabilities of such fluid components to flow through said reservoir are of values which vary with change in the ratio of such fluid components, comprising a plurality of simulating units corresponding to bodies of such reservoir, each simulating unit including at least two sets of electrically conducting adjustable impedances, said sets simulating flows of the fluid mixture in different directions through the reservoir, each set including at least two electrically conducting adjustable impedances, one such impedance of each set constituting a permeability simulating element for a first defined one of the fluid components and another such impedance of each set constituting a permeability simulating element for another second defined fluid component, means to connect the impedances of each set together in parallel relationship including common terminal connections for both such impedances of such set, means to connect together the adjustable impedance simulating elements of all sets for the first defined fluid component intermediate between the terminal connections of said sets, means to connect together the adjustable impedance simulating elements of all sets for the second defined fluid component intermediate between the terminal connections of said sets, means to adjust the impedance value of each of said impedances to correspond at such ratio of the fluid components, to a function of the permeability of the corresponding fluid component, to flow through the simulated body of the reservoir, means to connect together the proximate terminal connections of adjacent simulating units to produce an electrical network of connected units simulating the proximate and fluid flow connected bodies of the reservoir, together with means to produce information concerning the incremental changes of quantity of each of said components in a selected simulated body of the reservoir during a pre-determined interval of time, comprising means to measure the quantities and directions of current flow during said unit of time through each of the impedances of the first defined sets of the simulating units whose terminal connections are connected to the terminal connections of the simulating unit which corresponds to such selected reservoir body, and means to measure the quantities and directions of current flow during said unit of time through each of the impedances of the second defined sets of said simulating units whose terminal connections are connected to the terminal connections of said simulating unit which corresponds to such selected body of the reservoir.

25. Means as defined in claim 24, together with means to make a record of such information comprising a record of the incremental changes corresponding to the impedances of the first defined and second defined sets of impedances.

26. Means as defined in claim 25, wherein said record making means includes means to determine and indicate the algebraic sum of the incremental changes corresponding to the impedances of the first defined set, and means to determine and indicate the algebraic sum of the incremental changes corresponding to the impedances of both sets.

27. Means as defined in claim 25, together with means to include in the record which corresponds to the impdeances of the first defined set a pre-determined quantity, and means to include in the record which corresponds to the impedances of the second defined set a pre-determined quantity.

28. Means as defined in claim 27, wherein said record making means includes means to determine and indicate the algebraic sum of the incremental changes corresponding to the impedances of the first defined set and includes said first defined pre-determined quantity, and includes means to determine and indicate the algebraic sum of the incremental changes corresponding to the impedances of both sets and includes both of said pre-determined quantities.

29. Means as defined in claim 28, together with means to determine and indicate the ratio between said first stated algebraic sum of incremental changes including said first defined pre-determined quantity, and said second stated algebraic sum of incremental changes for both sets including both of said defined pre-determined quantities.

30. Means as defined in claim 29, wherein said ratio is the first stated algebraic sum of incremental changes including said first defined pre-determined quantity, divided by said second stated algebraic sum of incremental changes for both sets including both of said defined pre-determined quantities.

31. Means as defined in claim 24, wherein the first defined one of the fluid components is water and wherein the second defined one of the fluid components is oil.

32. Means as defined in claim 31, together with means to make a record of such information comprising a record of the incremental changes corresponding to the impedances of the first defined water permeability simulating set and a record of the second defined oil permeability simulating set.

33. Means as defined in claim 32, wherein said record making means includes means to determine and indicate the algebraic sum of the incremental changes corresponding to the impedances of the first defined water simulating set, and means to determine and indicate the algebraic sum of the incremental changes corresponding to the impedances of both the first defined water simulating set and the algebraic sum of the incremental changes corresponding to the impedances of the second defined oil simulating set.

34. Means as defined in claim 32, together with means to include in the record which corresponds to the impedances of the first defined water simulating set a pre-determined quantity, and means to include in the record which corresponds to the impedances of the second defined oil simulating set a pre-determined quantity.

35. Means as defined in claim 34, wherein the pre-determined quantity to which the algebraic sum of the incremental changes corresponding to the impedances of the first defined water simulating set is included comprises the quantity of water contained in the simulated body of the reservoir other than such incremental changes, and wherein the pre-determined quantity to which the algebraic sum of the incremental changes corresponding to the impedances of the second defined oil simulating set is included comprises the quantity of oil contained in the simulated body of the reservoir other than such incremental changes.

36. Means as defined in claim 35, wherein said record making means includes means to determine and indicate the algebraic sum of the incremental changes corresponding to the impedances of the first defined water simulating set and includes said quantity of water other than such incremental changes, and includes means to determine and indicate the algebraic sum of the incremental changes corresponding to the impedances of both the water simulating set and the oil simulating set and includes said quantity of water other than such incremental changes and includes said quantity of oil other than such incremental changes.

37. Means as defined in claim 36, together with means to determine and indicate the ratio which comprises the algebraic sum of the incremental changes corresponding to the impedances of the first defined water simulating set including said quantity of water other than such incremental changes, divided by the algebraic sum of the incremental changes corresponding to the impedances of both the water simulating set and the oil simulating set and said quantity of water other than such incremental changes and said quantity of oil other than such incremental changes, being the percent water saturation of the selected body of the reservoir simulated by such selected simulating unit.

38. Means as defined in claim 37, together with means to produce a record of the said ratio.

39. Means to simulate the drainage and flow characteristics of a porous permeable fluid containing reservoir in which reservoir are contained a mixture of at least two fluid components in a changing ratio of said components and wherein the permeabilities of such fluid components to flow through said reservoir are of values which vary with change in the ratio of such fluid components, said means including means to determine and indicate said ratio between said fluid components during drainage of said reservoir and including a plurality of simulating units corresponding to proximate and fluid flow permeability connected bodies of the reservoir, each simulating unit including means to conduit flow of a measurable medium through such simulating unit and corresponding to each of the simulated fluids of the flow through the corresponding reservoir body, means to adjust each of the simulating units to permit flow of such measurable medium through such simulating unit to simulate the flow of the fluid simulated by said measurable medium through the permeability of the corresponding reservoir body at said ratio of such fluid components, interconnections between each simulating unit and the proximate simulating units for simulation of the flow of said mixture of fluids between the proximate reservoir bodies simulated by said units, together with means to produce information concerning incremental changes of quantity of each of said fluid components in a selected simulated body of the reservoir during a pre-determined interval of time, comprising means to measure the quantities and directions of flow of the measurable medium simulating one of the fluids, between the simulating unit which corresponds to such selected reservoir body and each of the proximate simulating units to which such simulating unit is interconnected, during such pre-determined interval of time, means to measure the quantities and directions of flow of the measurable medium simulating the other one of such fluids, between the simulating unit which corresponds to such selected reservoir body and each of the proximate simulating units to which such simulating unit is interconnected, during such pre-determined interval of time, means to make a record of the algebraic sum of the quantities and directions of flow of the measurable medium which simulates such one of the fluids, with respect to said simulating unit, and means to make a record of the algebraic sum of the quantities and directions of flow of the measurable medium which simulates such other of the fluids, with respect to said simulating unit.

40. Means as defined in claim 39, together with means to include in the record of the first stated algebraic sum a pre-determined quantity, and means to include in the record of the second stated algebraic sum a pre-determined quantity.

41. Means as defined in claim 40, wherein the first stated algebraic sum corresponds to increments of water movement between said simulated reservoir body and the proximate and fluid flow permeability connected bodies of the reservoir, and wherein the second stated algebraic sum corresponds to increments of oil movement between said simulated reservoir body and the proximate and fluid flow permeability connected bodies of the reservoir.

42. Means as defined in claim 41, wherein the pre-determined quantity included in the record of the algebraic sum which corresponds to the water movement, is the amount corresponding to the water contained in the reservoir body at the beginning of said pre-determined interval of time, and wherein the pre-determined quantity included in the record of the algebraic sum which corresponds to the oil movement, is the amount corresponding to the oil contained in the reservoir body at the beginning of said pre-determined interval of time.

43. Means as defined in claim 42, together with means to determine and indicate the ratio of the algebraic sum which corresponds to the water movement including the amount corresponding to the water contained in the reservoir body at the beginning of said pre-determined interval of time, divided by the algebraic sum which includes both of such sums which correspond to the water movement and the amount of water contained in the reservoir body at the beginning of said pre-determined interval of time and which correspond to the oil movement and the amount of oil contained in the reservoir body at the beginning of said predetermined interval of time, said ratio being the percent water saturation of the selected body of the reservoir simulated by such selected simulating unit.

44. Means as defined in claim 43, together with means to determine and give an indication of the relative permeability of the reservoir body for water and the relative permeability of said reservoir body for oil corresponding to such percent water saturation.

45. Means as defined in claim 44, together with means to adjust such simulating unit which corresponds to such reservoir body to permit flow of such measurable medium through such simulating unit to simulate the flow of water through the permeability of such reservoir body at said percent water saturation, and means to adjust such simulating unit to permit flow of such measurable medium through such simulating unit to simulate the flow of oil through the permeability of such reservoir body at said percent water saturation.

46. Means as defined in claim 43, together with means to produce a record of such percent water saturation indication for such simulating unit.

47. Means as defined in claim 43, together with a signal device, and operative connections between the means which determines and indicates the ratio which is a percent water saturation and said signal device effective to cause the signal device to give a signal when said ratio exceeds a pre-determined value.

48. Means to simulate the drainage and flow characteristics of a porous permeable fluid containing reservoir in which reservoir are contained a mixture of at least two fluid components in a changing ratio of said components and wherein the permeabilities of such fluid components to flow through said reservoir are of values which vary with change in the ratio of such fluid components, said means including means to determine and indicate said ratio between said fluid components during drainage of said reservoir and including a plurality of simulating units corresponding to proximate and fluid flow permeability connected bodies of the reservoir, each simulating unit including means to conduct flow of a measurable medium through such simulating unit and corresponding to each of the simulated fluids of the flow through the corresponding reservoir body, means to adjust each of the simulating units to permit flow of such measurable medium through such simulating unit to simulate the flow of the fluid simulated by said measurable medium, through the permeability of the corresponding reservoir body at said ratio of such fluid components, interconnections between each simulating unit and the proximate simulating units for simulation of the flow of said mixture of fluids between the proximate reservoir bodies simulated by said simulating units, together with means to successively test the fluid flow operations of the simulating units, including means to produce information concerning incremental changes of quantity of each of said fluid components in each simulated body of the reservoir during a predetermined interval of time, including means to measure the quantities and directions of flow of the measurable medium simulating one of the fluids, between the simulating unit which corresponds to one of the reservoir bodies and each of the simulating units to which such simulating unit is interconnected, during a pre-determined interval of time, means to measure the quantities and directions of flow of the measurable medium simulating the other one of such fluids, between such simulating unit which corresponds to said reservoir body and each of the simulating units to which such simulating unit is interconnected, during such pre-determined interval of time, and including means to make a record of the algebraic sum of the quantities and directions of flow of the measurable medium which simulates such one of the fluids, with respect to said simulating unit, including a predetermined quantity, and also including means to make a record of the algebraic sum of the quantities and directions of flow of the measurable medium which simulates such other of the fluids, with respect to said simulating unit, including a pre-determined quantity, together with actuating means and operative connections between said actuating means and the means to measure the quantities and directions of flow of the measurable medium which simulates the one of the fluids, and between the actuating means and the said means which measures the quantities and directions of flow of the measurable medium which simulates the other one of the fluids, said actuating means and connections being constituted and effective to cause the functioning of such means, for production of the information and record concerning the incremental changes of quantity of each of the fluid components in each simulated body of the reservoir during such pre-determined interval of time in a regular order of progression from simulating unit to simulating unit.

49. Means as defined in claim 48, wherein the first stated algebraic sum corresponds to increments of water movement between said simulated reservoir body and the proximate and fluid flow connected bodies of the reservoir, and wherein the second stated algebraic sum corresponds to increments of oil movement between said simulated reservoir body and the proximate and fluid flow permeability connected bodies of the reservoir, and wherein the pre-determined quantity included in the record of the algebraic sum which corresponds to the water movement, is the amount corresponding to the water contained in the reservoir body at the beginning of said pre-determined interval of time, and wherein the pre-determined quantity included in the record of the algebraic sum which corresponds to the oil movement, is the amount corresponding to the oil contained in the reservoir body at the beginning of said pre-determined interval of time, for each such test of a simulating unit.

50. Means as defined in claim 49, together with means to determine and indicate the ratio of the algebraic sum which corresponds to the water movement including the amount corresponding to the water contained in the reservoir body simulated by such test, at the beginning of said pre-determined interval of time, divided by the algebraic sum which includes both of such sums which correspond to the water movement and the amount of water contained in the reservoir body at the beginning of the pre-determined interval of time and which correspond to the oil movement and the amount of oil contained in the reservoir body at the beginning of said pre-determined interval of time, said ratio being the percent water saturation of the simulated body of the reservoir, and operative connections between such functioning means and said ratio determining means, effective to cause the ratio determining means to determine and indicate such ratio corresponding to each simulating unit tested according to such order of progression.

51. Means as defined in claim 50, together with means to determine and give an indication of the relative permeability of the reservoir body for water and the relative permeability of said reservoir body for oil, corresponding to such percent water saturation, and operative connections between such functioning means and said relative permeability determining and indication giving means, effective to cause the relative permeability determining means to determine and indicate such relative permeabilities for water and for oil corresponding to such percent water saturation, corresponding to each simulating unit tested according to such order of progression.

52. Means as defined in claim 51, wherein the means to adjust each of the simulating units to permit flow of such measurable medium through such simulating unit to simulate the flow of the fluid simulated by said measurable medium, through the permeability of the corresponding reservoir body at said ratio of such fluid components, comprises means to adjust the means which conducts flow of the measurable medium through the simulating unit corresponding to each of the simulated fluids of the flow through the reservoir body, and includes means to adjust such measurable medium flow conducting means to permit flow of such measurable medium corresponding to varying relative permeabilities of the reservoir body to flow of such fluid components therethrough, together with operative connections between the relative permeability determining means for water and oil and the means to adjust the measurable medium flow conducting means of such simulating unit to adjusted conditions to cause said measurable medium flow conducting means to conduct corresponding to said relative permeabilities for water and oil.

53. Means as defined in claim 52, wherein the operative connections between the relative permeability determining means and the measurable medium flow adjustment means include means to make such connections inoperative, and operative connections between the means which causes the functioning for production of the information and record concerning each of the simulating units in a regular order of progression to render such inoperative making means effective at a pre-determined position in such order of progression.

54. Means to simulate the drainage and flow characteristics of a porous permeable fluid containing reservoir in which reservoir is contained a mixture of at least two fluid components in a changing ratio of said components and wherein the permeabilities of such fluid components to flow through said reservoir are of values which vary with change in the ratio of such fluid components, said means including means to determine and indicate said ratio between said fluid components during drainage of said reservoir and including a plurality of simulating units corresponding to proximate and fluid flow permeability connected bodies of the reservoir, each simulating unit including means to conduct flow of a measurable medium through such simulating unit and corresponding to each of the simulated fluids of the flow through the corresponding reservoir body, the means which conduct the flow of the measurable medium corresponding to each fluid component being adjustable to permit flow of such measurable medium through such simulating unit to simulate the flow of such fluid through the permeability of the corresponding reservoir body at said ratio of such fluid components, interconnections between each simulating unit and the proximate simulating units for simulation of the flow of said mixture of fluids between the proximate reservoir bodies simulated by such simulating units, means to measure the net quantity of each of the measurable media flowed through each simulating unit in a pre-determined interval of time and corresponding to the quantity of the reservoir fluid simulated by each such measurable medium flowed through the reservoir body in a reservoir time interval corresponding to such pre-determined simulating unit time interval, means to add to the amount of the fluid simulated by each such measurable medium and contained in the reservoir body at the beginning of the reservoir time interval, the amount of each such fluid corresponding to such net quantity of such measurable medium to determine the amount of fluid simulated by each such measurable medium and contained in such reservoir body at the end of the reservoir time interval corresponding to the simulating interval of time, means to determine the ratio of the amount of one of the fluids contained in the reservoir body at the end of such time interval divided by the sum of the amounts of both of the fluids contained in the reservoir body at the end of such time interval, together with means to adjust the adjustable means which permits flow of each of the fluids simulated by the measurable medium corresponding to such fluid to permit flow of the measurable media for both fluids in a ratio corresponding to the relative permeabilities of the two fluids for the ratio determined by said ratio determining means.

55. Means as defined in claim 54, wherein the numerator of said division is the amount corresponding to water component of the fluids contained in the reservoir body, and the divisor is the sum of amounts corresponding to both water and oil contained in the reservoir body, and the dividend ratio is the percent water saturation of the fluids contained in the reservoir body divided by one hundred.

56. Means as defined in claim 54, wherein the means to measure the net quantity of each of the measurable media flowed through each simulating unit in a pre-determined time interval comprises a first defined measuring means, and wherein the means to add to the amount of the fluid simulated by each such measurable medium and contained in the reservoir body at the beginning of the reservoir time interval, the amount of each such fluid corresponding to such net quantity of such measurable medium to determine the amount of fluid simulated by each such measurable medium and contained in such reservoir body at the end of the reservoir time interval corresponding to the simulating unit interval of time, comprises a second defined measuring means, and wherein the means to determine the ratio of the amount of one of the fluids contained in the reservoir body at the end of such time interval, divided by the sum of the amounts of both of the fluids contained in the reservoir body at the end of such time interval comprises a third defined ratio calculating means, and wherein there is a means to adjust the adjustable means which permits flow of each of the measurable media which simulate the fluids contained in the corresponding reservoir body, to permit flow of said measurable media for both fluids in a ratio corresponding to the relative permeabilities of the two fluids at the ratio determined in said third defined ratio calculating means, corresponding to each of the simulating units, each such means comprising a fourth defined permeability adjusting means for such simulating unit.

57. Means as defined in claim 56, wherein the numerator of the division to produce said ratio is the amount corresponding to water component of the fluids contained in the reservoir body, and the divisor of said division is the sum of amounts corresponding to both water and oil contained in the reservoir body, and the dividend ratio is the percent water saturation of the fluids contained in the reservoir body divided by one hundred.

58. Means as defined in claim 57, together with means to determine and indicate the relative permeabilities of the fluid components contained in the reservoir, corresponding to varying percentages of water saturations of the fluid components contained in such reservoir, said means comprising a fifth defined relative permeability determining and indicating means.

59. Means as defined in claim 58, wherein there is included in the means to simulate the drainage and flow characteristics of such reservoir, one of said first defined measuring means, one of said second defined measuring means, and one of said fifth defined relative permeability determining and indicating means corresponding to said plurality of simulating units, and is included one of said third defined ratio calculating means and one of said fourth defined permeability adjusting means corresponding to each of said simulating units.

60. Means as defined in claim 59, together with selector switch means intermediate between the simulating units and the first defined measuring means, said selector switch means being constituted to successively connect the simulating units to the first defined measuring means in a preselected squence of the simulating units for actuation of said switch means in a given direction, together with operative connections between the first defined measuring means and the second defined measuring means, means to connect each of the third defined ratio calculating means for the specific simulating units, to the second defined measuring means in the same sequence as the sequence of the switch produced connections of the simulating units to the first defined measuring means, and simultaneously with such connections, means to connect each of the third defined ratio calculating means to the fifth defined relative permeability determining and indicating means simultaneously with connection of such third defined ratio calculating means to the second defined measuring means, and means to connect each of the fourth defined permeability adjusting means for the specific simulating units to the fifth defined permeability determining and indicating means in the same sequence as the sequence of the switch produced connections of the simulating units to the first defined measuring means and simultaneously with such connections.

61. Means as defined in claim 60, together with means to actuate said selector switch means, and the means which connects each of the third defined ratio calculating means to the second defined measuring means, and the means which connects each of the third defined ratio calculating means to the fifth defined relative permeability determining and indicating means, and the means which connects each of the fourth defined permeability adjusting means to the fifth defined permeability determining and indicating means simultaneously step-by-step to thereby produce adjustments of the fourth defined permeability adjusting means corresponding to the simulating units simultaneously with the successive actuations of the selector switch for successive connections of the simulating units to the first defined measuring means.

62. Means as defined in claim 61, wherein said actuating means comprises a programming unit, together with means to actuate said programming unit through cycles of operation, during each of which cycles said connections are produced as defined.

63. Means as defined in claim 62, wherein each such cycle of operation of the programming unit includes such defined connections and operations corresponding to all of the simulating units.

64. Means as defined in claim 61, wherein the fourth defined permeability adjusting means for each simulating unit includes a movably adjustable setting element corresponding to the adjustable means which conducts the flow of the measurable medium for each fluid component of such simulating unit, and a carrier supporting such movably adjustable setting elements corresponding to all of the adjustable means which conduct the flow of the measurable medium for all of the simulating units, means to support said carrier for movement through cycles of movement in a path of movement of form to cause the movably adjustable setting elements to register successively with the fifth defined permeability determining and indicating means simultaneously with movement of the selector switch means to positions for successive connection of the simulating units to the first defined measuring means in such pre-selected sequence of the simulating units, and said fifth defined permeability determining and indicating means and said movably adjustable setting elements including parts to co-operate with each other when the movably adjustable setting elements register with the permeability determining and indicating means in such cycle of movement, effectively to cause the setting elements to move to set positions corresponding to the values of permeability so determined and indicated by the fifth permeability determining and indicating means.

65. Means as defined in claim 64, together with means to advance said carrier step-by-step to such registering positions simultaneously with the actuation of the selector switch means, as aforesaid.

66. Means as defined in claim 65, wherein at completion of the cycle of movement the carrier occupies the same position with respect to the co-operating parts of the fifth defined permeability determining and indicating means as it occupied at the beginning of such cycle of movement.

67. Means as defined in claim 66, wherein the adjustable means which conduct the flow of the measurable medium in the simulating units include means co-operatible with the adjustable setting elements of the carrier effectively to re-set such adjustable means to correspond to the set positions of the setting elements, and wherein all of the co-operatible means of the adjustable means of all of the simulating units register with the co-operatible means of the carrier when such carrier is in its cycle completed position.

68. Means as defined in claim 67, together with means to move the co-operatible means of the adjustable means of the simulating units into such co-operation with the corresponding setting elements in the set positions of such setting elements, to thereby adjust the adjustable means of the simulating units to correspond with the permeability determined and indicated positions to which the setting elements have been set.

69. Means as defined in claim 68, wherein the means which actuates the selector switch means, and the means which connects each of the third defined ratio calculating means to the second defined measuring means, and the means which connects each of the third defined ratio calculating means to the fifth defined relative permeability determining and indicating means, and the means which connects each of the fourth defined permeability adjusting means to the fifth defined permeability determining and indicating means simultaneously step-by-step to thereby produce adjustments of the fourth defined permeability adjusting means corresponding to the simulating units simultaneously with the successive actuations of the selector switch for successive connections of the simulating units to the first defined measuring means, also includes means to advance the carrier of the movably adjustable setting elements step-by-step to cause the setting elements to register with the relative permeability determining and indicating means in an order of succession corresponding to the order of succession of the simulating units to the first defined measuring means.

70. Means as defined in claim 69, wherein said actuating means comprises a programming unit, together with means to actuate said programming unit through cycles of operation, during each of which cycles said connections are produced as defined.

71. Means as defined in claim 70, wherein each such cycle of operation of the programming unit includes such defined connections and operations corresponding to all of the simulating units.

72. Means as defined in claim 69, together with means to make a record of the ratio determined by said third defined ratio calculating means corresponding to each of the simulating units selected by the selector switch means, and means to advance said record making means to positions of the records corresponding to the successive simulating units so selected by the selector switch means.

73. Means as defined in claim 72, wherein said actuating means comprises a programming unit, together with means to actuate said programming unit through cycles of operation, during each of which cycles said connections are produced as defined.

74. Means as defined in claim 73, wherein each such cycle of operation of the programming unit includes such defined connections and operations corresponding to all of the simulating units.

75. Means as defined in claim 74, together with means to make ineffective the programming unit actuating means, and operative connections between the means which makes a record of the ratio so determined by said third defined ratio calculating means, and the means which makes ineffective the programming unit actuating means, such operative connections including means to make effective such operative connections when said ratio record making means makes a record for a ratio of value exceeding a pre-determined amount, to thereby discontinue the actuation of the programming unit.

76. In an apparatus for simulating the drainage and flow characteristics of a porous permeable fluid containing reservoir in which reservoir are contained a mixture of at least two fluid components, one of said fluids being characterized by the quality of wetting the permeable reservoir and constituting a wetting agent of the material of said reservoir, and the material of said reservoir and of said fluid components being characterized by the fact that when the percent of the wetting agent component comprises one hundred percent of the fluid flowing through the formation the relative permeability of the formation to flow of such wetting agent component comprises one hundred percent, and also characterized by the fact that when the percent of the non-wetting agent component comprises one hundred percent of the fluid flowing through the formation the relative permeability of the formation to the flow of such non-wetting agent component comprises one hundred percent, and characterized by the fact that for progressive reductions of the percent of each component of the mixture, the relative permeability of the formation to the flow of such component through the formation decreases, and further characterized by the fact that the permeability of the formation to the flow of at least one such component becomes zero when the percentage of such component is more than zero, said means comprising a simulating unit simulating the fluid flow characteristics of such reservoir body, and including at least two electrically conducting adjustable impedances, one such impedance constituting a permeability simulating element corresponding to one of the fluid components and another such impedance constituting a permeability simulating element corresponding to another fluid component, means to connect said impedances together in parallel relationship including common terminal connections for both such impedances, current flow through the impedances of said unit from one terminal to the other simulating the fluid mixture flow through the simulated body of the reservoir, means to determine and indicate the rate of current flow through one impedance element comprising means to measure and give an electrical first defined signal proportional to said current rate, and means to translate and indicate such signal as a rate of flow of the simulated fluid component of the reservoir body simulated by said simulating element.

77. Means as defined in claim 76, wherein the viscosity of said reservoir contained simulated fluid is of value corresponding to the formation pressure of the reservoir body simulated by said impedance, together with means to produce and deliver a second defined signal corresponding to the viscosity of said fluid component contained in said reservoir body at the formation pressure thereof, together with means to produce and deliver a third defined signal of value proportional to the product of the viscosity of said fluid component corresponding to said second defined signal multiplied into the rate of said fluid component corresponding to said first defined signal, the value of said third defined signal corresponding to the relative permeability of said fluid component to flow through the simulated reservoir body at the formation pressure thereof.

78. Means as defined in claim 77, wherein the viscosity of said reservoir contained simulated fluid is of value corresponding to the formation pressure of the reservoir body simulated by said impedance and the gas contained in said simulated fluid contained in said reservoir body at such formation pressure, and wherein the value of said third defined signal corresponds to the relative permeability of said fluid component including such contained gas to flow through the simulated reservoir body at the formation pressure thereof and the gas contained in such fluid component.

79. Means as defined in claim 77, wherein said fluid component simulated by said impedance element comprises oil.

80. Means as defined in claim 78, wherein said fluid component simulated by said impedance element comprises oil.

81. Means as defined in claim 77, wherein said fluid component simulated by said impedance element comprises water.

82. Means as defined in claim 78, wherein said fluid component simulated by said impedance element comprises water.

83. Means as defined in claim 77, together with means to produce and give an indication of a fourth defined signal of value proportional to a ratio between the two fluid components simulated by the two impedance elements of said simulating unit, together with connections between the means which produces and delivers said third defined signal and the means which produces and gives an indication of said fourth defined signal effective to cause said fourth defined signal producing and giving means to produce and give its signal for the ratio which corresponds to the value of the relative permeability to which said third defined signal corresponds.

84. Means as defined in claim 83, together with means to produce and give an indication of a fifth defined signal of value proportional to a ratio between the two fluid components simulated by the two impedance elements of said simulating unit, said fifth defined signal corresponding to the relative permeability of the other fluid component of said simulated reservoir body, together with connections between the means which produces and gives an indication of the fourth defined signal at its value which is proportional to the ratio which corresponds to the third defined signal, and said fifth defined signal producing and indicating means, effective to cause said fifth defined signal producing and giving means to produce and give its signal for the ratio which corresponds to the value of the relative permeability to which the third defined signal corresponds.

85. Means as defined in claim 83, wherein the other fluid component of the simulated reservoir body simulated by said other impedance element comprises water, and wherein the indication which is produced and given by the fourth defined signal producing and giving means corresponds to the water saturation at the relative permeability of the fluid component simulated by said one impedance element.

86. Means as defined in claim 85, wherein the ratio at which the fifth defined signal producing and giving means gives its signal is the water saturation corresponding to the relative permeability to which the third defined signal corresponds.

87. In apparatus for simulating the drainage and flow characteristics of a porous permeable fluid containing reservoir in which reservoir is contained a mixture of at least two fluid components in a changing ratio of said components and wherein the permeabilities of such fluid components to flow through a body of the reservoir are of values which vary with change in the ratio of such fluid components, means to simulate said fluid flow characteristics of the fluid mixture through said reservoir, comprising a series of simulating units corresponding to proximate bodies of the reservoir, each simulating unit including at least two electrically conducting adjustable impedances, one such impedance constituting a permeability simulating element for one of the fluid components and another such impedance constituting a permeability simulating element for another fluid component, means to connect said impedances together in parallel relationship including common terminal connections for both such impedances, current flow through the impedances of each such unit from one terminal to the other simulating the fluid mixture flow through the simulated body of the reservoir, means to adjust the impedance value of each of said impedances to correspond at such ratio of the fluid contents, to a function of the permeability of the corresponding fluid component, to flow through the simulated body of the reservoir, means to connect together the proximate terminals of adjacent simulating units to produce an electrical network of connected units simulating the proximate and fluid flow connected bodies of the reservoir, means to supply electric current to at least one selected point of said network, comprising a drive simulating means, and means to deliver electric current from at least one selected point of said network, comprising a production simulating means.

88. Means as defined in claim 87, together with means to maintain the magnitude of the current delivered through said production simulating means constant.

89. Means as defined in claim 88, together with means to vary the potential delivered to the drive simulating means.

90. Means as defined in claim 89, wherein the means to maintain the volume of current delivered through the production simulating means constant, comprises means to vary the potential delivered to the drive simulating means.

91. In apparatus for simulating the drainage and flow characteristics of a porous permeable fluid containing reservoir in which reservoir is contained a fluid component, means to simulate said fluid flow characteristics of the fluid through said reservoir, comprising a series of simulating units corresponding to proximate fluid flow connected bodies of the reservoir, each simulating unit including at least one electrically conducting adjustable impedance, such impedance constituting a permeability simulating element for the fluid component, means to connect the impedances of the simulating units together into a network of said impedances corresponding to the fluid flow connected bodies of the reservoir, means to supply electric current to at least one selected point of said network, comprising a drive simulating means, means to deliver electric current from at least one selected point of said network, comprising a production simulating means, wherein said reservoir fluid component includes gas in solution, and wherein the amount of such gas in solution per unit quantity of such component decreases with reduction of the formation pressure to which said component is subjected, with shrinkage in volume of such fluid component per unit quantity of such component, and with release of gas from solution at the reservoir body location simulated by said simulating unit, said fluid component entering the reservoir body including an amount of gas larger than said fluid component leaving said reservoir body per unit quantity of such component, and the volume of said fluid component entering said simulated reservoir body being larger than the volume of said fluid component leaving said reservoir body per unit quantity of such component, and wherein the current flow through the impedance element simulates flow of said fluid component through the reservoir body simulated by said simulating unit, the magnitude of the current delivered to said impedance element corresponding to the volume of said component delivered to the reservoir body simulated by said simulating unit including said larger quantity of gas, means to determine and give an indication of a sixth defined signal of value corresponding to a correction factor proportional to the change in volume of said component in the reservoir body simulated by said simulating unit which change in volume corresponds to reduction of formation pressure during flow of such component through said simulating unit, said signal determining and indicating means including means to test the network potential at the location of said simulating unit, means to test the potential drop through the impedance element, means to produce and indicate a signal proportional to the formation pressure to which said network potential corresponds, and means to determine and indicate the change in formation volume factor corresponding to the potential drop at the formation pressure represented by the network potential at the location of said simulating unit.

References Cited in the file of this patent

UNITED STATES PATENTS 2,924,384   Potter _____ Feb. 9, 1960